US012277234B2

(12) United States Patent
Durham et al.

(10) Patent No.: US 12,277,234 B2
(45) Date of Patent: Apr. 15, 2025

(54) CRYPTOGRAPHIC COMPUTING IN MULTITENANT ENVIRONMENTS

(71) Applicant: Intel Corporation, Santa Clara, CA (US)

(72) Inventors: David M. Durham, Beaverton, OR (US); Michael D. LeMay, Hillsboro, OR (US); Salmin Sultana, Hillsboro, OR (US); Karanvir S. Grewal, Hillsboro, OR (US); Michael E. Kounavis, Portland, OR (US); Sergej Deutsch, Hillsboro, OR (US); Andrew James Weiler, Hillsboro, OR (US); Abhishek Basak, Bothell, WA (US); Dan Baum, Haifa (IL); Santosh Ghosh, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 17/791,000

(22) PCT Filed: Dec. 26, 2020

(86) PCT No.: PCT/US2020/067072
§ 371 (c)(1),
(2) Date: Jul. 6, 2022

(87) PCT Pub. No.: WO2021/162792
PCT Pub. Date: Aug. 19, 2021

(65) Prior Publication Data
US 2023/0027329 A1    Jan. 26, 2023

Related U.S. Application Data

(60) Provisional application No. 63/122,444, filed on Dec. 7, 2020, provisional application No. 62/976,319, filed on Feb. 13, 2020.

(51) Int. Cl.
*G06F 21/00*    (2013.01)
*G06F 21/54*    (2013.01)
(Continued)

(52) U.S. Cl.
CPC ............ *G06F 21/602* (2013.01); *G06F 21/54* (2013.01); *G06F 21/79* (2013.01)

(58) Field of Classification Search
CPC ........ G06F 21/602; G06F 21/54; G06F 21/79; G06F 21/57; G06F 2212/402; G06F 12/1408
See application file for complete search history.

(56) References Cited

U.S. PATENT DOCUMENTS 6,961,852 B2 *   11/2005   Craft ...................... G06F 21/123
                                                    713/168
9,015,824 B1     4/2015    Drewry et al.
(Continued)

FOREIGN PATENT DOCUMENTS

EP    3745273 A1    12/2020
JP    2011522469    7/2011
(Continued)

OTHER PUBLICATIONS

EPO; Extended European Search Report issued in EP Patent Application No. 22153425.8, dated Jul. 18, 2022; 8 pages.
(Continued)

Primary Examiner — Yogesh Paliwal
(74) Attorney, Agent, or Firm — Alliance IP, LLC

(57) ABSTRACT

A processor, a system, a machine readable medium, and a method. The processor comprises first circuitry to: encrypt a first code image using a first code key; load the encrypted first code image into a memory area allocated in memory for the first code image by an operating system miming on the processor; and send to the operating system a substitute key
(Continued)

that corresponds to the first code key, wherein the first code key is concealed from the operating system; and an instruction cache including control circuitry; and second circuitry coupled to the instruction cache, the second circuitry to: receive the substitute key from the operating system; in response to a first request from the operating system to execute the first code image to instantiate a first process, perform a first cryptographic function using a hardware key to generate the first code key from the substitute key; and program the control circuitry of the instruction cache with the first code key to enable the first code image to be decrypted using the first code key.

25 Claims, 61 Drawing Sheets

(51) Int. Cl.
  *G06F 21/60*  (2013.01)
  *G06F 21/79*  (2013.01)

(56) References Cited

U.S. PATENT DOCUMENTS

| | | |
|---|---|---|
| 9,135,450 B2 | 9/2015 | Grobman et al. |
| 9,390,268 B1 | 7/2016 | Martini et al. |
| 9,436,847 B2 | 9/2016 | Durham et al. |
| 9,753,754 B2 | 9/2017 | Howell et al. |
| 9,830,162 B2 | 11/2017 | LeMay |
| 9,954,950 B2 | 4/2018 | LeMay et al. |
| 10,084,603 B2 | 9/2018 | Rogers et al. |
| 10,326,744 B1 | 6/2019 | Nossik et al. |
| 10,706,164 B2 | 7/2020 | LeMay et al. |
| 10,785,028 B2 | 9/2020 | Girkar et al. |
| 10,860,709 B2 | 12/2020 | LeMay et al. |
| 11,216,366 B2 | 1/2022 | Durham et al. |
| 11,288,188 B1 | 3/2022 | Tummala et al. |
| 11,403,234 B2 | 8/2022 | Durham et al. |
| 11,416,624 B2 | 8/2022 | Durham et al. |
| 11,662,928 B1 | 5/2023 | Kumar et al. |
| 11,809,735 B1 | 11/2023 | Kumar et al. |
| 11,829,488 B2 | 11/2023 | Durham et al. |
| 11,838,418 B2 | 12/2023 | Girkar et al. |
| 2002/0065993 A1 | 5/2002 | Chauvel |
| 2005/0010804 A1 | 1/2005 | Bruening et al. |
| 2005/0100163 A1* | 5/2005 | Buer .............. G06F 21/51 380/259 |
| 2006/0080553 A1 | 4/2006 | Hall |
| 2007/0192592 A1 | 8/2007 | Goettfert et al. |
| 2007/0220500 A1 | 9/2007 | Saunier |
| 2007/0230690 A1 | 10/2007 | Elhamias et al. |
| 2008/0205651 A1 | 8/2008 | Goto et al. |
| 2008/0229425 A1 | 9/2008 | Perrin et al. |
| 2008/0288785 A1 | 11/2008 | Rao et al. |
| 2008/0320601 A1 | 12/2008 | Linsley |
| 2009/0196416 A1 | 8/2009 | Minematsu |
| 2009/0249064 A1 | 10/2009 | Atley et al. |
| 2009/0285390 A1* | 11/2009 | Scherer .............. G06F 21/51 380/44 |
| 2010/0122088 A1 | 5/2010 | Oxford |
| 2010/0281273 A1 | 11/2010 | Lee et al. |
| 2011/0293097 A1 | 12/2011 | Maino et al. |
| 2013/0191649 A1 | 7/2013 | Muff et al. |
| 2013/0232507 A1 | 9/2013 | Farrugia et al. |
| 2013/0283396 A1 | 10/2013 | Langer et al. |
| 2014/0020092 A1 | 1/2014 | Davidov |
| 2014/0025944 A1* | 1/2014 | Maletsky .............. G06F 21/57 713/150 |
| 2014/0149730 A1 | 5/2014 | Joshi et al. |
| 2015/0032996 A1 | 1/2015 | Koeberl et al. |
| 2015/0161059 A1 | 6/2015 | Durham et al. |
| 2015/0371063 A1* | 12/2015 | Van Antwerpen ....... G09C 1/00 713/190 |
| 2015/0381358 A1 | 12/2015 | Grobman et al. |
| 2016/0092702 A1 | 3/2016 | Durham et al. |
| 2016/0192194 A1 | 6/2016 | Yang |
| 2016/0292422 A1 | 10/2016 | Hayashi et al. |
| 2016/0335187 A1 | 11/2016 | Greenspan et al. |
| 2016/0364341 A1 | 12/2016 | Banginwar et al. |
| 2016/0371496 A1 | 12/2016 | Sell |
| 2016/0380772 A1 | 12/2016 | Gopal et al. |
| 2017/0063547 A1 | 3/2017 | Brandt et al. |
| 2017/0093567 A1 | 3/2017 | Gopal et al. |
| 2017/0171185 A1 | 6/2017 | Camenisch et al. |
| 2017/0235957 A1 | 8/2017 | Maletsky |
| 2017/0237560 A1 | 8/2017 | Mueller et al. |
| 2017/0249260 A1 | 8/2017 | Sahita et al. |
| 2017/0300425 A1 | 10/2017 | Meredith et al. |
| 2017/0308297 A1 | 10/2017 | Roberts et al. |
| 2017/0344297 A1 | 11/2017 | Woolman et al. |
| 2017/0364704 A1 | 12/2017 | Wright et al. |
| 2018/0046576 A1 | 2/2018 | Lesartre et al. |
| 2018/0046823 A1* | 2/2018 | Durham .............. G06F 21/53 |
| 2018/0069694 A1 | 3/2018 | Riou |
| 2018/0082057 A1 | 3/2018 | LeMay et al. |
| 2018/0247082 A1* | 8/2018 | Durham .............. G06F 21/53 |
| 2018/0268170 A1 | 9/2018 | Li et al. |
| 2019/0007204 A1 | 1/2019 | Field et al. |
| 2019/0044927 A1 | 2/2019 | Sood et al. |
| 2019/0087354 A1* | 3/2019 | Chhabra .............. G06F 21/64 |
| 2019/0102322 A1 | 4/2019 | Chhabra et al. |
| 2019/0102577 A1 | 4/2019 | Gueron et al. |
| 2019/0147192 A1 | 5/2019 | Khosravi et al. |
| 2019/0220625 A1* | 7/2019 | Durham .............. G06F 8/63 |
| 2019/0227951 A1 | 7/2019 | Durham et al. |
| 2019/0339978 A1 | 11/2019 | Wallach |
| 2019/0377574 A1 | 12/2019 | Weimer |
| 2020/0050553 A1 | 2/2020 | Haj et al. |
| 2020/0089430 A1 | 3/2020 | Kanno |
| 2020/0125501 A1 | 4/2020 | Durham et al. |
| 2020/0125770 A1 | 4/2020 | LeMay et al. |
| 2020/0159676 A1 | 5/2020 | Durham et al. |
| 2020/0201789 A1 | 6/2020 | Durham et al. |
| 2020/0241775 A1 | 7/2020 | Breslow |
| 2020/0249995 A1 | 8/2020 | Wong et al. |
| 2020/0379902 A1 | 12/2020 | Durham et al. |
| 2020/0380140 A1 | 12/2020 | Medwed et al. |
| 2020/0382303 A1 | 12/2020 | Girkar et al. |
| 2021/0200673 A1 | 7/2021 | Gupta et al. |
| 2021/0240638 A1 | 8/2021 | Deutsch et al. |
| 2021/0405896 A1 | 12/2021 | Durham et al. |
| 2022/0012188 A1 | 1/2022 | Durham et al. |
| 2022/0156180 A1 | 5/2022 | Durham et al. |
| 2022/0206958 A1 | 6/2022 | LeMay et al. |
| 2022/0335140 A1 | 10/2022 | Sultana et al. |
| 2022/0343029 A1 | 10/2022 | Sultana et al. |
| 2022/0382885 A1 | 12/2022 | Durham et al. |

FOREIGN PATENT DOCUMENTS

| | | |
|---|---|---|
| JP | 2013541783 A | 11/2013 |
| JP | 2015061182 A | 3/2015 |
| JP | 2019091430 A | 6/2019 |
| KR | 101754518 B1 | 7/2017 |
| WO | 2013147794 A1 | 10/2013 |
| WO | 2014059438 A2 | 4/2014 |
| WO | 2021162792 A1 | 8/2021 |
| WO | 2022139850 | 6/2022 |

OTHER PUBLICATIONS

PCT International Preliminary Report on Patentability issued in PCT/US2020/067072, dated Aug. 25, 2022; 8 pages.
France Intellectual Property Office; Search Report issued in FR2114288, dated Jan. 12, 2023; 24 pages with English translation.
USPTO Notice of Allowance for U.S. Appl. No. 17/485,213 received Dec. 14, 2023 (11 pages).
USPTO; Notice of Allowance issued in U.S. Appl. No. 17/472,272, dated Jan. 9, 2024, 9 pages.

(56) References Cited

OTHER PUBLICATIONS

International Preliminary Report on Patentability for International Patent Application No. PCT/US2020/067076, mailed Jul. 6, 2023; 7 pages.
Kroes et al., Fast and Generic Metadata Management with Mid-Fat Pointers, 2017, ACM, 6 pages (Year: 2017).
Non-Final Office Action received in U.S. Appl. No. 17/472,272, dated Jul. 7, 2023, 11 pages.
French Office Action received in Application No. 2114288, dated Apr. 3, 2024, with English translation, 6 pages.
USPTO Final Office Action for U.S. Appl. No. 17/481,405 received on Aug. 30, 2023, entitled, Cryptographic Computing Including Enhanced Cryptographic Addresses (21 pages).
USPTO Non-Final Office Action for U.S. Appl. No. 17/539,933, filed Dec. 1, 2021 entitled, Security Check Systems and Methods for Memory Allocations (5 pages).
Ainsworth, Sam et al., "MarkUs: Drop-in use-after-free prevention for low-level languages," 2020 IEEE Symposium on Security and Privacy, Cambridge, UK (14 pages).
Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.
Carr, Scott A. et al., "DataShield: Configurable Data Confidentiality and Integrity," Purdue University, Asia CCS, '17, Apr. 2-6, 2017, Abu Dhabi, United Arab Emirates (12 pages).
Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.
Durham, David M. et al.; U.S. Appl. No. 17/539,933, filed Dec. 1, 2021.
EPO; Extended European Search Report issued in EP Patent Application No. 20210029.3, dated May 20, 2021; 8 pages.
EPO; Office Action issued in EP Patent Application No. 20210029.3, dated Mar. 16, 2022; 4 pages.
Filardo, Nathaniel Wesley et al., "Cornucopia: Temporal Safety for CHERI Heaps;" Cambridge, UK. (18 pages).
GitHub.com; "V8 Garbage Collector," Oct. 23, 2018 (13 pages).
Haraken@, et al.,; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr; 9 pages.
Haraken@; "CheckedPtr2 and CheckedPtr3," retrieved from the Internet at https://docs.google.com/document/d/14TsvTgswPUOQuQoI9TmkFQnuSaFD8ZLHRvzapNwl5vs; published Apr. 4, 2020; 8 pages.
Hong, H. et al., "Data-Oriented Programming: On the Expressiveness of Non-Control Data Attacks," IEEE S&P 18 pages, 2016.
Intel; "Intel 64 and IA-32 Architectures Software Developer's Manual," vol. 1: Basic Architecture, Chapter 3: Basic Execution Environment; Oct. 2019; 57 pages.
Intel; "Intel 64 and IA-32 Architectures Software Developer's Manual," vol. 1: Basic Architecture, Chapter 6: Procedure Calls, Interrupts, and Exceptions; Oct. 2019; 48 pages.
Intel; "Intel 64 and IA-32 Architectures Software Developer's Manual," vol. 3: System Programming Guide, Chapter 6; Oct. 2019; 110 pages.
Kim, Yonghae, et al.; "Hardware-based Always-on Heap Memory Safety," 2020 53rd Annual IEEE/ACM International Symposium on Microarchitecture (MICRO); Athens, Greece; 14 pages.
L. Muscariello et al., "Hybrid Information-Centric Networking draft-muscariello-intarea-hicn-00," Cisco Systems, Inc., Jun. 7, 2018 (21 pages).
Mohamed et al., "A scheme for implementing address translation storage buffers," Proceedings of the 2002 IEEE Canadian Conference on Electrical and Computer Engineering, 2002, pp. 626-632.
Myoung Jin Nam, Periklis Akritidis, and David J Greaves. 2019. Framer: a tagged-pointer capability system with memory safety applications. In Proceedings of the 35th Annual Computer Security Applications Conference (ACSAC 19), Association for Computing Machinery, New York, NY, USA, 612-626, https://doi.org/10.1145/3359789.3359799.
Notice of Allowance, U.S. Appl. No. 16/024,259, May 20, 2020, 20 pages.
Notice of Allowance, U.S. Appl. No. 16/728,928, Feb. 22, 2021, 10 pages.
Notice of Allowance, U.S. Appl. No. 17/321,087, Apr. 13, 2022, 13 pages.
Notice of Allowance, U.S. Appl. No. 17/321,087, May 4, 2022, 9 pages.
PCT International Search Report and Written Opinion issued in PCT/US2020/067072, dated May 26, 2021; 13 pages.
PCT International Search Report and Written Opinion issued in PCT/US2020/067076, dated Sep. 9, 2021; 11 pages.
Watson et al., Capability Hardware Enhanced RISC Instructions (CHERI): Notes on the Meltdown and Spectre Attacks, University of Campbridge Computer Laboratory, Feb. 2018, 16 pages.
Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Xia, Hongyan et al., "CHERIvoke: Characterising Pointer Revocation using CHERI Capabilities for Temporal Memory Safety, " MICRO-52, Oct. 2019, Columbus, OH, US (13 pages).
Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017).
USPTO Non-Final Office Action for U.S. Appl. No. 17/481,405 received on Feb. 16, 2023, entitled, Cryptographic Computing Including Enhanced Cryptographic Addresses (19 pages).
USPTO Non-Final Office Action for U.S. Appl. No. 17/485,213 received on Feb. 14, 2023, entitled, Object and Cacheline Granularity Cryptographic Memory Integrity (19 pages).
EPO European Extended Search Report in EP Application Serial No. 20918345.8 mailed on Mar. 14, 2024, 7 pages.
USPTO Final Office Action for U.S. Appl. No. 17/485,213 received on Aug. 8, 2023, entitled, Object and Cacheline Granularity Cryptographic Memory Integrity (19 pages).
USPTO Notice of Allowance for U.S. Appl. No. 17/539,933 received Jun. 16, 2023 entitled, Security Check Systems and Methods for Memory Allocations (7 pages).
Non-Final Office Action received in U.S. Appl. No. 16/998,913, dated Jan. 25, 2023, 13 pages.
Dutch Office Action received in Application No. 2029792, dated Mar. 22, 2023, with Statement of Relevance, 15 pages.
L. Florin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
Japanese Office Action received in Application No. 2022-540601, dated Sep. 3, 2024, with English translation, 6 pages.
USPTO Notice of Allowance in U.S. Appl. No. 17/855,261 mailed on Oct. 29, 2024 (10 pages).
Cai, Zechao, et al.; "Demystifying Pointer Authentication on Apple M1," Proceedings of the 32nd USENIX Security Symposium; Aug. 9-11, 2023; 17 pages.
USPTO Final Office Action issued in U.S. Appl. No. 17/854,814, dated Sep. 24, 2024; 14 pages.
USPTO Non-Final Office Action in U.S. Appl. No. 17/953,186 mailed on Sep. 27, 2024 (18 pages).
USPTO Non-Final Office Action in U.S. Appl. No. 18/499,133 dated Sep. 26, 2024 (15 pages).
USPTO Final Office Action in U.S. Appl. No. 17/953,186, mailed on Jan. 7, 2025 (17 pages).
USPTO Notice of Allowance in U.S. Appl. No. 17/878,322, mailed on Dec. 18, 2024 (10 pages).

* cited by examiner

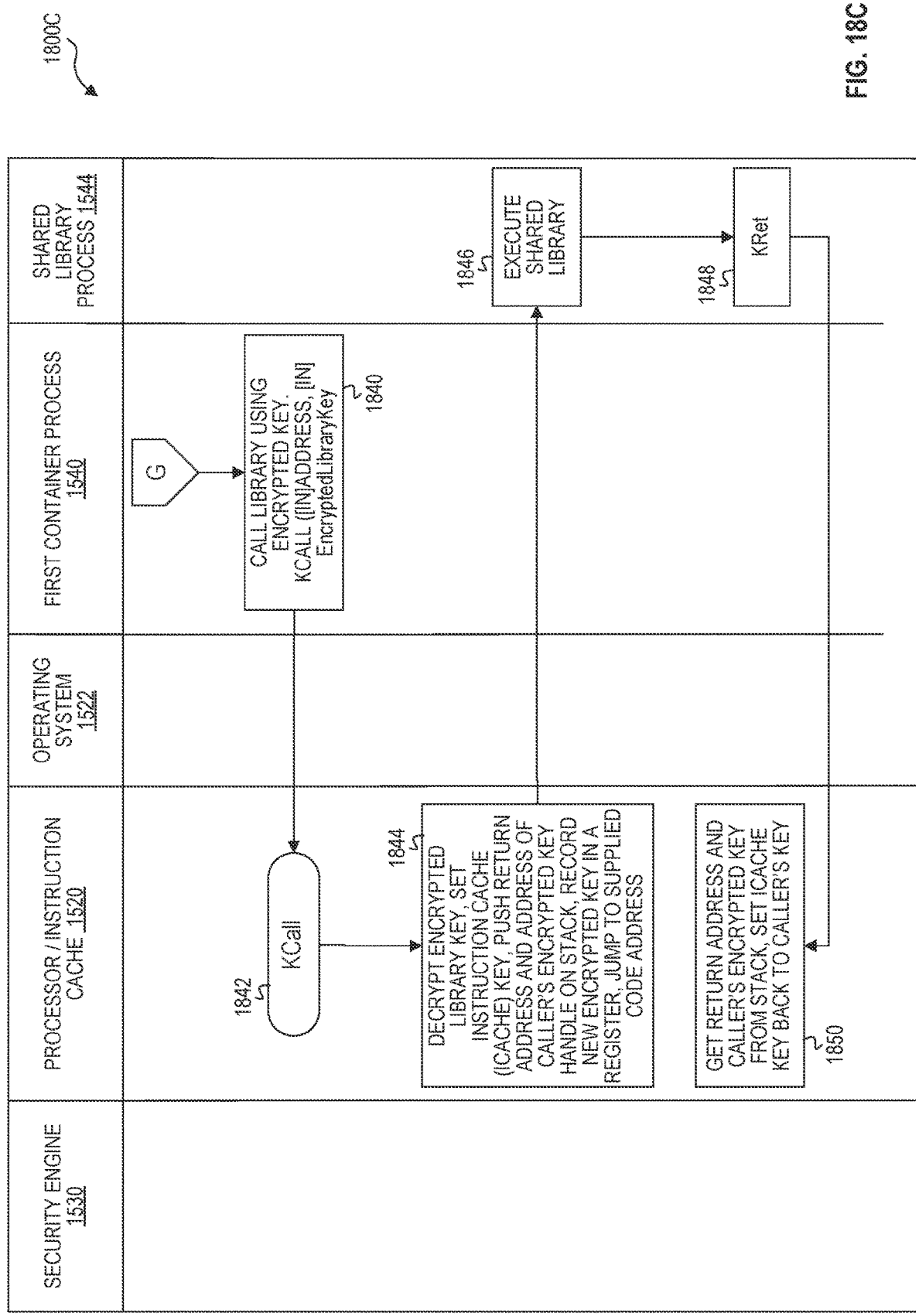

CRYPTOGRAPHIC COMPUTING IN MULTITENANT ENVIRONMENTS

CROSS REFERENCE TO RELATED APPLICATION

This Application is a national phase filing under 35 U.S.C. § 371 of International Application No. PCT/US2020/067072, filed Dec. 26, 2020, which claims the benefit of, and priority from, U.S. Provisional Patent Application No. 63/122,444, entitled "Cryptographic Computing including Metadata Stored Outside of an Address Pointer" and filed Dec. 7, 2020, and U.S. Provisional Patent Application No. 62/976,319 entitled "Security Check Systems And Methods For Memory Allocations" and filed on Feb. 13, 2020, the entire disclosures of which are incorporated herein by reference.

TECHNICAL FIELD

This disclosure relates in general to the field of computer systems, and more particularly, to cryptographic computing in memory operations.

BACKGROUND

Protecting memory in computer systems from software bugs and security vulnerabilities is a significant concern. A buffer overflow, which can affect memory safety, occurs when a program writes data to a buffer and overruns a boundary of the buffer such that adjacent memory locations are overwritten. Similarly, reading past the end of a buffer into another page may trigger an access violation or fault. Another memory safety violation is referred to as a dangling pointer. A dangling pointer is a reference that is not resolved to a valid destination. This may occur when memory is deallocated without modifying the value of an existing pointer to the deallocated (or freed) memory. If the system reallocates the freed memory and the dangling pointer is used to access the reallocated memory, unpredictable behavior, including system failure, may occur.

Current computing techniques (e.g., page tables for process/kernel separation, virtual machine managers, managed runtimes, etc.) have used architecture and metadata to provide data protection. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as for function as a service (FaaS) workloads or for per-object bounds information), and particularly in multitenant environments.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 18A-18C are flow diagrams of example container processes using shared libraries according to an embodiment;

DETAILED DESCRIPTION

Figure 1:
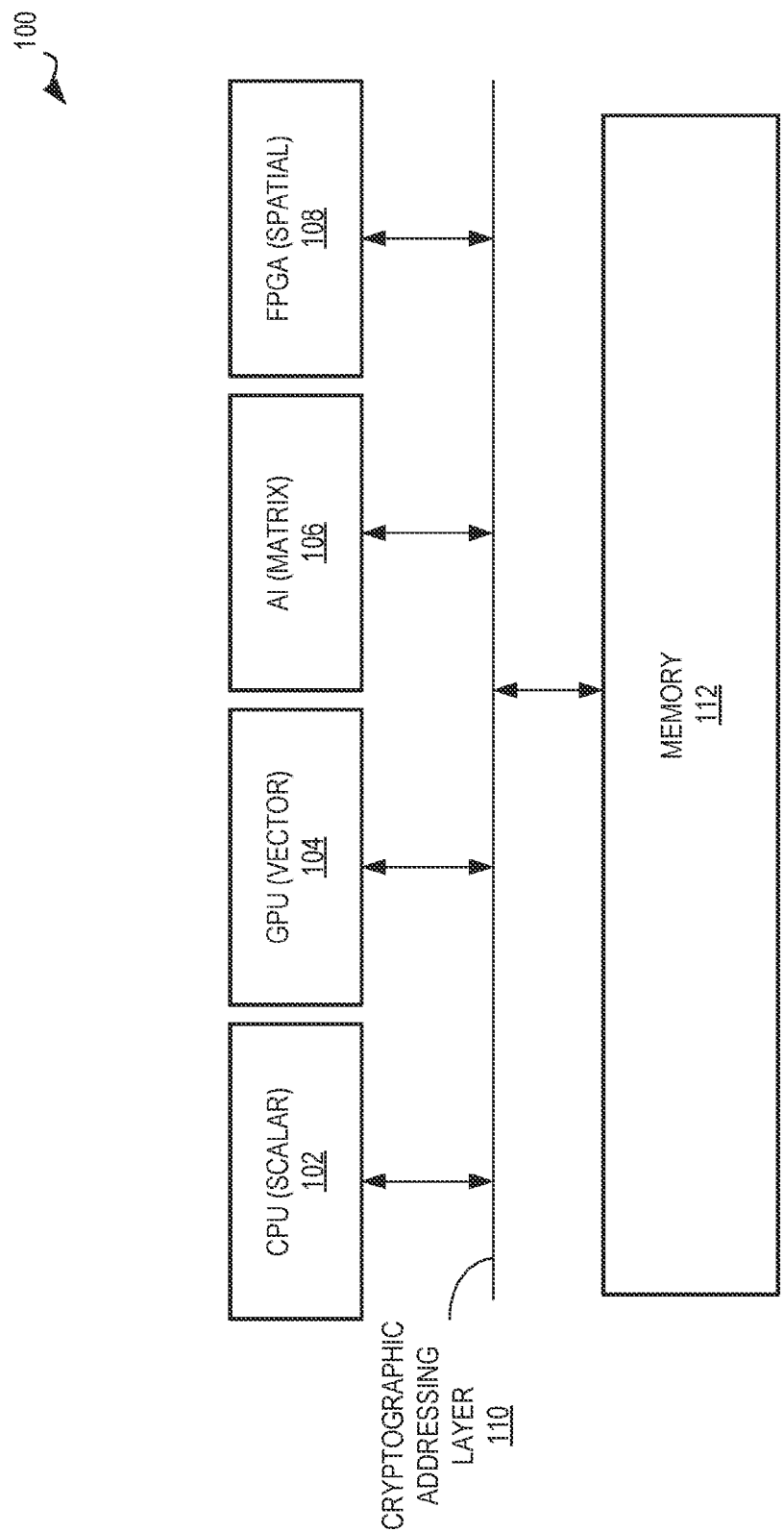
FIG. 1 is a block diagram illustrating an example cryptographic computing environment according to at least one embodiment.

The following disclosure provides various possible embodiments, or examples, for implementation of cryptographic computing. Cryptographic computing is an important trend in the computing industry, with the very foundation of computing itself becoming fundamentally cryptographic. Cryptographic computing represents a sea change, a fundamental rethinking of systems security with wide implications for the industry.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in one or more additional databases, each having an identified relationship to the accessed element. In another example, if "A"

is logically associated with "B," accessing "A" will expose or otherwise draw information and/or data from "B," and vice-versa.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Note that in the following discussion specific components are designated using an alphanumeric item designator. For example, a first element may be designated 470A and a second element may be designated 470B. For ease of discussion and conciseness, when describing a feature common to both elements, the alphanumeric designator is omitted. Thus, when such a generic (i.e., non-alphanumeric) designator is used, the described feature should be understood as applicable to all elements sharing a common numeric designator. For example, a feature described with respect to "element 470" would apply to all elements 470A-470n. On the other hand, a feature described with respect to "element 470A" would apply specifically to the element designated 470A and not to elements designated 470B through 470n.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

As used herein, "metadata" refers to at least one or more of: a tag value or version number (tag metadata), valid range metadata, context information (e.g. a memory allocation size (e.g., Bytes of allocated memory referenced by an indirect address), a type of the data or code (e.g., class of data or code defined by programming language), permissions (e.g., read, write, and execute permissions of the indirect address), a location of the data or code (e.g., address combined with the size of the data or code), an ownership of the data or code, a privilege level (e.g., user or supervisor), or a cryptographic context identifier (or crypto context ID) (e.g., randomized or deterministically unique value for each indirect address), to name a few examples. "Metadata" as used herein may also refer to a key identifier (key ID), a tweak, a counter, a memory access control (MAC), or error correction code (ECC).

As used herein, "allocation" refers to an addressable portion of memory in which an object, such as data or code, is stored.

As used herein, "bounds information" refers to information to determine a beginning and an end of an allocation based on a reference point. The reference point may include, for example, a midpoint, a beginning, an end of either a slot, a block, a page, or any other unit of memory.

As used herein, "slot," refers a unit of memory in a cache line.

As used herein, by "compartment," what is meant herein is a tenant cryptographically isolated from other tenants. As used herein, the term "cryptographic isolated" is intended to mean isolation resulting from different areas of memory (different compartments or tenants) being encrypted with different keys and/or tweaks. Isolated memory compartments/tenants can be composed of data structures and/or code of virtual machines (VMs), applications, functions, or threads. In multi-tenant environments, cryptography may be used to enforce isolation between the tenants rather than page tables or extended page tables.

As used herein, "tweak" or "tweak function" refers to a function that allows use of a physical memory address (e.g., scrambled, unscrambled, etc.) as a tweak to a block cipher by bind unencrypted data with a physical memory address. The tweak function may include, for example, XTS (xor-encrypt-xor/XEX-based tweaked-codebook mode with ciphertext stealing) algorithm, Liskov, Rivest, and Wagner (LRW) algorithm, and so on, or combinations thereof. The tweak function may, for example, spread the original physical memory address, XOR the address with the unencrypted data, and run the result through an encryptor with a key to bind the unencrypted data to the address. In one example, when an attack includes swapping ciphertext data to a different memory location, the decryptor may decrypt the ciphertext data with a memory address corresponding to a different memory location, causing corresponding unencrypted data (e.g., plaintext data) to include a random distribution of the plurality of bits.

A. Cryptographic Computing

FIGS. 1-10 below provide some example computing devices, computing environments, hardware, software, networks or flows that may be used in the context of cryptographic computing embodiments as described herein.

FIG. 1 is a block diagram illustrating an example cryptographic computing environment 100 according to at least one embodiment. In the example shown, a cryptographic addressing layer 110 extends across the example compute vectors central processing unit (CPU) 102, graphical processing unit (GPU) 104, artificial intelligence (AI) 106, and field programmable gate array (FPGA) 108. For example, the CPU 102 and GPU 104 may share the same virtual address translation for data stored in memory 112, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 112 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 2:
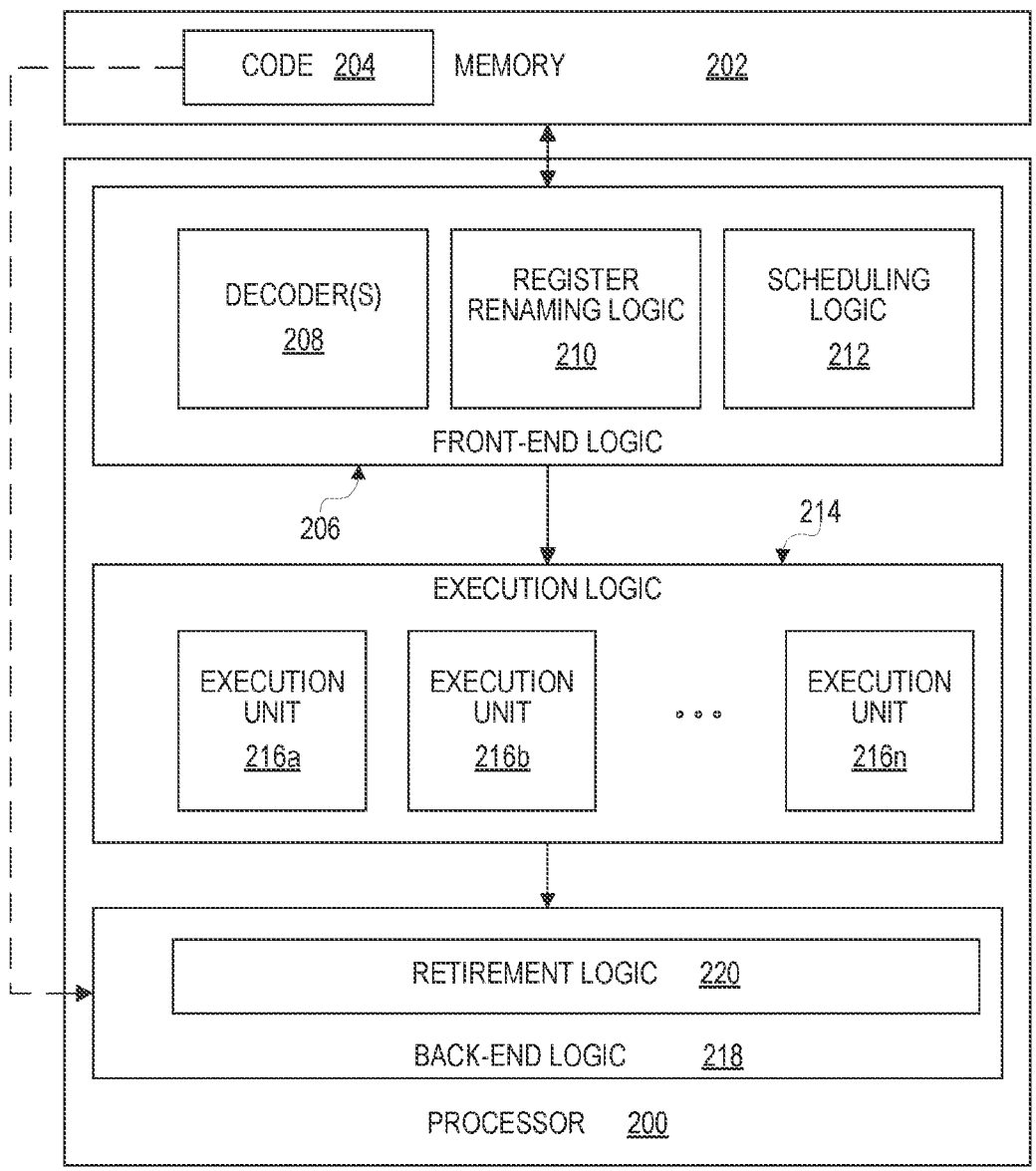
FIG. 2 is a block diagram illustrating an example processor according to at least one embodiment.
Figure 3:
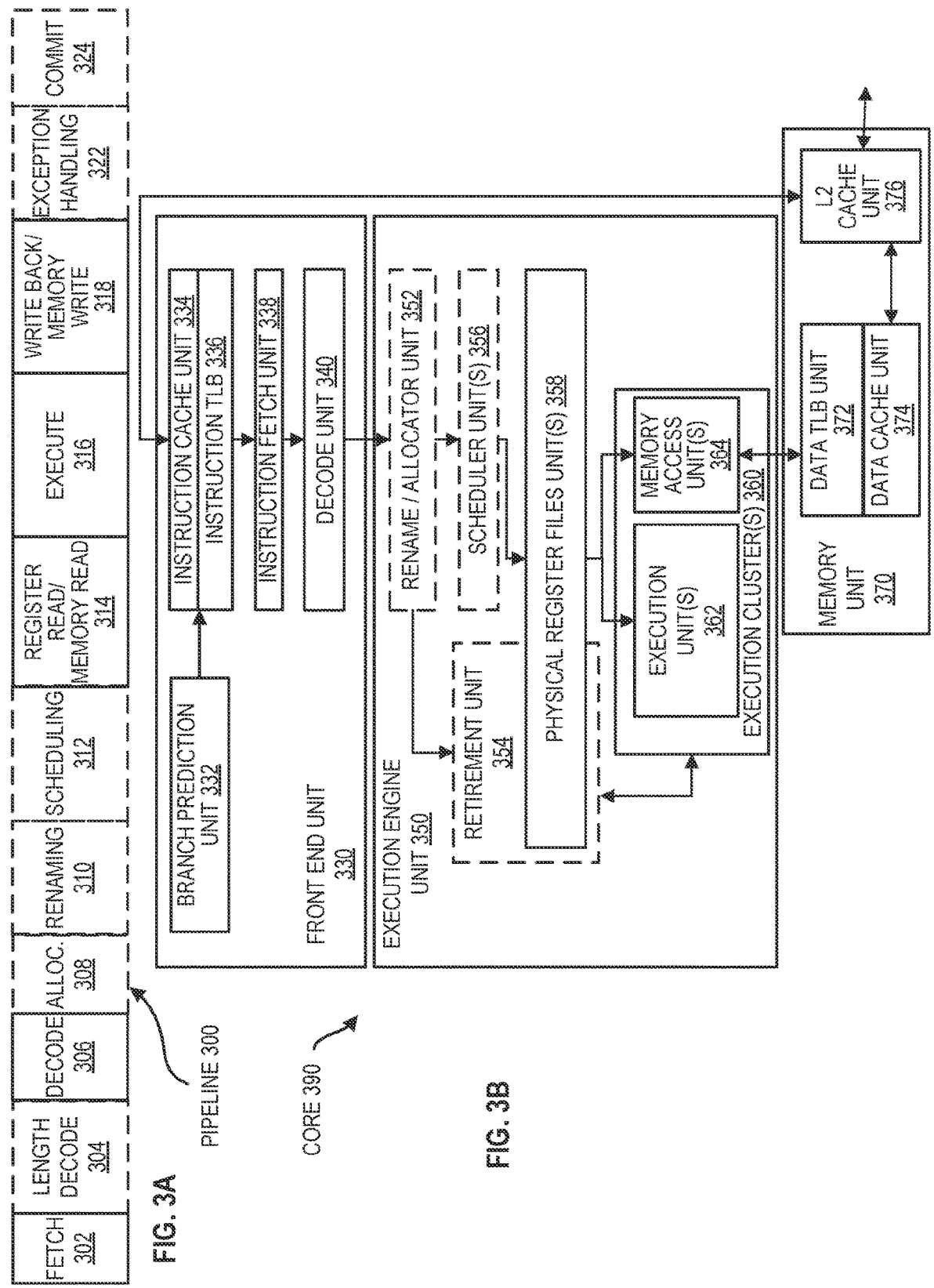
FIG. 3A is a block diagram illustrating both an exemplary in-order pipeline and an exemplary register renaming, out-of-order issue/execution pipeline in accordance with certain embodiments.
FIG. 3B is a block diagram illustrating both an exemplary embodiment of an in-order architecture core and an exemplary register renaming, out-of-order issue/execution architecture core to be included in a processor in accordance with certain embodiments.
Figure 4:
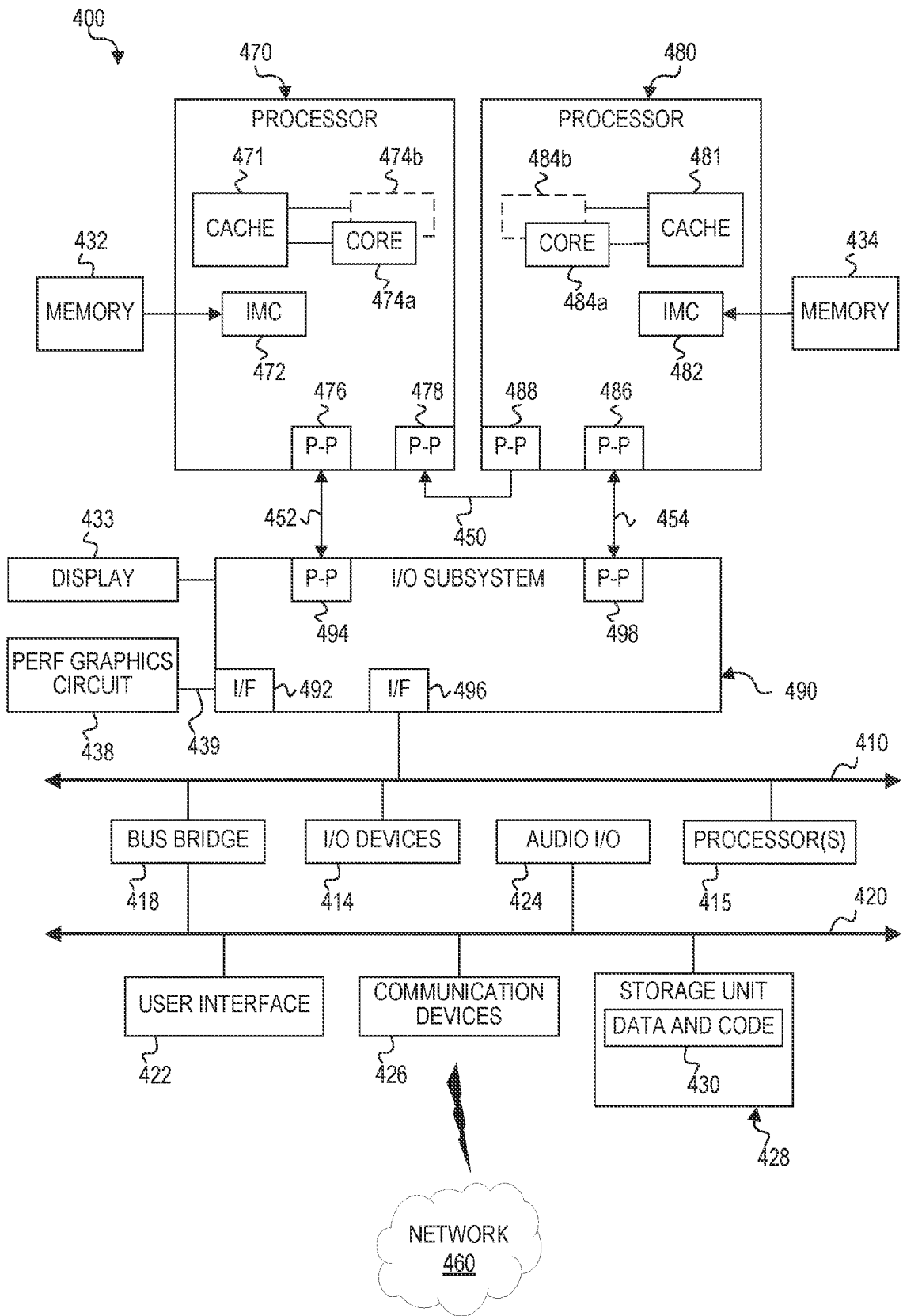
FIG. 4 is a block diagram of an example computer architecture according to at least one embodiment.

FIGS. 2-4 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 2-4.

FIG. 2 is an example illustration of a processor according to an embodiment. Processor 200 is an example of a type of hardware device that can be used in connection with the implementations shown and described herein (e.g., processor 102). Processor 200 may be any type of processor, such as a microprocessor, an embedded processor, a digital signal processor (DSP), a network processor, a multi-core processor, a single core processor, or other device to execute code. Although only one processor 200 is illustrated in FIG. 2, a processing element may alternatively include more than one of processor 200 illustrated in FIG. 2. Processor 200 may be a single-threaded core or, for at least one embodiment, the processor 200 may be multi-threaded in that it may include more than one hardware thread context (or "logical processor") per core.

FIG. 2 also illustrates a memory 202 coupled to processor 200 in accordance with an embodiment. Memory 202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 200 can execute any type of instructions associated with algorithms, processes, or operations detailed herein. Generally, processor 200 can transform an element or an article (e.g., data) from one state or thing to another state or thing.

Code 204, which may be one or more instructions to be executed by processor 200, may be stored in memory 202, or may be stored in software, hardware, firmware, or any suitable combination thereof, or in any other internal or external component, device, element, or object where appropriate and based on particular needs. In one example, processor 200 can follow a program sequence of instructions indicated by code 204. Each instruction enters a front-end logic 206 and is processed by one or more decoders 208. The decoder may generate, as its output, a micro operation such as a fixed width micro operation in a predefined format, or may generate other instructions, microinstructions, or control signals that reflect the original code instruction. Front-end logic 206 also includes register renaming logic 210 and scheduling logic 212, which generally allocate resources and queue the operation corresponding to the instruction for execution.

Processor 200 can also include execution logic 214 having a set of execution units 216a, 216b, 216n, etc. Some embodiments may include a number of execution units dedicated to specific functions or sets of functions. Other embodiments may include only one execution unit or one execution unit that can perform a particular function. Execution logic 214 performs the operations specified by code instructions.

After completion of execution of the operations specified by the code instructions, back-end logic 218 can retire the instructions of code 204. In one embodiment, processor 200 allows out of order execution but requires in order retirement of instructions. Retirement logic 220 may take a variety of known forms (e.g., re-order buffers or the like). In this manner, processor 200 is transformed during execution of code 204, at least in terms of the output generated by the decoder, hardware registers and tables utilized by register renaming logic 210, and any registers (not shown) modified by execution logic 214.

Although not shown in FIG. 2, a processing element may include other elements on a chip with processor 200. For example, a processing element may include memory control logic along with processor 200. The processing element may include I/O control logic and/or may include I/O control logic integrated with memory control logic. The processing element may also include one or more caches. In some embodiments, non-volatile memory (such as flash memory or fuses) may also be included on the chip with processor 200.

FIG. 3A is a block diagram illustrating both an exemplary in-order pipeline and an exemplary register renaming, out-of-order issue/execution pipeline according to one or more embodiments of this disclosure. FIG. 3B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 3A-3B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3A, a processor pipeline 300 includes a fetch stage 302, a length decode stage 304, a decode stage 306, an allocation stage 308, a renaming stage 310, a schedule (also known as a dispatch or issue) stage 312, a register read/memory read stage 314, an execute stage 316, a write back/memory write stage 318, an exception handling stage 322, and a commit stage 324.

FIG. 3B shows processor core 390 including a front end unit 330 coupled to an execution engine unit 350, and both are coupled to a memory unit 370. Processor core 390 and memory unit 370 are examples of the types of hardware that can be used in connection with the implementations shown and described herein (e.g., processor 102, memory 120). The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like. In addition, processor core 390 and its components represent example architecture that could be used to implement logical processors and their respective components.

The front end unit 330 includes a branch prediction unit 332 coupled to an instruction cache unit 334, which is coupled to an instruction translation lookaside buffer (TLB) unit 336, which is coupled to an instruction fetch unit 338, which is coupled to a decode unit 340. The decode unit 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM or other medium that stores microcode for certain macroinstructions (e.g., in decode unit 340 or otherwise within the front end unit 330). The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations, central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 358 comprises a vector registers unit, a write mask registers unit, and a scalar registers unit. These register units may provide architectural vector registers, vector mask registers, and general purpose registers (GPRs). In at least some embodiments described herein, register file(s) units 358 are examples of the types of hardware that can be used in connection with the implementations shown and described herein (e.g., registers 112). The physical register file(s) unit(s) 358 is overlapped by the retirement unit 354 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 362 may also include an address generation unit (e.g., 822) to calculate addresses used by the core to access main memory (e.g., memory unit 370) and a page miss handler (PMH).

The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which includes a data TLB unit 372 coupled to a data cache unit 374 coupled to a level 2 (L2) cache unit 376. In one exemplary embodiment, the memory access unit(s) 364 may include a load unit, a store address unit, and a store data unit, each of which is coupled to the data TLB unit 372 in the memory unit 370. The instruction cache unit 334 is further coupled to a level 2 (L2) cache unit 376 in the memory unit 370. The L2 cache unit 376 is coupled to one or more other levels of cache and eventually to a main memory. In addition, a page miss handler (e.g., page miss handler 826) may also be included in core 390 to look up an address mapping in a page table if no match is found in the data TLB unit 372.

By way of example, the exemplary register renaming, out-of-order issue/execution core architecture may implement the pipeline 300 as follows: 1) the instruction fetch unit 338 performs the fetch and length decoding stages 302 and 304; 2) the decode unit 340 performs the decode stage 306; 3) the rename/allocator unit 352 performs the allocation stage 308 and renaming stage 310; 4) the scheduler unit(s) 356 performs the schedule stage 312; 5) the physical register file(s) unit(s) 358 and the memory unit 370 perform the register read/memory read stage 314; the execution cluster(s) 360 perform the execute stage 316; 6) the memory unit 370 and the physical register file(s) unit(s) 358 perform the write back/memory write stage 318; 7) various units may be involved in the exception handling stage 322; and 8) the retirement unit 354 and the physical register file(s) unit(s) 358 perform the commit stage 324.

The core 390 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 334/374 and a shared L2 cache unit 376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 4 illustrates a computing system 400 that is arranged in a point-to-point (PtP) configuration according to an embodiment. In particular, FIG. 4 shows a system where processors, memory, and input/output devices are interconnected by a number of point-to-point interfaces. Generally, one or more of the computing systems or computing devices described (e.g., computing device 100) herein may be configured in the same or similar manner as computing system 400.

Processors 470 and 480 may be implemented as single core processors 474a and 484a or multi-core processors 474a-474b and 484a-484b. Processors 470 and 480 may each include a cache 471 and 481 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 400. Moreover, processors 470 and 480 are examples of the types of hardware that can be used in connection with the implementations shown and described herein (e.g., processor 102).

Processors 470 and 480 may also each include integrated memory controller logic (IMC) 472 and 482 to communicate with memory elements 432 and 434, which may be portions of main memory locally attached to the respective processors. In alternative embodiments, memory controller logic 472 and 482 may be discrete logic separate from processors 470 and 480. Memory elements 432 and/or 434 may store various data to be used by processors 470 and 480 in achieving operations and functionality outlined herein.

Processors 470 and 480 may be any type of processor, such as those discussed in connection with other figures. Processors 470 and 480 may exchange data via a point-to-point (PtP) interface 450 using point-to-point interface circuits 478 and 488, respectively. Processors 470 and 480 may each exchange data with an input/output (I/O) subsystem 490 via individual point-to-point interfaces 452 and 454 using point-to-point interface circuits 476, 486, 494, and 498. I/O subsystem 490 may also exchange data with a high-performance graphics circuit 438 via a high-performance graphics interface 439, using an interface circuit 492, which could be a PtP interface circuit. In one embodiment, the high-performance graphics circuit 438 is a special-purpose processor, such as, for example, a high-throughput MIC processor, a network or communication processor, compression engine, graphics processor, GPGPU, embedded processor, or the like. I/O subsystem 490 may also communicate with a display 433 for displaying data that is viewable by a human user. In alternative embodiments, any or all of the PtP links illustrated in FIG. 4 could be implemented as a multi-drop bus rather than a PtP link.

I/O subsystem 490 may be in communication with a bus 410 via an interface circuit 496. Bus 410 may have one or more devices that communicate over it, such as a bus bridge 418, I/O devices 414, and one or more other processors 415. Via a bus 420, bus bridge 418 may be in communication with other devices such as a user interface 422 (such as a keyboard, mouse, touchscreen, or other input devices), communication devices 426 (such as modems, network interface devices, or other types of communication devices that may communicate through a computer network 460), audio I/O devices 424, and/or a data storage device 428. Data storage device 428 may store code and data 430, which may be executed by processors 470 and/or 480. In alternative embodiments, any portions of the bus architectures could be implemented with one or more PtP links.

Program code, such as code 430, may be applied to input instructions to perform the functions described herein and generate output information. The output information may be applied to one or more output devices, in known fashion. For purposes of this application, a processing system may be part of computing system 400 and includes any system that has a processor, such as, for example; a digital signal processor (DSP), a microcontroller, an application specific integrated circuit (ASIC), or a microprocessor.

The program code (e.g., 430) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 4 is a schematic illustration of an embodiment of a computing system that may be utilized to implement various embodiments discussed herein. It will be appreciated that various components of the system depicted in FIG. 4 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 5:
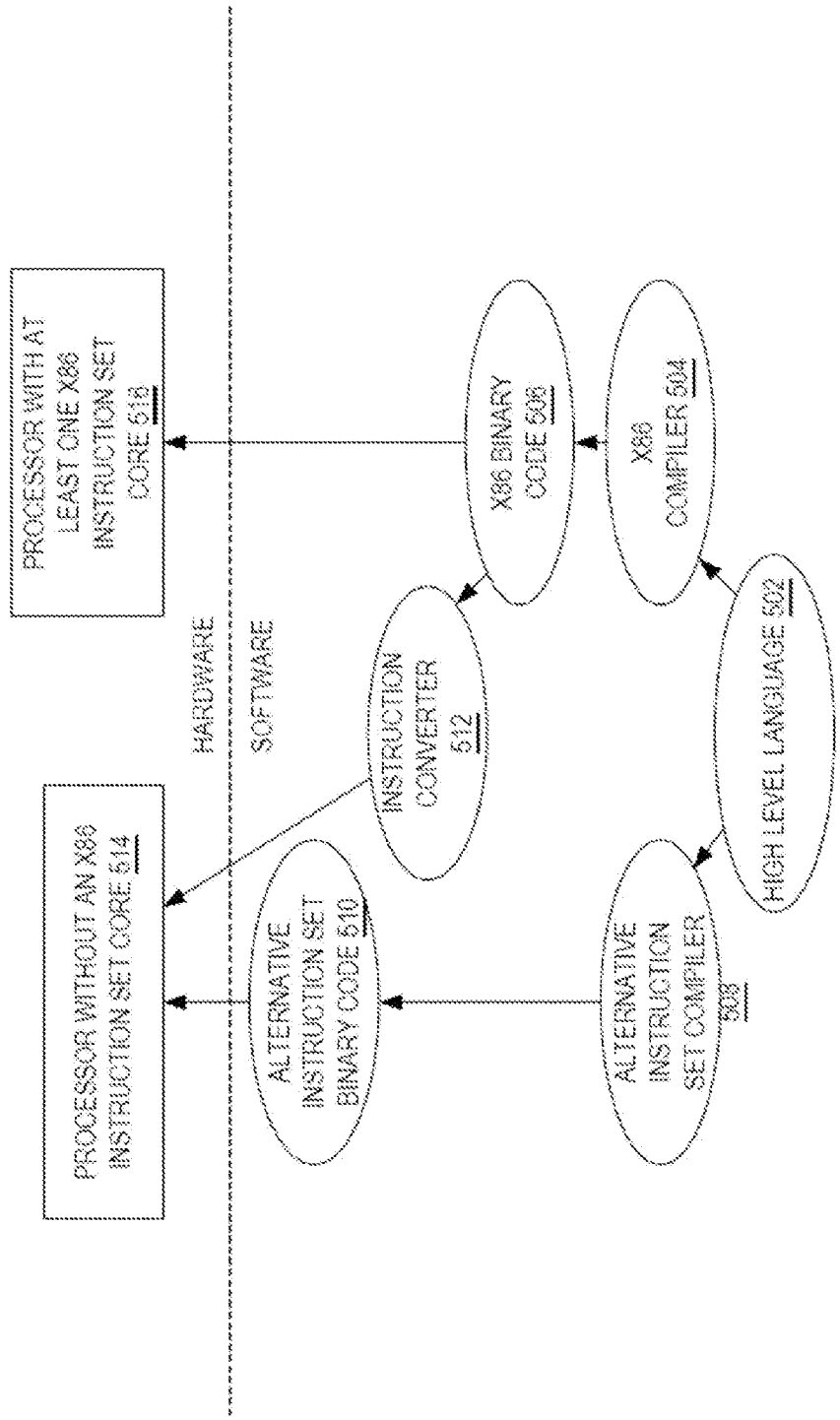
FIG. 5 is a block diagram contrasting the use of a software instruction converter to convert binary instructions in a source instruction set to binary instructions in a target instruction set according to embodiments of the present disclosure.

FIG. 5 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 5 shows a program in a high level language 502 may be compiled using an x86 compiler 504 to generate x86 binary code 506 that may be natively executed by a processor with at least one x86 instruction set core 516. The processor with at least one x86 instruction set core 516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 504 represents a compiler that is operable to generate x86 binary code 506 (e.g., object code) that can, with or without additional linkage processing, be executed on the processor with at least one x86 instruction set core 516. Similarly, FIG. 5 shows the program in the high level language 502 may be compiled using an alternative instruction set compiler 508 to generate alternative instruction set binary code 510 that may be natively executed by a processor without at least one x86 instruction set core 514 (e.g., a processor with cores that execute the MIPS instruction set of MIPS Technologies of Sunnyvale, CA and/or that execute the ARM instruction set of ARM Holdings of Sunnyvale, CA). The instruction converter 512 is used to convert the x86 binary code 506 into code that may be natively executed by the processor without an x86 instruction set core 514. This converted code is not likely to be the same as the alternative instruction set binary code 510 because an instruction converter capable of this is difficult to make; however, the converted code will accomplish the general operation and be made up of instructions from the alternative instruction set. Thus, the instruction converter 512 represents software, firmware, hardware, or a combination thereof that, through emulation, simulation or any other process, allows a processor or other electronic device that does not have an x86 instruction set processor or core to execute the x86 binary code 506.

B. Cryptographic Addressing

According to some embodiments, a linear address is a base address for an object (or something inside of an object) in memory. A slice or segment of the base address includes a plurality of bits that may be encrypted and embedded in the pointer. The base address slice may be encrypted (and decrypted) based on a secret address key and a tweak that includes context information (e.g., memory allocation size, type of object, permissions, etc.) and/or the metadata encoded in the pointer. The same context information (and encoded metadata) may be supplied when accessing the pointer in order to correctly decrypt the base address slice and generate the linear address. Binding data encryption and the pointer can be achieved by encrypting the data (or code) at the memory location using a pointer-based tweak and secret data key. The pointer-based tweak for encrypting (and decrypting) the data can be derived from the encoded pointer and potentially additional context information. In particular, a pointer-based tweak for data can be created based, at least in part, on the decrypted slice of the base address and possibly the metadata in the encoded pointer. In at least some embodiments, context information stored separately from the pointer may also be included in the tweak.

Variations of a different tweak for encrypting and decrypting a slice of the base address to be embedded in the pointer are possible in one or more embodiments. For example, different and/or additional context information such as various types of metadata, cryptographic context identifier, portions of the plaintext base address, or any suitable combination thereof may be used in the tweak used to encrypt/decrypt the slice of the memory address in the pointer. Similarly, variations of the tweak for encrypting and decrypting the data referenced by the encoded pointer are also possible. In other embodiments, additional parts of the encoded pointer may be used in the pointer-based tweak or the entire encoded pointer may be used as the pointer-based tweak. Furthermore, in at least some embodiments, different and/or additional context information such as metadata, cryptographic context identifier, slices of the plaintext address, or any suitable combination thereof may also be used in the tweak used to encrypt/decrypt the data referenced by the encoded pointer.

It should be noted that, while it is understood that data and code can be referenced by indirect addresses (also referred to herein as "pointers"), for ease of illustration, the description herein may only refer to data (rather than code) being referenced by, and cryptographically bound to, a pointer. However, it should be understood that generally, discussions regarding the memory access and encryption/decryption of such data are intended to also be applicable to code. Furthermore, the use of the term "object" herein is intended to mean a value or information or a group of values or information in memory that is referenced by a pointer. For example, an object can be a heap allocation, a local or global variable, a function, code, etc.

For purposes of illustrating the several embodiments of base address encryption in cryptographic computing, it is important to first understand the operations and activities associated with data protection and memory safety. Accordingly, the following foundational information may be viewed as a basis from which the present disclosure may be properly explained.

Cryptographic computing can mitigate or resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing objects to be shared via pointers that are encrypted, with the encrypted pointers and keys providing controlled access down to individual data objects.

Cryptographic computing embodiments disclosed herein may leverage the concept of a cryptographic addressing layer where the processor decrypts software allocated memory base addresses (linear/virtual address space, sometimes referred to as "pointers") based on context information (e.g., implicit and explicit metadata, a cryptographic context identifier, metadata encoded in the pointer, etc.). As used herein, a "tweak" may refer to, among other things, an extra input to a block cipher, in addition to the usual plaintext or ciphertext input and the key (e.g., secret key 616(1)). A tweak comprises one or more bits that represent a value. In one or more embodiments, a tweak may compose all or part of an initialization vector (IV) for a block cipher. When decryption of a base address slice is performed, if the information used to create the tweak (e.g., context information) corresponds to the original allocation of the memory address by a memory allocator (e.g., software allocation method), then the processor can correctly decrypt the base address slice and generate the full plaintext base address. Otherwise, a random address result may cause a fault and get caught by the processor.

A full plaintext base address that has been generated from a cryptographically encoded pointer may be used by the processor as at least part of a tweak to the data encryption cipher used to encrypt/decrypt data it refers to (data referenced by the cryptographically encoded pointer), creating a cryptographic binding between the cryptographic addressing layer and data/code encryption. In other embodiments, the cryptographic addresses (or address slices) may be used as at least part of a tweak for a data encryption cipher. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

In cryptographic computing, where data security is fundamentally linked to cryptographic memory addressing, processing and fine grain cryptographic access controls to data are important. Cryptographic computing transforms all compute vectors from the CPU to GPU, accelerators to FPGAs, etc. With cryptographic computing, protections may be cryptographic, where processors and accelerators alike utilize secret keys and ciphers to provide access control and separation at increasingly fine granularities. Further, instead of virtual machine and process separation, individual functions may become the boundary, address spaces are shared while pointers are encrypted, with keys providing controlled access down to individual data objects. Capabilities may thus become entwined in the cryptographic operations to provide granular access control to data objects while preventing buffer overflows, type confusion and temporal (e.g. use-after-free) vulnerabilities at every level of the system. Cryptographic code may execute natively, safely, and without the need for interpreters or managed runtimes to provide memory and type safety. Memory may move from isolated domains and containers to globally shared memory models where data is accessible based on cryptographic access control mechanisms, and gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multitenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer encryption have emerged recently. The PRINCE cipher, for example, can be implemented in 3 clocks requiring as little as 799 μm$^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information associated with the referenced data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption of the next input block.

The "Metadata Wall" may refer to the problem of additionally fetching metadata about memory operations such as access control, object type/size, and version. Today's computer architecture requires the processor to lookup metadata, or data about data, to determine if memory accesses are allowed. The additional memory accesses for metadata can impact performance, additional storage for the metadata is required, and the metadata itself needs to be protected in order to provide security. Some current solutions that add metadata in the form of bounds tables that the hardware would use to detect buffer overflows have been shown to have up to 4× performance impact with 400% memory overheads for some workloads. Similarly, shadow stack metadata enables Control-flow Enforcement Technology, and memory tagging uses metadata for versioning and capabilities add metadata for verifying data types. Memory tagging is not suitable for mitigating type confusion and protecting against uninitialized use variables. In addition, although the overhead of memory tagging may be reduced using error-correcting code bits, it can nevertheless require additional devices, which can increase costs. Capability machines may also use fat pointers to embed security metadata in-line with pointers, imposing substantial memory overheads (e.g., 25% in pointer heavy applications) due to doubling the pointer size.

In contrast, some embodiments of cryptographic computing may provide context information (e.g., metadata encoded in pointer, external metadata), codified as tweaks to cryptographic addressing and data, cryptographic addressing and code, or a combination thereof, removing potential performance and memory overheads caused by the inclusion of such metadata. In particular, base address encryption in cryptographic computing mitigates major categories of memory safety vulnerabilities, while simultaneously enabling compilers to embed statically-computed context information into program code to reduce time and memory overheads from loading metadata dynamically, as such overheads have been substantial in past approaches relying solely on dynamic metadata. The resulting encrypted base address slice may need no additional protections beyond the secret key, allowing reuse of the same memory as the data. Functional safety standards, which are becoming increasingly important, require the use of memory safety mechanisms to counter vulnerabilities such as data corruption, out-of-bound accesses, control flow violations, and access permission violations, for example. As further discussed or indicated herein, cryptographic computing using encrypted base addresses may solve a myriad of such memory safety vulnerabilities with the same unified mechanism, using computation instead of memory.

Figure 6:
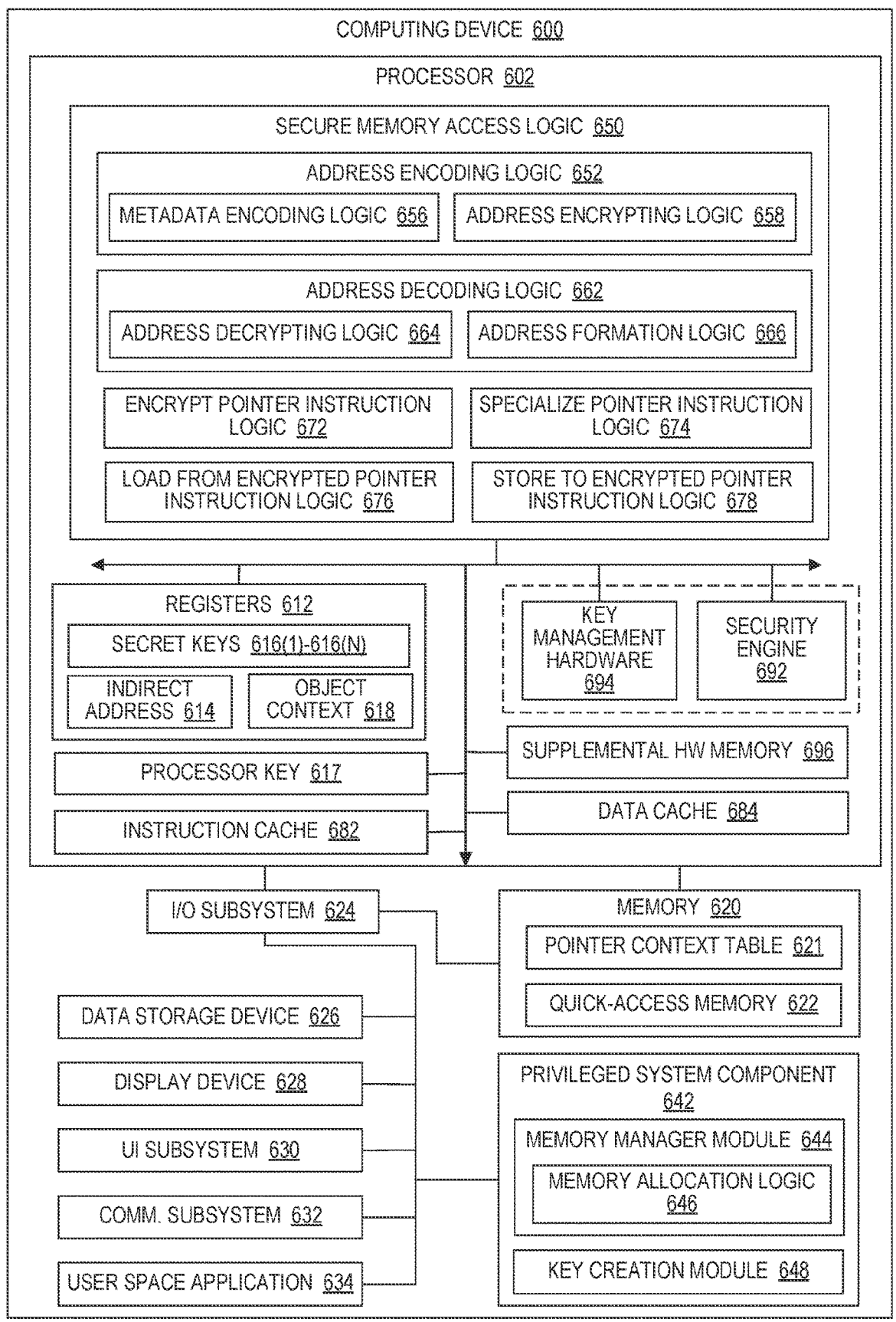
FIG. 6 is a simplified block diagram of an example computing device configured with secure memory access logic according to at least one embodiment of the present disclosure.

Turning to FIG. 6, FIG. 6 is a simplified block diagram of an example computing device 600 configured with secure memory access logic according to at least one embodiment of the present disclosure. In the example shown, the computing device 600 includes a processor 602 having a set of secure memory access logic 650 and a number of registers 612. The secure memory access logic 650 utilizes metadata about an indirect address 614, which is encoded into unused bits of the indirect address 614 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 614. For example, the metadata encoding and decoding provided by the secure memory access logic 650 can prevent the indirect address 614 from being manipulated to cause a buffer overflow, and/or can prevent program code from accessing memory that it does not have permission to access. Address encoding logic 652 of the secure memory access logic 650 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the indirect address 614, which points to the allocated memory, is encoded with the address metadata.

The address metadata can include a tag value or version number. A tag value can include randomized bits generated for the memory allocation. The randomized bits may be generated to be unique for the memory allocation. A version number can be a deterministically different value such as a sequential number that determines current ownership of the referenced allocated memory in time. The sequential number can be incremented by a predetermined amount each time an indirect address is created for newly allocated memory. The tag/version can be used as part of a tweak to encrypt and decrypt the base address slice encoded in the indirect address. The tag/version can also be used as part of a tweak to encrypt and decrypt the data or code that the base address references.

The address metadata can also include valid range metadata. The valid range metadata allows executing programs to manipulate the value of the indirect address 614 within a valid range, but could potentially corrupt the indirect address 614 if the memory is accessed using the indirect address 614 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the indirect address 614 (e.g., whether the indirect address 614 can be used to write, execute, or read the referenced memory).

In at least some other embodiments that will be further described herein, other metadata (or context information) can be encoded in the unused bits of indirect address 614 such as a memory allocation size (e.g., Bytes of allocated memory referenced by the indirect address), a type of the data or code (e.g., class of data or code defined by programming language), and/or permissions (e.g., read, write, and execute permissions of the indirect address), a location of the data or code (e.g., address combined with the size of the data or code), the memory location where the pointer itself is to be stored, an ownership of the data or code, a privilege level (e.g., user or supervisor), a cryptographic context identifier (or crypto context ID) (e.g., randomized or deterministically unique value for each indirect address), etc. In other embodiments, such context information may not be encoded in the indirect address but instead, may be accessed statically when it is embedded in the code stream or accessed dynamically via a table look-up in memory. In some embodiments, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number determining current ownership of the referenced allocated data in time instead of or in addition to a randomized tag value. Even if an adversary is able to guess the current tag value or version number for a region of memory, e.g. because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 662 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory which the processor instruction will access to perform its operation. A data memory operand may specify a location in memory of data to be manipulated, whereas a control transfer memory operand may specify a location in memory at which the destination address for the control transfer is stored. Address decoding logic 662 may also be invoked to verify the encoded metadata for a new instruction to load data or code referenced by an indirect address and another new instruction to store data or code referenced by an indirect address. These instructions can provide the indirect address (or pointer) as a parameter along with context information that may be used as part of a tweak for decrypting the base address slice embedded in the indirect address.

The example secure memory access logic 650 is embodied as part of processor instructions (e.g., as part of the processor instruction set architecture), or microcode (e.g., instructions that are stored in read-only memory and executed directly by the processor 602). In other embodiments, portions of the secure memory access logic 650 may be embodied as hardware, firmware, software, or a combination thereof (e.g., as programming code executed by a privileged system component 642 of the computing device 600). For example, the secure memory access logic 650 may be embodied in software as an instruction set emulator (e.g., a binary instrumentation tool such as a PIN Tool) that emulates the instruction logic utilizing the encoded addresses as disclosed herein.

The secure memory access logic 650 is executable by the computing device 600 to provide security for indirect addresses "inline," e.g., during execution of a program (such as a user space software application) by the computing device 600. As used herein, the terms "indirect address" and "pointer" may each refer to, among other things, an address (e.g. virtual address or linear address), such as a base address of a memory location at which other data or instructions are stored. In an example, a register that stores an encoded memory address of a memory location where data or code is stored may act as a pointer. As such, the indirect address 614 may be embodied as, for example, a data pointer (which refers to a location of data), a code pointer (which refers to a location of executable code), an instruction pointer, or a stack pointer. Thus, indirect addresses may be referred to by other terminology, such as "pointer," "address pointer," or "pointer address." As used herein, "nnetadata" may refer to, among other things, information about or relating to an indirect address 614, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory access instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory. In one or more embodiments herein, new instructions to load data or code using a pointer encoded with an encrypted base address slice (e.g., "LdEP" instruction) and to store data or code using a pointer encoded with an encrypted base address slice (e.g., "StEP" instruction) will be further described herein.

However, the indirect address encoding/decoding technology disclosed herein is not limited to MOV or load/store instructions. For example, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an indirect address (e.g., arithmetic operations such as ADD, SUB, MUL, AND, OR, XOR, etc. may have a source/destination memory reference in the form of an indirect address and/or they may have a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 650 includes address encoding logic 652 (which includes metadata encoding logic 656 and address encrypting logic 658) and address decoding logic 662 (which includes address decrypting logic 664 and address formation logic 666). Secure memory access logic 650 also includes encrypt pointer instruction logic 672 ("EncryptBaseAddr" instruction), specialize pointer instruction logic 674 ("SpecializePtr" instruction), load from encrypted pointer instruction logic 676 ("LdEP" instruction), store to encrypted pointer instruction logic 678 ("StEP" instruction), and legacy memory access instruction logic (e.g., MOV instruction). The address encoding logic 652 and the address decoding logic 662 may be embodied in processor instructions (e.g., 672, 674, 676, 678), or as a separate instruction or series of instructions, or as higher-level code executed by a privileged system component such as an operating system kernel or virtual machine monitor, or as an instruction set emulator. As described in more detail below, the address encoding logic 652 and the address decoding logic 662 each operate on an indirect address 614 using metadata (e.g., one or more of valid range, permission metadata, memory allocation size, type, location, ownership, version, tag value, privilege level (e.g., user or supervisor), crypto context ID, etc.) and a secret key (e.g., secret key 616(1)), in order to secure the indirect address 614 at the memory allocation/access level. Also as described in more detail below, data encrypting logic (shown in FIG. 7) and data decrypting logic (shown in FIG. 7) may operate on data or code (referenced by indirect address 614) using at least a portion of the indirect address and a secret key (e.g., secret key 616(2)), in order to secure the data or code at the memory location referenced by the indirect address 614 by binding the data/code encryption to the indirect address.

The example indirect address 614 is embodied as a register 612 (e.g., a general purpose register of the processor 602). The example secret keys 616(1)-616(N) may be generated by a key creation module 648 of a privileged system component 642, and stored in one of the registers 612 (e.g., a special purpose register or machine specific register (MSR)), or another memory location that is readable by the processor 602. In some embodiments, the secret keys 616(1)-616(N) may be stored in a location that is readable only by the processor. In other embodiments, the secret keys 616(1)-616(N) used to secure indirect addresses, data, and code can be stored in another memory location, such as in firmware, in a secure portion of the data storage device 626 or another data storage device, or another form of memory suitable for performing the functions described herein. In some embodiments, the secret keys 616(1)-616(N) may be transmitted across a secure communications channel and restored by an executive (such as an operating system or a virtual machine monitor, e.g., the privileged system component 642 described below). In virtualized environments in which virtual machines are migrated from one machine to another, and/or in cases in which a virtual machine, process or program running on the computing device 600 begins a sleeping/hibernating mode after an indirect address and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 642).

It should be noted that embodiments described herein allow for any number of secret keys to be used for a particular program. In one example, the same secret key may be used for all indirect addresses used in a program. In another example, a different secret key may be used for each indirect address associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data encryption/decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data. Similarly, references to "secret code key" or "code key" as used herein are intended to refer to the use of a secret key in operations to encrypt and decrypt code.

On (or during) a memory allocation operation (e.g., a "malloc"), memory allocation logic 646 allocates a range of memory for a buffer and returns the indirect address 614 and the metadata (e.g., one or more of range, permission metadata, memory allocation size, type, location, ownership, version, tag, privilege level, crypto context ID, etc.). For example, the memory allocation logic 646 may encode a tag with randomized bits or a version number in the indirect address 614 (e.g., in the unused/non-canonical bits), or supply the metadata as one or more separate parameters to the instruction, where the parameter(s) specify the range, code permission information, memory allocation size, type, location, ownership, version, tag, privilege level (e.g., user or supervisor), crypto context ID, or some suitable combination thereof. Illustratively, the memory allocation logic 646 is embodied in a memory manager module 644 of the privileged system component 642. The memory allocation logic 646 initiates the address encoding logic 652. The address encoding logic 652 includes metadata encoding logic 656, which encodes the indirect address 614 with the metadata such as a tag, or with other metadata in other encoding variations (e.g., range, permission metadata, memory allocation size, type, location, ownership, version, tag value, privilege level, crypto context ID, some suitable combination thereof, etc.). The address encoding logic 652 may store the metadata in an unused portion of the indirect address 614 (e.g., non-canonical bits of a 64-bit address). For some metadata or combinations of metadata, the indirect address 614 may be encoded in a larger address space (e.g., 628-bit address, 256-bit address) to accommodate the size of the metadata or combination of metadata.

In an embodiment, address encoding logic 652 selects a portion (or slice) of the base address to be encrypted and encoded in the indirect address 614. In other embodiments, the slice of the base address to be encrypted may be known a priori (e.g., lower 32 bits, etc.). The address encrypting logic 658 encrypts the selected slice of the base address using the secret address key 616(1) and an address tweak, as described further below.

On a memory access operation (e.g., a read, write, or execute operation), the address decoding logic 662 decodes the previously-encoded indirect address 614. To do this, the address decrypting logic 664 decrypts the encrypted slice of the base address encoded in the indirect address 614 using the secret key 616(1) and the address tweak, as described further below. The upper address bits (UAB) of the base address, which are not included as part of the slice to be encrypted, may be externally stored in a table (e.g., pointer context table 621) or register (e.g., object context 618). A number of plaintext offset bits (e.g., 25) are encoded in the lower bits of the indirect address 614. In at least one embodiment, they may be initialized to zeros.

The indirect address 614 is returned to its original (e.g., canonical) form, based on appropriate operations (e.g. address decoding logic 662) in order to restore the original value of the indirect address 614 (e.g., the true, original linear memory address). To do this in at least one possible embodiment, the address decoding logic 662 may remove the address metadata (e.g., tag) encoded in the unused bits of the indirect address 614 (e.g., return the unused bits to their original form). The encrypted slice can be decrypted and concatenated with the upper address bits. The result can be adjusted based on the offset. If the indirect address 614 decodes successfully, the memory access operation completes successfully. However, if the encoded indirect address 614 has been manipulated (e.g., by software, inadvertently or by an attacker) so that its value falls outside the valid range indicated by the range metadata (e.g., overflows the buffer), the indirect address 614 will be corrupted as a result of the decrypting process performed by the address decrypting logic 664. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 650 enables the computing device 600 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any binary modifications, or without the need to recompile legacy code. In some scenarios, the indirect address instructions disclosed herein can operate without any additional memory reads/writes, or without any additional instructions. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Cryptographic computing may be applied to data and code and, in at least some embodiments, different keys may be used for encryption/decryption of the data and the code. One possible approach to accommodate the use of different keys for data and code is to implement separate caches. Accordingly, one or more caches for encrypted instructions and one or more caches for encrypted data can be provided when separate keys are used for code and data in cryptographic computing. For example, a "code key" can be programmed to encrypt and decrypt code that is stored in the instruction cache and associated with a particular process, and a "data key" can be programmed to encrypt and decrypt data that is stored in the data cache and associated with the particular process. Different code keys and data keys can be programmed for code and data associated with different processes.

In the example of FIG. 6, processor 602 includes an instruction cache 682 (which may be similar to instruction cache 334 of FIG. 3B, cache 471 or 481 or memory 432 or 434 of FIG. 4) and a data cache 684 (which may be similar to data cache unit 374 of FIG. 3B, cache 471 or 481 or memory 432 or 434 of FIG. 4). In at least one embodiment, the code and data caches 682 and 684 may be L1 caches. Instruction cache 682 can include control circuitry to store encrypted code and to allow the decryption of the encrypted code with a code key programmed in the control circuitry per process. Data cache 684 can include control circuitry to store encrypted data and to allow the decryption of the encrypted data with a data key programmed in the control circuitry per process. The control circuitry of instruction cache and data cache (which may be similar to IMC 472, 482 of FIG. 4) may be combined with or separate (in whole or in part) from memory controller circuitry (e.g., 472, 482).

In one or more embodiments, a security engine 692 and key management hardware 694 for protecting keys in cryptographic computing may be configured in computing device 600. Security engine 692 and key management hardware 694 may be logically separate entities or combined as one logical and physical entity. This entity is configured to provide code and data keys in the form of an encrypted key from which a code (or data key) can be decrypted or a unique key identifier from which a code (or data) key can be derived. Security engine 692 and key management hardware 694 may be embodied as circuitry, firmware, software, or any suitable combination thereof. In at least some embodiments, security engine 692 and/or key management hardware 694 may form part of processor 602. In at least some embodiments, security engine 692 and/or key management hardware 694 may be embodied as a trusted firmware component executing in a privileged state.

In some embodiments, supplemental hardware (HW) memory 696 may also be provided for storing keys. In some examples, supplemental HW memory 696 may be implemented as a new cache or content addressable memory (CAM). In one or more implementations, supplemental HW memory 696 may be used to store encrypted code and data keys or derived code and data keys, at least when the keys are not currently programmed in the cache circuitry of the instruction and data caches 682 and 684.

Some embodiments of the disclosed technologies utilize aspects of address decoding logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein.

Referring now in more detail to FIG. 6, the computing device 600 may be embodied as any type of electronic device for performing the functions described herein. For example, the computing device 600 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 6, the example computing device 600 includes at least one processor 602 embodied with the secure memory access logic 650.

The computing device 600 also includes memory 620, an input/output subsystem 624, a data storage device 626, a display device 628, a user interface (UI) subsystem 630, a communication subsystem 632, at least one user space application 634, and the privileged system component 642 (which, illustratively, includes the memory manager module 644 and the key creation module 648). The computing device 600 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 600 may be embodied as software, firmware, hardware, or a combination of software and hardware.

The processor 602 may be embodied as any type of processor capable of performing the functions described herein. For example, the processor 602 may be embodied as a multi-core processor, other multiple-CPU processor or processing/controlling circuit, or multiple diverse processing units or circuits (e.g., CPU and GPU, etc.). The processor 602 has a number of registers 612, which include general purpose registers (GPRs), special purpose registers (SPRs), and/or model-specific registers (MSRs). The indirect address 614 and the secret keys 616(1)-616(N) may be stored in registers 612. Object context 618 may also be stored in a register. Object context 618 may include a slice of the most significant bits or "upper address bits" (e.g., upper 22 bits in a 57-bit indirect address), which are not encoded in an indirect address (e.g., 614) for the object. As will be further described herein, in this scenario, an indirect address can reference data stored in a statically-addressable memory region (e.g., quick-access memory 622). For some scenarios in which data is stored in a statically-addressable memory region, a linear address for the data can be generated from the indirect address without dynamically obtaining the upper address bits or other context information from, for example, a dynamically-accessible table. Instead, the upper address bits can be obtained from a register, and other context information can be statically provided in the program code. Thus, data stored in a statically-addressable memory region can be more quickly accessed than data stored in other memory in which dynamic look-ups for context information is required. There may be some instances, however, where the other context information is dynamically retrieved even though the data is stored in a statically-addressable region. This may occur when it is desirable to store certain objects in a statically-addressable region but the compiler is unable to statically supply the context information for those objects.

A processor key 617 (also referred to herein as 'hardware key'), may be used for various encryption, decryption, and/or hashing operations and may be configured as a secure key in the hardware of the processor 602. Processor 617 may, for example, be stored in fuses, stored in read-only memory, or generated by a physically unclonable function that produces a consistent set of randomized bits. Generally, processor key 617 may be configured in hardware and known to processor 602, but not known or otherwise available to privileged software (e.g., operating system, virtual machine manager (VMM), firmware) or unprivileged software.

The memory 620 of the computing device 600 may be embodied as any type of volatile or non-volatile memory or data storage capable of performing the functions described herein. In operation, the memory 620 may store various data and software used during operation of the computing device 600, as well as operating systems, applications, programs, libraries, and drivers. In one or more embodiments, memory 620 includes a pointer context table 621, which may contain multiple table entries. The location of the pointer context table 621 may be indicated as a physically-addressable table base defined by a register, such as a model-specific register (MSR)), for example. Each table entry can include context information associated with a cryptographically encoded pointer to an object in memory. In one embodiment, the context information may include size metadata (e.g., a value indicating the memory allocation size for the object), type metadata (e.g., type or class of object), and permissions metadata (e.g., permissions of a pointer to the object). One or more table entries may also contain the upper address bits (UABs) associated with the cryptographically encoded pointer. One or more other table entries may encode zeros for the upper address bits associated with the cryptographically encoded pointer, for example, when the upper address bits are stored in a register (e.g., 618). In at least one embodiment, the pointer context table 621 could be indexed by the encrypted slices of cryptographically encoded pointers to objects. Each table entry can be indexed by an encrypted slice of a respective cryptographically encoded pointer. However, in other embodiments, any suitable technique may be used to index or otherwise map the table entries to their respective pointers, including but not necessarily limited to indexes, other pointers, hash tables, or any other technique that represents a relation, connection, link, or association between the table entries and their respective pointers. Moreover, other indexes may also be used. For example, any portion of a cryptographically encoded pointer that is sufficiently unique could be used to index the pointer context table. For example, pointer context table 621 could be indexed by at least a portion of the cryptographically encoded pointers such as the encrypted slice of the base address, the encrypted slice of the base address plus a tag portion, the entire cryptographically encoded pointer, etc. It should be noted, however, that the entire cryptographically encoded pointer could be suitable as an index as long as the pointer is not modified by the software. For example, if the software updates an offset in the pointer to point to a field within the object, the pointer will change. In this case, indexing the table by the entire pointer could prevent the table entry from being found. The table can be managed from user space using a new instruction set architecture (ISA) as further described herein. Collisions in the table are possible, however, so the operating system is responsible for handling such occurrences as will be further described herein.

Certain regions of memory 620 may be defined as quick-access memory 622. Quick-access memory 622 represents a region of memory where a register (e.g., 612) can specify the upper address bits of the region. For example, a memory region of 4 GB may be designated as quick-access memory where 4 GB of data (or code) can be stored and memory access can be performed by an instruction that supplies the appropriate context information (e.g., memory allocation size, type, permissions) and pulls the upper address bits from a register (e.g., object context 618) rather than a table in memory (e.g., pointer context table 621). Although a quick-access memory region may be 4 GB as illustrated, any other suitable memory size may be designated as quick-access memory according to particular needs and implementations. For example, a quick-access memory region may be 32 GB if objects are aligned to an 8-Byte boundary.

The memory 620 is communicatively coupled to the processor 602, e.g., via the I/O subsystem 624. The I/O subsystem 624 may be embodied as circuitry and/or components to facilitate input/output operations with the processor 602, the memory 620, and other components of the computing device 600. For example, the I/O subsystem 624 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 624 may form a portion of a system-on-a-chip (SoC) and be incorporated, along with the processor 602, the memory 620, and/or other components of the computing device 600, on a single integrated circuit chip.

The data storage device 626 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 628 may be embodied as any type of display capable of displaying digital information such as a liquid crystal display (LCD), a light emitting diode (LED), a plasma display, a cathode ray tube (CRT), or other type of display device. In some embodiments, the display device 628 may be coupled to a touch screen or other human computer interface device to allow user interaction with the computing device 600. The display device 628 may be part of the user interface (UI) subsystem 630. The user interface subsystem 630 may include a number of additional devices to facilitate user interaction with the computing device 600, including physical or virtual control buttons or keys, a microphone, a speaker, a unidirectional or bidirectional still and/or video camera, and/or others. The user interface subsystem 630 may also include devices, such as motion sensors, proximity sensors, and eye tracking devices, which may be configured to detect, capture, and process various other forms of human interactions involving the computing device 600.

The computing device 600 further includes a communication subsystem 632, which may be embodied as any communication circuit, device, or collection thereof, capable of enabling communications between the computing device 600 and other electronic devices. The communication subsystem 632 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 632 may be embodied as a network adapter, including a wireless network adapter.

The example computing device 600 also includes a number of computer program components, such as the user space application 634 and the privileged system component 642. The user space application 634 may be embodied as any computer application (e.g., software, firmware, hardware, or a combination thereof) that interacts directly or indirectly with an end user via, for example, the display device 628 or the UI subsystem 630. Some examples of user space applications 634 include word processing programs, document viewers/readers, web browsers, electronic mail programs, messaging services, computer games, camera and video applications, etc. Among other things, the privileged system component 642 facilitates the communication between the user space applications 634 and the hardware components of the computing device 600. Portions of the privileged system component 642 may be embodied as any operating system capable of performing the functions described herein, such as a version of WINDOWS by Microsoft Corporation, ANDROID by Google, Inc., and/or others. Alternatively or in addition, a portion of the privileged system component 642 may be embodied as any type of virtual machine monitor capable of performing the functions described herein (e.g., a type I or type II hypervisor).

The example privileged system component 642 includes a number of computer program components, such as the memory manager module 644 and the key creation module 648. Each of the components of the privileged system component 642 may be embodied as software, firmware, hardware, or a combination of software and hardware. For example, the components of the privileged system component 642 may be embodied as modules of an operating system kernel, a virtual machine monitor, or a hypervisor. The memory manager module 644 allocates portions of memory 620 to the various processes running on the computing device 600 (e.g., as ranges of virtual memory addresses). The memory manager module 644 is embodied as, for example, a loader, a memory manager service, or a heap management service. The key creation module 648 creates the secret keys 616(1)-616(N) (e.g., secret address keys, secret data keys, secret code keys) and writes them to a register or registers to which the processor 602 has read access (e.g., a special purpose register). To create a secret key, the key creation module 648 may execute, for example, a random number generator or another algorithm capable of generating a secret key that can perform the functions described herein.

It should be noted that a myriad of approaches could be used to generate or obtain a key for embodiments disclosed herein. For example, although the key creation module 648 is shown as being part of computing device 600, one or more secret keys could be obtained from any suitable external source using any suitable authentication processes to securely communicate the key to computing device 600, which may include generating the key as part of those processes. Furthermore, privileged system component 642 may be part of a trusted execution environment (TEE), virtual machine, processor 602, a co-processor (not shown), or any other suitable hardware, firmware, or software in computing device 600 or securely connected to computing device 600. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 7:
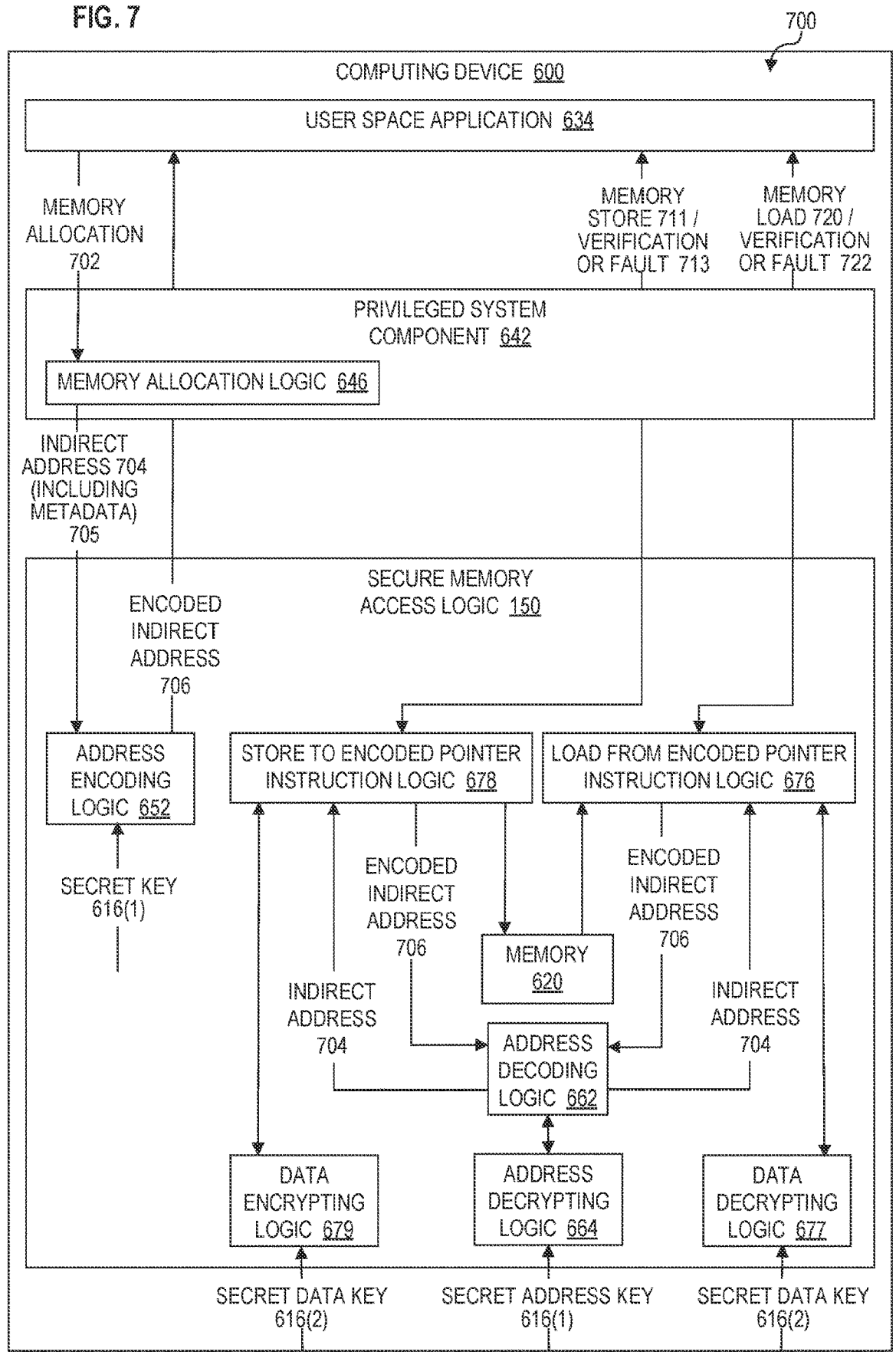
FIG. 7 is a simplified environment diagram illustrating an application of the secure memory access logic of FIG. 6 according to at least one embodiment of the present disclosure.

FIG. 7 is a simplified environment diagram illustrating an application of the secure memory access logic of FIG. 6 according to at least one embodiment of the present disclosure. In some embodiments, the computing device 600 may establish an environment 700 during operation (e.g., native and/or virtual runtime or "execution" environments). The various modules depicted in the example environment 700 may be embodied as hardware, firmware, software, or a combination thereof. In the environment 700, the user space application 634 (or the privileged system component 642, e.g., in loading a user space application 634) may, from time to time, during the operation of the computing device 600, issue a memory allocation 702. The memory allocation 702 may be translated (e.g., compiled or interpreted), as needed, by the memory allocation logic 646 of the privileged system component 642 before being passed on to the processor 602.

In the processor 602, the address encoding logic 652 is executed in response to the memory allocation 702 (e.g., in place of a conventional "malloc" instruction/function call). In one or more embodiments, the memory manager module 644 (or memory allocator) may include a heap allocator or stack allocator that executes an encrypt pointer instruction (EncryptBaseAddr), which performs address encoding logic 652, along with additional checks related to the size of the object relative to the bounds of the region within which the object is allocated, and table management for storing context information in some scenarios. In addition, a specialize pointer instruction (SpecializePtr) may also perform address encoding logic 652, along with additional checks to ensure that the object is contained within the memory allocated by another pointer and that the permissions granted to the specialized pointer are not greater than the permissions granted to the other pointer.

Whereas a conventional malloc instruction simply allocates memory and returns an (unsecured) pointer, the address encoding logic 652 encodes an indirect address 704, including metadata 705 such as a tag of randomized bits or, in other encodings other metadata (e.g., the range permission information, memory allocation size, type, location, ownership, version, privilege level, crypto context ID or key, or any combination thereof, etc.) may be included, and returns an encoded indirect address 706. The metadata may be embedded in the indirect address or pointer (e.g., a standard 64-bit register or enlarged register such as 628 bits or 756 bits to fit more metadata) in a plaintext format, embedded within another operand that is provided to the pointer encryption/decryption instructions and data access instructions, stored in a table in memory or in a control register, or provided via any combination thereof. For example, the tag value may be embedded in the pointer and the crypto context ID may be stored in a control register.

Similarly, the user space application 634 or the privileged system component 642 may issue a memory store 711 from time to time, which may be handled by the processor 602 as a processor instruction that reads from a register 612 (or other storage unit) and writes to memory 620 or cache using indirect address 614 (e.g. a STORE, MOV instruction). Using the STORE instruction as an example, the memory store instruction logic 670 stores data only after successfully executing address decoding logic 662 to decode the encoded indirect address 706 and also successfully executing data encrypting logic 679 based on a data tweak and secret data key 616(2) to encrypt the data to be stored at a memory location pointed to by the indirect address 704. Successful execution of address decoding logic 662 is based on successful execution of address decrypting logic 664, which uses an address tweak and secret address key 616(1) to decrypt the encrypted address slice of the encoded indirect address 706.

Similarly, the user space application 634 or the privileged system component 642 may issue a memory load 720 from time to time, which may be handled by the processor 102 as a processor instruction that reads from memory 620 and writes to a register 612 using an indirect address 614 (e.g. LdEP or MOV instruction). Using the LOAD instruction as an example, the load from encrypted pointer (LdEP) instruction logic 676 performs the memory access only after successfully executing the address decoding logic 662 to decode the encoded indirect address 706. Successful execution of address decoding logic 662 is based on successful execution of address decrypting logic 664, which uses an address tweak and secret address key 616(1) to decrypt the encrypted address slice of the encoded indirect address 706. Once the indirect address 704 is returned and memory 620 is accessed to load data from the memory location pointed to by the indirect address 704, the loaded data may be decrypted by executing data decrypting logic 677 based on a data tweak and secret data key 616(2). Successful execution of the data decrypting logic 677 depends on whether the portions of the indirect address used to create a data tweak to decrypt the data, and the additional metadata (if any) used to create the data tweak, correspond to the original allocation of the memory location pointed to by the indirect address.

While the address decoding logic 662 is shown as a separate module from store to encrypted pointer instruction logic 678 and load from encrypted pointer instruction logic 676 in FIG. 7, it should be understood that the address decoding logic 662 can be incorporated into the instruction logic 678 and/or 676 or can be embodied as a separate set of instructions. Further, it should be understood that the address decoding logic 662 can be incorporated into or referenced by other types of instructions, alternatively or in addition to the LdEP, StEP, and MOV instructions (e.g., arithmetic instructions with memory operands, call, JMP, etc.). For example, control transfer instructions such as call and JMP can load the encoded pointer address for the code to execute into the processor's program counter register (e.g. instruction pointer) (e.g., the RIP, where RIP is the instruction pointer register in 64-bit code). The instruction pointer register can then be queried by the processor and as a result, the current program counter address will be the encoded form (offset to the current program counter location).

If the address decoding logic 662 successfully decodes the encoded indirect address 706, which includes the address decrypting logic 664 successfully decrypting the encrypted address slice in the encoded indirect address, the original indirect address 704 is returned to the privileged system component 642 and the memory access is completed, or program execution begins at the new program counter location (in the case of control flow changes). If the encoded indirect address 706 does not successfully decode, a fault is raised. Based on the successful completion or failure of memory store 711, an appropriate verification or fault signal 713 is returned to the user space application 634. Similarly, based on the successful completion or failure of memory load 720, an appropriate verification or fault signal 722 is returned to the user space application 634.

Cryptographically Encoded Pointers in an Encrypted Base Address (EBA) Format

Figure 8:
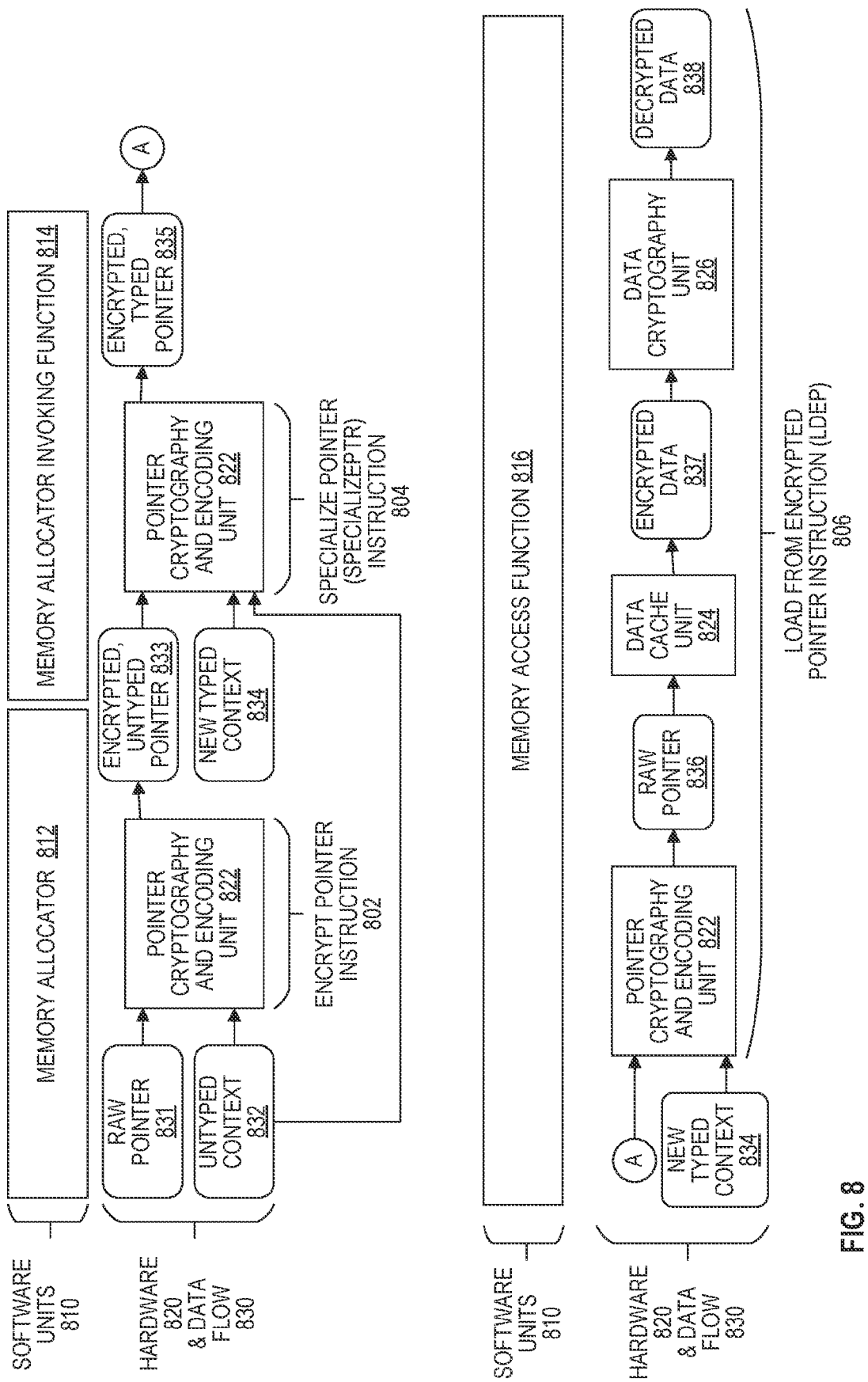
FIG. 8 is a simplified block diagram of possible example details of hardware, software units, and data flow in a computing device according to at least one embodiment.

FIG. 8 is a simplified flow diagram 800 illustrating additional details of software units, hardware, and data flow associated with memory allocation and access using a cryptographically encoded pointer in an encrypted base address (EBA) format. A pointer having an EBA format is encoded with an encrypted slice of a base address and at least one item of metadata associated with the data stored at the base address. In one or more embodiments, a computing device such as computing device 600 includes software units 810, hardware 820, and data flow 830. Software units 810 include a memory allocator 812, a memory allocator invoking function 814, and a memory access function 816. Hardware 820 includes a pointer cryptography and encoding unit 822, a data cache unit 824, and a data cryptography unit 826. Data flow 830 includes a raw pointer 831, untyped context 832, an encrypted, untyped pointer 833, typed context 834, an encrypted, typed pointer 835, encrypted data 837, and decrypted data 838.

An encrypt pointer (EncryptBaseAddr) instruction 802 may be invoked by memory allocator 812. For example, memory allocator invoking function 814 may invoke memory allocator 812 by requesting memory for an object (e.g., malloc instruction), and the memory allocator 812 may include a heap allocator or stack allocator that invokes the EncryptBaseAddr instruction 802. The EncryptBaseAddr instruction 802 causes pointer cryptography and encoding unit 822 to encrypt a slice of raw pointer 831 using untyped context 832. Raw pointer 831 is passed as a register operand of EncryptBaseAddr instruction 802 and represents a plaintext base address for the allocated memory in which the object is to be stored. The slice of the base address to be encrypted includes predetermined bits in the address (e.g., bits 3 to 34). The upper bits in the base address may be stored externally (e.g., in a table in memory or in a register). The untyped context 832 is also passed as a register operand and can include, for example, context information such as memory allocation size and permissions metadata for the object. Untyped context 832 does not include type metadata for the object. The untyped context 832 can be used as a tweak input to an encryption algorithm (e.g., block cipher) to encrypt the slice of the raw pointer 831 (e.g., plaintext base address). Pointer cryptography and encoding unit 822 may also generate a tag of randomized bits, which can be used as part of the tweak for the base address slice. In at least one embodiment, pointer cryptography and encoding unit 822 generates encrypted, untyped pointer 833 by concatenating the tag, the encrypted base address slice, and an offset in the pointer 833. The offset may be initialized to zeroes.

The memory allocator invoking function 814 can invoke a specialize pointer instruction 804 (SpecializePtr) based on a previously-encoded pointer such as encrypted, untyped pointer 833. In at least one embodiment, the encrypted, untyped pointer 833, the untyped context 832, and the typed context 834 can be passed as register operands of the SpecializePtr instruction 804. The SpecializePtr instruction 804 causes pointer cryptography and encoding unit 822 to decrypt the encrypted base address slice of the encrypted, untyped pointer 833 using the original context (e.g., untyped context 832). The upper address bits of the base address may be retrieved and concatenated with the decrypted base address slice. If the decrypted base address slice represents bits 3 to 34 of the original base address (i.e., because the address is 8-Byte aligned), then three bits initialized to "0" are concatenated at the end of the decrypted base address slice to obtain the original base address. The offset of the encrypted, untyped pointer 833 can be added to the original base address to obtain a specialized base address to a sub-region within the allocated memory (or to the same region of the allocated memory) for which a specialize pointer is to be generated. For example, if the offset has changed, then the specialized address will point to a location within the allocated memory. If the offset has not changed, then the specialized address will point to the same location as the original base address. This may be desirable, for example, when restricted access to the same object is desired, because permissions can be reduced for the specialized address. Once the specialized address is computed, the new context (e.g., typed context 834) can be used as a tweak input to an encryption algorithm (e.g., block cipher) to encrypt a slice of the special address. In at least one embodiment, typed context 834 includes a memory allocation size, permissions, and a type of the object. The memory allocation size in the typed context 834 may be the same or smaller than the memory allocation size in the untyped context 832. The permissions metadata in the typed context 834 may be the same or less than the permissions metadata in the untyped context 832. Pointer cryptography and encoding unit 822 may also generate a tag of randomized bits, which can be used as part of the tweak for the specialized address slice. The tags for pointers that are used to access the same regions of memory should match to ensure correct data decryption. In other embodiments, the tag encoded in the encrypted, untyped pointer 833 may be used instead. In at least one embodiment, pointer cryptography and encoding unit 822 generates encrypted, typed pointer 835 by concatenating the tag (either the newly generated tag or the original tag encoded in pointer 833), the encrypted specialized address slice, and an offset in the pointer 835. The offset may be initialized to zeroes.

After a pointer is cryptographically encoded with a base address slice or specialized address slice, metadata (e.g., tag), and an offset, the cryptographically encoded pointer may be used to access an object stored in the memory location referenced by the pointer. Thus, both the encrypted, untyped pointer 833 and the encrypted, typed pointer 835 could be used to access memory at their respective locations based on their respective permissions. For illustration purposes, FIG. 8 further shows how a specialized pointer such as encrypted, typed pointer 835 can be used to access memory. For example, the memory access function 816 can invoke a load from encrypted pointer instruction 806 (LdEP) based on a previously-encoded pointer such as encrypted, typed pointer 835. In at least one embodiment, the encrypted, typed pointer 835 and the typed context 834 can be passed as register operands of the LdEP instruction 806. The LdEP instruction 806 causes pointer cryptography and encoding unit 822 to decrypt the encrypted specialized address slice of the encrypted, typed pointer 835 using the typed context 834 as a tweak and generate a raw pointer 836. The upper address bits of the specialized address (which are the same as the upper address bits of the base address) may be retrieved and concatenated with the decrypted specialized address slice. If the decrypted specialized address slice represents bits 3 to 34 of the original specialized address (i.e., because the specialized address is 8-Byte aligned), then three bits initialized to "0" are concatenated at the end of the decrypted specialized address slice to obtain the original specialized address. The offset of the encrypted, typed pointer 835 can be added to the original specialized address to obtain the raw pointer 836, which is the location in memory to be accessed. If there is no offset, then raw pointer 836 represents the original specialized address.

Once the raw pointer 836 is generated, LdEP instruction 806 performs access control checks such as boundaries and permissions. If the access control checks succeed, then the object (or data) from the desired memory location is loaded into a destination operand and decrypted. Raw pointer 836 is used to load data from memory, such as from data cache unit 824 into a register. In at least one embodiment, the data being accessed is encrypted using a tweak that binds the encrypted, typed pointer 835 to the data. For example, the tweak used to encrypt the data may include raw pointer 836 and the tag encoded in the encrypted, typed pointer 835. In one or more embodiments, additional context may also be used in the tweak including, for example, a crypto context identifier (or crypto context ID) (e.g., 64-bit random or deterministically unique value assigned to the pointer) and/or other variable length metadata (e.g., range, location, ownership, version, privilege level, etc.). LdEP instruction 806 causes data cryptography unit 826 to decrypt encrypted data 837 using the same tweak to generate decrypted data 838. The address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the indirect address may include a version number (or other deterministic value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Figure 9:
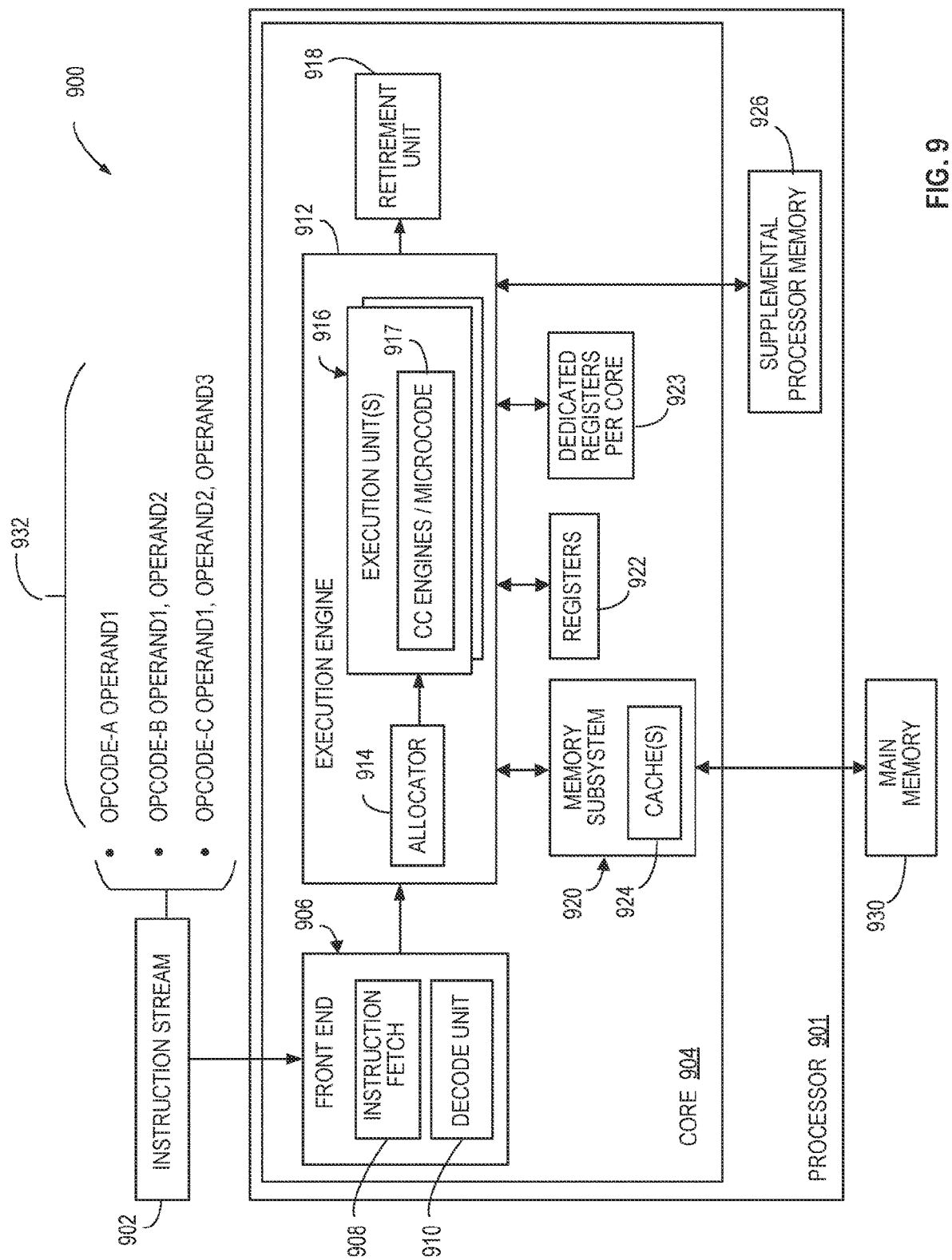
FIG. 9 is a is a simplified block diagram of a possible system for implementing example instructions and logic for various cryptographic computing operations according to at least one embodiment.

Some embodiments of the present disclosure involve instructions and processing logic for various cryptographic computing operations. FIG. 9 is a block diagram of a system 900 for instructions and logic for various cryptographic computing operations, according to embodiments of the present disclosure.

A cryptographic computing (CC) central processing unit (CPU) may have multiple cryptographic engines to encrypt/decrypt code, encrypt/decrypt data transferred to and from memory caches, encode/decode pointers, and authenticate the integrity of code and data. These engines may require cryptographic keys and/or tweaks that need to be securely stored to prevent exposure outside the trusted computing base (TCB) such as user applications and possibly the operating system (OS). For example, cryptographic keys and/or tweaks may be stored in internal hardware registers. In one or more embodiments, these keys are to be unique for each application tenant (e.g., application) running on the same hardware to avoid data leakage between tenants. The hardware is to be programmed with the correct keys based on which tenant is running. Each parallel hardware unit (e.g., core) can have its own set of key registers.

System 900 may include a processor with one or more cores, SoC, integrated circuit, or other mechanism. For example, system 900 may include a processor 901 with a core 904. Although core 904 is shown and described as an example in FIG. 9, any suitable mechanism may be used, including multiple cores within processor 901. Core 904 may include any suitable mechanisms for executing cryptographic computing operations, including those that involve programming 128-bit pointer keys, data keys, and code keys, switching keys between processes, making routable pointers, compressing/decompressing pointers, transferring pointer ownership of an object, and memory move/reverse data from one address to different address. In one embodiment, such mechanisms may be implemented in hardware. Core 904 may be implemented fully or in part by the elements described in FIGS. 1-8.

Instructions to be executed on core 904 may be included in instruction stream 902. Instruction stream 902 may be generated by, for example, a compiler, just-in-time interpreter, or other suitable mechanism (which might or might not be included in system 900), or may be designated by a drafter of code resulting in instruction stream 902. For example, a compiler may take application code and generate executable code in the form of instruction stream 902. Instructions may be received by core 904 from instruction stream 902. Instruction stream 902 may be loaded to core 904 in any suitable manner. For example, instructions to be executed by core 904 may be loaded from storage, from other machines, or from other memory, such as main memory 930. The instructions may arrive and be available in resident memory, such as RAM, wherein instructions are fetched from storage to be executed by core 904. The instructions may be fetched from resident memory by, for example, a prefetcher or fetch unit (such as instruction fetch unit 908).

In one embodiment, instruction stream 902 may include instructions from an instruction set architecture (ISA) having particular formats 932 based on respective instruction definitions. Generally, native instructions are executed by a CPU directly and contain an opcode and one to three operands. Example instruction formats 932 may include a first instruction format having a first opcode-A and one operand, a second instruction format having a second opcode-B and two operands, and a third instruction having a third opcode-C and three operands. An opcode contains information that informs the CPU what operations are to be performed. Operands tell the CPU what data is to be processed in the operations to be performed. Types of operands can include immediate, register, and memory. An immediate operand is a constant value to be used by the instruction. A register operand may be a name/identifier of a register to be accessed. The register may contain data to be accessed or a pointer to a memory location where the data to be accessed is stored. A memory operand may be a reference to a location in memory that contains data or a pointer to a memory location where the data to be accessed is stored.

One or more embodiments disclosed herein include instructions to perform cryptographic computing operations. For example, instruction stream 902 may include a "KCALL" instruction and a "KRET" instruction for enabling a secure library call and return to a single instance of library code in memory that can be securely shared by multiple processes. An encrypted process key (or code key) for the library code may be passed as an operand from a calling program to an instruction cache (e.g., 334, 471, 481, 682) to be used for decrypting instructions in the library code for execution. Other instructions that may be implemented include, but are not necessarily limited to, an "EnterSecureImage" instruction for requesting execution of an encrypted code image, a "VerifyHash" instruction for verifying a code key is valid, and a "SendUIPI" instruction for sending an interrupt from a process directly to a processor Various operands and specific operations performed with respect to each of these instructions will be further defined and described herein.

Core 904 may include a front end 906, which may include an instruction fetch pipeline stage (such as instruction fetch unit 908) and a decode pipeline stage (such as decide unit 910). Front end 906 may receive and decode instructions from instruction stream 902 using decode unit 910. The decoded instructions may be dispatched, allocated, and scheduled for execution by an allocation stage of a pipeline (such as allocator 914) and allocated to execution units 916 for execution.

Execution units 916 may be configured with cryptographic computing engines and/or microcode 917 in any suitable manner to enable cryptographic computing instruction extensions to be performed. In one nonlimiting example, core 904 may include some dedicated execution units for cryptographic computing primitives (e.g., encoding/decoding a cryptographically encoded pointer, encrypting/decrypting a cryptographically encoded pointer, etc.), while some executing units include microcode to accomplish the overall cryptographic computing instruction flows.

One or more specific cryptographic computing instructions to be executed by core 904 may be included in a library defined for execution by core 904. In another embodiment, specific cryptographic computing instructions may be targeted by particular portions of core 904. For example, core 904 may recognize, either implicitly or through decoding (e.g., via decode unit 910) and execution or attempted execution of one of the aforementioned instructions, that one of these extended cryptographic computing operations is to be performed. In some implementations and scenarios, the extended cryptographic computing instruction (or particular operation(s) of the instruction) may be directed to a particular one of the execution units 916 for execution of the instruction (or particular operation(s) of the instruction). For example, the instruction (or particular operation of the instruction) may be directed to a dedicated execution unit that performs a certain cryptographic primitive.

An execution unit 916 that executes cryptographic computing instructions may be implemented in any suitable manner. In one embodiment, an execution unit 916 may include or may be communicatively coupled to registers, supplemental processor memory 926, and other memory elements to store information necessary to perform one or more cryptographic computing operations. In one embodiment, an execution unit 916 may include circuitry to perform a cryptographic computing operation.

Generally, during execution of cryptographic computing instructions, access to data that is typically stored in memory or to additional instructions (including data or instructions resident in main memory 930) may be made through memory subsystem 920. Moreover, results from execution may be stored in memory subsystem 920 and subsequently moved to main memory 930 or some other longer storage memory. Memory subsystem 920 may include, for example, memory, RAM, or a cache hierarchy, which may include caches 924, such as one or more Level 1 (L1) caches or Level 2 (L2) caches, some of which may be shared by multiple cores 904 or processors 901.

Execution of cryptographic computing instructions may also involve cryptographically encoded pointers and other information related to the cryptographic computing functions such as, for example, secret keys, tweaks, context information, and/or credentials for information requiring authentication. Cryptographically encoded pointers are typically stored in registers 922. Registers 922 may be included in core 904 and may also be used to store other information related to cryptographic computing. In one or more embodiments, dedicated registers 923 per core may be provisioned to store secret keys and/or tweaks for the cryptographic operations. Processor 901 may also include supplemental processor memory 926, such as content addressable memory (CAM), which may be dedicated for storage of information related to cryptographic computing. For example, dedicated supplemental processor memory 926 may be a dedicated cache that is not accessible by software. Thus, information such as keys, tweaks, context information, credentials, and/or possibly cryptographically encoded pointers may be stored in the dedicated supplemental processor memory 926. In other embodiments, keys used to secure a cryptographically encoded pointer, data, and/or code (and potentially other information related to cryptographic computing) can be stored in another memory location such as firmware, in a secure portion of main memory 930 or another storage device, or any other form of secure memory suitable for performing the functions described herein.

After execution by execution units 916, instructions may be retired by a writeback stage or retirement stage in retirement unit 918. Various portions of such execution pipelining may be performed by one or more cores.

Figure 10:
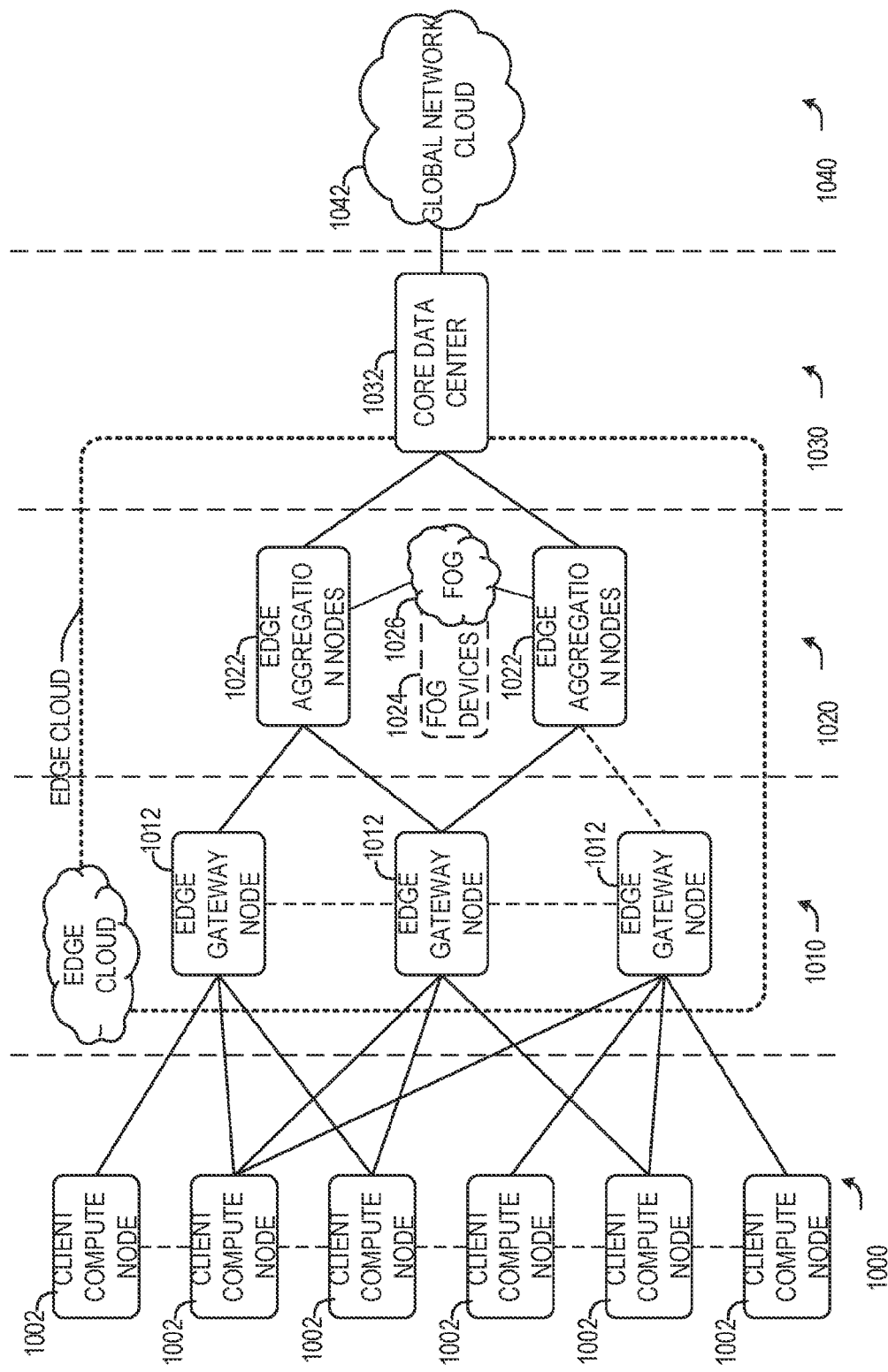
FIG. 10 is a schematic depiction of a cloud network according to some embodiments.

FIG. 10 provides a further abstracted overview of layers of distributed compute deployed among an edge computing environment for purposes of illustration. At a more generic level, an edge computing system may be described to encompass any number of deployments operating in an edge cloud, which provide coordination from client and distributed computing devices.

FIG. 10 generically depicts an edge computing system for providing edge services and applications to multi-stakeholder entities, as distributed among one or more client compute nodes 1002, one or more edge gateway nodes 1012, one or more edge aggregation nodes 1022, one or more core data centers 1032, and a global network cloud 1042, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 1010, 1020, 1030, 1040, 1050. For example, the client compute nodes 1002 are each located at an endpoint layer 1010, while each of the edge gateway nodes 1012 are located at an edge devices layer 1020 (local level) of the edge computing system. Additionally, each of the edge aggregation nodes 1022 (and/or fog devices 1024, if arranged or operated with or among a fog networking configuration 1026) are located at a network access layer 1030 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1032 is located at a core network layer 1040 (e.g., a regional or geographically-central level), while the global network cloud 1042 is located at a cloud data center layer 1050 (e.g., a national or global layer). The use of "core" in the context of FIG. 10 is provided as a term for a centralized network location—deeper in the network—which is accessible by multiple edge nodes or components; however, a "core" does not necessarily designate the "center" or the deepest location of the network. Accordingly, the core data center 1032 may be located within, at, or near the edge cloud.

Although an illustrative number of client compute nodes 1002, edge gateway nodes 1012, edge aggregation nodes 1022, core data centers 1032, global network clouds 1042 are shown in FIG. 10, it should be appreciated that the edge computing system may include more or fewer devices or systems at each layer. Additionally, as shown in FIG. 10, the number of components of each layer 1010, 1020, 1030, 1040, 1050 generally increases at each lower level (i.e., when moving closer to endpoints). As such, one edge gateway node 1012 may service multiple client compute nodes 1002, and one edge aggregation node 1022 may service multiple edge gateway nodes 1012.

Consistent with the examples provided herein, each client compute node 1002 may be embodied as any type of end point component, device, appliance, or "thing" capable of communicating as a producer or consumer of data. Further, the label "node" or "device" as used in the edge computing system 1000 does not necessarily mean that such node or device operates in a client or agent/minion/follower role; rather, any of the nodes or devices in the edge computing system 1000 refer to individual entities, nodes, or subsystems which include discrete or connected hardware or software configurations to facilitate or use the edge cloud.

As such, the edge cloud is formed from network components and functional features operated by and within the edge gateway nodes 1012 and the edge aggregation nodes 1022 of layers 1020, 1030, respectively. The edge cloud may be embodied as any type of network that provides edge computing and/or storage resources which are proximately located to radio access network (RAN) capable endpoint devices (e.g., mobile computing devices, IoT devices, smart devices, etc.), which are shown in FIG. 10 as the client compute nodes 1002. In other words, the edge cloud may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud may form a portion of or otherwise provide an ingress point into or across a fog networking configuration 1026 (e.g., a network of fog devices 1024, not shown in detail), which may be embodied as a system-level horizontal and distributed architecture that distributes resources and services to perform a specific function. For instance, a coordinated and distributed network of fog devices 1024 may perform computing, storage, control, or networking aspects in the context of an IoT system arrangement. Other networked, aggregated, and distributed functions may exist in the edge cloud between the cloud data center layer 1050 and the client endpoints (e.g., client compute nodes 1002). Some of these are discussed in the following sections in the context of network functions or service virtualization, including the use of virtual edges and virtual services which are orchestrated for multiple stakeholders.

The edge gateway nodes 1012 and the edge aggregation nodes 1022 cooperate to provide various edge services and security to the client compute nodes 1002. Furthermore, because each client compute node 1002 may be stationary or mobile, each edge gateway node 1012 may cooperate with other edge gateway devices to propagate presently provided edge services and security as the corresponding client compute node 1002 moves about a region. To do so, each of the edge gateway nodes 1012 and/or edge aggregation nodes 1022 may support multiple tenancy and multiple stakeholder configurations, in which services from (or hosted for) multiple service providers and multiple consumers may be supported and coordinated across a single or multiple compute devices.

Any of nodes 1002, 1012, 1022 or 1032 may, for example, include an architecture similar to that shown for system 400 of FIG. 4, or include a processor similar to any of processors 470 or 480 of FIG. 4.

Figure 11:
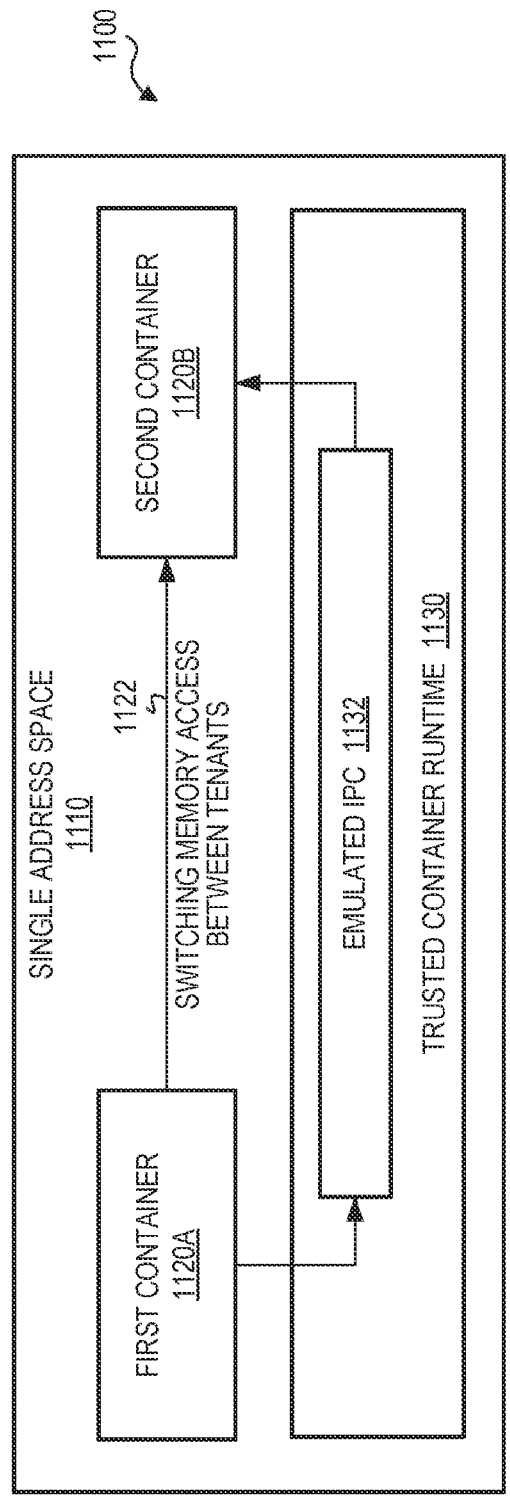
FIG. 11 is a simplified block diagram illustrating an example multitenant software architecture.

FIG. 11 is a simplified block diagram that illustrates an example multitenant software architecture 1100 including a single address space 1110 supporting a container A 1120A and a container B 1020B. Isolation is enforced between the containers using cryptographically encoded pointers. The address space 1110 may comprise a trusted container runtime 1130 that facilitates an emulated inter-process communication 1132 between the containers 1120A and 1120B. Only two containers are illustrated in FIG. 11 for simplicity and ease of description. It should be noted, however, that the concepts described herein could be applied to a scaled implementation with many containers.

Encoded pointers may be implemented to instantiate cryptographic isolation in a multitenant software architecture (e.g., 1100) using, for example, the concepts previously shown and described herein related to cryptographically encoded pointers and potentially other encoded pointers that do not include an encrypted portion of a linear address, but that include other context information to distinguish. First, containers are not permitted to generate pointers with raw pointers as input, as this could enable the container to access unauthorized memory. Typically, in a multitenant environment, containers are not trusted by other containers or by a trusted runtime. If each container could access any part of the address space, a malicious container could access data or code of another container, corrupt data or code of another container. Therefore, the ability to generate an encrypted pointer to any part of the single address space is restricted. In addition, containers may be allowed to execute a special instruction to produce pointers that provide at most the permissions that are already supplied by existing pointers the container is allowed to access. For example, a container may be able to reduce the size of an object that is a subset of an object it was already assigned, using a processor instruction for producing an encoded pointer of a smaller size given a pointer of a larger size for the same object location in memory.

Each container may be restricted to just the memory areas covered by the pointers that are provided as input to that container by its supervisor (e.g. the operating system or a trusted runtime).

In one or more embodiments, trusted runtime 1130 comprises software that is trusted by the containers. This software may be privileged, but does not necessarily have to be privileged. Along with the trusted software, trusted runtime 1130 may also include firmware, a secure software mode and/or hardware in any suitable combination that, when executed, is responsible for loading container code into memory, for scheduling containers, and for configuring the processor memory access control features to grant each container access to precisely the memory that it is authorized to access. It may also provide services such as allocating or deallocating regions of private or shared memory for containers, sending messages between containers, terminating containers, and providing cryptographic keys of a first container to one or more other containers that are authorized to access the first container.

In the multitenant environment, the trusted runtime 1130 restricts each container to its own authorized memory region. Trusted runtime 1130 can generate a pointer or pointers that reference one or more "private" memory regions that a particular container is authorized to access, but that other containers are not authorized to access. A pointer to an authorized memory region can be generated by the trusted runtime 1130 with a raw pointer using an appropriate instruction. Additionally, the trusted runtime encrypts the container code as it is being loaded and generates pointers to the container code. The pointers generated by the trusted runtime 1130 can be provided to the container code when the container code is initiated or during execution for example, when a message is received from another container. In one example illustration, when trusted runtime 1130 initiates container A 1120A, trusted runtime 1130 generates a cryptographically encoded pointer that covers a particular memory region that container A 1120A is authorized to access, and then provides the cryptographically pointer to container A 1120A to be used during its execution. It should be noted that the authorized memory region may contain sub-regions within the memory region that may contain their own pointers. In addition, trusted runtime 1130 can also generate a pointer or pointers that reference one or more "shared" memory regions that all containers within the single address space are allowed to access or that a subset of containers in the single address space are allowed to access.

Typically, secret cryptographic keys are used to encrypt base address slices of some cryptographically encoded pointers (e.g., extended base address (EBA) pointers) or other address slices in pointers using other cryptographically encoded formats), and to encrypt data or code that is referenced by the pointers. In the multitenant environment, keys may be switched between containers (also referred to herein as "tenants") so that each container uses a different key than the other containers for generating encrypted base address slices (and address slices in pointers using other cryptographically encoded formats) for its pointers, and for encrypting data or code that is referenced by the pointers. Switching keys can strengthen isolation without requiring translation lookaside buffer (TLB) evictions, cache evictions, or other actions that impose additional overhead as in conventional page table switching. Embodiments also allow switching memory access between containers 1122, where one container transfers control so that another container may access the code and data of the second container. The first container (e.g., Container A 1120A) may cause the keys of the container being accessed (e.g., Container B 1120B) to be activated for use in order to successfully access data and code of the container being accessed.

Various compute strategies are employed to host multitenant software architectures, such as 1100. Often, a virtual system may be implemented with container code running in separate virtual machines. Although this provides isolation for the container code, there is significant performance overhead that accompanies a virtualized multitenancy environment. Running container code on the same host operating system can offer system performance advantages, but isolation and security of the container code are still needed.

Cryptographic computing can enable container code to run on the same host operating system while protecting components of a process from each other and isolating container code from other container code. However, certain privileged entities that may be part of a trusted computing base may obtain access to secret keys used in the encryption and decryption associated with cryptographically encoded pointers and the corresponding data and code referenced by those pointers. For example, normally an operating system has full control over changing processes in a multitenant environment, as it decides when and what processes are to be switched. To switch processes, an instruction such as MOV cr3 may be used to switch page tables by filling the control register 3 with the pointer to the base of the page table, page directory or with the appropriate page map level (e.g., 4 or 5) depending on the particular architecture. When the process changing occurs, secret keys can be exposed to a trusted runtime (e.g., 1110) and/or to other privileged entities (e.g., graphical processing unit (GPU)) that participate in the operations of the workload. Such privileged entities, however, may be vulnerable to attacks, thereby potentially undermining cryptographic computing protection when secret keys are exposed to those entities. If secret keys are exposed to an exploited or otherwise flawed operating system, for example, the operating system could potentially tamper with the workload, manipulating code or data of a particular process. Likewise, third party providers such as cloud service providers, administrators or individuals with physical access to equipment may compromise the privileged software or tamper with external storage or memory. Consequently, safeguards are needed for keys used in cryptographic computing for multitenant environments.

When relying on an operating system (or other privileged software) to be trustworthy, other issues may arise in signature verification for applications and libraries. In one common scenario a file system in a server can receive, via some network (e.g., Internet, local network, etc.), a signed package to install and/or update applications and/or libraries hosted on that server. An operating system may be configured with an operating system updater to verify signatures on downloaded packages. The binary images of the downloaded applications and libraries, however, may not be signed once they are installed/updated on the server. Applications and libraries may be looked up according to a name, but the name may not be unique to a particular binary image and may be forged. For example, many differently compiled variants of glibc of a certain version may be distributed by different vendors. Accordingly, trusting the operating system to select the appropriate version without some verification mechanism that the selected version is in fact the most current version of the expected software, risks execution of out-of-date binaries or modified binaries and resulting data corruption or compromise. Removing privileged software such as an operating system, a virtual machine manager, etc. from a trusted computing base of a system can prevent such privileged software from accessing incorrect libraries and/or from manipulating code or data associated with a process.

A cryptographic sub-process object-granular multitenant system, as disclosed herein, can resolve these issues. Embodiments herein provide cryptographic computing with a security engine (e.g., 692) to protect the confidentiality and integrity of in-memory data and code for container applications. The embedded security (e.g., 692) engine and key management hardware (e.g., 694) can generate and manage per-container data and code keys, where a code key and a data key of a particular container process are unique. In one or more embodiments, the security engine and key management hardware coordinate to generate the per-container data and code keys without visibility by the operating system (e.g., a guest operating system, a host operating system) or other privileged software (e.g., a virtual machine manager, other privileged firmware and software). Consequently, privileged software is removed from the trusted computing base by preventing direct access to unencrypted keys used in the cryptographic computing computations for encrypting/decrypting portions of cryptographically encoded pointers and the data and code referenced by the pointers. Additionally, the security engine and key management hardware provide for container application code runtime confidentiality, integrity, and attestation based on these encoded pointers and keys.

Figure 12:
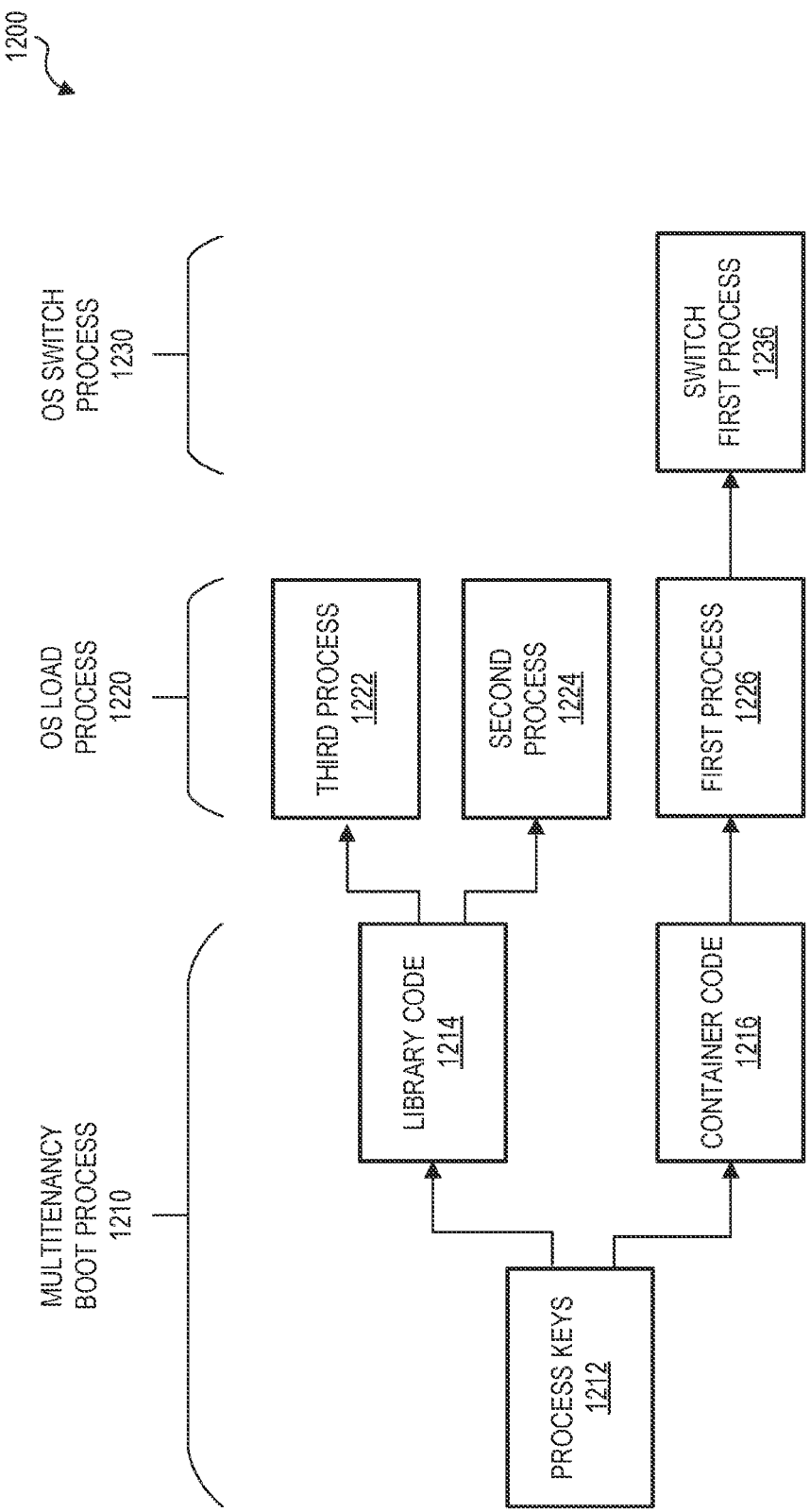
FIG. 12 is a simplified block diagram illustrating an example multitenancy initialization process according to an embodiment.

Turning to FIG. 12, FIG. 12 is a simplified block diagram illustrating a multitenancy initialization process 1200 according to an embodiment. Multitenancy initialization process 1200 includes establishing respective process keys per container during a boot process. Process keys can include code keys and data keys, where code keys are unique for each container code image and data associated with that container code image and corresponding process. A separate library key can be generated for library code 1214. A multitenancy boot process 1210 can involve System Management Mode (SMM) and/or a Basic Input/Output System (BIOS) program or other firmware that is used to perform start-up procedures when a computer is booted or powered on, before privileged software like an operating system is running. In one example, a security engine (e.g., 692) or other suitable secure mode (e.g., Secure-Arbitration Mode (SEAM) of Intel® Trust Doman Extensions, etc.) or security processor (e.g., Intel® Converged Security Management Engine (CSME), etc.) can be used to generate process keys, use the process keys for encryption of container code 1216 and associated data, and use a processor/hardware key to encrypt the process keys associated with container code 1216 and library code 1214 that may run in the multitenancy environment. In one or more examples, the security engine is configured as a secure place where trusted code may run independently (e.g., without operating system interference) and signing keys are protected by hardware. When the operating system boots, it can allocate memory for container code 1216 and library code 1214. Container code 1216 may also be referred to as tenant code, customer code, consumer code, or any other suitable term representing code that is to run in a multitenancy environment in which the code is to be secure from manipulation by other code, including privileged software.

In one example, process keys include a code key that can be assigned to a particular code image and used to encrypt (and decrypt) the code image in memory. A code image can include any type of code (e.g., of an application, program, library, or other code that is executable or compliable for execution). In some scenarios, a code image may include only code and in other scenarios a code image can include code and data such as global variables and/or constants, for example. As used herein, however, "code key" generally refers to a key used to encrypt and decrypt an application or program of a container process, while "library key" generally refers to a key used to encrypt and decrypt a library image. Process keys can also include data keys that can be assigned to data associated with a particular code image (e.g., data that is used by the container and not shared with other containers, or data that is generated by the container). Data that is shared by multiple container processes may be encrypted by a shared data key. A code key and library key can be used to encrypt container code 1216 and library code 1214, respectively, using their linear (or logical) addresses as a tweak to their encryptions. In addition, a hash of container code 1216 and a hash of the library code 1214 in memory can be generated and each hash can be encrypted with their respective code keys. In some instances the hash may be signed by the security engine. An image hash encrypted with the code key assigned to the code image can indicate which encrypted code key corresponds to which code image encrypted in memory thus ensure that a particular key is valid (that is, was used to encrypt the code image in memory). Generally, a hash is an algorithm that converts an input value and returns a fixed-length output value in a different size. The hash algorithm may or may not use a key (e.g. a MAC or message authentication code). Any suitable hashing algorithm may be used in embodiments described herein. Examples of hashing algorithms that may be used include, but are not necessarily limited to, a Secure Hash Algorithm (e.g., SHA1, SHA2, SHA3) or a Message Digest 5 (MD5).

In some scenarios, where the code to be run is known a priori, before the operating system (or other privileged software) is running, process keys 1212 can be established and encrypted and container code and library code can be measured and encrypted, which can be later loaded by the operating system for execution at a future point.

In one example of an operating system load process 1220, the operating system can receive the encrypted images of container code 1216 and of library code 1214, as well as the encrypted process keys. The operating system can load the encrypted code image of container code 1216 into memory for first process 1226 and the encrypted code image of library code 1214 into memory for second process 1222 and for third process 1224. This creates the linear-to-physical mapping by setting up the page tables. An attestation process may be used to prove to the tenant that its code (e.g., 1216) is loaded. Other embodiments may use a secret key, injected into the encrypted code image by the security image, to prove to the tenant that the expected code is running, given the tenant's knowledge of the secret and the ability to verify messages that could only be produced using the secret (e.g. by generating MACs using the secret value).

In one example of an operating system switch process 1230, the operating system may switch from first process 1226 to another process. This may be accomplished, for example, by a MOV cr3 instruction. In at least one embodiment, a new instruction may be provided to set the process keys via the encrypted process keys that were established in the multitenancy boot process 1210 and that were used to generate the encrypted code image of the container code 1216 and library code 1214. The new instruction enables the operating system to set the process keys without visibility into the process keys because the process keys are encrypted with a secret known to the hardware but unknown to the operating system. Other embodiments may similarly use derived keys where the process keys are the derived keys. A chain of trust can be created where the operating system can still control the platform but cannot see the code that is running in the process because the code images were encrypted by another entity (e.g., security engine 692).

The encryption of the code images is performed based on linear (or logical) address mappings (e.g., rather than physical address) and therefore, the binding to linear addresses does not require the operating system to keep track of physical pages or to provide any additional hardware support for paging. Thus, the operating system can still control all of the paging operations (e.g., page the physical memory back to disk or other form of storage, page the physical memory into main memory, etc.).

Figure 13:
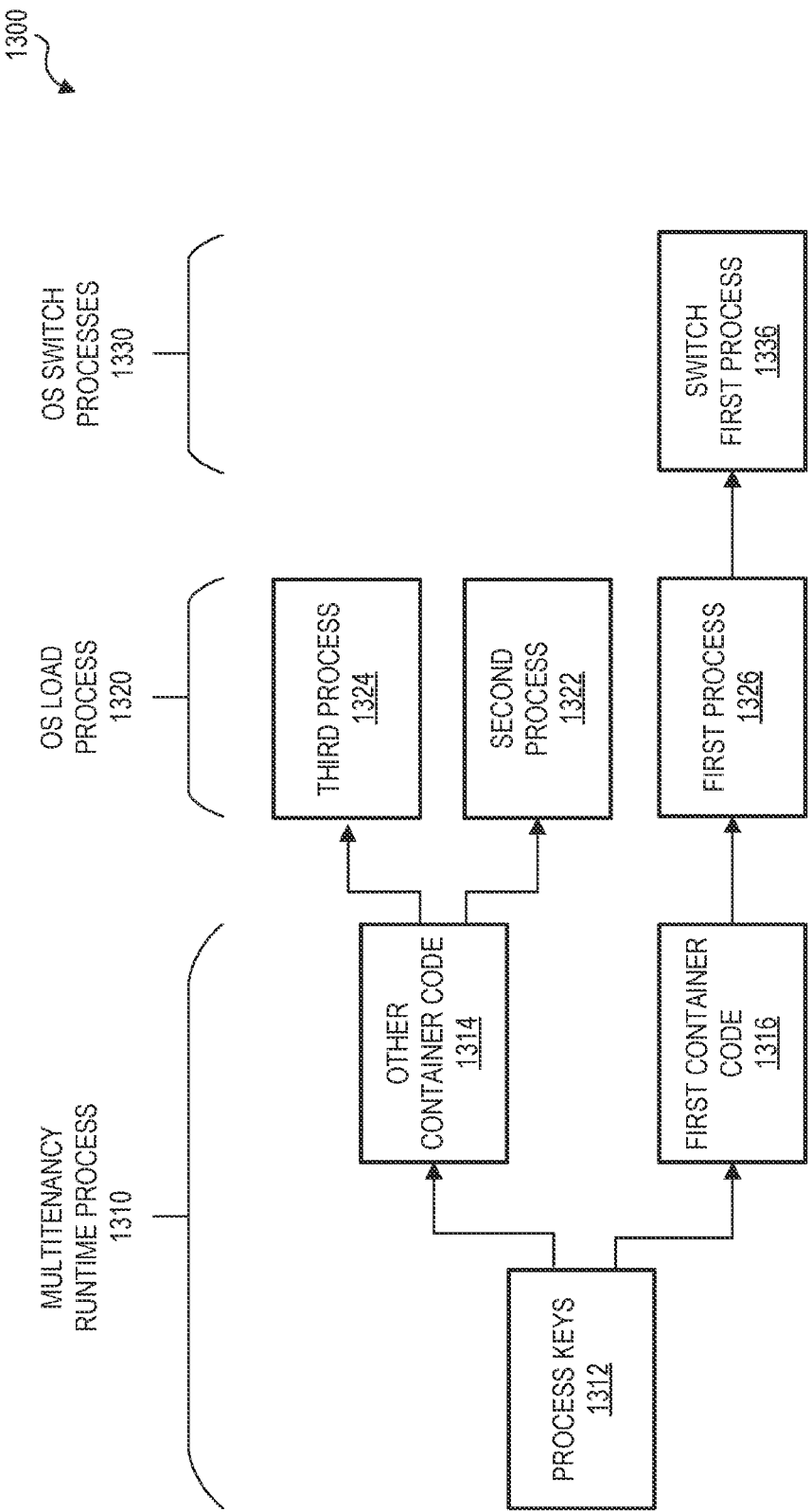
FIG. 13 is a simplified block diagram illustrating an example multitenancy runtime process according to an embodiment.

FIG. 13 is a simplified block diagram illustrating a multitenancy runtime process 1300 according to an embodiment. Multitenancy runtime process 1300 includes establishing respective process keys for code images during runtime where the process keys are unique for each code image and corresponding process. During a multitenancy runtime process 1310, the operating system can call a security engine (e.g., SEAM, secure mode, security engine, secure mode, etc.) to lock new process keys 1312 by encrypting them with a key known only to the processor hardware and security engine. New process keys 1312 can include a first key for first container code 1316 and other keys for other container code 1314. Additionally, code encryption keys may be different than data encryption keys for each container. In one example, the new process keys 1312 can be encrypted using a processor or hardware key that is available only to the processor (e.g., 602) and security engine. Accordingly, the encrypted keys cannot be directly decrypted by the operating system but instead, can be decrypted by the processor hardware for example, when invoked by the security engine or by a new processor instruction.

The security engine can load the plaintext of first container code 1316 and other container code 1314. In at least one embodiment, each instance of container code (also referred to herein as "code image") can be fixed up to enable attestation of the code image. For example, a secret key can be injected into the code image demonstrating it had undergone this method. In addition, implicit integrity can be implemented by periodically inserting no operation ("NOP") instructions in the code image to verify code sections are unmodified during execution and verifying the NOPs are still present in the decrypted image, or MACs, separate MAC tables or other integrity mechanism. The fixed up code images of first container code 1316 and other container code 1314 can be encrypted using their respective process keys and respective non-overlapping linear addresses (i.e., location) or rebaseable logical addresses as a tweak in the encryption (for example, using a tweakable cipher mode such as XTS). Metadata indicating an execute permission may also be used as a tweak in at least some embodiments. Additionally, each code image can be hashed with its respective process key of process keys 1312, signed or encrypted with the process key, and returned to the operating system.

In one example of an operating system load process 1320, the operating system can receive the encrypted code images of first container code 1316 and other container code 1314, as well as the encrypted process keys from the security engine. The operating system can load the encrypted code image of first container code 1316 into memory (or the security engine could have already loaded the encrypted code image into memory) as first process 1326 and the encrypted code images of other container code 1314 into memory as second process 1322 and third process 1324. The OS creates the linear-to-physical mapping by setting up the page tables. Processes can use process keys (e.g., library keys corresponding to respective library images) to extend executable code (e.g., to load library) and to set up initial states. An attestation process may be used to prove to the tenants that their code (e.g., 1314, 1216) is loaded. The attestation keys injected into the code images, or other secrets, may be used to attest to a remote party.

In one example of an operating system switch process 1330, the operating system may switch from first process 1326 to another process, such as second process 1322. This may be accomplished, for example, by a MOV cr3 instruction. In at least one embodiment, the operating system can set the process key (e.g., the code key and the data key) for the second process 1322 via the new set encrypted key instruction to process key register, which may be a general purpose register (GPR), control register or MSR. This key may be encrypted using the processor key. The processor can decrypt the encrypted process keys to obtain the code key and data key of second process 1322. The code key and data key can be used to decrypt code and data, respectively, of second process 1322 as it loads and executes from memory. Process 1322 can be entered using a user interrupt entrypoint to always provide the process controlled entry from known code paths.

Figure 14:
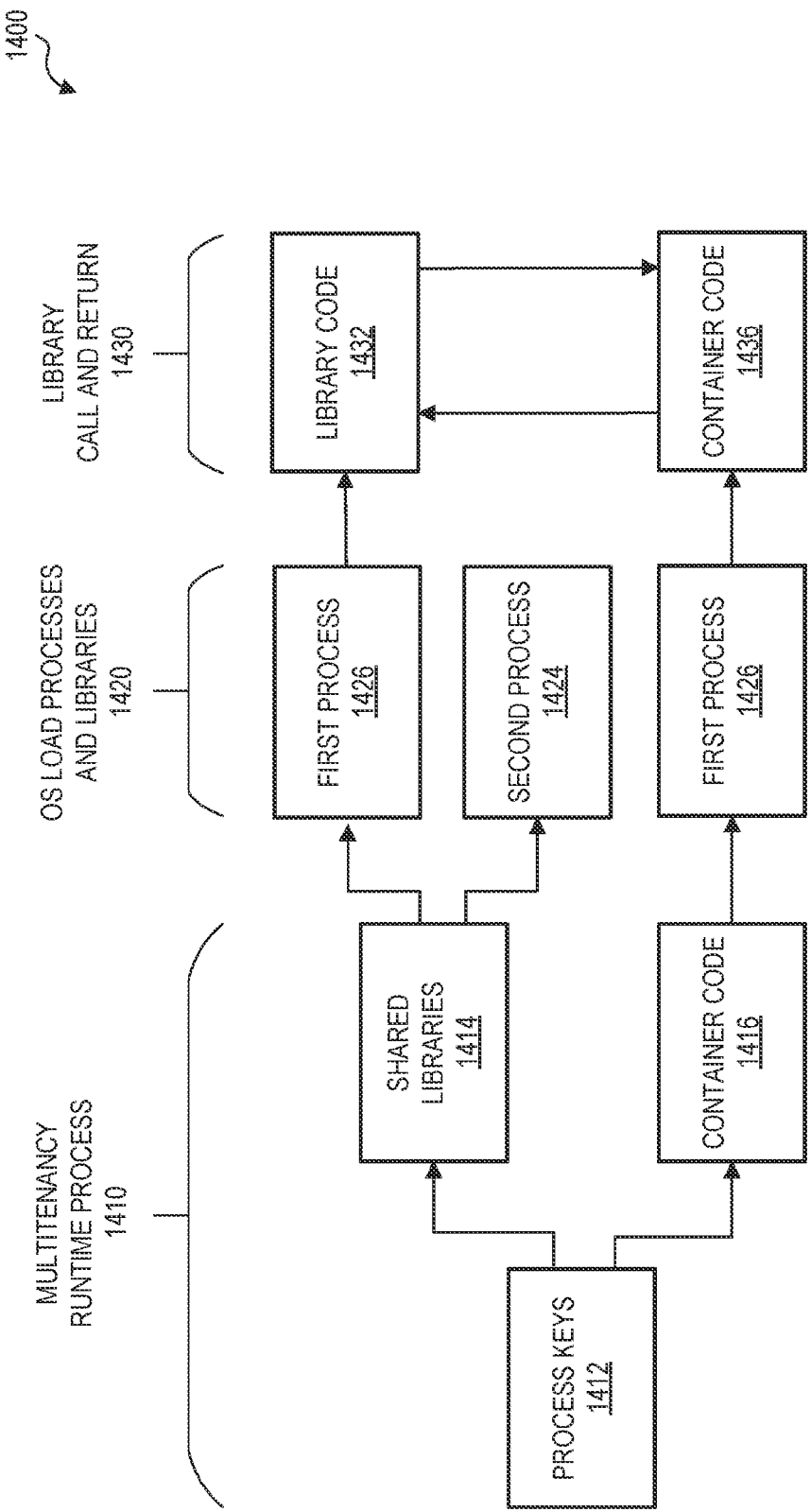
FIG. 14 is a simplified block diagram illustrating another example multitenancy runtime process with shared libraries according to an embodiment.

FIG. 14 is a simplified block diagram illustrating a multitenancy runtime process 1400 according to an embodiment. Multitenancy runtime process 1400 illustrates a shared library call subprocess and includes using respective process keys for container code and shared libraries. In a multitenancy runtime process 1410, the operating system can call a security engine (e.g., SEAM, secure mode, security engine, secure mode, etc.) to lock new process keys 1412 by encryption. New process keys 1412 can include a first code key for container code 1416 and other code keys (also referred to herein as library keys) for shared libraries 1414. In one example, the new process keys 1412 can be encrypted using a processor key that is available only to the processor (e.g., 602) and security engine. Accordingly, the encrypted keys cannot be directly decrypted by the operating system but instead, can be decrypted by the processor for example, when invoked by the security engine.

The security engine can load the plaintext of container code 1416 and shared libraries 1414. In one embodiment of multitenancy runtime process 1410 the security engine (e.g., 692) can create non-overlapping shared libraries in different linear regions that are shared between multiple processes. Each code image (e.g., container code and each shared library code) can be fixed up to enable attestation of the code image. For example, a secret key can be injected into the code image. In addition, implicit integrity can be implemented by periodically inserting no operation ("NOP") instructions in the code image to verify code sections are unmodified during execution, or a MAC table for the image may be constructed. The fixed up code images of container code 1416 and the fixed up images of the shared libraries 1414 can be encrypted using their respective process keys and respective non-overlapping linear addresses (i.e., location) or logical address as a tweak in the encryption. Metadata indicating an execute permission may also be used as a tweak in at least some embodiments. Additionally, each code image can be hashed with its respective process key 1412, each hash signed or encrypted with the process key, and returned to the operating system.

In one example of an operating system load process 1420, the operating system can receive the encrypted code images of container code 1416 and shared libraries 1414, each encrypted with their respective process keys. The operating system can also receive, from the security engine, the linear or logical address and encrypted process key for each shared library image and can set up the initial states. The encrypted library images may be loaded into memory at their non-overlapping linear or rebaseable logical address ranges. The operating system can also load the encrypted code image of container code 1416 into memory as first process 1426. The OS may then create the linear-to-physical mappings by setting up the page tables to include the appropriate shared libraries physical memory locations into the linear address space of the process.

In this example, first process 1426 is sharing one of the shared libraries, library code 1432, with a second process 1424. For example, library code 1432 may be a library that is needed by container code 1416 and some other non-trusted entities, but multiple copies of that library in physical memory are not desirable (e.g., glibc). In this scenario, encrypting shared library code 1432 with a unique process key (e.g., a library key) and cryptographically binding the shared library code 1432 line by line (block by block) to its respective linear addresses (as a tweak to the encryption) enables the library code to be encrypted and shared by multiple processes. In this scenario, the library code is associated with a different process key than the container code (or code of another process) accessing the library code, requiring a key switch to decrypt the library code.

New instructions, such as library call and return instructions 1430, may be executed by container code 1416 once it is launched. These instructions may also use the encrypted library key for library code 1432. In one example, container code 1416 can load library 1432 via the OS, get a signed message authentication code (MAC) or encrypted hash and encrypted key for the library, and verify that the MAC or encrypted hash and encrypted key corresponds to library code 1432. Container code 1416 may then execute a library call (e.g., KCALL) instruction using the library's encrypted key. Thus, the library's encrypted key is set as an instruction cache key on the library call instruction for the instruction cache (e.g., 334, 471, 482, 682) of the processor (e.g., 390, 470, 480, 602). The processor can decrypt the encrypted key and begin decrypting instructions in the instruction cache using the decrypted key. Once library code 1432 has finished executing, a library return instruction (e.g., KRET) can reset the instruction cache key for the instruction cache back to the caller's (e.g., container code 1416) code key. Data may use a different key that is associated with the process, however, as the library code may use the caller's data key (process key). That is, the library code uses the data key associated with the container code 1436 when called by first process 1416. However, when the library code is called by second process 1424, a different data key is programmed in the data cache and the library code uses that new data key. If the library has any writable data sections (e.g., data sections that can be modified, such as global variables), then these writable data sections may be copied into the process memory for the process that is calling the library. Thus, the modifiable library data can be encrypted and decrypted using the appropriate (per-process) data key.

It should be noted that other processes with different tenant code or different customer code can be running the same library code 1432 with the same encrypted key using the same kind of call (e.g., KCALL and KRET). Thus, libraries encrypted and stored in physical memory can be shared across processes that do not necessarily trust each other, and operating systems that also may not be trusted. This technique enables a secure call and return flow sequence between different components and only one copy of the library code is needed in memory. All processes can share the same physical memory mapped to the same linear or logical address.

Figure 15:
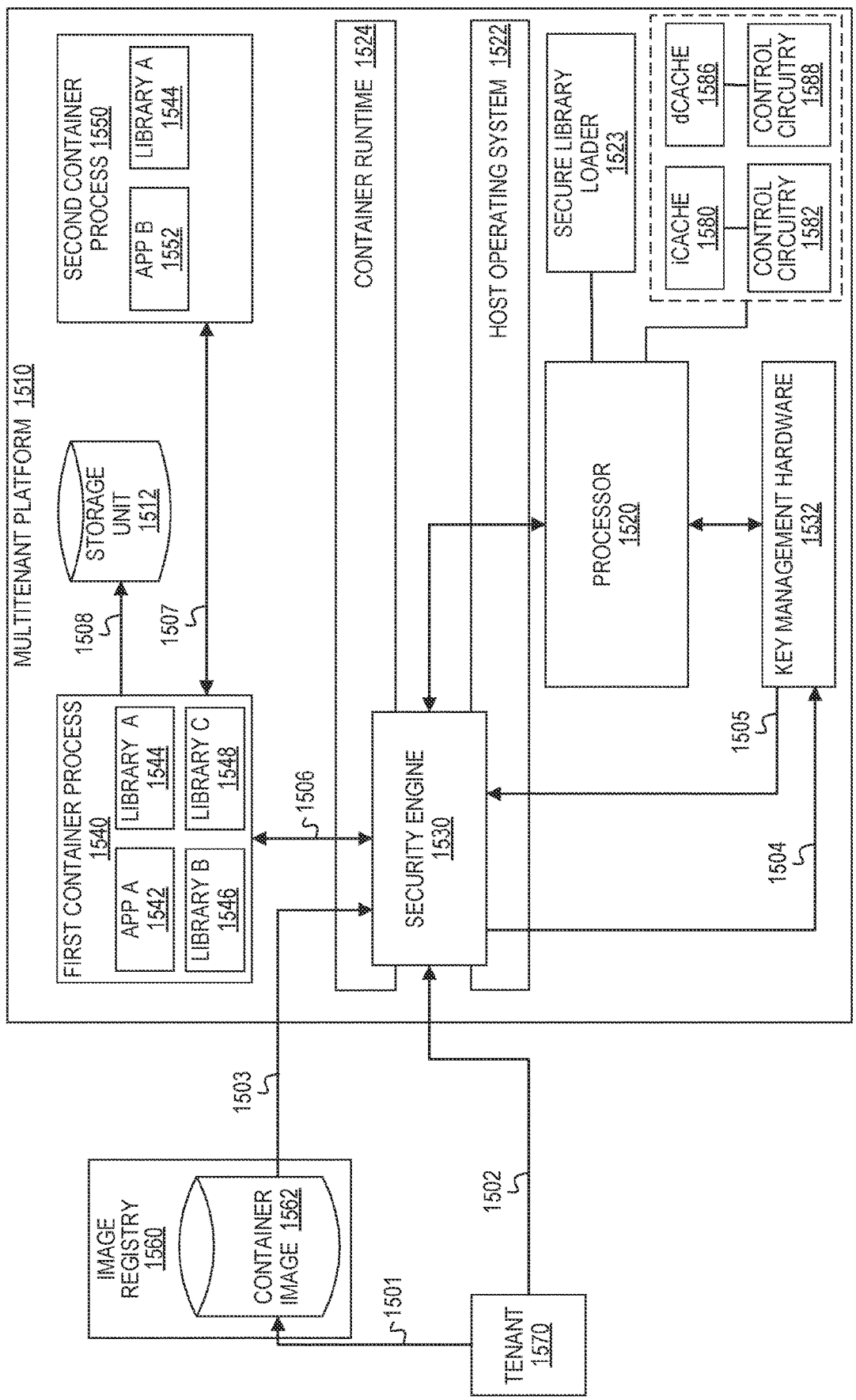
FIG. 15 is a block diagram of an example multitenant system architecture for cryptographic computing based container security according to an embodiment.

Turning to FIG. 15, a block diagram of an example multitenant system 1500 for cryptographic computing based container security is illustrated according to an embodiment. Multitenant system 1500 is configured to launch a container with an encrypted code image on a verified platform (e.g., 1540), protect code and data in-memory, and securely handle asynchronous events and communication between container processes (e.g., first container process 1540A and second container process 1540B). The example multitenant system 1500 can include an image registry 1560 and a multitenant platform 1510. In one example, image registry 1560 can be maintained by a cloud service provider and is configured to allow a code image for a container, such as code image 1562, to be published and retrieved by a multitenancy computing platform, such as multitenant platform 1510 for launching a container process. In an example, a software developer or user may publish code image 1562, which may be signed and possibly encrypted code. A software developer or user that publishes code image 1562 may be associated with a tenant, such as tenant 1570, which can issue a request to multitenant platform 1510 (or its associated service provider) to launch code image 1562. Tenant 1570 represents a computing device or system that is configured for communication to image registry 1560 and multitenant platform 1510, and that may be used to request container code to be launched (e.g., first container process 1540) on multitenant platform 1510. One or more other tenants may also be configured for communication to multitenant platform 1510 to request container code to be launched (e.g., second container process 1550) on multitenant platform 1510. In some scenarios, a tenant owner may give commands via a user interface to request the multitenant platform to launch the container and in other scenarios, tenant 1570 may be automated for launching container code on multitenant platform 1510.

Multitenant platform 1510 represents one example multitenancy architecture according to one or more embodiments, which may be implemented as a computing platform configured to run multiple containers with cryptographic computing based container security. In one example, the platform provides attestation of its hardware to the tenant to verify that it is a trusted platform. The platform can also attest to its hardware, boot, operating system, for example. Any suitable attestation infrastructure may be utilized to provide platform attestation (e.g., TPM2 in Intel PTT, SGX/TDX, security engine, etc.). Multitenant platform 1510 may include a processor 1520 (e.g. central processing unit (CPU), graphical processing unit (GPU), etc.), which may be implemented in accordance with (but not necessarily limited to) the various architectures described herein (e.g., 102, 104, 106, 108, 200, 390, 470, 480).

A security engine 1530 and key management hardware 1532 may be configured in multitenant platform 1500 to generate and store per-container process keys that can be used to encrypt and decrypt code and data associated with a particular container. Process keys can include a code key for a process that is instantiated by executing a container code image and a data key for data that is associated with the process. Security engine 1530 and key management hardware 1532 may be logically separate entities (as shown in FIG. 15) or combined as one logical and physical entity, and may be implemented in hardware, software, firmware, or any suitable combination thereof, using any suitable secure mode (e.g., Secure-Arbitration Mode (SEAM) of Intel® Trust Doman Extensions, ESE, etc.) or security processor (e.g., Intel® Converged Security Management Engine (CSME), etc.).

In one embodiment, security engine 1530 is a trusted firmware component of the multitenant platform 1510. In some embodiments, it may be configured as a separate embedded processor that runs trusted firmware. The security engine 1530 can execute in a privileged state similar to Intel® Virtual Machine eXtensions (VMX) root, ring level-1, or another virtualization root mode. In some embodiments the security engine may be entirely hardware circuits. The security engine can establish defined interfaces to other domains, such as an operating system (e.g., 1522). The security engine may be embodied as a firmware library that can be measured by hardware (e.g., by the processor 1520). Security engine 1520 is part of a trusted computing base (TCB) that can measure and encrypt code and library images and also produce encrypted process keys. Security engine 1530 and processor 1520 may be integrated or may be logically and/or physically separate but configured to coordinate to perform encryption and decryption associated with the process keys using a processor/hardware key, which processor 1520 can access.

Processor 1520 may also include an instruction cache (iCache) 1580 (which may be similar to instruction cache 334 of FIG. 3B, cache 471, 481 or memory 432, 434 of FIG. 4, or instruction cache 682 of FIG. 6) and a data cache (dCache) 1586 (which may be similar to data cache unit 374 of FIG. 3B, cache 471, 481 or memory 432, 434 of FIG. 4, or data cache 684 of FIG. 6). Instruction cache 1580 can be coupled to or include control circuitry 1582 to store encrypted code and to allow the decryption of the encrypted code with a different code key programmed in the control circuitry for each process. Data cache 684 can also be coupled to or include control circuitry 1588 to store encrypted data and to allow the decryption of the encrypted data with a different data key programmed in the control circuitry for each process. Control circuitries 1582 and 1588 may be combined or separate and may be similar to IMC 472, 482. Some embodiments may use a shared code and data cache with tags or other context identifiers to distinguish the code and data keys used for individual cachelines.

The iCache 1580 can be configured to program a code key in its logic (e.g., control circuitry 1582) and, as each cache line of instructions from an encrypted code image is loaded into iCache 1580 from memory during execution, the cache line can be decrypted using the programmed code key and a tweak, which may include at least a portion of the linear address of the instruction and potentially other metadata). Similarly, the dCache 1586 can be configured to program a data key in its logic (e.g., control circuitry 1588) and, as encrypted data is loaded into dCache 1586, the encrypted data can be decrypted using the programmed data key and a tweak, which may include at least a portion of the linear address of the data and potentially other metadata. These caches may be flushed by the processor on a process switch, process key switch, or otherwise use a tagging mechanism to discriminate between cachelines belonging to different processes and to be used exclusively with their associated process.

A host operating system 1522 running in multitenant platform 1510 may be configured to manage the executions of multiple containers via a container runtime 1524, in coordination with security engine 1530 and key management hardware 1532. Host operating system 1522 may be a host operating system in a non-virtualized environment. In other embodiments, multitenant platform 1510 may be implemented as a virtualized environment and host operating system 1522 may be a guest operating system for one or more virtual machines. In this scenario, a virtual machine manager may also be implemented on hardware (e.g., processor 1520).

In the example of FIG. 15, multitenant platform 1510 is hosting two workloads that include first container process 1540 and second container process 1550. First container process 1540 includes an application 1542 and three library files that include library A 1544, library B 1546, and library C 1548. Second container process 1550 includes an application 1552 and library A 1544. Library A 1544 is a shared library and only one copy of the library may be stored in memory, but both applications 1542 and 1552 in each container may securely call the shared library A 1544 using cryptographic computing based container security as disclosed herein.

An example general flow of cryptographic computing based container security is illustrated in FIG. 15 for the multitenant system 1500. In this example general flow, at 1501, tenant (or user) 1570 can publish a code image on image registry 1560, such as code image 1562. The code image 1562 may be code to launch and run as a container process on a node. The code that is published in image registry 1560 may be encrypted and signed, partially encrypted and signed, or encrypted (including one or more inputs) and signed. In other embodiments, signing may be not used. In one or more embodiments, code image 1562 may be encrypted and signed. In other embodiments, the code may be in plaintext and signed. In at least one embodiment, the signature applied to the published code may be a digitally signed certificate that is of a particular variant of the application (or library) with a specified version. Metadata fields that may be included in the certificate can include at least one of a identifier of the supplier of the published code (e.g., unique, fully-qualified domain name), an application or library name, a version of the application or library, a hash of binary code and constant data associated with the published code, a hash of initial values for writable data associated with the published code.

Once the code image is published, at 1502, a request/command may be sent to a cloud services provider to launch a container, for example, to run code image 1562. The provider can assign the workload to a worker node, such as multitenant platform 1510, which may be a trusted platform of the provider. At 1502, security engine 1530 can attest to tenant 1570 that it is trustworthy, as previously described. Once tenant 1570 is satisfied by the attestation of the platform 1510, at 1503, security engine 1530 can pull or receive, code image 1562 from image registry 1560, measure the code image, and decrypt it if it is encrypted, and then encrypt it with a per-process code key. If the image is already encrypted with a tenant key when pulled from image registry 1560, then security engine 1530 can perform a secure key exchange to obtain the key from tenant 1570, decrypt the code image, then re-encrypt it with the code key. In some implementations, the tenant-provided key may be used for the re-encryption of the code image.

Before encrypting code image 1562, processor 1520 can use security engine 1530 to inject an image attestation key into code image 1562, or other secret(s), for subsequent image attestation by tenant 1570, for example, to establish a secure channel to a container process (e.g., first container process 1540) instantiated from the cryptographically secured code image. Additionally, security engine 1530 can periodically insert no-operation ("NOP" or "no-op") instructions in the code image at some block granularity and the processor verifies their presence upon decryption. These no-ops can serve as low entropy instructions within the code that do not actually execute, but as the code image is decrypted at runtime, processor 1520 can detect if the no-ops exist at some block boundary and be assured (e.g., by implicit integrity) that if the NOPs are present upon decryption the code has not been modified. If the code was modified in any way (e.g., physical adversary or unintentional modification), then the no-ops will not decrypt correctly as they will decrypt to garbage, and this can be inferred as tampering of the code and an appropriate action (e.g., exception raised) can be taken. Other embodiments may inject MACs into the image or setup MAC tables used by the processor to verify image integrity upon decryption. Security engine 1530 can also generate a hash of the image, which along with the image attestation key is sent to the tenant.

At 1504, security engine 1530 requests that process keys (for code and data) be established for a first container process 1540 to be instantiated based on the code image. Key management hardware 1532 can be configured to generate process keys (data and code) per container, and can provide the process keys to security engine 1530 at 1505. Although key management hardware 1532 is illustrated as a separate entity from security engine 1530 in FIG. 15, in some implementations, key management hardware 1532 and security engine 1530 may be combined as one logical and physical entity. The process keys for a container process can include a code key for encrypting and decrypting the code image binary corresponding to the container process, and a data key that is separate for in-memory and at-rest data associated with the container process.

In an embodiment related to diffusion, which is further described herein, security engine 1530 may generate tenant (or container) keys for cryptographic caches (e.g., L1 data cache, L1 instruction cache, L2 cache, or L3 cache, etc.) for diffusion using a tweakable block cipher. Security engine 1530 can wrap the keys with the processor/hardware key and an integrity indication, such as a hash, to ensure that any modification or tampering with the keys can be detected. These tenant keys for the cryptographic cache for diffusion can be sent to the operating system or can be directly programmed into the processor using separate instructions from the instruction set architecture.

In one or more embodiments, the process keys may be symmetric, in which code (or data) can be encrypted and then decrypted using the same key. Any suitable type of symmetric algorithm may be implemented including, but not limited to, the various examples previously described herein, such as block ciphers and possibly other types of encryption. In other examples an asymmetric key pair may be used. In this example, the instruction cache and data cache may set both the encryption and decryption keys for a process to enable decryption of data and code and subsequent encryption of data and code once it is no longer needed. Alternatively, additional communication may be implemented to retrieve the correct key of the key pair as needed. Any suitable type of asymmetric algorithm may be implemented including, but not limited to, Rivest-Shamir-Adleman (RSA) or Diffie-Hellman.

Any suitable technique for generating the process keys may be implemented. In one example, tenant 1570 may provide its own process key(s) and send as a wrapped key to multitenant platform 1510. In this scenario, security engine 1530 and tenant 1570 may communicate to share a decryption key to enable security engine 1530 to decrypt the wrapped tenant key(s), which could then be used as the process keys and re-encrypted as needed.

In another example, the process keys may be derived from a root (or master) key and wrapped (i.e., encrypted) before being passed to the operating system. In this key wrapping mechanism, each key (e.g., code key and data key) may be encrypted using a key that is stored and/or generated from hardware that processor 1520 (and security engine 1530) can access but that software components may not access. This hardware (or processor) key is kept hidden from software, including privileged software such as the operating system 1522 or a virtual machine manager in a virtualized environment. By way of example, the hardware key may be stored in fuses, stored in ROM, or generated by a physically unclonable function that produces a consistent set of randomized bits. The data key and the code key may be wrapped separately with the hardware key. A key wrapping mechanism may be used for tenant-supplied process keys as well.

In another example, the process keys may use derived keys. In this example, unique key identifiers (rather than code and data keys) may be generated per container process for code and data. A key identifier may be some number that is unique, for example, a monatomic counter value that increases whenever a new on is assigned. To obtain a code key (or data key) from the unique key identifier, the unique key identifier, along with some constant value (e.g., salt), may be encrypted with the hardware key (e.g., processor key). Other key derivation methods may also be used such as hashing (e.g. SHA3) the unique identifier with a secret key to produce value that may be used as a derived key. Thus, the unique key identifier may be passed through privileged software because the privileged software will be unable to derive the actual code or data key for the container process. Embodiments may provide migratable hardware keys per virtual machine to enable migration of virtual machines across different hardware platforms, allowing the correct derivation of keys for migrated images.

It should be noted that unique key identifiers (to derive code or data keys) and encrypted code or data keys are essentially "substitute keys" that conceal the actual code or data key it represents. Accordingly, a substitute key may be shared with privileged (or other) software such as an operating system, because the actual code or data key is not ascertainable by the privileged (or other) software. To obtain the actual value of a code key (or data key) from a substitute key, an appropriate cryptographic function can use a hardware key (e.g., processor key) to obtain or generate the actual code (or data) key represented by the substitute key. The type of cryptographic function that is used, however, is different depending on whether the substitute key is a unique key identifier or an encrypted key. If the substitute key is a unique key identifier, then the cryptographic function to be applied may be an encryption algorithm, but if the substitute key is an encrypted key, then the cryptographic function to be applied may be an decryption algorithm. For example, if the substitute key is an encrypted key, then the processor can decrypt the encrypted key using a hardware key to obtain or generate the code or data key that can be used for encryption/decryption of code or data. If the substitute key is a unique key identifier, then processor can encrypt the unique key identifier (and optionally some constant value) using a hardware key to obtain or generate the code or data key that can be used for encryption/decryption of code or data. It should be noted that all of the embodiments described herein (e.g., FIGS. 11-28B) are described with reference to embodiments in which the keys (e.g., code key, data key, library key, interrupt key, migration key) are generated by key management hardware and then encrypted with a hardware key before being passed to the first and/or second container processes. In other embodiments, however, the key (e.g., code key, data key, library key, interrupt key, migration key) could be derived, as previously explained herein. In this other embodiment, a unique key identifier is generated and the actual shared substitute key can be derived by using the hardware key to encrypt the unique key identifier, possibly along with some constant data. Thus, a substitute key embodied as a unique key identifier, rather than a substitute key embodied as an encrypted key, would be passed to the appropriate container process(es) depending on the particular functionality being described.

Wrapped keys and unique key identifiers are two possible techniques that may be used in one or more embodiments disclosed herein. Generally, any technique may be used that enables the actual value of cryptographic code and data keys for encrypting/decrypting code and data, respectively, to be concealed from the operating system 1522, while giving the operating system enough information to enable it to manage execution of the code. In particular role of deciding when and to which process hardware access is to be provided. As used herein, the information passed to the operating system when using the wrapped process keys technique (e.g., encrypted code keys and encrypted data keys) or using the unique process key identifier technique (e.g., unique code key identifier and unique data key identifier) may also be referred to herein as "substitute code keys" and "substitute data keys", which are essentially substitutes for the actual code and data keys needed to encrypt and decrypt code and data of a process.

Security engine 1530 can encrypt the retrieved code image 1562 using the code key and at least a portion of the linear address allocated for the code image as a tweak. Security engine 1530 can also encrypt the image hash using the code key. For regular code keys and data keys (i.e., not derived keys), security engine 1530 can encrypt the code and/or data keys using a hardware key. The hardware key may be accessible to processor 1520, but not to software. Security engine 1530 can send the encrypted image hash, the encrypted code key, and the encrypted data key to host operating system 1522. In addition, security engine 1530 may generate tenant keys for crypto cache for diffusion, and wrap these keys with a CPU key (and an integrity to ensure they are not tampered with, and either send to host operating system 1522 or directly program these into the processor 1520 using a separate ISA instruction(s).

It should be noted that, in an implementation that uses derived keys, the unique code key identifier, along with some constant value, can be encrypted with the hardware key to produce a derived code key. Security engine 1530 can encrypt code image 1562 using the derived code key and at least a portion of the linear address allocated for the code image as a tweak. Security engine 1530 can also encrypt the image hash using the derived code key. Security engine 1530 may not encrypt the derived code key but instead, sends the encrypted image hash, the unique code key identifier, and the unique data key identifier to host operating system 1522.

The operating system 1522 may perform its normal functions in scheduling the execution of the code image. Because the operating system 1522 does not know how to decrypt the encrypted code key (or derive the code key from the unique code key identifier), the operating system is prevented from decrypting the code image and potentially manipulating the code. In one or more embodiments, once the operating system 1522 is ready to instantiate first container process 1540 by executing the encrypted code image, the operating system may execute a new instruction to pass the encrypted process keys (or unique process key identifiers) to instruction cache (icache) 1580. The iCache 1580 can verify that the encrypted code key (or unique code key identifier) is bound to the encrypted code image.

If the verification is successful, the encrypted code image can be decrypted and executed by the iCache 1580. It should be noted that, if regular code and data keys are used, then before the encrypted code image is decrypted and executed, processor can flush the instruction and data caches 1580 and 1586, set up the code and data keys for the instruction and data caches, respectively, program the control circuits 1582 and 1588 in the caches with the appropriate keys, load the code and data keys in registers, and then execute the code image, instantiated as first container process 1540, for example. In an implementation using derived process keys, the instruction and data caches may not need to be flushed because the unique code key identifier may be inserted as a tag on each cache line and therefore, the crypto caches will know which container process the cache line belongs to. In addition, the encryption circuit in the caches will derive the code (or data) key on the fly when it is ready to encrypt or decrypt some code or data. In both implementations, first container process 1540 can be instantiated without any privileged software or any other software being able to see the code image and potentially manipulate the code.

During execution, when the container is context switched out, the registers and other states, including the code and data keys can be wrapped using the processor key, together with some integrity information and saved to memory, Any suitable context switch methods may be used including, but not limited to, existing context switch instructions such as the XSAVE/XRESTORE instructions. Alternatively, this information may be stored in reserved memory, which is not accessible to untrusted software such as operating system and a virtual machine manager.

Also, inter-process communication may be established between first container process 1540 and second container process 1550 at 1507 in some scenarios. Additionally, data associated with first container process 1540 may be retrieved and/or stored in storage unit 1512.

Figure 16A:
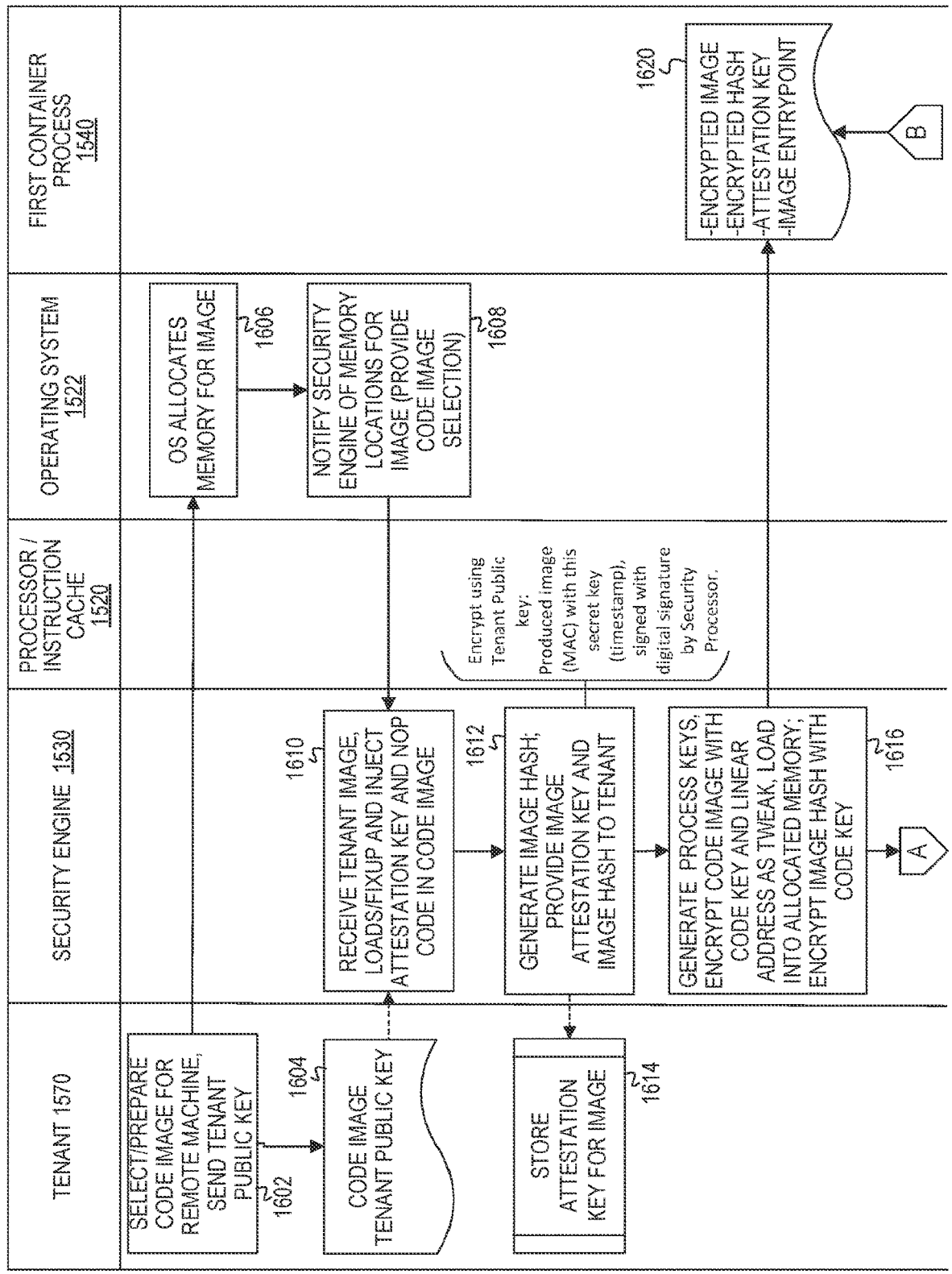
FIGS. 16A-16B is a flow diagram of an example initialization process according to an embodiment.
Figure 16B:
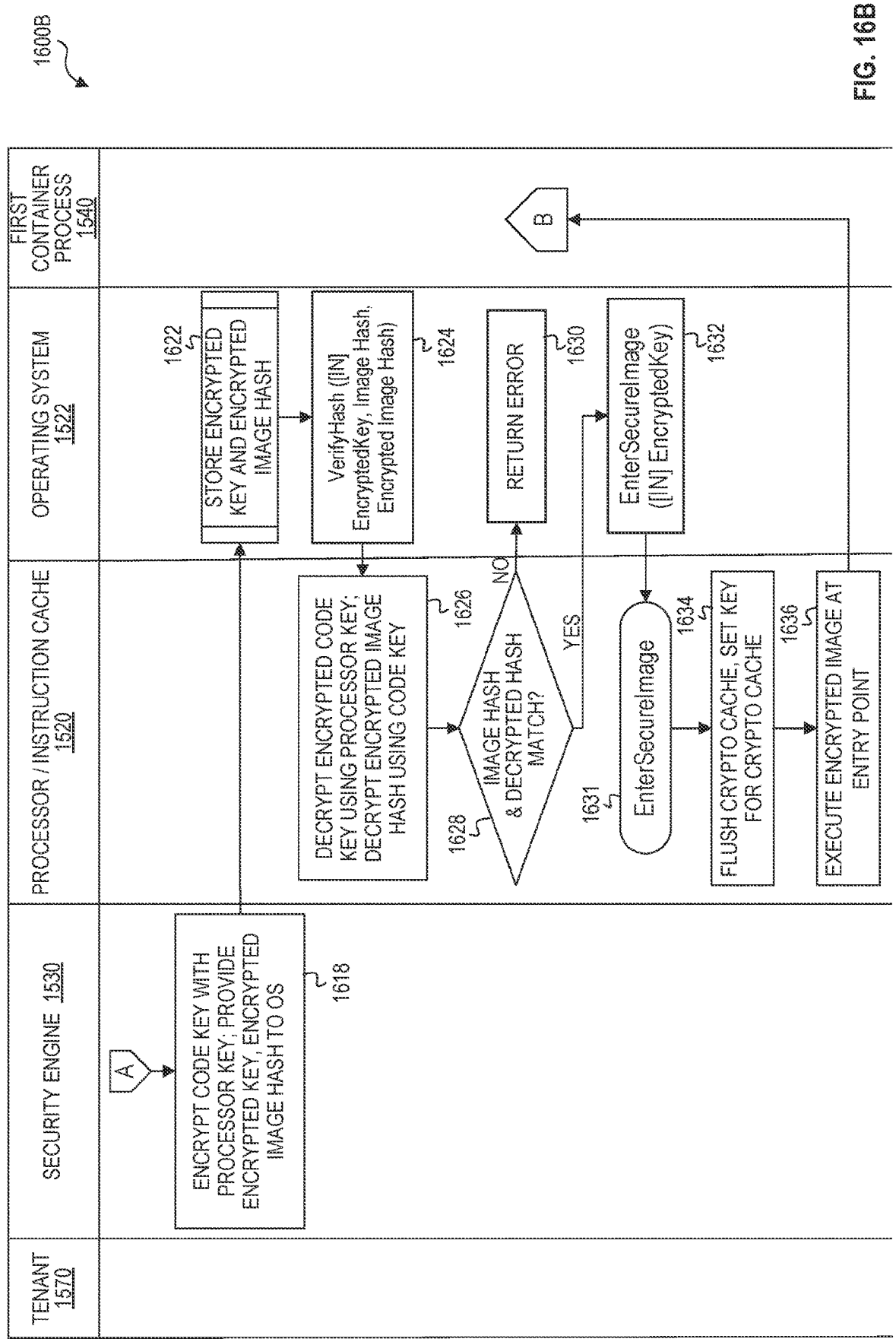

Turning to FIGS. 16A-16B, FIGS. 16A-16B illustrate an example flow diagram 1600A-1600B of operations associated with an initialization process for establishing process keys for container code in a multitenant system (e.g., 1500) according to an embodiment. One or more operations of flow diagram 1600A-1600B may be executed by hardware, firmware, and/or software of a multitenant system, such as multitenant system 1500. In this example, one or more operations may be performed by a tenant such as tenant 1570, a security engine such as security engine 1530, a processor such as processor 1520 including an instruction cache such as iCache 1580, an operating system such as host operating system 1522, and/or a container process such as first or second container process 1540 or 1550. Although specific operations and communications are illustrated in FIGS. 1600A-1600B with reference to particular entities of multitenant system 1500, this is done for illustration purposes and it should be understood that various other configurations of multitenant system 1500 are possible, based on particular implementations and needs, and that instructions and/or operations may be combined or separated, or performed by a different entity in some embodiments and implementations.

At 1602, the tenant may select and/or prepare a code image for a remote machine, such as multitenant platform 1510. A tenant public key may be sent to the remote machine and passed to the remote machine's operating system to request that a particular container associated with the tenant public key be executed. In addition, at 1604, the tenant may store the code image of the container to be executed, the tenant public key, and a timestamp.

At 1606, the operating system allocates memory for the code image to be executed. At 1608, the operating system can notify the security engine of memory locations that are allocated for the code image. In addition, the operating system can communicate to the security engine which code image was selected and requested for execution by the tenant.

At 1610, security engine 1530 can obtain the selected code image to be executed. For example, the security engine may obtain the code image from an image registry or from tenant at 1604. The security engine can load and fix-up the code image. In at least one embodiment, the security image can inject an attestation key into the code image for subsequent image attestation, for example, by the tenant to initiate the code image. In one example, the attestation key may be generated at the multitenant platform 1510. For example, an attestation key could be generated by security engine 1530, key management hardware 1532, or any other suitable component of multitenant platform 1510 and provided to security engine 1530. In addition, no-op instructions can be inserted in the code image at some block granularity so that at runtime processor 1520 can be assured by implicit integrity that the code image has not been modified if no-ops exist at the known block boundary. If the code image has been modified, then the no-op instructions will decrypt to garbage in iCache 1580.

At 1612, an image hash can be generated for the fixed up code image. In one example, any suitable one-way hash function may be used to generate the image hash including, but not necessarily limited to, Secure Hash Algorithm (e.g., SHA-3, SHA-2, etc.) or Message Digest (e.g., MD4, MD5).

Also at 1612, a message authentication code (MAC) may be generated for the code image using the attestation key. The MAC can also be generated using any suitable one-way hash function (e.g., SHA1-3, MD4-5, etc.). In one example, the attestation key and timestamp are used to generate MAC on the updated image. The attestation key is encrypted with tenant public key, and a digital signature is generated on the encrypted attestation key using the security engine's private key (e.g., processor key or other private key of security engine). At 1614, the MAC, the encrypted attestation key, and the signature by the security engine are sent to tenant 1570. This scheme is used to send attestation key and image MAC to the tenant and ensure that it binds to the security engine.

At 1616, security engine 1530 and/or key management hardware 1532 may generate process keys for code and data associated with the code image. The process keys can include a code key for encrypting and decrypting the code image and a data key for encrypting and decrypting data associated with the code image. At 1616, security engine 1530 can encrypt the fixed up code image with the code key and a tweak that may include at least a portion of the linear address of the allocated memory for the code image (e.g., a linear address of each cache line may be used to encrypt the code per cache line) and possibly additional metadata. In one example, execute permission metadata may be included in the tweak or provided as an additional tweak. This may be useful to ensure that the code image to be executed is validly executable (e.g., it is executable code rather than merely data). Because page table typically mark what code is executable, using an execute permissions tweak ensures that the page tables cannot be used maliciously or inadvertently to attempt to run some image that is not validly executable. Security engine 1530 can also use the code key to encrypt the image hash and generate an encrypted image hash. This can bind the image hash, which represents the plaintext code image, to the key (i.e., the code key) that was used to encrypt that code image in memory. The image hash may be calculated cache line-by-cache line as each subsequent cache line comprising the image is successively encrypted by the security image (e.g. security engine reads/loads the next line of the plaintext image from memory, updates a running secure hash with that line, and then encrypts the cache line tweaked with its address and writes/stores it back to memory, repeating for each line up to the image size).

Once the code image is encrypted with the code key and appropriate tweak, the encrypted image is loaded into the allocated memory to be executed as process 1540, as indicated at 1620. In addition, the encrypted image hash, the attestation key and an entrypoint into the code image is also loaded in memory to enable execution of the process. Before the stored encrypted code image is executed, however, control is passed back to the operating system to manage the timing and allocation of hardware resources for executing the stored encrypted code image.

With reference to FIG. 16B, at 1618, security engine 1530 can use a processor key to encrypt the code key that was used to encrypt the code image stored in memory and that was also used to encrypt the image hash of the unencrypted code image. Both the encrypted key and the encrypted image hash can be provided to the operating system 1522 as control is passed back to the operating system to initiate execution of the stored encrypted code image. At 1622, the operating system can store the encrypted key and the encrypted image hash (and possibly the image hash that has not been encrypted).

When the operating system 1522 is ready to initiate the container process 1540, at 1624, the operating system can execute an instruction, VerifyHash to verify whether the encrypted image hash has been modified. to verify the encrypted image hash received from security engine 1530. The VerifyHash instruction may pass the encrypted key, the image hash, and the encrypted image hash to processor 1520 for the verification. At 1626, processor 1520 can decrypt the encrypted code key with the processor key, and decrypt the encrypted image hash with the code key. At 1628, the image hash received as an operand from the operating system and the decrypted image hash can be compared. If they do not match, then an error may be returned to the operating system 1522 at 1630. Alternatively, the secure process or container 1540 may call the VerifyHash instruction to verify the contents of another process or a library image that it may want to execute.

If the verification is successful at 1628, then the operating system 1522 (or alternatively a container process 1540) may issue another instruction at 1632, such as EnterSecureImage. The encrypted key may be passed back to processor 1520. Alternatively, if the verification is successful at 1628, processor 1520 may save or cache the decrypted key generated at 1626 to avoid having to decrypt it again after the operating system instructs processor 1520 to run the code image at 1632.

When the instruction is issued, control passes to processor 1520 at 1631. At 1634, if the decrypted code key was not saved at 1626, then the encrypted key passed in the instruction at 1632 can be decrypted with the processor key. At 1634, processor 1520 can flush the instruction cache 1580 of any currently stored instructions and/or flush the data cache of any currently stored data. The logic (e.g., control circuitry 1582) of instruction cache 1580 can be set or programmed to use the code key to decrypt the encrypted image to obtain decrypted code (or instructions) that can be executed in the processor pipeline. In addition, data cache 1586 may also be flushed and its logic (e.g., control circuitry 1588) may also be set to use the data key associated with the process instantiated by executing the encrypted image (e.g., 1540). At 1636, instruction cache 1580 begins decrypting the encrypted image at the entrypoint saved to memory at 1620 and instantiates process 1540. Alternatively, the entrypoint for the code image may also be encrypted with the encrypted key and passed as part of the EnterSecureImage instruction allowing the choice of multiple entry points into the image (effectively becoming a secure jump JMP to address instruction).

Figure 17:
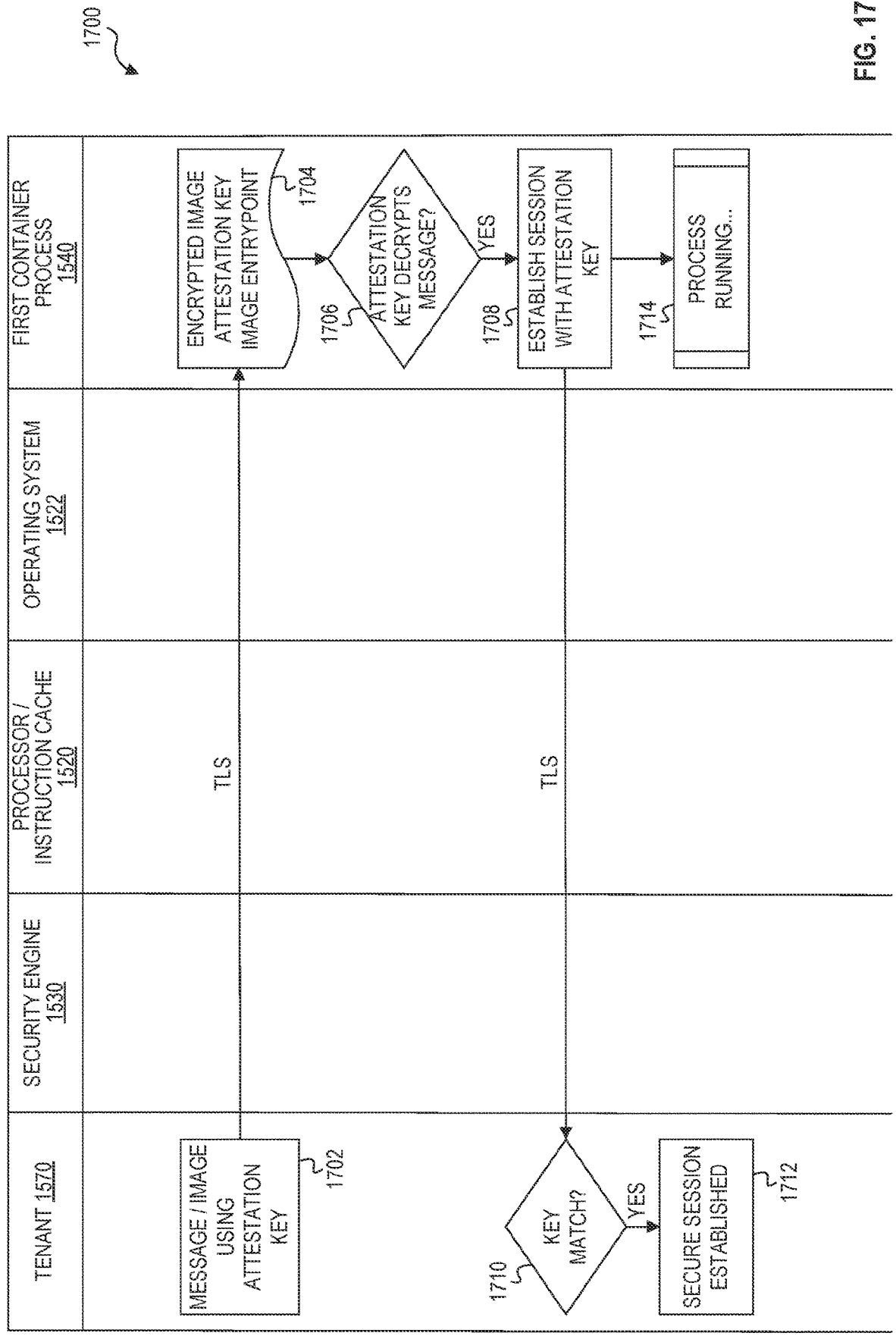
FIG. 17 is a flow diagram of an example bootstrapping process according to an embodiment.

FIG. 17 illustrates an example flow diagram 1700 of a bootstrapping process in which a tenant (e.g., 1570) can establish a secure channel with a node (e.g., multitenant platform 1510) to access a container process. Any suitable cryptographic protocols designed to provide communications security over a computer network may be used to establish a secure channel between tenant 1570 and the platform depending on particular needs an implementations. In one example, transport layer security (TLS), which is part of the Internet Protocol Suite, may be used. Any secure technique may be used to establish a TLS channel, including as credentials based on asymmetric (e.g., public/private) key pairs.

At 1702, tenant 1570 may communicate with first container process 1540 on the multitenant platform 1500 and send a code image or a message identifying the known code image (e.g., name, version, and/or any other information identifying a particular code image corresponding to the container process that the tenant wants to access. The attestation key may have been generated by security engine 1530 as described at 1612 and injected when the image was loaded by the security engine at 1620. The attestation key may also be sent to the multitenant platform. First container process 1540 may receive the message or code image from tenant 1570 via the TLS channel. At 1704, the encrypted code image, the attestation key (which was injected into the code image before it was encrypted), and the image entrypoint are obtained. At 1706, if the attestation key injected into the encrypted code image decrypts the message (or code image) from tenant 1570, then at 1708, the secure session can be established between the platform 1510 and tenant 1570. The attestation process 1536 may send the attestation key to tenant 1570. If the received attestation key matches the attestation key previously stored by tenant 1570 (e.g., see 1614), then a secure session is established at 1712 between tenant 1570 and the container process that is running the code image at 1714. As the process is running at 1714, the code image can execute securely as the code and data are cryptographically bound to linear addresses and the code key and data key, respectively.

In another embodiment, the attestation key could be a public key certificate signed by security engine 1530, where a private key remains secret to the encrypted image. The security engine's digital signature may be used to establish a TLS session with the secure process image's public key. The certificate may also include a hash of a dynamic linker and application binaries.

Figure 18A:
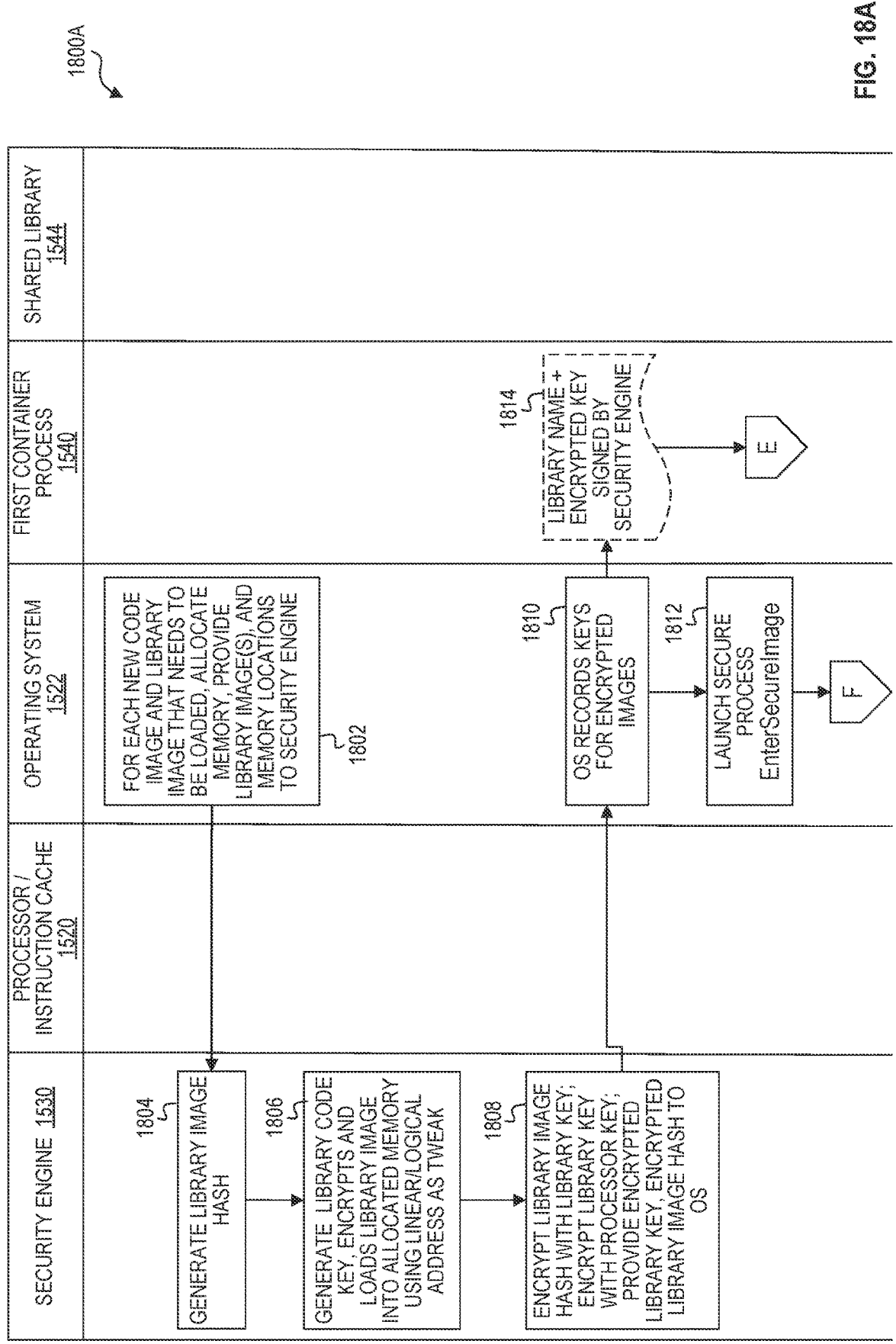
Figure 18B:
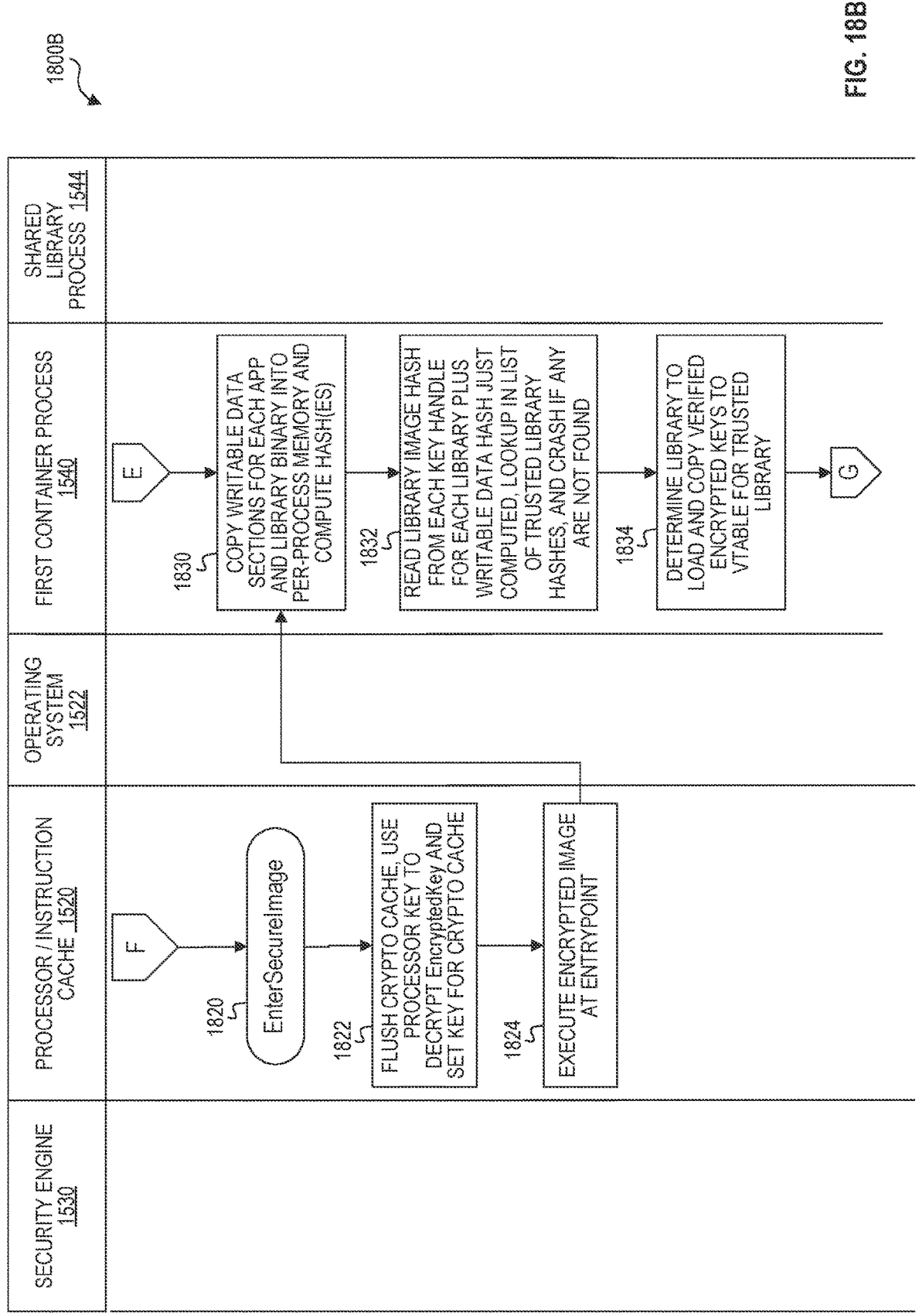

FIGS. 18A-18C illustrate example flow diagrams 1800A-1800C of initialization of shared libraries used by container processes and a container process calling a shared library according to an embodiment. One or more operations of flow diagrams 1800A-1800C may be executed by hardware, firmware, and/or software of a multitenant platform, such as multitenant platform 1510. In this example, one or more operations may be performed by a security engine (e.g., 1530), a processor (e.g., 1520) including an instruction cache such as iCache (e.g., 1580), an operating system (e.g., 1522), a container process (e.g., 1540), and a library process (e.g., 1544). Although specific operations and communications are illustrated in FIGS. 18A-18C with reference to particular entities of multitenant platform 1510, this is done for illustration purposes and it should be understood that various other configurations of multitenant platform 1510 are possible, and that instructions and/or operations may be combined or separated or performed by a different entity in some embodiments and implementations.

Generally, in this example flow, first container process 1540 invokes shared library 1544. The linear bindings of cryptographic computing, where code is bound to a linear address, can be leveraged so that security engine 1530 can create non-overlapping shared libraries in different linear regions that are shared by multiple processes. Alternatively, logical addresses may be used to create rebaseable images that are encrypted/decrypted relative to a specified base address allowing the image to be relocatable in linear memory. Accordingly, non-writable code and non-writable data of a shared library image can be loaded only once for multiple container processes (e.g., second container process 1545) to call. Each container process uses the same library key to decrypt the code of a particular shared library. Additionally, the library key that was used to encrypt a particular library code image is different than the code keys (also referred to as "container code keys" or process key) used to encrypt and decrypt the code of the container processes that call that particular library. For example, a container code key used to encrypt and decrypt a particular container code image that invokes a shared library is distinct from a library key that is used to encrypt and decrypt that particular library code image. However, the process key used to encrypt and decrypt data (the "data key") associated with a container process, is implicitly used by the invoked library code via the data cache (e.g., 1586) as this data key is not changed when the library code is invoked by the container process (and is changed via the EnterSecureImage instruction).

Flow diagram 1800A-1800C will now be described. It should be noted that the flow can be applied to multiple libraries that may be called by a container process, such as first container process 1540. For simplicity, however, flow diagram 1800A-1800C is usually described with reference to a single library. In addition, for simplification, the initialization of a container application or code image is not described as it has been previously described herein. It should be noted that the initialization of an application (or container) code image may be occurring concurrently with the initialization of the library images.

At 1802, for each new code image and library image that needs to be loaded into memory, operating system 1522 allocates memory. A library image that may be called by one or more container processes that would be instantiated upon execution of the new code images, is provided to security engine 1530. A library image may include library code and some constant data. At 1804, security engine 1530 can generate a hash for the library image. In one example, any suitable one-way hash function may be used to generate the library image hash including, but not necessarily limited to, Secure Hash Algorithm (e.g., SHA-3, SHA-2, etc.) or Message Digest (e.g., MD4, MD5), accumulating the hash value as the image is read line by line.

In some embodiments, the security engine may ensure that the library being used is the correct image by verifying the digital signature from the publisher (e.g., developer, company, etc.) of a library image. This may be particularly useful in scenarios when a patch update is made to a shared library and is signed by the publisher of the update. In this embodiment, a digital signature of the library image can also be provided to security engine 1530. At 1804, a determination is made as to whether the digital signature received from operating system 1522 matches digital signatures of the trusted publisher by security engine 1530 for the received library image. If the signature does not match, then an error may be returned.

At 1806, or concurrent with 1804, security engine 1530 and/or key management hardware 1532 may generate a library key for encrypting and decrypting code and the constant data associated with the library image. At 1806, security engine 1530 can encrypt the library image (e.g., library code and some constant data, if any) with the library key and a tweak that may include at least a portion of the linear address of the allocated memory for the library image (e.g., a linear address of each cache line may be used to encrypt the code per cache line) and possibly additional metadata. Alternatively, a rebaseable logical address may be used. Once the library image is encrypted with the library key and appropriate tweak, the encrypted library image is loaded into the allocated memory to be executed when invoked by a container process, such as container process 1540.

At 1808, security engine 1530 can use the library key to encrypt the library image hash and generate an encrypted library image hash. This can bind the library image hash, which represents the library image, to the key (i.e., the library key) that was used to encrypt that library image in memory. In addition, security engine 1530 can use a processor key to encrypt the library key that was used to encrypt the library image stored in memory and that was also used to encrypt the library image hash of the unencrypted library image. Both the encrypted library key and the encrypted library image hash can be provided to the operating system 1522 as control is passed back to the operating system to manage execution of a container code image that calls the shared library code image and loads the physical pages of the library into the linear address space of the container code process using page table mappings. In one or more embodiments, the encrypted library key and library image hash may be provided as a key handle, which may be generated by encrypting the encrypted library key and the library image hash together.

At 1810, the operating system 1522 can store the encrypted library key and the encrypted library image hash (and possibly the library image hash that has not been encrypted). As indicated at 1814, the library name and encrypted library key, which may be signed by the security engine, are provided to (or stored for) the container process (e.g., 1540) that calls the library.

It should be noted, that in addition to performing the encryption of the library image and library key, security engine 1530 also prepares a container code image as described with reference to 1610-1618 of FIGS. 16A-16B. If a container process that calls the shared library has already been instantiated, however, then security engine 1530 does not need to perform the encryption and hashing of the library image and library key. That is, when a container process invokes a function from a shared library that has already been loaded by other containers, then the library is already set up. In this scenario, a code key would already have been generated, and a library image would already have been encrypted and loaded the first time the library was needed by a process. Thus, the current container process just uses the library. Security engine, 1530 may still send the encrypted library key and encrypted library image to the operating system 1810.

Once the encrypted library keys have been stored by operating system 1522, the operating system 1522 may issue another instruction at 1812, such as EnterSecureImage to launch a secure container process, such as first container process 1540. An encrypted code key for the encrypted container image to be executed may be passed to processor 1520 in the EnterSecureImage instruction. Although not shown in FIG. 18A, a verification may be performed before launching container process 1540, as shown in 1624-1630 of FIG. 16B.

When the instruction is issued, control passes to processor 1520 at 1820. At 1822, the encrypted container code key can be decrypted with the processor key. Also, processor 1520 can flush instruction cache 1580 of any currently stored instructions. The logic (e.g., control circuitry 1582) of instruction cache 1580 can be set or programmed to use the container code key to decrypt the encrypted container code image to obtain decrypted container code (or instructions) that can be executed in the processor pipeline. In addition, data cache 1586 may also be flushed and its logic (e.g., control circuitry 1588) may also be set to use the data key associated with the process instantiated by executing the encrypted container code image. At 1824, instruction cache 1580 begins decrypting the encrypted container code image at its entrypoint and instantiates first container process 1540.

At 1830, the writable region of the library is copied into the address space of container process that may call the library. Libraries and applications may include certain data sections (e.g., variables) and possibly other sections in their binaries that are that can be updated throughout the execution of the library or application. Accordingly, these writable sections are not shared by different container processes, but instead, are written into the address space of each container process that may call the library or application. Therefore, at 1830, first container process 1540 can copy writable data sections (and other sections that are writable, if any) of the library code image (e.g., the binary), into the address space of first container process 1540, and any other container processes that call the library. A hash can be computed over the per-process memory once the writable data section is copied.

At 1832, the library image may be verified. The library image hash from the key handle may be read, along with the corresponding writable data hash computed at 1830. If the key handle is encrypted, then it may be decrypted so that the library image hash can be read. A lookup may be performed in a trusted library hash list. If the library image hash or the writable data hash is not found, then the library code image is not run and an error may be returned or the program may be allowed to crash. The VerifyHash instruction 1624 may be used to verify the expected image hash corresponds to an encrypted library key where the library key was used to encrypt the hash for the library image.

Alternatively, the digital signatures of the publishers of the library images or applications may be used for the verification. If a digital signature of a library image (or application) matches the hash of the initial values of writable data sections, then the library image (or application) is verified. Otherwise, an error may be returned.

If the verification at 1832 is successful, then at 1834, process 1540 can identify which library code image is to be loaded and can copy verified encrypted library keys to a virtual table (vtable) for the identified library code image, which indicates that the identified library code image is trusted.

With reference to FIG. 18C, at 1840, the shared library may be called using a new instruction (e.g., KCall) that passes in the memory address (e.g., the linear address of the memory location of the encrypted library image and/or the logical base address of where the library is loaded) and the encrypted library key. When the instruction is issued, control passes to processor 1520 at 1842. At 1844, the encrypted library key passed in the instruction at 1840 can be decrypted with the processor key. In addition, a return address and the address of the caller's encrypted code key (e.g., address of encrypted code key for first container process 1540 or the encrypted code key itself may be stored on the call stack) can be pushed on stack memory. Also, the code key for the shared library can be stored in a register and the instruction pointer can jump to the supplied memory address for the loaded library code image.

At 1844, processor 1520 may flush the instruction cache 1580 of any currently stored instructions, although both code from the container process and shared library may co-exist in the instruction cache as they are differentiated by address. The logic (e.g., control circuitry 1582) of instruction cache 1580 can be set or programmed to use the library key to decrypt the encrypted library image to obtain decrypted library code (or instructions) that can be executed in the processor pipeline. The process key for the data that is programmed for data cache 1586 is not changed as the library code uses the same data key to encrypt and decrypt data that it access and/or manipulates when called by the process for which the data key was generated.

At 1846, instruction cache 1580 begins decrypting the encrypted library image. The instruction cache 1580 uses the library key that is programmed in its logic to decrypt the code in the library code image. The data cache 1586 uses the data key for the process to decrypt and encrypt data that is accessed and/or manipulated by the library code during its execution.

Once the shared library has finished executing, control may be returned to the caller (e.g., first container process 1540) using a new instruction (e.g., KRet). At 1850, the return address and the caller's encrypted key are obtained from stack. The logic (e.g., control circuitry 1582) of instruction cache 1580 can be set or programmed to use the code key for the process, which can be obtained by decrypting the caller's encrypted key using the processor key. The data key for the process, which is already programmed for data cache 1586, is not altered and data may continue to be decrypted and encrypted using the same data key while the process is running.

Figure 19:
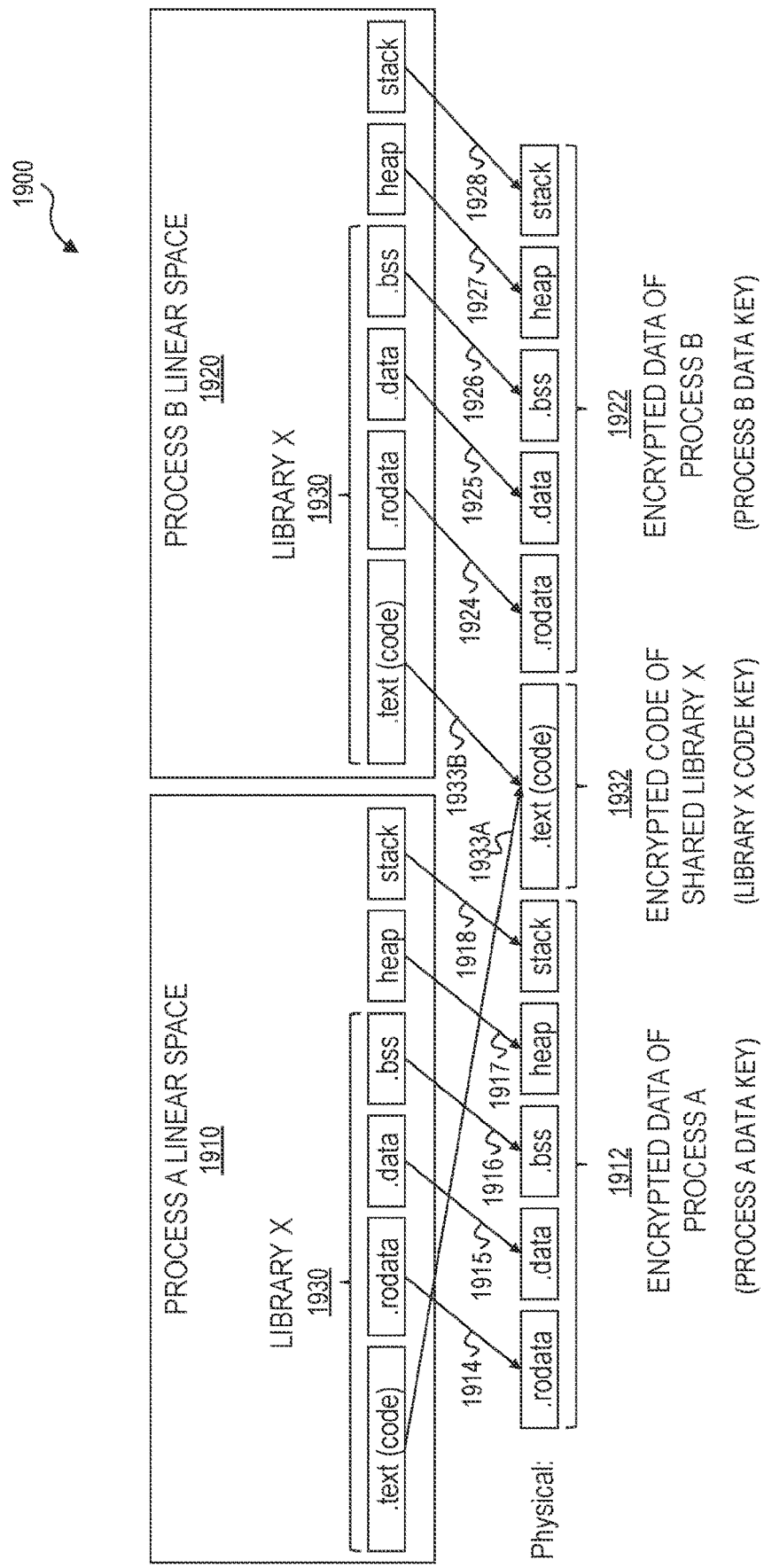
FIG. 19 is a block diagram of a possible memory layout for data and code for processes calling a shared library according to an embodiment.
Figure 20:
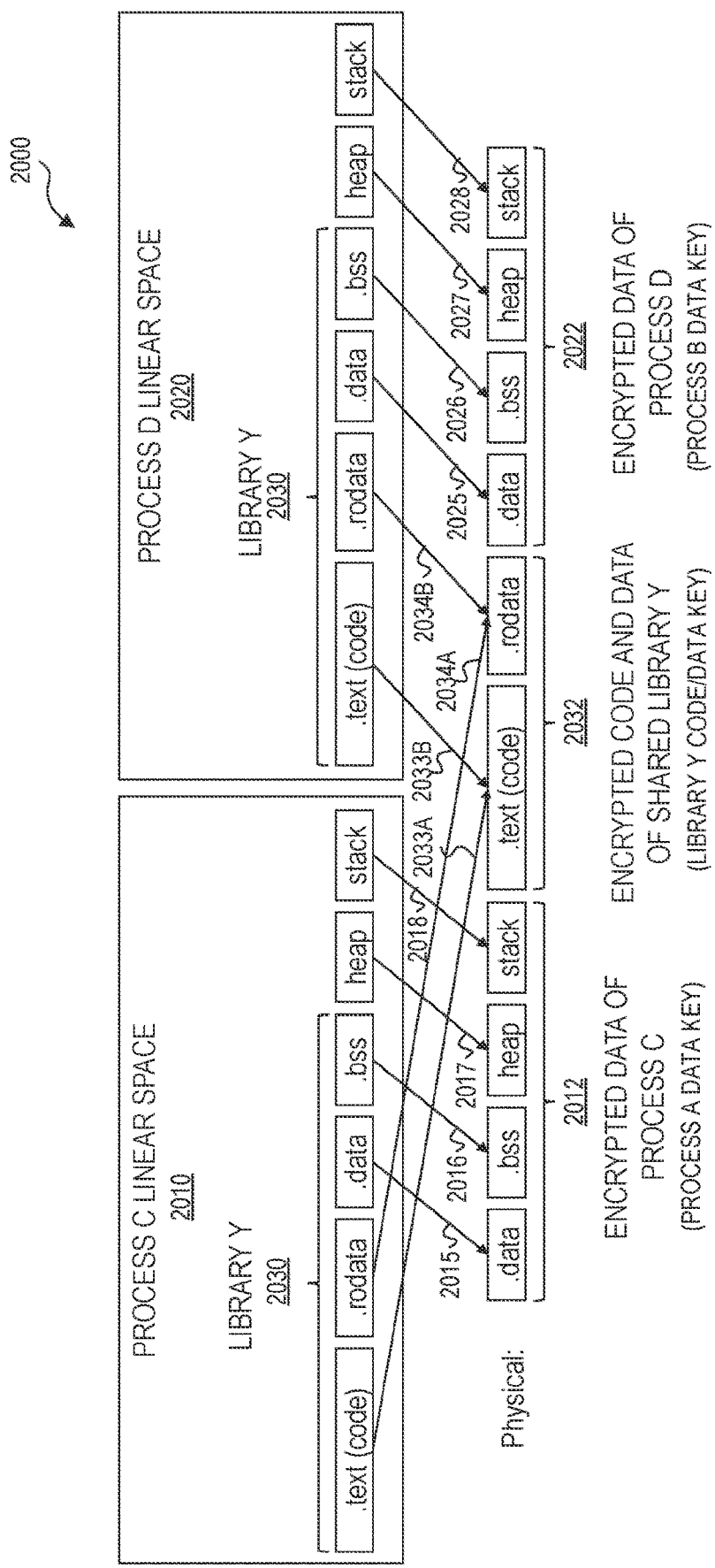
FIG. 20 is a block diagram of another possible memory layout for data and code for processes calling a shared library according to an embodiment.
Figure 21:
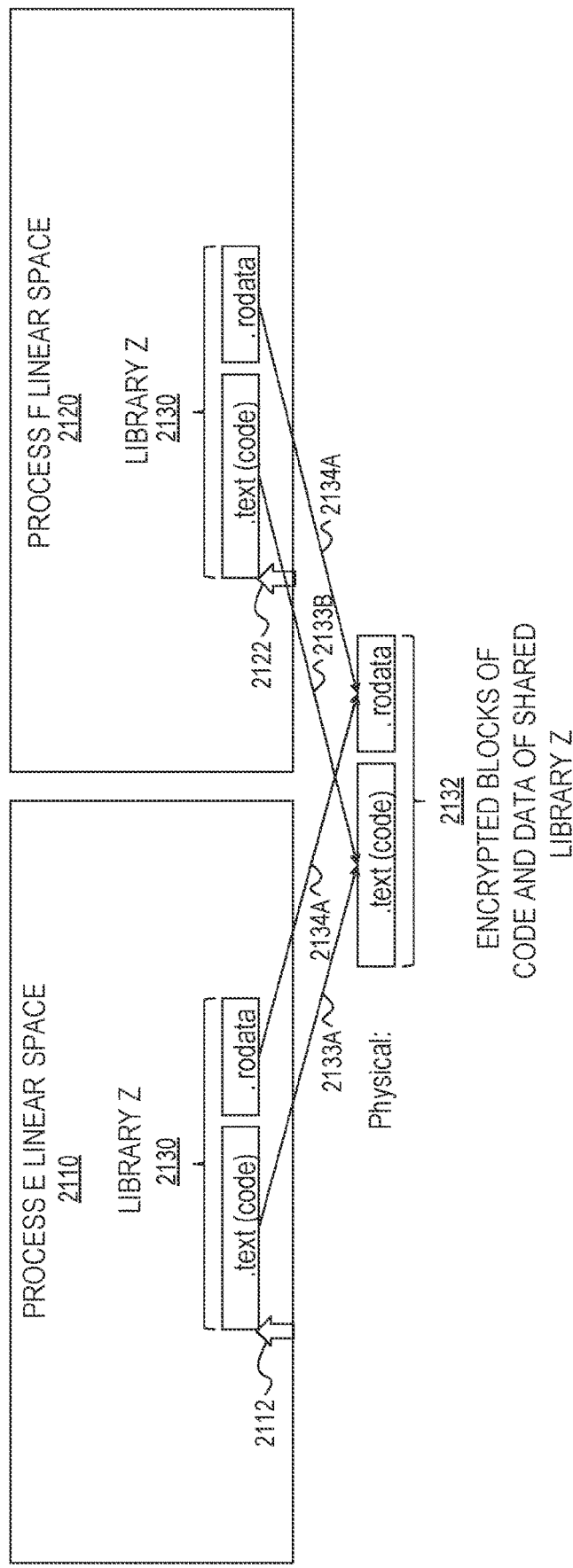
FIG. 21 is a block diagram of yet another possible memory layout for data and code for processes calling a shared library according to an embodiment.

FIGS. 19, 20, and 21 are block diagrams respectively, illustrating various possible memory layouts for data and code associated with two concurrent processes that call the same shared library. FIG. 19 is a block diagram of a possible memory layout 1900 for data and code in a scenario in which two container processes A and B call shared library X, and only library code is shared between the two processes A and B. Memory allocated for the two container processes includes a first linear space 1910 for process A and a second linear space 1920 for process B. Library X 1930 is called by both processes but only code of library X is shared (e.g., the data belonging to library X may not be shared). Code associated with library X is stored at the physical level as encrypted code 1932 and is encrypted and decrypted using a library code key that was generated (or derived) for library X.

In the example of FIG. 19, process A's encrypted data 1912 is not shared with process B and may only be mapped into process A linear space 1910, as indicated by .rodata 1914, .data 1915, .bss 1916, heap 1917, and stack 1918. Process B's encrypted data 1922 is not shared with process A and may only be mapped into process B linear space 1920, as indicated by .rodata 1924, .data 1925, .bss 1926, heap 1927, and stack 1928. In this example, however, the same copy of Library X's encrypted code 1932 may be shared by process A and process B as indicated by .text (code) 1933A and 1933B.

All data accesses use the current, per-process data key for encrypting and decrypting data as the data is stored and retrieved, respectively. For example, at the physical level, data associated with process A is stored as encrypted data 1912 and is encrypted using a data key generated (or derived) for process A. Data associated with process B is stored as encrypted data 1922 and is encrypted using a data key generated (or derived) for process B. In this example, constant data, denoted as ".rodata", contains read-only global allocations that are each initialized with values from the program binary, and uninitialized data, denoted as ".bss", contains global allocations zeroed out when the program starts. Also, it should be noted that each process also contains other code and data than what is illustrated in FIG. 19.

FIG. 20 is a block diagram of a possible memory layout 2000 for data and code in a scenario in which two container processes C and D call shared library Y. Library code and global variables are shared between the two processes C and D. Memory allocated for the two container processes includes a first linear space 2010 for process C and a second linear space 2020 for process D. Library Y 2030 is called by both processes and both the code and global variables associated with library Y are shared. Code and global variables associated with library Y are stored at the physical level as encrypted code and data 2032 and are encrypted and decrypted using a library code/data key that was generated (or derived) for library Y.

In the example of FIG. 20, process C's encrypted data 2012 is not shared with process D and may only be mapped into process C linear space 2010, as indicated by .data 2015, .bss 2016, heap 2017, and stack 2018. Process D's encrypted data 2022 is not shared with process C and may only be mapped into process D linear space 2020, as indicated by .data 2025, .bss 2026, heap 2027, and stack 2028. In this example, however, both code and data (i.e., global variables) of library Y are shared by process C and process D. The same copy of Library Y's encrypted code 2032 may be shared by process C and process D as indicated by .text (code) 2033A and 2033B, and the same copy of global variables may be shared by process C and process D as indicated by .rodata 2034A and 2034B.

In this example, data accesses to .rodata global allocations (e.g., those using an RIP- (instruction pointer register)

relative accesses with read-only permissions in page tables) automatically use the library-specific code/rodata key. An alternative way of indicating to the processor when the library-specific code/rodata key should be used for data accesses is by indicating the range of the .rodata section to the processor, e.g. in registers that are initialized from a range specification stored in the key handle for the library. When a pointer is generated to a constant global variable such that the compiler cannot ensure that a RIP-relative access is always performed to it, the compiler can move it, for example, to .data to support correct functioning. Although page permissions are under operating system control and could potentially cause the wrong key to be used in this case, they would still be unable to access and/or manipulate the data using this approach.

Other data accesses use the current, per-process data key for encrypting and decrypting data as the data is stored and retrieved, respectively. For example, at the physical level, data associated with process C is stored as encrypted data 2012 and is encrypted using a data key generated (or derived) for process C. Data associated with process D is stored as encrypted data 2022 and is encrypted using a data key generated (or derived) for process D.

FIG. 21 is a block diagram of a possible memory layout 2100 for a scenario in which two container processes E and F call shared library Z. Library code and global variables are shared between the two processes E and F. Thus, the same copy of Library Z's encrypted blocks of code 2132 may be shared by process E and process F as indicated by .text (code) 2133A and 2133B, and the same copy of global variables may be shared by process E and process F as indicated by .rodata 2134A and 2134B. Memory allocated for the two container processes includes a first linear space 2110 for process E and a second linear space 2120 for process F. Library Z 2130 is called by both processes and both the code and global variables associated with library Z are shared.

In this scenario, however, a position-independent cryptographic binding is used for library contents. Accordingly, code and global variables associated with library Z are stored at the physical level where encryption of each block of code and data is bound to a linear offset from the beginning of the library, rather than the absolute linear address. When process E calls library Z, library Z's base address 2112 in process E is stored in a new register (e.g., KLinBase register). Similarly, when process F calls library Z, library Z's base address 2122 in process F is stored in the new register (e.g., KLinBase register). The new instructions previously discussed herein (e.g., KCall and KRet) may be used to update the new register (e.g., KLinBase register).

Figure 22:
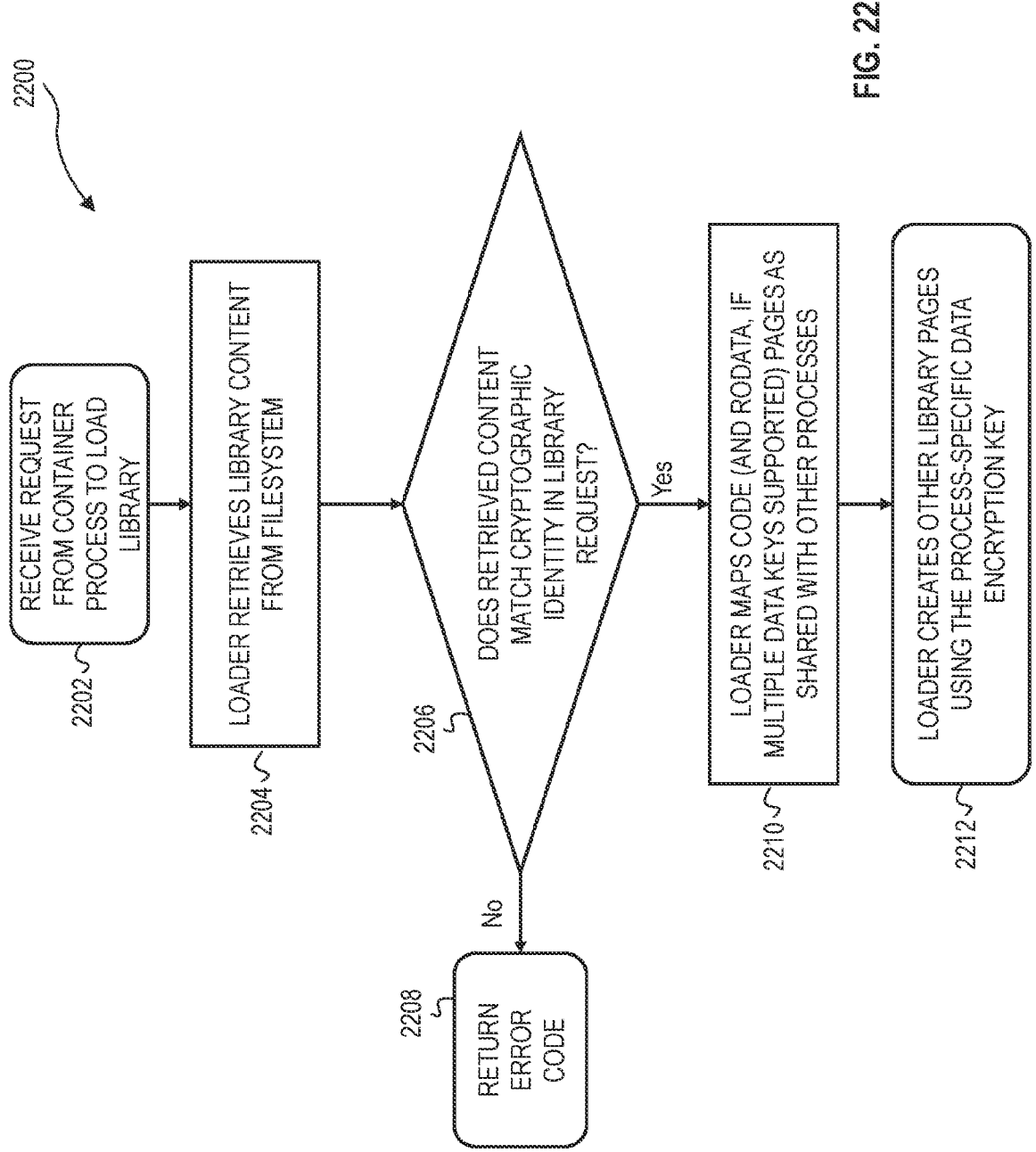
FIG. 22 is a flow diagram of an example process associated with loading a shared library code image for a calling container according to an embodiment.

FIG. 22 is an example flow diagram 2200 that illustrates an example process associated with loading a shared library code image for a calling container process according to an embodiment. One or more operations corresponding to flow diagram 2200 may be executed by hardware, firmware, and/or software of a multitenant system, such as multitenant system 1500. In this example, one or more operations may be performed by a secure loader, such as secure loader 1523 of security engine 1530 in multitenant platform 1510. In one example, the operations of flow diagram 2200 may be executed when a container process attempts to call a shared library in a multitenant system.

At 2202, the secure loader may receive a request from a container process (e.g., 1540) to load a shared library. The library load request can include a trusted cryptographic identity, such as a library image hash (e.g., 1804). At 2204, the secure loader retrieves the encrypted library code image from the filesystem, which can be stored in memory. At 2206, a determination is made as to whether the retrieved content (e.g., the encrypted library code image) matches the cryptographic identity (e.g., the library image hash) in the library request. In one example, the encrypted library key is decrypted by the processor key and the decrypted library key is used to decrypt the retrieved encrypted library code image. The cryptographic identity of the library can be verified based on the digital signature certificate of the library binary. The author of the binary can provide a digital signature certificate computed on metadata, such as supplier (e.g. unique, fully-qualified domain name), library name, version, hash of binary code and constant (i.e., read-only) data, hash of initial values for writable data, etc. The security engine may verify the digital signature associated with the library.

If the retrieved content does not match the cryptographic identity in the library request, then an appropriate error code can be returned at 2208 and the library image may not be loaded. If the retrieved content does not match the cryptographic identity in the library request, then at 2210, the secure loader can map the library code pages as shared with other processes. Constant data (e.g., rodata) if multiple data keys are supported. In addition, the secure loader creates other library pages using the process-specific data key.

Figure 23:
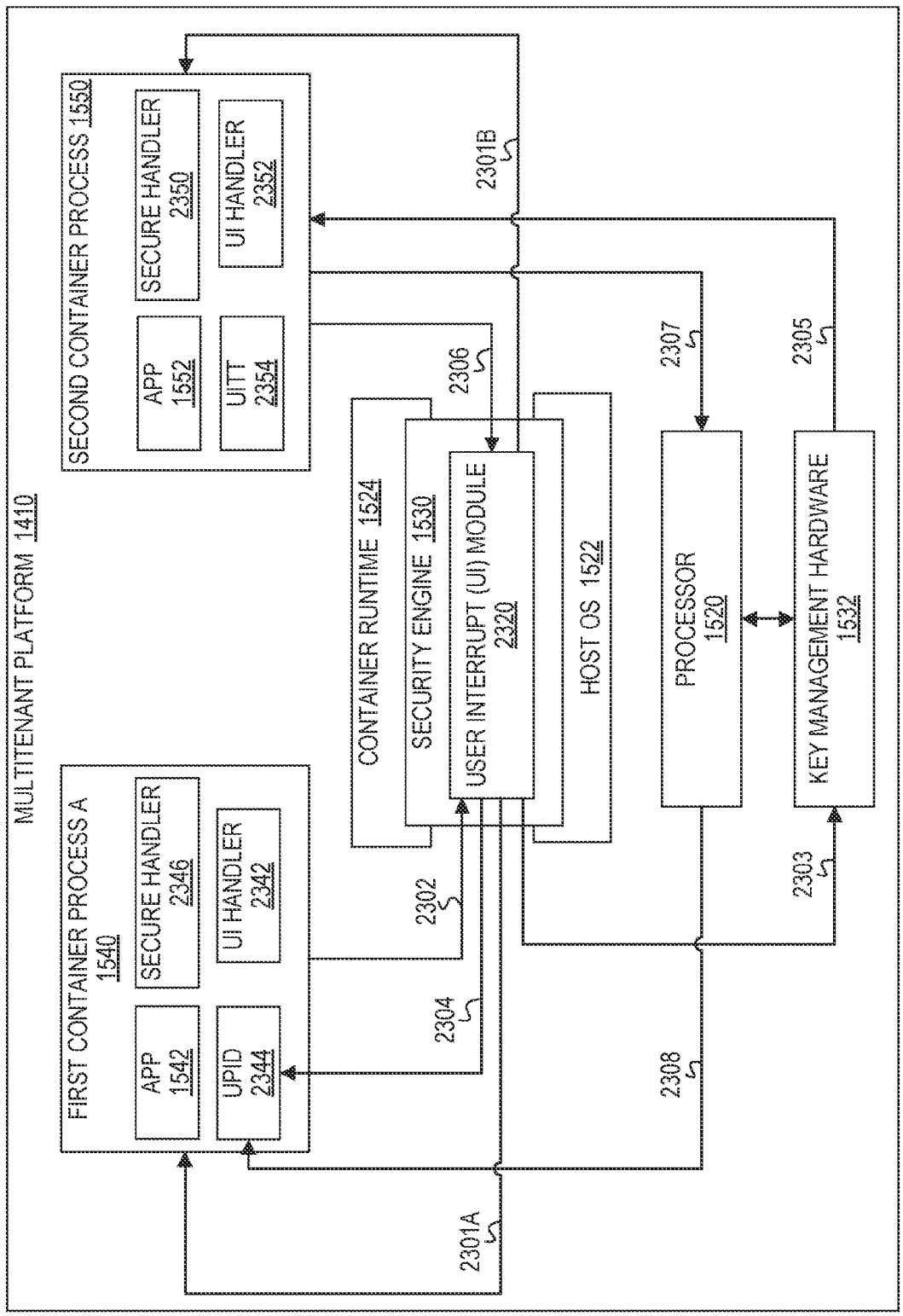
FIG. 23 is a block diagram of additional possible details of a multitenant platform of the multitenant system architecture of FIG. 15.

Turning to FIG. 23, a block diagram is illustrated with additional possible details of multitenant platform 1510 according to an embodiment. Multitenant platform 1510 includes a secure user interrupt capability. Multitenant platform 1510 illustrates first container process 1540 as running application 1542 and second container process 1550 running application 1552. For simplicity, libraries are not illustrated and the crypto caches 1580 and 1586 are not shown. However, a user interrupt module 2320 is shown as part of security engine 1530. In addition, first container process 1540 is shown as the called process (or receiver), and second container process 1550 is shown as the calling process (or sender). Accordingly, as the called process, first container process 1540 includes a user interrupt (UI) handler 2342 and a unique process identifier 2344. As the calling process, second container process 1550 includes a user interrupt (UI) handler 2352 and a user interrupt target table (UITT) 2354. In at least some embodiments, the code images of first container process 1540 and second container process 1550 may include secure handlers 2340 and 2350, respectively, for handling asynchronous interrupts as will be further described herein.

To ensure secure communication among containers, an embodiment of a user-interrupt capability allows delivery of interrupts directly to user space. It enables direct communication between two processes (e.g., first container process 1540 and second container process 1550). It also allows direct communication between a device and a process without requiring. These direct communications do not require intervention by an operating system, such as host operating system 1522. The operating system may provide some initial support to set up the user interrupts. In at least one embodiment, the user-interrupt capability may be initialized using a user interrupt module 2320, which may be configured as part of security engine 1530.

An example general flow of user interrupts in multitenant platform 1510 is illustrated in FIG. 23. In this example general flow, per process code and data keys (and library keys, if any) have already been established as previously described herein. When the first container is launched, at 2301A, a secure user interrupt channel is established between first container process 1540 and security engine 1530 for communication. Similarly, when the second container is launched, at 2301B, a secure user interrupt channel is established between second container process 1540 and security engine 1530 for communication. As first container process 1540 initiates an inter-process communication with second container process 1550, at 2302, the first container process submits an inter-process communication (IPC) interrupt registration request to register itself as an interrupt receiver. As part of registration, the interrupt receiver (e.g., 1540) programs a per-user-thread interrupt handler 2342 by storing the linear address of the UI handler code into a register (e.g., MSR). The interrupt handler 2342 handles interrupts whenever an interrupt is triggered by the sender.

Upon receiving the IPC interrupt registration request, at 2303, the secure processor requests key management hardware 1532 to generate a shared interrupt key to be used between the communicating containers processes (e.g., 1540 and 1550). Key management hardware 1532 sends the interrupt key (or a key handle for the interrupt key) to security engine 1530. The security engine encrypts the interrupt key with the hardware key to generate an encrypted interrupt key.

At 2304, security engine 1530 shares the encrypted interrupt key with the IPC interrupt receiver (e.g., first container process 1540). Security engine 1530 allocates and initializes a unique process interrupt descriptor (UPID) in memory for the interrupt receiver (e.g., first container process 1540). For example, the encrypted interrupt key may be stored in the UPID in bit locations that are currently reserved and/or ignored during user-interrupt notification processing. Security engine 1530 may also populate user-interrupt related registers, such as model specific registers (MSRs). In one example, the following MSRs may be populated: IA32_UINTR_HANDLER, IA32_UINTR_STACKADJUST, and IA32_UINTR_MISC, etc.

| Bit Positions | Name | Description |
| --- | --- | --- |
| 0 | Valid Bit | If this bit is set, there is a notification outstanding for one or more user interrupts in PIR. |
| 7:1 | Reserved | Must be 0 |
| 15:8 | User Vector (UV) | The user interrupt number, which may be in the range 0-63 aligned, so 15:4 must be 0. |
| 63:16 | Reserved | |
| 127:64 | UPIDADDR | Linear address of a UPID (64-byte aligned, so bits 69:64 must be 0. |

At 2305, the interrupt sender (e.g., second container process 1550) is notified of the interrupt registration. At 2306, the interrupt sender (e.g., second container process 1550) registers itself for the IPC interrupt with security engine 1530. To register the interrupt sender, security engine 1530 adds a new entry for the interrupt in a per-thread target table (UITT) 2354 of the sender. The UITT entry includes the linear address of receiver's UPID and a user vector of the IPC interrupt to be sent. In addition, the encrypted interrupt key may also be stored in the UITT entry. The security engine encrypts the UITT entry with the shared interrupt key (or potentially with the hardware key) and returns a UITT entry index, an interrupt identifier such as an interrupt number that distinguishes an interrupt the second process may initiate from other interrupts the second process initiates, information about the receiver process (e.g., first container process 1540), etc. to the sender via the initially set communication channel at 2301B. In one example implementation, a UITT entry in a UITT table may have a format and information that is the same or similar to the following:

| Bit Positions | Name | Description |
| --- | --- | --- |
| 0 | Valid Bit | If this bit is set, there is a notification outstanding for one or more user interrupts in PIR. |
| 7:1 | Reserved | Must be 0 |
| 15:8 | User Vector (UV) | The user interrupt number, which may be in the range 0-63 aligned, so 15:4 must be 0. |
| 63:16 | Reserved | |
| 127:64 | UPIDADDR | Linear address of a UPID (64-byte aligned, so bits 69:64 must be 0. |

At 2307, the sender can now generate an IPC interrupt request by using an interrupt instruction, such as SENDUIPI (UITT_INDEX). Processor 1520 can verify that the UITT entry is valid and can then located the receiver's UPID based on its linear address, which is stored in the UITT entry. Processor 1520 can then invoke the UI handler of the receiver and the receiver and the sender can begin inter-process communication. The shared interrupt key may be used for communications between the receiver and sender while the inter-process communication is established. For example, the shared interrupt key may be used to encrypt and decrypt messages or other data that is shared between the processes.

Figure 24:
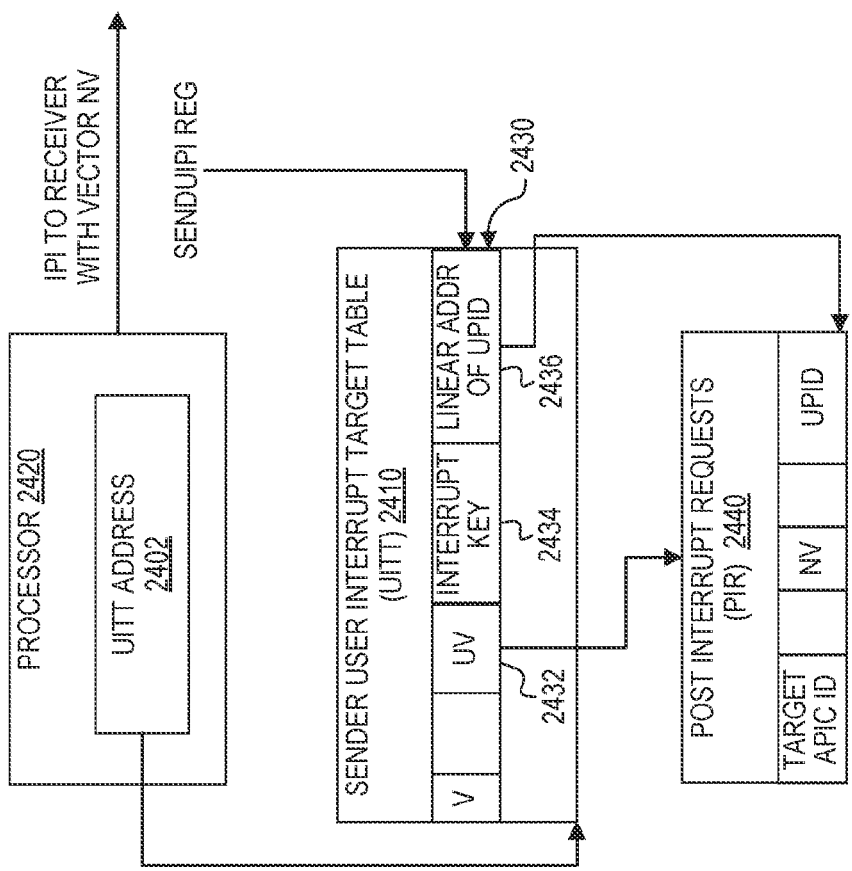
FIG. 24 is a block diagram of a selected portion of information that may be used during a user interrupt according to an embodiment.

FIG. 24 is a block diagram illustrating a selected portion of information used during a user interrupt. When an interrupt sender registers with a security engine in processor 2420, the processor can add an entry 2430 to a sender user interrupt target table (UITT) 2410 to provide information needed by the interrupt sender to successfully issue an interrupt to establish inter-process communication with a particular container process. The process can use a UITT address 2402 to store the UITT entry 2430 at the appropriate memory location. In addition to other information, the UITT entry 2430 can include the linear address of a user process interrupt descriptor (UPID) 2436 of the interrupt receiver, a shared interrupt key 2434 (or a key handle for the shared interrupt key) encrypted by a hardware key, and a user vector 2432. User vector 2432 can identify the sender and include a memory location of the sender's interrupt handler 2352. The receiver's UPID 2436 can be stored in post interrupt requests (PIR) 2440.

Figure 25:
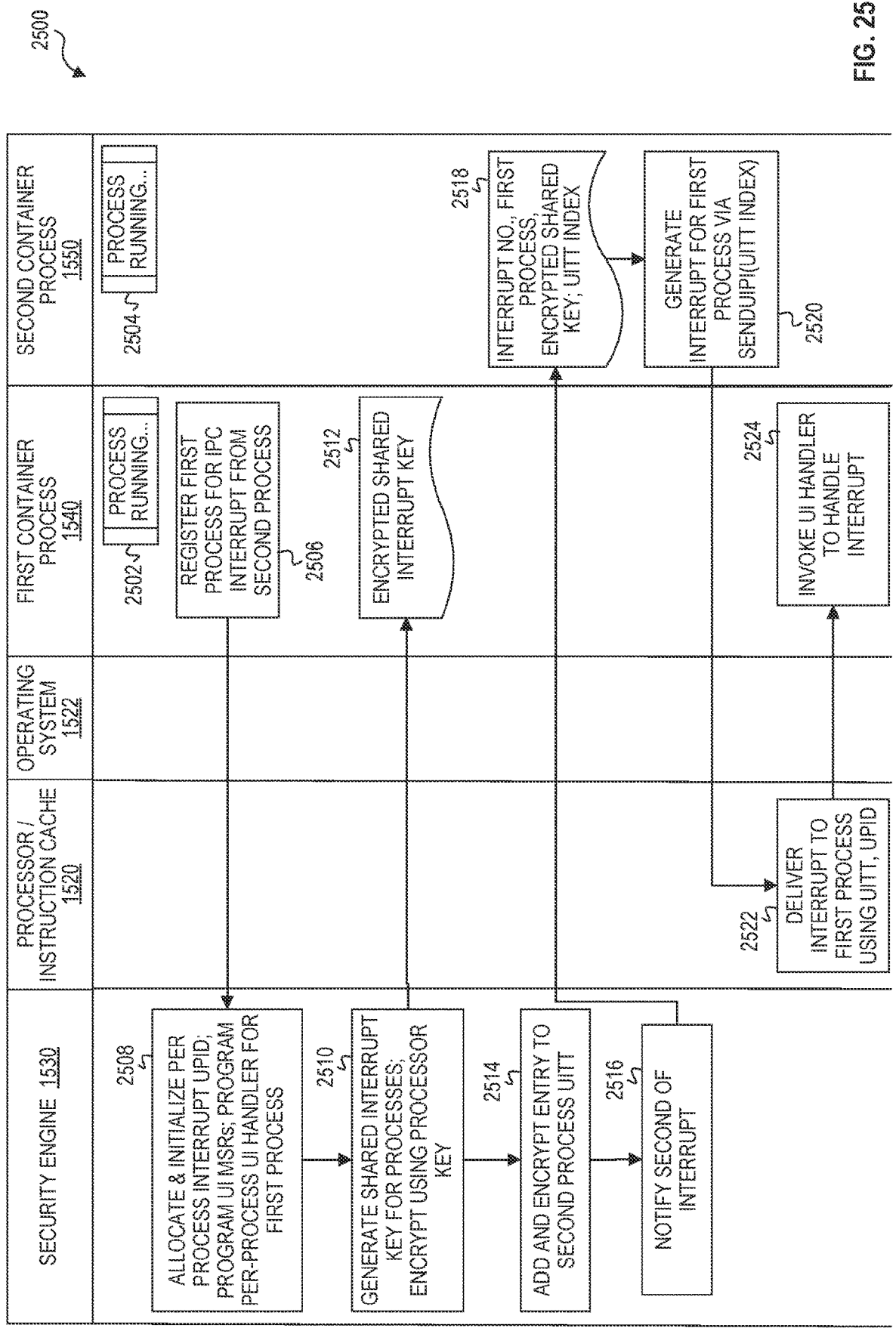
FIG. 25 illustrates a flow diagram of an inter-process communication between container processes according to an embodiment.

FIG. 25 illustrates a flow diagram 2500 of example operations associated with inter-process communication between container processes in a multitenancy environment according to an embodiment. One or more operations of flow diagram 2500 may be executed by hardware, firmware, and/or software of a multitenant platform, such as multitenant platform 1510. In this example, one or more operations may be performed by a security engine (e.g., 1530), a processor (e.g., 1520) including an instruction cache such as iCache (e.g., 1580), a first container process (e.g., 1540), and a second container process (e.g., 1550). Although specific operations and communications are illustrated in FIG. 25 with reference to particular entities of multitenant platform 1510, this is done for illustration purposes and it should be understood that various other configurations of multitenant platform 1510 are possible, and that instructions and/or operations may be combined or separated or performed by a different entity in some embodiments and implementations.

As indicated at 2502, first container process 1540 is running on multitenant platform 1510. Also, as indicated at 2504, second container process 1550 is running on multitenant platform 1510. Container processes 1540 and 1550 may be configured with per-process keys using cryptographic computing as previously described herein.

At 2506, first container process 1540 registers with processor 1520 as an interrupt receiver for an inter-process communication (IPC) interrupt from second container process 1550. This registration is handled via security engine 1530, as first container process 1540 sends a registration request to the security engine. At 2508, the security engine allocates and initializes a per process unique process interrupt descriptor (UPID) (e.g., 2344) in memory for first container process 1540. In addition, security engine 1530 can also program user-interrupt related registers (e.g., MSRs) and per-process user interrupt handler (e.g., 2342) for first container process 1540.

At 2510, security engine 1530 can generate a shared interrupt key for first and second container processes 1540 and 1550, for example, via key management hardware (e.g., 1532). Security engine 1530 can encrypt the interrupt key with the hardware key (e.g., processor key). At 2412, the encrypted shared interrupt key can be passed to first container process 1540.

It should be noted that FIG. 2500 describes an embodiment in which the shared interrupt key is generated by key management hardware and then encrypted with a hardware key before being passed to the first and second container processes. In other embodiments, the interrupt key could be derived, as previously explained herein. In this other embodiment, a unique key identifier is generated and the actual shared interrupt key can be derived by using the hardware key to encrypt the unique key identifier, possibly along with some constant data. Thus, the unique key identifier, rather than the encrypted interrupt key, would be passed to first and second container processes 1540 and 1550.

At 2514, the security engine can create an entry for a UITT of second container process 1550. The entry can contain a linear address of the first container process' UPID and the encrypted shared interrupt key (or a key handle for the encrypted shared interrupt key). The entry may also contain an interrupt number, which can be a number that identifies the particular interrupt. In one embodiment, the encrypted shared interrupt key can be stored at or near the beginning of the entry and the rest of the entry may be encrypted with the shared interrupt key (before it is encrypted). In another embodiment, the entire entry may be encrypted with the hardware key. Security engine 1530 may store the UITT entry in the UITT table for second container process 1550.

At 2516, security engine 1530 notifies second container process 1550 of the interrupt registration. The second container process can register itself as an interrupt sender for the IPC interrupt. At 2518, the security engine can return a UITT entry index, an interrupt number, and information about the first container process 1540 to second container process 1550 via a secure communication channel that was previously established.

At 2520, second container process 1550 can request, via an instruction, that an interrupt be invoked by the processor for first container process 1540. The instruction may include the UITT index as a parameter so that processor 1520 can find the UITT entry to determine which interrupt to invoke, which entity is the interrupt receiver, and which code is to be invoked (e.g., UI handler 2342). For example, the instruction may be SENDUIPI(UITT_INDEX). In response to the instruction, at 2522, processor 1520 can use the UITT index parameter to find the UITT entry in the sender's UITT (e.g., 2354). The processor can pull the linear address of the receiver's UPID from the UITT entry and use the linear address to read the receiver's UPID. The information in the UPID indicates which interrupt to invoke, which process is receiving the interrupt, and which code to execute. At 2524, first container process 1540 invokes its own UI handler (e.g., 2342) to handle the interrupt. Accordingly, the interrupt is accomplished securely without involving privileged software (e.g., operating system interrupt handler). Instead, the receiver container process executes its own UI handler. Additionally, if the first and second container processes share data, the data can be encrypted and decrypted using the shared interrupt key which is concealed from software other than the first and second container processes. The use of the shared interrupt key, which is encrypted by the hardware key (or is a unique key identifier that requires encryption by the hardware key to derive the interrupt key), prevents privileged software, such as host operating system 1522, from accessing the shared data or understanding the shared data if it is accessed.

Figure 26:
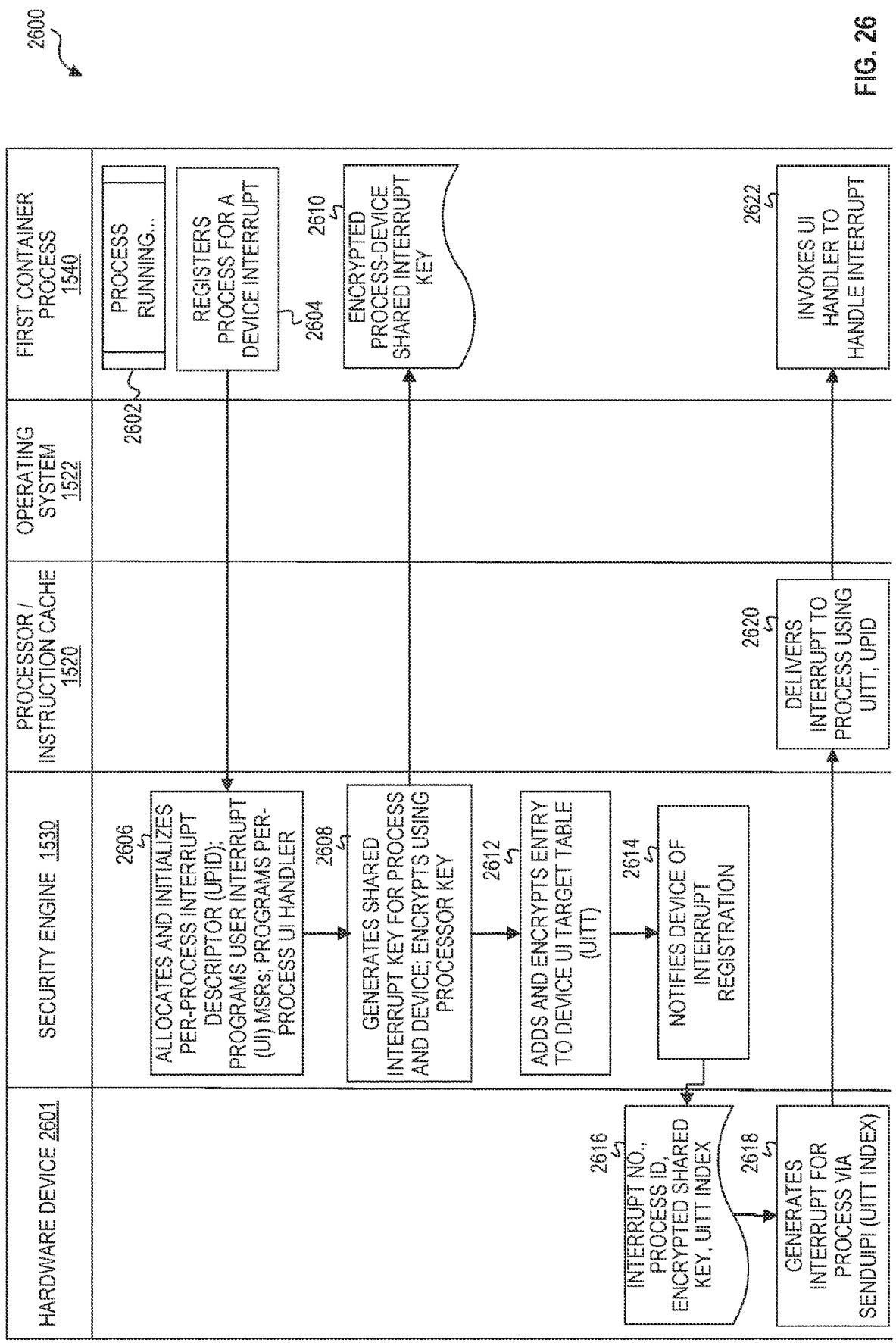
FIG. 26 is a flow diagram of an example asynchronous event/interrupt handling, according to an embodiment.

FIG. 26 illustrates an example flow diagram 2600 of operations associated with asynchronous event/interrupt handling in a multitenancy environment according to an embodiment. A hardware device 2601 and various entities of a multitenant platform (e.g., 1510) may communicate and perform operations to enable first container process 1540 to handle events/interrupts from hardware device 2601 without exposing code and data to privileged software. One or more operations of flow diagram 2600 may be executed by hardware, firmware, and/or software of a multitenant platform, such as multitenant platform 1510. In this example, one or more operations may be performed by a hardware device (e.g., 2601), a security engine (e.g., 1530), a processor (e.g., 1520) including an instruction cache such as iCache (e.g., 1580), and a container process (e.g., 1540). Although specific operations and communications are illustrated in FIG. 26 with reference to particular entities of multitenant platform 1510, this is done for illustration purposes and it should be understood that various other configurations of multitenant platform 1510 are possible, and that instructions and/or operations may be combined or separated or performed by a different entity in some embodiments and implementations.

Generally, an asynchronous interrupt can be an event that corresponds to an electrical signal generated by a hardware device and detected by a processor, where the sequence of instructions executed by the processor may be altered in response. When a container is executing, asynchronous events may occur including timer interrupts, which can cause a context switch, device input/output (I/O) for the container, etc. A user-interrupt process can be configured to protect data and code from other software, including privileged software, in a multitenant environment. The usage may include, but is not necessarily limited to, general-purpose timer and device I/O interrupts (assuming the device can generate user-interrupts), or event-driven dispatch for I/O stacks (e.g., user-space networking and transports).

As indicated at 2602, first container process 1540 is running on multitenant platform 1510. First container processes 1540 may be configured with per-process keys using cryptographic computing as previously described herein.

At 2604, first container process 1540 registers with processor 1520 as an interrupt receiver for device interrupt from hardware device 2601. This registration is handled via security engine 1530, as first container process 1540 sends a registration request to the security engine. At 2606, the security engine allocates and initializes a per process unique process interrupt descriptor (UPID) (e.g., 2344) in memory for first container process 1540. In addition, security engine 1530 can also program user-interrupt related registers (e.g., MSRs) and per-process user interrupt handler (e.g., 2342) for first container process 1540.

At 2608, security engine 1530 can generate a process-device shared interrupt key for first container process 1540 and hardware device 2601, for example, via key management hardware (e.g., 1532). Security engine 1530 can encrypt the process-device shared interrupt key with the hardware key (e.g., processor key). At 2410, the encrypted process-device shared interrupt key can be passed to first container process 1540.

Although FIG. 2600 describes an embodiment in which the process-device shared interrupt key is generated by key management hardware and then encrypted with a hardware key before being passed to the first container process, in other embodiments, the interrupt key could be derived, as previously explained herein. In this other embodiment, a unique key identifier is generated and the actual process-device shared interrupt key can be derived by using the hardware key to encrypt the unique key identifier, possibly along with some constant data. Thus, the unique key identifier, rather than the encrypted process-device shared interrupt key, would be passed to first container process 1540 and hardware device 2601.

At 2612, the security engine can create an entry for a UITT of hardware device 2601. The entry can contain a linear address of the first container process' UPID and the encrypted process-device shared interrupt key (or a key handle for the encrypted process-device shared interrupt key). The entry may also contain an interrupt number, which can be a number that identifies the particular interrupt. In one embodiment, the encrypted shared interrupt key can be stored at or near the beginning of the entry and the rest of the entry may be encrypted with the shared interrupt key (before it is encrypted). In another embodiment, the entire entry may be encrypted with the hardware key. Security engine 1530 may store the UITT entry in the UITT table for hardware device 2601.

At 2614, security engine 1530 notifies hardware device 2601 of the interrupt registration. The hardware device 2601 can register itself as an interrupt sender for the device interrupt. At 2616, the security engine can return a UITT entry index, an interrupt number, and information about first container process 1540 to hardware device 2601.

At 2618, hardware device 2601 can request, via an instruction, that an interrupt be invoked by the processor for first container process 1540. The instruction may include the UITT index as a parameter so that processor 1520 can find the UITT entry to determine which interrupt to invoke, which entity is the interrupt receiver, and which code is to be invoked (e.g., UI handler 2342). For example, the instruction may be SENDUIPI(UITT_INDEX). In response to the instruction, at 2620, processor 1520 can use the UITT index parameter to find the UITT entry in the sender's UITT (e.g., hardware device's UITT). The processor can pull the linear address of the receiver's UPID from the UITT entry and use the linear address to read the receiver's UPID. The information in the UPID indicates which interrupt to invoke, which process is receiving the interrupt, and which code to execute. At 2622, first container process 1540 invokes its own UI handler (e.g., 2342) to handle the interrupt. Accordingly, the interrupt is accomplished securely without involving privileged software, such as an interrupt handler of the operating system. Instead, the receiver container process executes its own UI handler. Additionally, if the first and second container processes share data, the data can be encrypted and decrypted using the shared interrupt key which is concealed from software other than the first and second container processes. The use of the shared interrupt key, which is encrypted by the hardware key (or is a unique key identifier that requires encryption by the hardware key to derive the interrupt key), prevents privileged software, such as host operating system 1522, from accessing the shared data or understanding the shared data if it is accessed.

Figure 27:
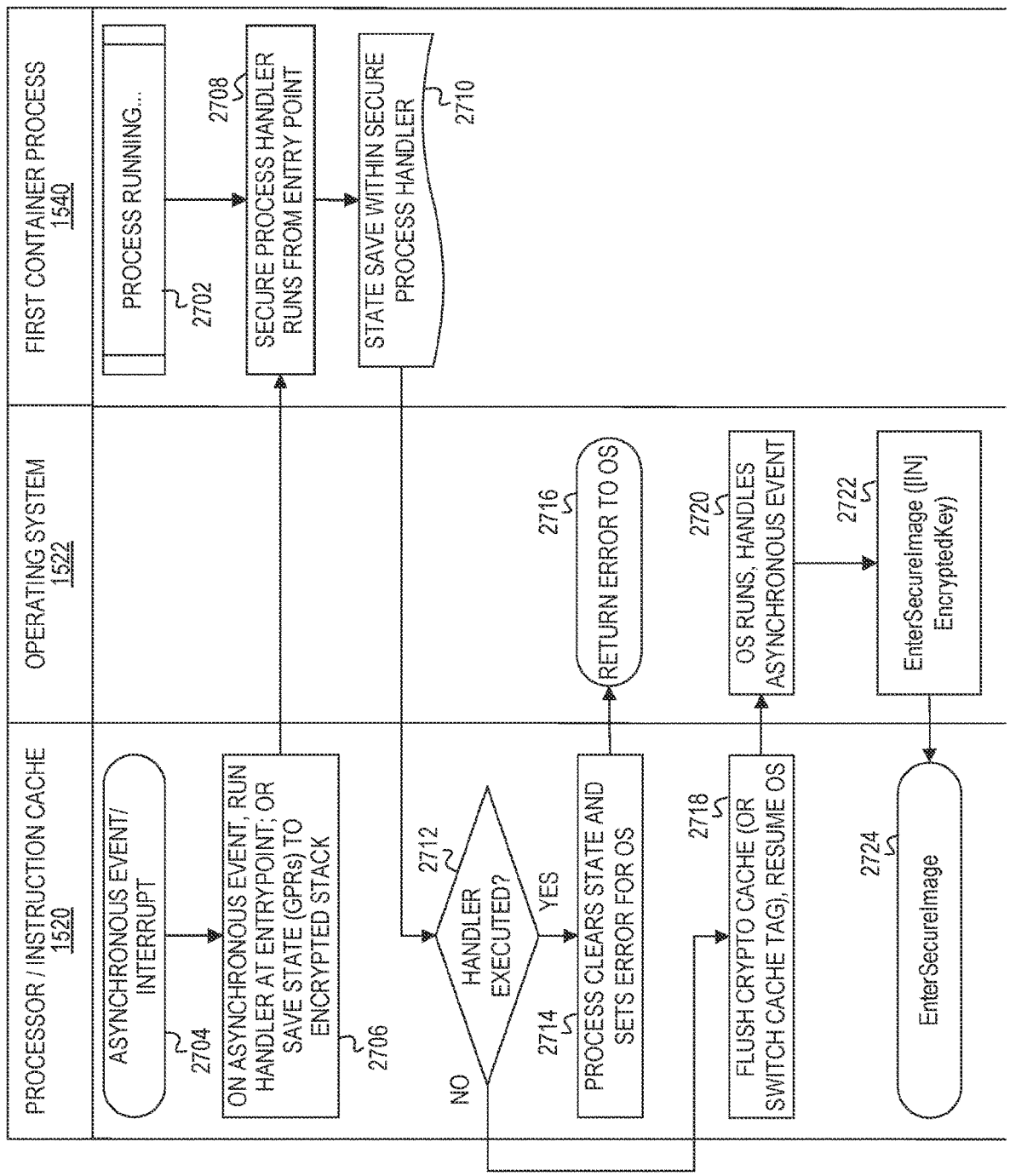
FIG. 27 is a flow diagram of another example asynchronous event/interrupt handling according to an embodiment.

FIG. 27 illustrates a flow diagram 2700 of operations associated with an example asynchronous event/interrupt handling in a multitenancy environment according to an alternative embodiment. One or more operations of flow diagram 2700 may be executed by hardware, firmware, and/or software of a multitenant platform, such as multitenant platform 1510. In this example, one or more operations may be performed by a processor (e.g., 1520) including an instruction cache such as iCache (e.g., 1580), an operating system (e.g., 1422), and a first container process (e.g., 1540). Although specific operations and communications are illustrated in FIG. 27 with reference to particular entities of multitenant platform 1510, this is done for illustration purposes and it should be understood that various other configurations of multitenant platform 1510 are possible, and that instructions and/or operations may be combined or separated or performed by a different entity in some embodiments and implementations.

As indicated at 2702, first container process 1540 is running on multitenant platform 1510. First container process 1540 may be configured with per-process keys using cryptographic computing as previously described herein.

At 2704, an asynchronous event/interrupt, as previously described herein, may be received by processor 1520. In one embodiment, in response to detecting the asynchronous event at 2706, the processor 1520 can save the state including, for example, general purpose registers (GPRs) being used by first container process 1540 and any other registers or data that is sensitive or needed by the first container process. In this embodiment, the state can be encrypted via data cache (e.g., 1586) using the data key for the first container process and saved to stack in encrypted form.

In another embodiment, in response to detecting asynchronous event, control passes to first container process 1540 and at 2708, and a secure handler (e.g., 2340) can run at an entry point of the currently executing process. This secure handler may be provided within the container code image associated with first container process 1540. In at least one embodiment, this secure handler can be invoked as a user-level interrupt. At 2710, the secure handler can save any state associated with the container code image, such as being used by first container process 1540 and any other registers or data that is sensitive or needed by the first container process. In one scenario, first container process 1540 can encrypt the state information and save it to memory (e.g., to stack) using an insecure instruction. In another embodiment, an insecure save instruction can be enhanced to encrypt data before it is stored to memory. In this scenario, the secure handler can identify the state to be saved and save the state information using the modified instruction that encrypts the data before it is stored. In these embodiments, the state of the executing process is saved by the process itself, rather the operating system 1522. In an alternative embodiment, the secure handler can provide the state information to processor 1520 for the processor to encrypt the state information and save it to stack.

Once the secure handler has saved the state information (or after the expiration of a predetermined amount of time since the asynchronous event was detected), at 2712, processor 1520 can determine whether the secure handler finished executing successfully. If not, then at 2714, the processor can clear the state (e.g., clear GPRs) and at 2716, return an error to operating system 1522.

If the secure handler executed successfully, then at 2718, processor 1520 can flush any secrets (e.g., caches, etc.) of the first container process 1540. In one example, processor 1520 can clear instruction cache 1580 of any currently stored instructions. If derived keys are used and each cache line has a tag (e.g., a unique key identifier), then flushing the crypto cache can be achieved by merely switching, modifying, or otherwise obscuring the cache tags. The logic (e.g., control circuitry 1582) of instruction cache 1580 that is programmed with the code key associated with first container process 1540 may be cleared so that operating system 1522 is unable to decrypt code from the container image of first container process 1540. In addition, data cache 1586 may also be flushed and its logic (e.g., control circuitry 1588) that is programmed with the data key associated with the first container process may also be cleared.

Once the crypto caches are flushed or otherwise cleared, processor 1520 can return control to the operating system 1522 to handle the asynchronous event without exposing any secrets of the first container process 1540 to the operating system. Thus, the operating system is kept outside the trusted computing base.

After handling the asynchronous event, the operating system can return control to the secure code image for the first container process 1540. At 2722, the instruction to resume secure execution of first container process 1540 may be executed by the operating system. For example, an instruction such as EnterSecureImage may be executed and the encrypted code key may be passed as a parameter to processor 1520. At 2724, processor 1520 can prepare the hardware for the secure code image to resume execution, as previously described herein. For example, resuming execution may include reprogramming the crypto caches with the appropriate code and data keys for the first container process.

Figure 28A:
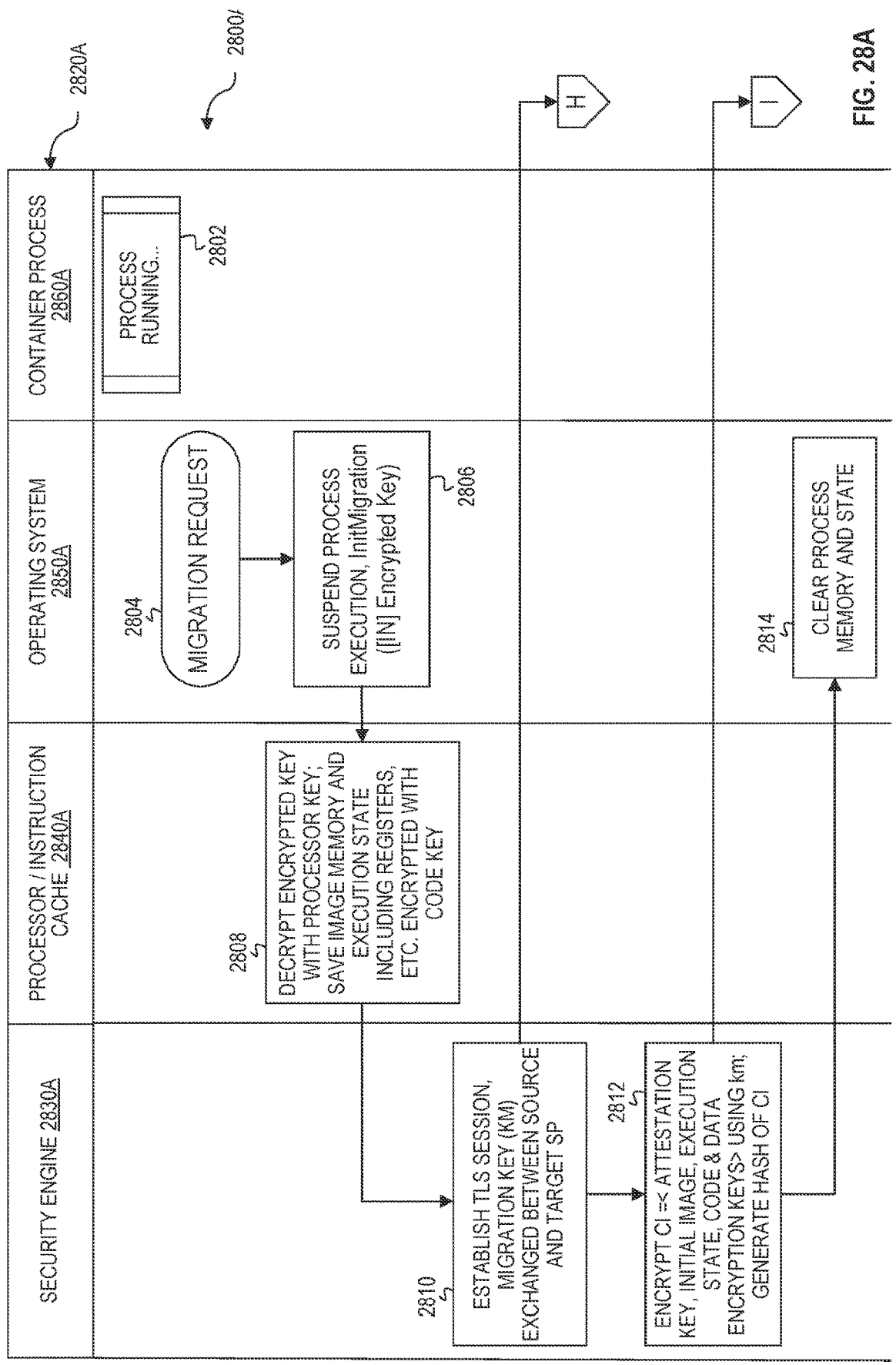
FIGS. 28A-28B are flow diagrams of an example container migration process according to an embodiment.
Figure 28B:
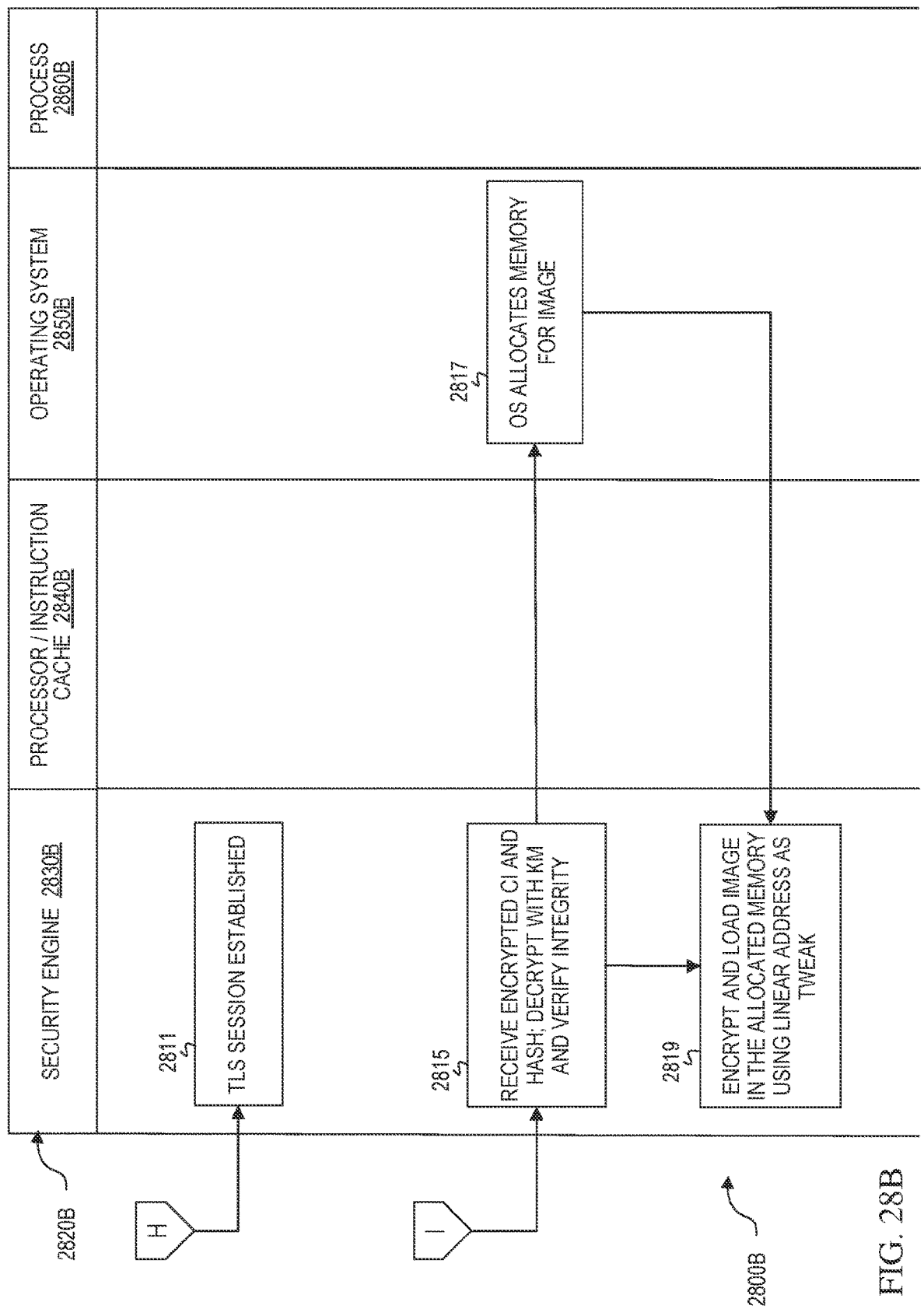

FIGS. 28A-28B illustrate an example flow diagram 2800A-2800B of operations associated with a container migration process in a multitenancy environment according to an embodiment. In at least one embodiment, one or more sets of operations corresponds to the activities of flow diagram 2800A-2800B. FIG. 28A illustrates example operations and control and data flow on a source node 2700A from which a container code image is to be migrated. FIG. 28B illustrates example operations and control and data flow that may occur on a target node 2820B to which the container code image is to be migrated. Source node 2820A and target node 2820B represent multitenant platform architectures, such as those shown and described herein (e.g., 1510, 1100). In this example, source node 2820A can include a security engine 2830A, a processor 2840A (including an instruction cache and a data cache), an operating system 2850A, and a container process 2860A. Target node 2820B can include a security engine 2830B, a processor 2840B (including an instruction cache and a data cache), an operating system 2850B, and a container process 2860B. Processors 2840A and 2840B may be configured in the same or similar manner as other processors described herein (e.g., 1520, 602) and security engines 2830A and 2830B may be configured in the same or similar manner as other security engines described herein (e.g., 1530). Operating systems 2850A and 2850B may be configured in the same or similar manner as other operating systems disclosed herein (e.g., 1522) and generally may be configured to run in a multitenant platform. Container process 2860A is an example process instantiated on source node 2820A from the execution of a container code image to be migrated to target node 2820B. Container process 2860B is an example process instantiated on target node 2820B after the container code image on the source node is migrated to the target node. Although specific operations and communications are illustrated in FIGS. 28A and 28B with reference to particular entities of source node 2820A and target node 2820B, this is done for illustration purposes and it should be understood that various other configurations of the nodes are possible, and that instructions and/or operations may be combined or separated or performed by a different entity in some embodiments and implementations.

In one or more embodiments, security engines 2830A and 2830B may be configured to perform secure migration operations as further described herein. In other embodiments, a secure migration agent may be configured in the source node and the target node as separate entities from their corresponding security engines 2830A and 2830B. For example, a secure migration agent may be configured as part of processor 2840A but distinct from security engine 2830A, and a secure migration agent may be configured as part of processor 2840B but distinct from security engine 2830B.

In this example, process keys that include a data key and a code key have been generated for (or can be derived from unique key identifiers generated for) container process 2860A. The process keys may be generated as previously described herein for example, with reference to FIGS. 16A-16B. The code key is used to encrypt and decrypt the code of the code image corresponding to container process 2860B. The data key is used the encrypt and decrypt data associated with container process 2860A.

The container migration process, as shown in FIGS. 28A-28B includes three main operations. First, source node 2820A saves the states of the running process (e.g., container process 2860A), which is encrypted with a process key (a code key) for the running process. Second, source node 2820A and target node 2820B authenticate each other and exchange a migration key as they establish a secure TLS session. Third, container states are transferred to the target node 2820B over the established TLS connection. Target node 2820B performs the initialization process as describe with reference to FIGS. 16A-16B, for example, to load and restore the running states of the container and resume execution on the target node.

With reference to FIG. 28A, as indicated at 2802, container process 2860A is running on source node 2820A. At 2804, operating system 2850A receives a migration request. At 2806, the operating system suspends the execution of container process 2860A. In one example, a new instruction may be executed by the operating system to instruct processor 2840A to migrate the code image corresponding to container process 2860A from source node 2820A to target node 2820B. One example of the instruction is InitMigration ([IN] EncryptedKey). The encrypted code key for container process 2860A may be passed as a parameter in the instruction.

At 2808, processor 2840A decrypts the encrypted code key, which was passed as a parameter from the operating system, with a hardware key (e.g., a processor key). In addition, processor 2840A can also take a snapshot of the execution state including registers and possibly other memory. Generally, any dynamic memory that may have changed while container process 2860A is running may be captured in the snapshot. Processor 2840A can encrypt the snapshot using the decrypted code key and then save the encrypted snapshot.

As shown at 2810 in FIG. 28A and at 2811 in FIG. 27B, the security engines (or separate migration agents) on source node 2820A and target node 2820B can authenticate each other using their public key certificates and establish a TLS session. The source node and target node can exchange a migration key (Km) as the TLS session is established for communication.

At 2812, the source security engine 2830A sends container information to target node 2820B. In one example, the container information (Ci) can include an attestation key, an initial container code image, the execution state, and code and data keys. The initial container code image may be the original container code image that loaded on source node 2820A. The container information (Ci) can be encrypted using the migration key (Km). In addition, a SHA3 hash may be computed on the container information (Ci) to be used for integrity verification.

Upon receiving the container information, at 2815, security engine 2830B of target node 2820B decrypts the container information using the migration key (Km) and verifies the integrity of the migrated container using the hash that was generated over the container information. To resume container execution on the target host, the target host may follow the initialization procedure, as previously described herein with reference to FIGS. 16A-16B. For example, at 2817, operating system 2850B allocates memory for the container code image. At 2819, the container code image can be fixed-up (if needed), encrypted using the code key, and loaded into the allocated memory using at least a portion of the linear address as a tweak. At 2814, operating system 2850A of source node 2820A can clear process memory and state associated with source container process 2860A.

As described above, in at least one embodiment, source node 2820A sends a container code image and execution states, which have been encrypted using the code key, to target node 2820B. Alternatively, the source security engine (or source migration agent) may send the decrypted container code image and execution states without sending the source code and data keys. In this implementation, target node 2820B can generate a new set of code and data keys for the container code image. This may be desirable when, instead of wrapped keys, a key derivation function is used to generate code and data encryption keys on-demand. Since the master secret to derive keys may be tied to a platform, this secret may not be shared between the source and target nodes.

In at least some scenarios, a cryptographic computing pointer encoding scheme may assume a flat address space. However, applications use FS- and GS-relative accesses, depending on the particular operating system, to reference thread-local storage with a non-zero segment base. Thus, using a cryptographic computing pointer encoding scheme to encrypt thread-local storage could potentially result in collisions between the encrypted pointer representations for thread-local and non-thread-local allocations and between thread-local allocations across different threads using different segment base addresses. To avoid such collisions, the segment base address could be incorporated into the pointer encryption tweak. For example, the segment base address could be added to the padded fixed address bits and the block cipher may need to be modified to support a sufficiently large tweak input.

C. Addressing Counter Mode Vulnerabilities in Cryptographic Computing

Counter mode encryption provides perfect forward secrecy that protects data, assuming that it does not change for a given pointer location. For instance, in some cryptographic computing (CC) embodiments, plaintext data may be XOR'ed with a keystream in a counter mode of operation to obtain ciphertext that is stored in the memory hierarchy, and an adversary will not be able to obtain the plaintext or information about the plaintext from the ciphertext alone. However, during the program execution, data in each pointer might be updated from its initial value. Adversaries might be able to take advantage of victims by observing changes (e.g., bit flips) in the victim data. For example, where a plaintext undergoes an XOR operation with a keystream to obtain ciphertext "A", and a modified version of the plaintext undergoes an XOR operation with the same keystream to obtain ciphertext "A*", an adversary may observe differences between A and A* (e.g., by XORing the two to "cancel" the keystream out) and potentially obtain information about the underlying plaintext.

One way of addressing this vulnerability is to use a fully data-diffusion encryption mode, such as, for example, Electronic codebook (ECB), xor-encrypt-xor (XEX), XEX-based tweaked-codebook mode with ciphertext stealing (XTS), etc. The approaches described herein may be referred to as cryptographic computing (CC) with diffusion. In this way, embodiments of the present disclosure may mitigate counter mode vulnerabilities such as the one described above or others described herein. For example, cross-allocation replays on the same address are mitigated by CC with diffusion. In addition, CC with diffusion may support authenticated security contexts coming from an encoded pointer at the allocation granularity. Further, CC with diffusion may protect at a finer granularity than the key domain, which is the granularity of the allocation.

Figure 29:
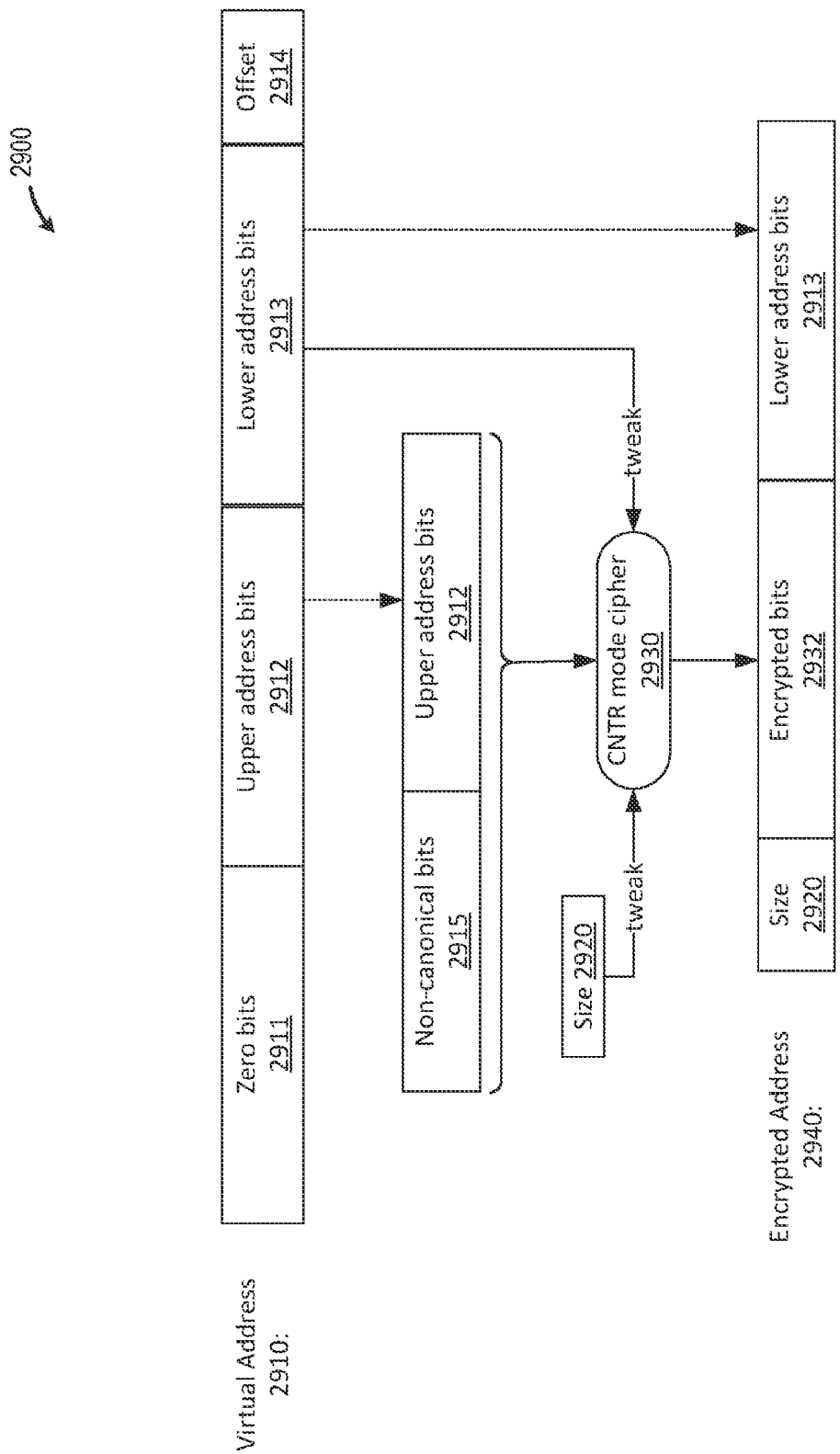
FIG. 29 illustrates a simplified block diagram of a virtual address encryption technique in accordance with certain embodiments.

FIG. 29 illustrates a simplified block diagram of a virtual address encryption technique 380 in accordance with certain embodiments. In the example shown, the virtual address 390 is cryptographically encoded to provide cryptographic isolation among data objects in memory. With this, embodiments may provide cryptographic assurance that an attacker's virtual address may collide with a victim's virtual address with only a negligible probability. In the example shown, the virtual address 390 includes a number of zero bits 391, upper address bits 392, lower address bits 393, and an offset 394. The upper address bits 392 are combined with non-canonical bits %115 and provided as plaintext input to a counter mode cipher 2930, with the lower address bits 393 of the virtual address 390 and a size field 2920 being provided as tweak inputs to the cipher 2930. The cipher 2930 may be a 32-bit tweakable block-cipher, such as for example, the PRINCE cipher, Simon cipher, or K-cipher as disclosed in U.S. Patent Application Publication No. US2020/01455187. The size field 2920 may indicate a memory allocation size. For example, the size field 2920 may indicate an exponent for a power-of-two (Po2) bit memory allocation, where the number of bits allocated is equal to two to the power of a number indicated by the size field (i.e., bits allocated=$2^{size}$). The ciphertext produced by the cipher 2930 is combined with the lower address bits 393 of the virtual address 390 and the size field 2920 as shown to construct the encrypted address 2940.

Figure 30:
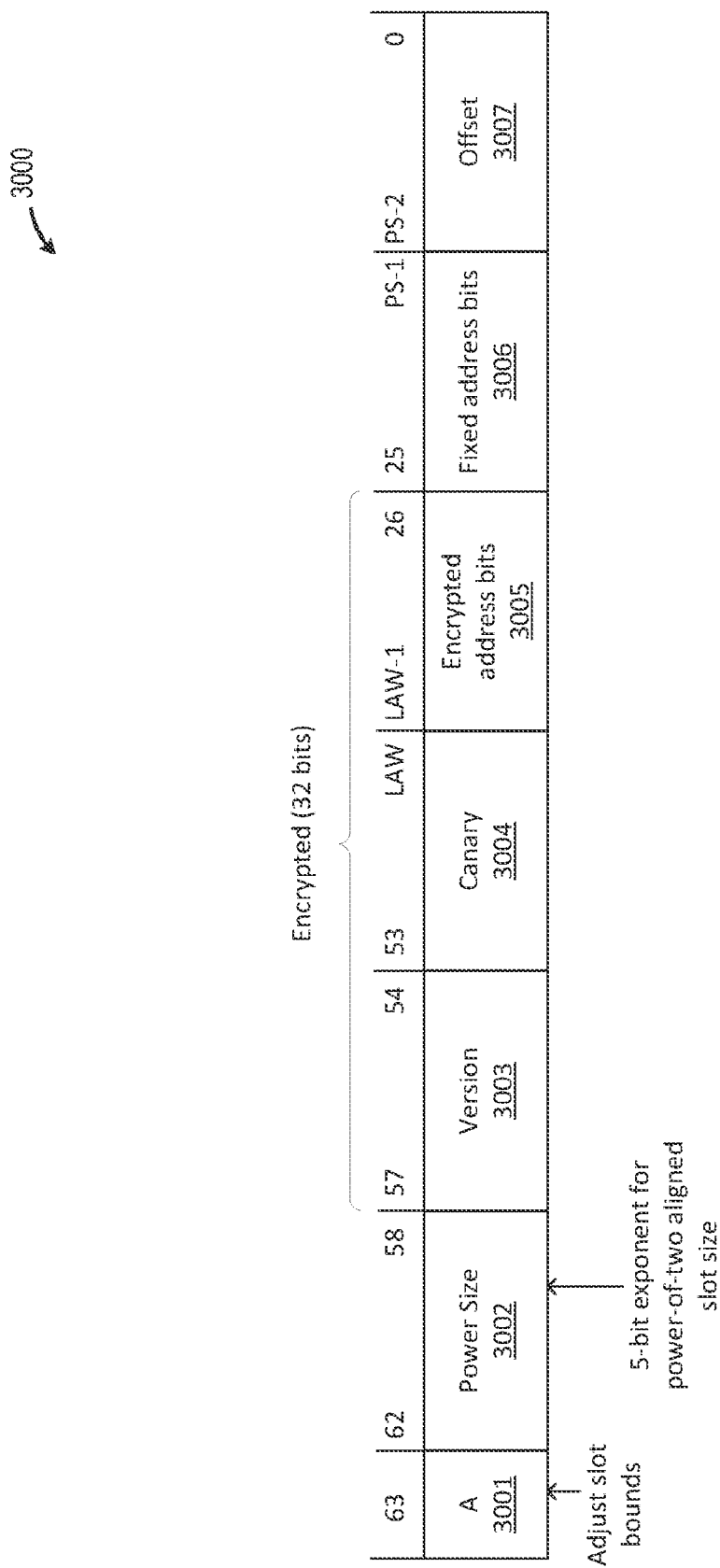
FIG. 30 illustrates an example encoded pointer in accordance with certain embodiments.

FIG. 30 illustrates an example encoded pointer 3000 in accordance with certain embodiments. The example encoded pointer 3000 may be encoded in a similar manner as the encrypted address 2940 of FIG. 29. In the example shown, the encoded pointer 3000 includes an adjust bit 3001 for adjusting slot boundaries (e.g., when the adjust bit 3001 is equal to 1, the encoded pointer address should be increased or decreased by half the size of the power of two bounding box, as indicated by the size field 2920 or power size field 3002), a power size field 3002 that indicates a size of a memory allocation as described above with respect to the size field 2920 of FIG. 29, 32 encrypted bits that include a version field 3003, a canary field 3004, and encrypted address bits 3005, fixed address bits 3006 (which may be lower address bits of a virtual address, e.g., as shown in FIG. 29), and an offset 3007 (which may be an offset of a virtual address, e.g., as shown in FIG. 29). It should be understood that, in some embodiments, each memory allocation is associated with a unique bounding box, the size of which is a power of two. This is the smallest memory region described by a binary prefix which contains the allocation. This bounding box which is unique per allocation I used for producing a cryptographic secret, which is present in the pointer encoding.

As described above with respect to FIG. 29, the fixed address bits 3006 and power size (PS) bits 3002 may be used as tweaks to encrypt the bits from 57 to 26. To get an adjacent allocation with the same size, the adversary's pointer will have only a few lower order bits in the fixed address bits 3006 differ from the target victim's allocation. To access the victim's allocation by such an adjacent pointer, the adversary must do following two things: (1) change Fixed address bits to match with corresponding victim's bits; and (2) manipulate the encrypted 32-bits so that the decrypted 32-bit (bits 57-26) will match with the corresponding bits in the victim's pointer. To do this, the adversary would need to break the pointer encryption algorithm.

Figure 31:
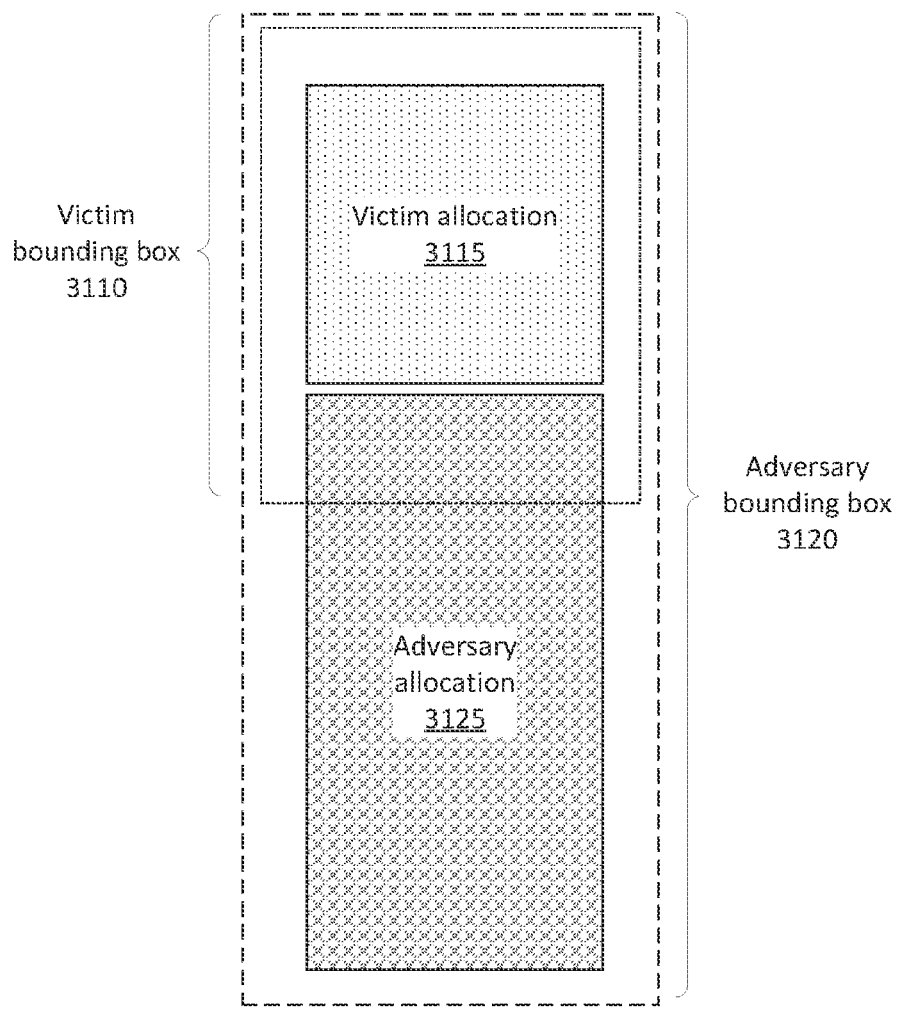
FIG. 31 illustrates example memory allocations for a victim and adversary in accordance with certain embodiments.

FIG. 31 illustrates example memory allocations for a victim and adversary in accordance with certain embodiments. In some instances, each memory allocation may be provided a 2n bytes bounding box (where n=1, 2, . . . ). In cryptographic computing (CC) environments, each data object may be encrypted in the counter mode, with the counter value being tweaked by the encrypted virtual address of the corresponding allocation. For example, an x-byte (2 k–1<x<2 k) allocation 3115 to a victim's pointer may be bounded by the 2 k bytes bounding box 3110 as shown in FIG. 31. The victim can generate a victim-specific CC keystream and can perform read/write operations anywhere within the bounding box 3110. However, an adversary's y-byte (2 k<y<2 k+1) allocation 3125 for its pointer A may be bounded by the 2 k+1 bytes bounding box 3120, which overlaps the victim's bounding box 3110 as shown. The adversary can generate an adversary-specific keystream and perform read/write operations in the entire bounding box 3120, which overlaps the victim's bounding box 3110 as shown. The adversary may accordingly perform read/write operations inside the victim's bounding box 3110. As a consequence, the adversary may access the victim allocation's data 3115 through following sequence of reads:

Read1←Data 1 XOR {Victim Keystream} XOR {Adversary Keystream}
Read2←Data 2 XOR {Victim Keystream} XOR {Adversary Keystream} where Data 1 and Data 2 refer to data within the victim's bounding box 3110. The adversary may then XOR each read (i.e., Read1 XOR Read2), which would cancel out the Victim Keystream and Adversary Keystream in each of Read1 and Read2, allowing the adversary to obtain: Data 1 XOR Data 2. This obtained value may carry meaningful information about victim's execution, and thus provide a potential avenue for exploitation by the adversary.

In the following discussion, several types of adversaries are considered, including Ring-3 adversaries who do not have more privileges than the victim, Intra-process adversary aiming in extracting random uniformly distributed secrets (e.g., keys), Intra-process adversary aiming in extracting any information about victim's data, Inter-process adversary to extract any data, physical adversaries (e.g., via cold boot or interposer), and colluding adversaries (e.g., software inter-process+physical). All are ring3 adversaries, which means that they do not have more privileges than the victim. First, an intra-process adversary may aim in extracting random uniformly distributed secrets (e.g., keys). Second, an intra-process adversary may aim in extracting any data. Third, an inter-process adversary may aim to extract the data of a different process. Finally, an adversary may be colluding with a VMM or an interposer (i.e., it may be both a software inter-process and physical adversary).

It will be seen that the inter-process adversary targeting random data can never be successful. This is because random uniformly distributed data cannot be leaked, by definition. For example, if the adversary extracts a quantity of the form {Random Data 1} XOR {Random Data 2}, the adversary is incapable of determining the bits of {Random Data 1}, or the bits of {Random Data 2}. It will also be seen that an intra-process adversary utilizing any allocation other than overlapping bounding boxes will be cryptographically unable to generate the right virtual address to access victim's data. If an intra-process adversary targets any data in overlapping bounding boxes, however, the problem described above may exist.

The following description provides a solution, based on an extra encryption stage (which is sometimes denoted as "diffusion") that may be performed at the mid level cache (MLC), the last level cache (LLC), or closer to the DRAM memory (e.g., where PRINCE encryption is used). In some embodiments, the diffusion may be tweaked by the size field of a pointer encoding (e.g., size field 2920 of FIG. 29 or power size field 3002 of FIG. 30). The solution provided herein is effective because adversarial out-of-bound accesses are always double diffused if the size fields differ. When data reside in LLC or in the DRAM memory, data have been diffused on the write—and are diffused again on the read. When data reside on the L1 data cache (which may also be referred to as the data cache unit (DCU)), the adversary accesses the victim with a different size field. As the physical addresses (PAs) differ, the access may be treated as a DCU miss. Thus, there will be a read from memory before the write, and the data will be doubly diffused.

Figure 32:
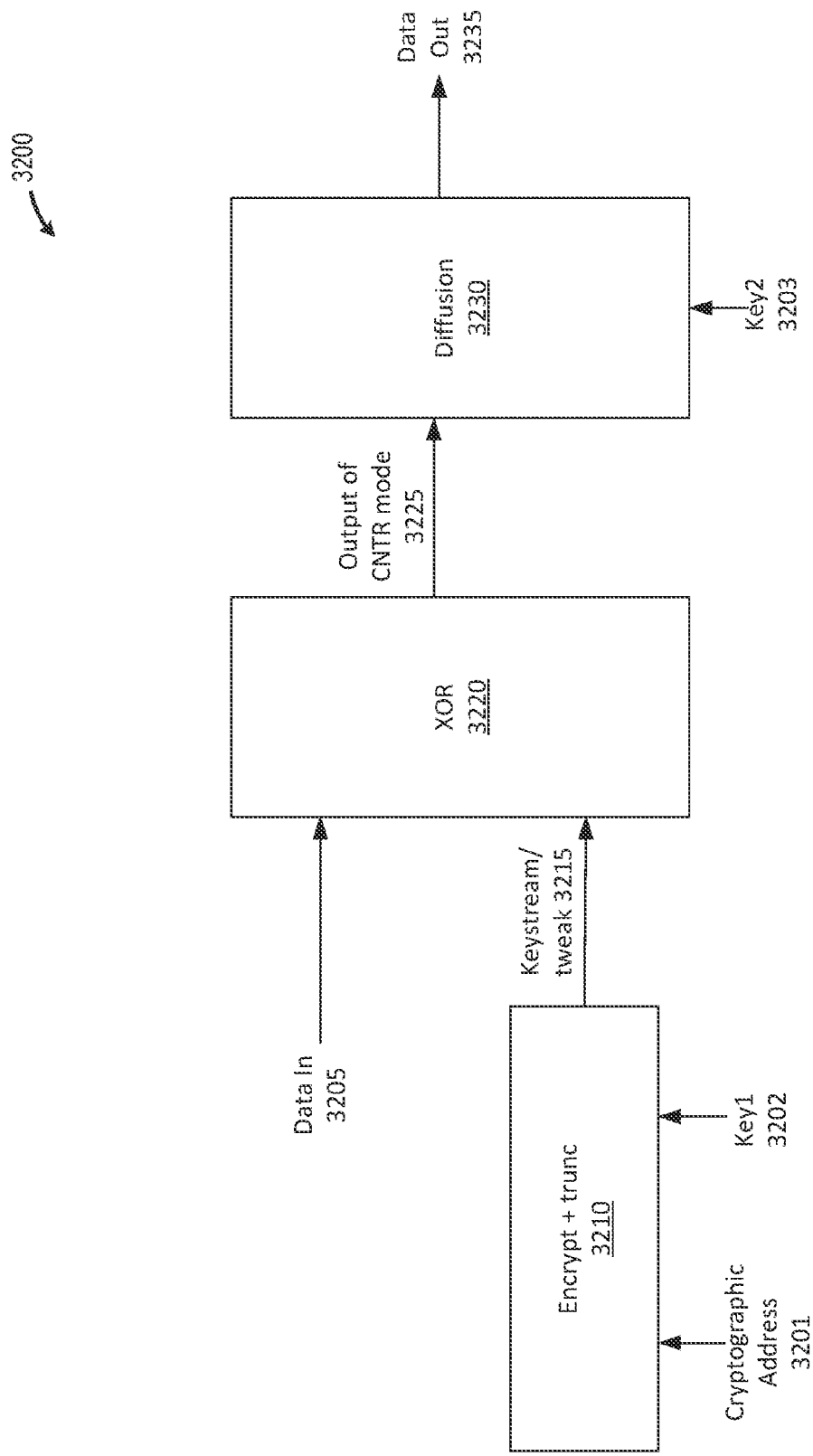
FIG. 32 illustrates a simplified block diagram of an example diffusion technique in accordance with certain embodiments.
Figure 33:
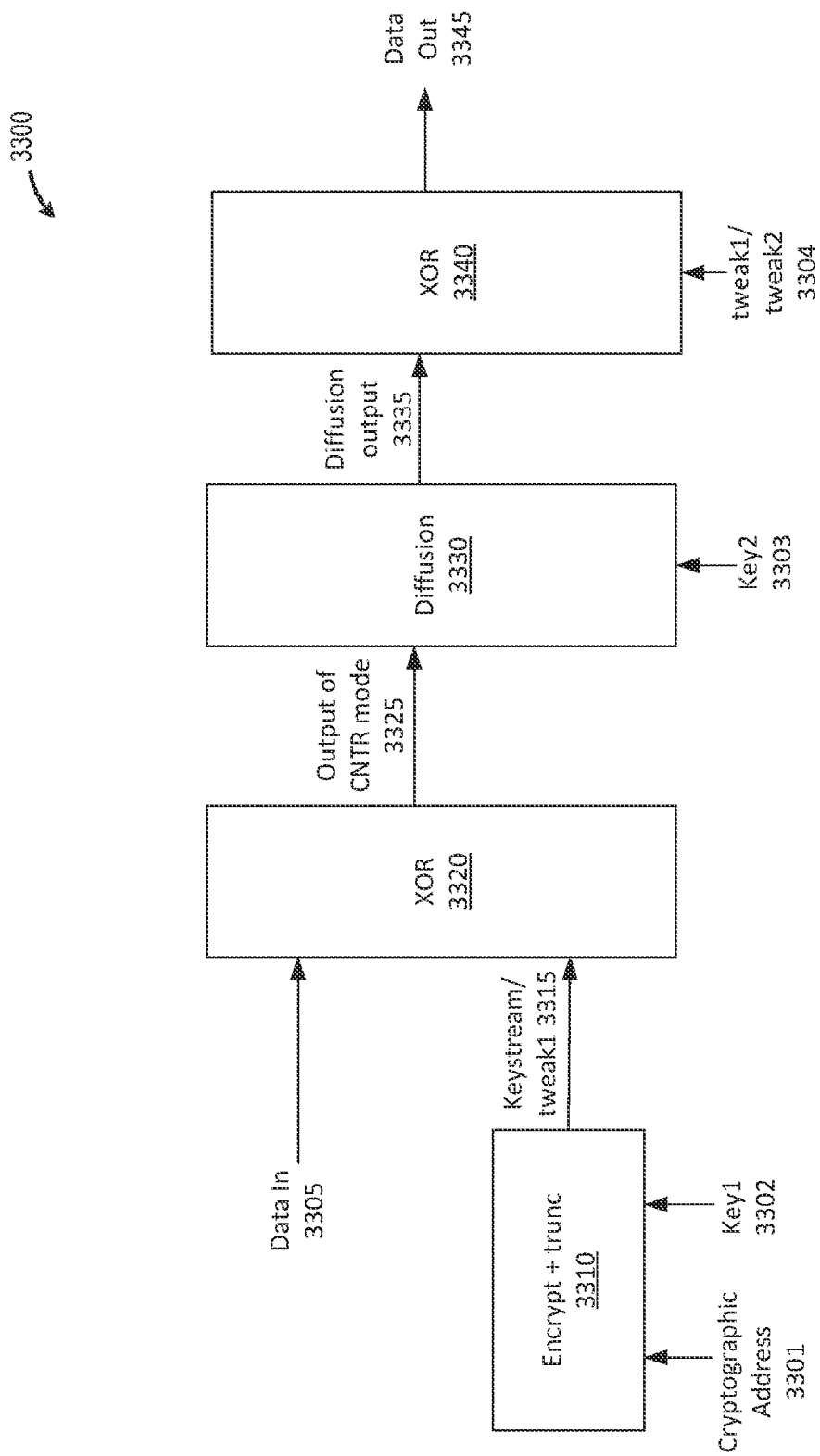
FIG. 33 illustrates a simplified block diagram of another example diffusion technique in accordance with certain embodiments.

FIG. 32 illustrates a simplified block diagram 3200 of an example diffusion technique in accordance with certain embodiments. In particular, the example shown includes an additional encryption stage (also denoted by "diffusion") that is performed on counter mode encrypted data with a different key (key2). The technique shown may protect against inter-process adversaries with overlapping bounding boxes as shown in FIG. 33 from observing victim's data updates (e.g., bit-flips). The technique shown may be used on both read and write operations, providing double diffusion.

In the example shown, input data 3205 (which may be plaintext in an encryption operation or ciphertext in a decryption operation) is encrypted/decrypted via a counter mode of operation by performing an XOR operation 3220 of the data 3205 and a keystream/tweak 3215. The counter mode used may be a forward secrecy protected counter mode of encryption/decryption with a full 24-round Gimli permutation, in some instances. The keystream/tweak 3215 is generated from an encryption and truncation function 3210 that uses a cryptographic address 3201 (e.g., encrypted address 2940 of FIG. 29 or pointer 3000 of FIG. 30) and key1 3202 as inputs. In some implementations, the encryption and truncation function 3210 uses a Gimli permutation that converts the cryptographic pointer and key into a pseudo-random bit string, also referred to as keystream. Next, the counter mode selects as many consecutive bits from this key stream as the length of the data to be encrypted, and XORs the selected bits of the keystream with the selected bits of the data to produce the ciphertext.

In some embodiments, the value of the key1 3202 may be based on a field of the cryptographic address 3201. For example, metadata (e.g., the size field) of the cryptographic address 3201 may be used as a key selector to select the key1 3202 from a key table, as described below. In other embodiments, other means of encryption/decryption may be performed on the data 3205 prior to the diffusion stage is performed at 3230. The encryption/decryption stage may be performed by circuitry of a processor core, e.g., in load and store buffer data paths of a processor core.

Figure 34:
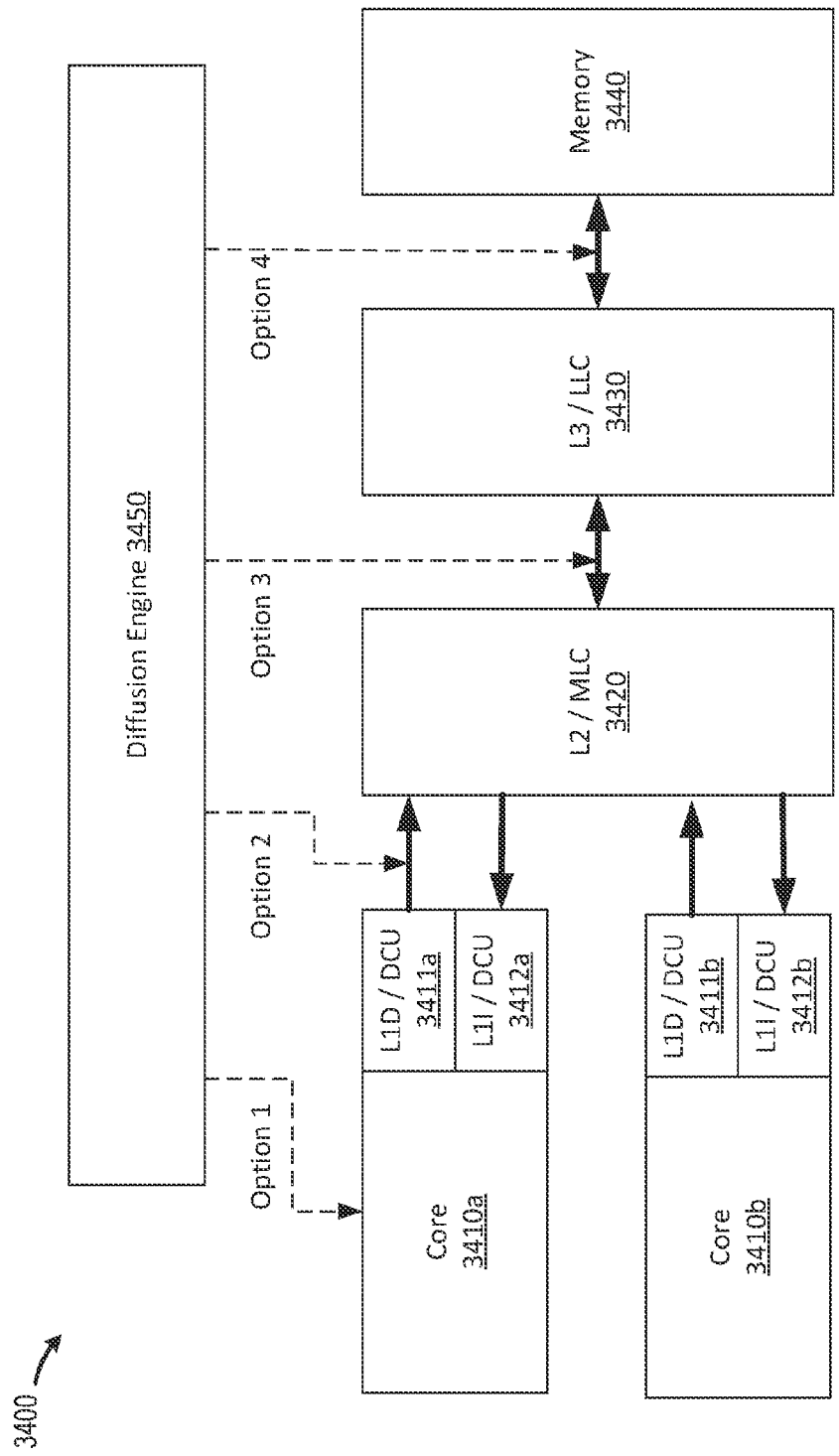
FIG. 34 illustrates a simplified block diagram of a processor and memory architecture in accordance with certain embodiments.

Diffusion 3230 is then performed on the output 3225 of the counter mode via a block cipher encryption mode that uses key2 3203 as a tweak. The diffusion 3230 may implement any function that fully mixes the bits of its inputs (e.g., 3225 and 3203 in the example shown). As some examples, the diffusion 3230 may be performed by a lightweight (e.g., round reduced) block cipher, such as, for example, the PRINCE cipher, the K-Cipher as disclosed in U.S. Patent Application Publication No. US2020/01455187, or another lightweight block cipher. In some embodiments, the value of key2 3203 may be based on or include the size/power field of an encoded pointer, such as, size field 2920 of FIG. 29 or power size field 3002 of FIG. 30. The value of key2 3203 may be based on other values as well. The output 3235 of the diffusion may then be stored in memory (e.g., in the allocation 3315 of FIG. 33) on an encryption/write operation, for example, or may be used in computations or other operations in a decryption/read operation, for example. The diffusion stage may be performed by circuitry of a diffusion engine that is in any suitable location within a processor. The diffusion engine may be located in one of the options as shown in FIG. 34 and described further below with respect to the diffusion engine 3450.

By implementing the diffusion technique as shown in FIG. 32, data may be doubly diffused via the read and write operations performed. Thus, adversarial out-of-bound accesses to extract victim's data through overlapping bounding boxes as shown in FIG. 33 may be unsuccessful, as no meaningful information can be leaked as described above. This is illustrated in the following out-of-bound access scenario. Using the same example overlapping bounding box scenario as shown in FIG. 33 and described above, but where a diffusion technique is also performed on reads/writes, an adversary would perform the following reads:

Read1←Diff2 (Diff1 (Data 1 XOR {Victim Keystream}))
 XOR {Adversary Keystream}
Read2←Diff2 (Diff1 (Data 2 XOR {Victim Keystream}))
 XOR {Adversary Keystream} where, Diff1 refers to the diffusion performed on the write of the data to memory, and Diff2 refers to the diffusion performed on the read from memory. Accordingly, Read1 XOR Read 2 returns (Diff2 (Diff1 (Data 1 XOR {Victim Keystream}))) XOR (Diff2 (Diff1 (Data 2 XOR {Victim Keystream}))), and from this, the adversary cannot observe any information about victim's data. This is because when victim's data reside in LLC or in the DRAM memory, data have been diffused on the write (tweaked by victim's size field) and are diffused again (tweaked by adversary's overlapped bounding box size) during the read by the adversary. When victim's data reside on the DCU brought through the victim read, the adversary's accesses is with a different size field. Accordingly, the physical addresses (PAs) differ, and the access is treated as a DCU miss.

FIG. 33 illustrates a simplified block diagram 3300 of another example diffusion technique in accordance with certain embodiments. In particular, the example shown includes the same diffusion technique as shown in FIG. 32 and described above (i.e., data 3305 may be implemented similar to data 3205 of FIG. 32, encryption and truncation function 3310 may be implemented similar to encryption and truncation function 3210 of FIG. 32, XOR 3320 may be implemented similar to XOR 3220 of FIG. 32, and diffusion 3330 may be implemented similar to diffusion 3230 of FIG. 32), but with an additional XOR 3340 that is performed on an output of the diffusion 3330. In this way, the technique shown may use the XEX mode of encryption. The last XOR 3340 is performed between the output of the diffusion 3335 and a tweak value 3304, which may be based on context information about the owner of a specific data, e.g., the keystream generated for counter mode of encryption, the encrypted virtual address and at least the size field of the encoded pointer, tweaking the last XOR operation. The data output 3345 may be utilized in the same manner as described above with respect to data 3235 of FIG. 32.

In certain embodiments, the first counter mode encryption stage (e.g., 3210 and 3220 of FIG. 32, or 3310 and 3320 of FIG. 33) may be performed between the core and the DCU/L1 cache units. For example, the core may encrypt data by XORing it with a keystream prior to storage in the DCUs/L1 cache, and may decrypt data stored in the DCUs/L1 cache by XORing the data with a keystream prior to using the data. The additional diffusion (e.g., diffusion 3230 of FIG. 32 or diffusion 3330 and XOR 3340 of FIG. 33) may be performed in any suitable location within the memory hierarchy. The following discussion considers various locations in which the diffusion may take place.

FIG. 34 illustrates a simplified block diagram of a processor and memory architecture 3400 in accordance with certain embodiments. The example architecture 3400 includes two processor cores 3410 and a memory hierarchy that includes respective Level-1 (L1) caches 3411, 3412 (which may also be referred to as data cache units (DCUs)) for each core 3410, a shared Level-2 (L2) cache 3420 (which may also be referred to as a mid level cache (MLC)), a shared Level-3 (L3) cache 3430 (which may also be referred to as a last level cache (LLC)), and main memory 3440. Each core 3410 has a respective Level-1 data cache (L1D) 3411, and a Level-1 instruction cache (L1I) 3412. The diffusion engine 3450 may be placed in one of the locations indicated by Options 1, 2, 3, and 4, e.g., based on the following considerations. The diffusion engine 3450 may perform diffusion on encrypted data as described above, e.g., with respect to diffusion 3230 of FIG. 32 or diffusion 3330 and XOR 3340 of FIG. 33.

Depending on affordable latency (i.e., performance overhead) that would be introduced by the extra diffusion, the diffusion may be performed in one of the options shown in FIG. 32. Nearer to the core may require less hardware and/or protocol changes, however, it may also introduce additional performance overhead due to the serial latency to perform diffusion. Based on a cipher RTL synthesis performed, the diffusion latency may vary from 3 to 6 cycles when targeting approximately 4 GHz clock frequency. In some cases, the diffusion may be performed in load/store pipeline between the core 3410 and the DCUs 3411, 3412 (shown as Option 1 in FIG. 32) may add the entire diffusion latency to each read/write operation for which performance overhead might be significant. In this case, the XOR-with-keystream encryption mode may be replaced with an encryption mode that supports full diffusion (e.g., AES in the XTS mode). Some advantages of this approach include no impact on the cache hardware, that it supports advanced security features (e.g., protection against colluding adversaries), and that the implementation is not challenging. However, one disadvantage of this approach is that it comes with the cost of some potential serialized latency.

In contrast, performing the diffusion prior to loading from/storing into the L3 cache 3430 (shown as Option 3 in FIG. 32) or memory 3440 via a memory controller (shown as Option 4 in FIG. 34) involves paging complexities. Performing the diffusion prior to loading from/storing to the L2 cache 3420 (shown as Option 2 in FIG. 34) would maintain the diffusion being performed within the core while also keeping a relatively smaller size (e.g., lower number of cache lines to manage), and may accordingly expect to have relatively less performance overhead than other options. One advantage of this Option 2 is that there is no direct impact on the data path latency, while one disadvantage of this approach is that there is some complexity when considering the cache hardware.

The following describes example embodiments that are guided by the needs for (i) legacy binary compatibility, (ii) almost no changes or no drastic changes to the MESI protocol for cache coherency, (iii) having the least possible amount of metadata stored in the cache, and (iv) "doable" changes to the cache HW, for example, avoid expanding the cache capacity with metadata etc.

Figure 35:
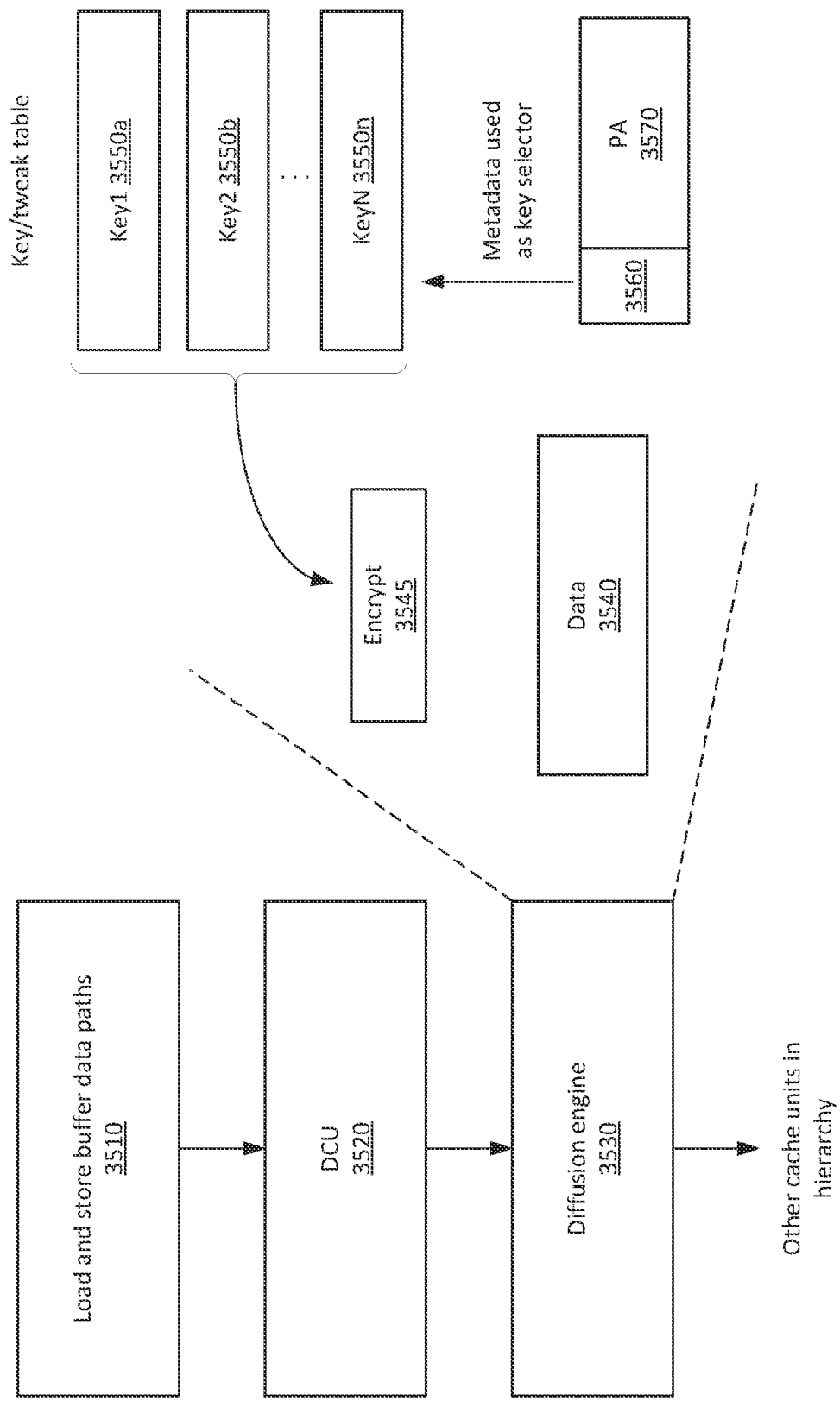
FIG. 35 illustrates a simplified block diagram of a diffusion technique being performed between a DCU and other cache units in a memory hierarchy in accordance with certain embodiments.

FIG. 35 illustrates a simplified block diagram of a diffusion technique being performed between a DCU 3520 and other cache units in a memory hierarchy in accordance with certain embodiments. In the example shown, the load and store buffer data paths 3510 are connected to the DCU 3520, which in turn is connected to a diffusion engine 3530. The diffusion engine 3530 connects to other cache units in the hierarchy, such as the L2/LC and L3/LLC cache units (e.g., L2/MLC 3420 and L3/LLC 3430 of FIG. 34, respectively).

The diffusion engine 3530 may include hardware, firmware, or both, configured to perform the diffusion stages 3230, 3330 as described above with respect to FIGS. 32, 33, respectively. That is, the diffusion engine may encrypt/decrypt data 3540 via encryption logic 3545, where the encryption/decryption is tweaked by metadata 3560 present in or appended to a physical address (PA) 3570 for the data 3540. For example, in certain embodiments, and as shown in FIG. 35, the metadata 3560 may include the size field (e.g., size field 2920 of FIG. 29 or power size field 3002 of FIG. 30) present in or appended to a PA 3570, and the size field may be used as a key selector to select an appropriate key/tweak values 3550 from a key store or table. Other embodiments may avoid the need to explicitly store keys or tweaks altogether as discussed further below. For example, other embodiments may compute on-the-fly keys using the metadata 3560 of the PA 3570, where such computation may be using the encryption logic 3545 of the diffusion engine 3530.

The security provided by embodiments herein may stem from the use of the size field in an address (e.g., the size field 2920 of FIG. 2920 or power size field 3002 of FIG. 30). Even for small object allocations, if one reads with the wrong size field, the content will be double diffused. Diffusion itself can be done in any mode, even in the electronic codebook (ECB) mode. In some embodiments, diffusion is performed at the granularity of 8 bytes (i.e., 64 bits), which is a typical block length used by lightweight block ciphers such as PRINCE. For example, if we want to read 2 bytes from memory, we would first need to reverse the diffusion of an 8 byte aligned "granule" that contains the quantity we want to read.

Figure 36:
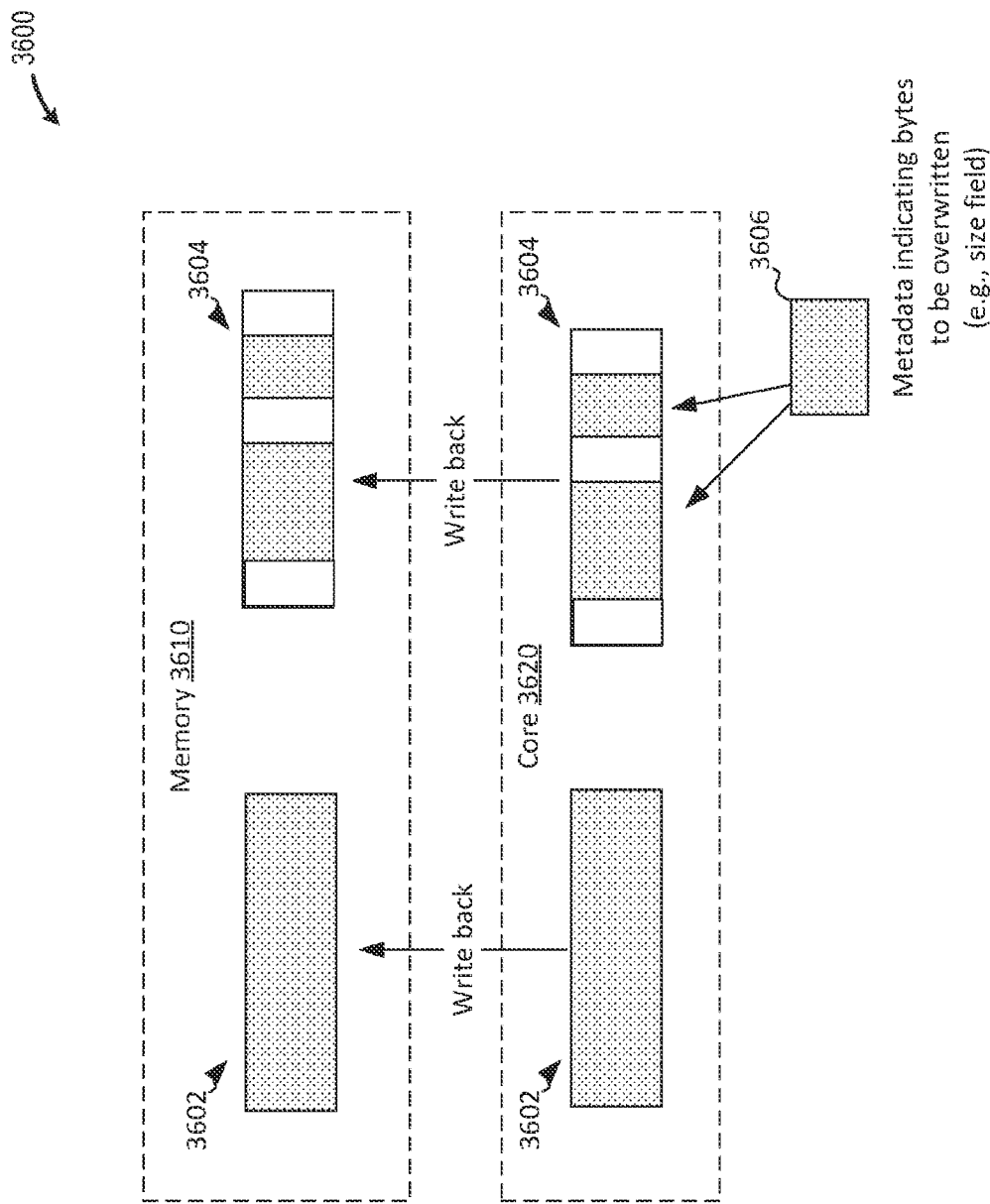
FIG. 36 illustrates a diagram of example technique for modifying and diffusing data at sub-cache line granularity in accordance with certain embodiments.

FIG. 36 illustrates a diagram of example technique 3600 for modifying and diffusing data at sub-cache line granularity in accordance with certain embodiments. Typically, write backs update all the bytes of a cache line, as shown on the left side of FIG. 36, where cache line 3602 is replaced in its entirety during a write back from the core 3620 to memory 3610. However, there may be a need for partial cache line write backs if multiple cores are to be allowed to change different entities of the same cache line. For instance, in the example shown on the right side of FIG. 36, metadata 3606 indicates which portions of cache line 3604 are to be modified on the write back to memory 3610. This technique may be referred to as "merging". The metadata 3606 may be generated from prior write operations which modify only the specific parts of the cache lines (also denoted by "granules"), indicated by the metadata. It will be understood that the cache lines 3602, 3604 may be code or data cache lines.

One approach is to always merge data at the memory controller level. In this case, a read always precedes a partial write back. This approach, however, comes at a performance cost. Furthermore, the merging metadata need to propagate via wiring to the memory controller. Such approach is not infeasible: The diffusion metadata are stripped off from the PA and replaced by the merging metadata. In another family of embodiments merging can happen right there at the cache unit where diffusion is performed (e.g., at the DCU). This avoids all complexity at the memory controller level. Such approach would work on the assumption that all cache lines that describe changes to the same physical location are local to the same core. This solution is also useful as it avoids substantial changes to the cache coherency protocol of the CPU (e.g., the MESI protocol). A third simpler option, of course, is to treat accesses with a different size field as DCU miss accesses.

Figure 37:
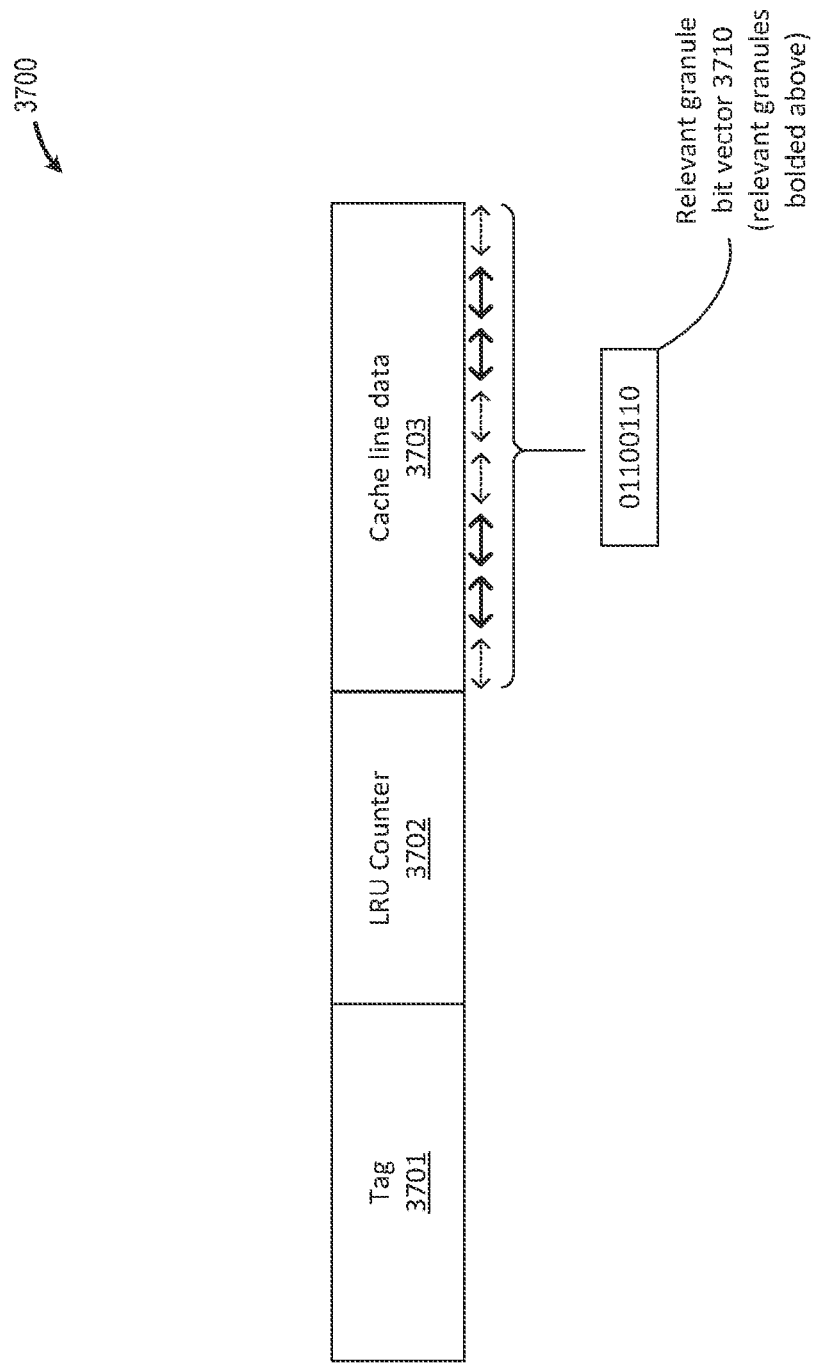
FIG. 37 illustrates an example technique 3700 for allowing merging to be performed inside the cache hierarchy in accordance with certain embodiments.

FIG. 37 illustrates an example technique 3700 for allowing merging to be performed inside the cache hierarchy in accordance with certain embodiments. In particular, Fig. $0 shows how merging metadata may be used inside the cache. Essentially, such metadata may act as instructions on how to diffuse and how to merge. In FIG. 37, a set associative cache is shown that includes cache line data 3703, an LRU counter 3702, and tag bits 3701. There is also a bit vector 3710 present (e.g., in the state of each set of a cache unit) that indicates which granules from the cache line data 3703 have been modified (e.g., are "relevant"). The bit vector 3710 may include the same number of bits as there are bytes in the cache line data 3703. For instance, since the cache line contains 8 granules in the example shown in FIG. 37, the bit vector 3710 is of length 8.

Figure 38:
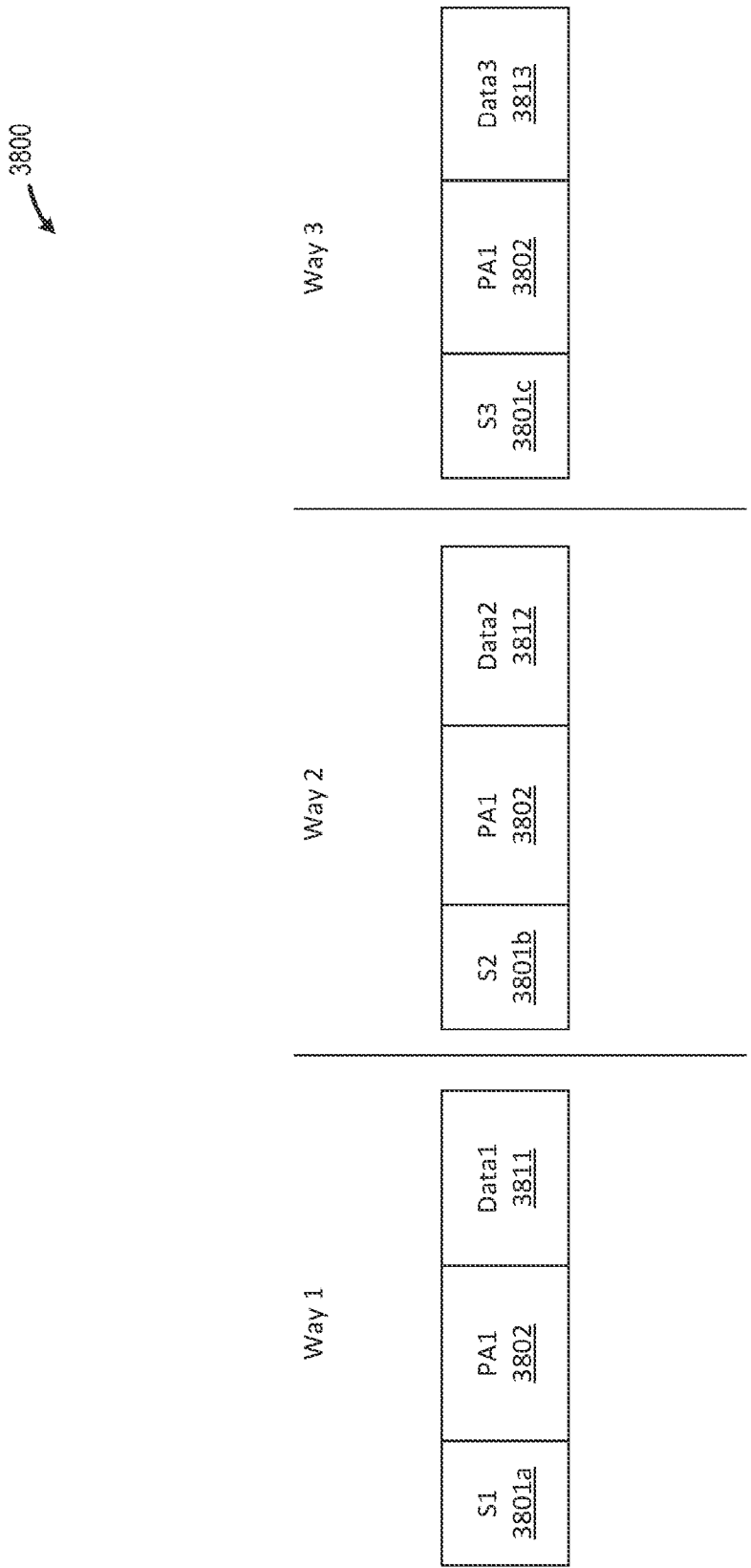
FIG. 38 illustrates an example organization of cache ways in accordance with certain embodiments.

FIG. 38 illustrates an example organization of cache ways in accordance with certain embodiments. In particular, FIG. 38 shows a single set 3800 of a cache unit, where multiple cache lines having tags indicating the same physical address 3802 but different size fields 3801 are placed in ways of the same set. This may be a data placement policy that is enforced by the cache hardware. The cache may accordingly always place entries associated with the same physical address on the same set, despite having different size fields.

In what follows we will be using the term "composite cache line" to refer to a set contains different cache lines of the same physical location. All cache lines of a composite one should be treated as a single cache line with respect to how the cache coherency protocol works. This is because there is no size field in last level cache (LLC). So, all cache lines of a composite one become modified simultaneously, transition to an invalid state simultaneously, become exclusive simultaneously, or become evicted simultaneously. In this way, only one core has each time the latest copy of the composite cache line, and the LLC is not even aware of the fact that a cache line is a composite one. When the cache lines, of a composite one, are about to get evicted, the granule bit vectors of each cache line are read. These bit vectors indicate which granules should be selected to be diffused using which size field. The diffused granules are then merged into a single cache line propagated to the other levels of the memory hierarchy. The granules which have not been modified can be diffused using any size field from the composite cash line. This is because a diffusion operation in this case will correctly reverse its corresponding decryption performed on these granules at read time. An example is shown below with respect to FIGS. 39A-39G.

Explicitly storing the granule bit vectors in each set of a set associative cache may be expensive. There are ways to overcome this cost, however. For example, once the need for turning the set to a composite cache line is determined a single way can be carved out and used for storing the merging metadata. Impossible values on the LRU counters could be exploited to indicate this is the situation. There is also of course the simplest solution that avoids composite cache lines altogether: Only size field can be modified at a time and can be cached in a core. An access with a different size field treated as a DCU miss. This suffers from the performance cost that comes from the more frequent evictions.

Figure 39A:
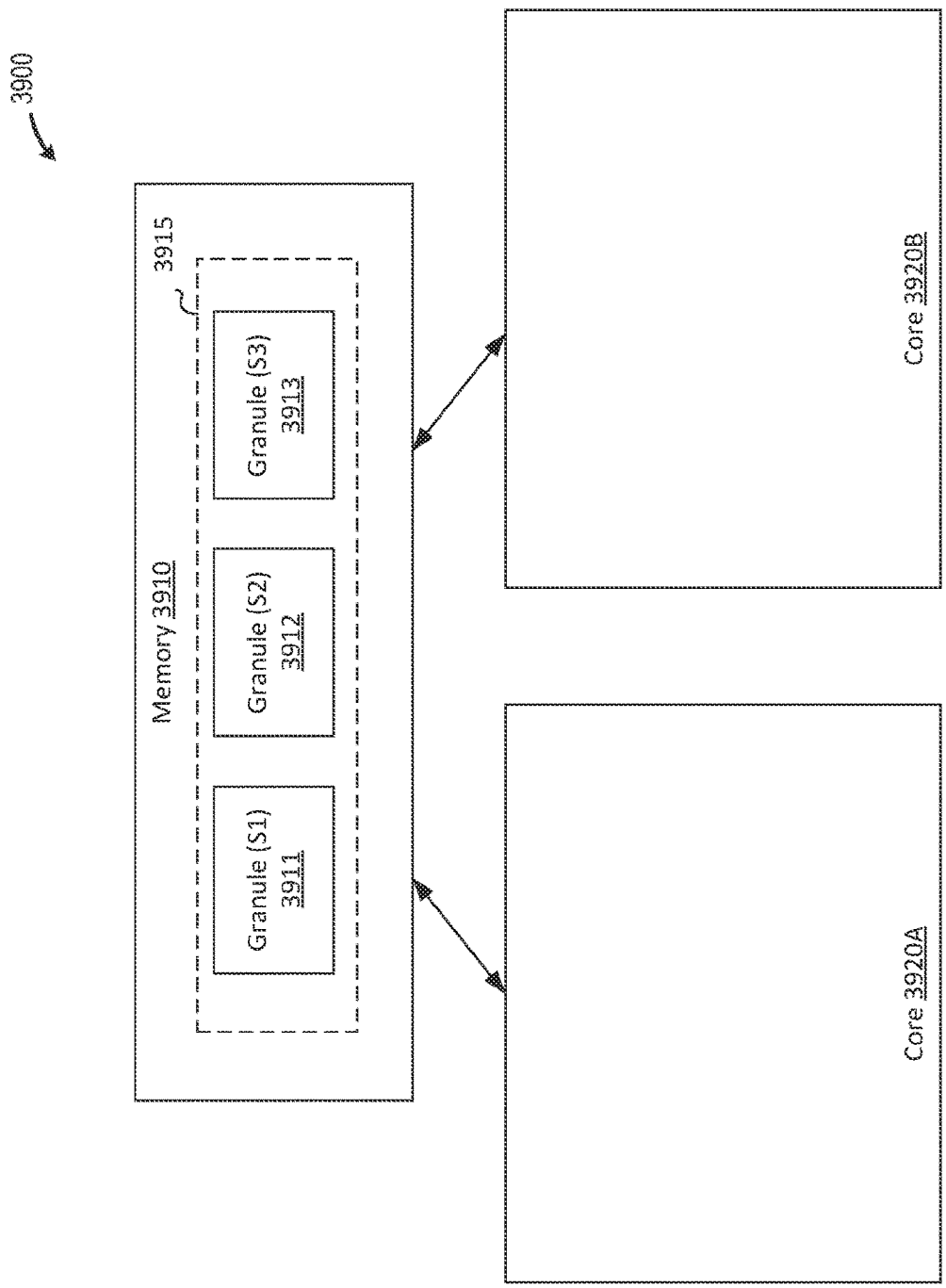
FIGS. 39A-39F illustrate example reads/writes by cores of a processor from/to memory in accordance with certain embodiments.

FIGS. 39A-39F illustrate example reads/writes by cores 3920 of a processor from/to memory 3910 in accordance with certain embodiments. In the examples shown, the memory 3910 (which may be memory in any location within the memory hierarchy outside the core, e.g., L1, L2, or L3 cache, or main memory) stores a cache line 3915 that includes three granules 3911, 3912, 3913 that each have different size fields (S1, S2, S3). In FIG. 39A, neither core 3920 has performed a read to load the cache line 3915. Each of the three granules 3911, 3912, 3913 in the memory 3910 is fully diffused as described above (e.g., encrypted and diffused described with respect to FIGS. 32 and 33).

Figure 39B:
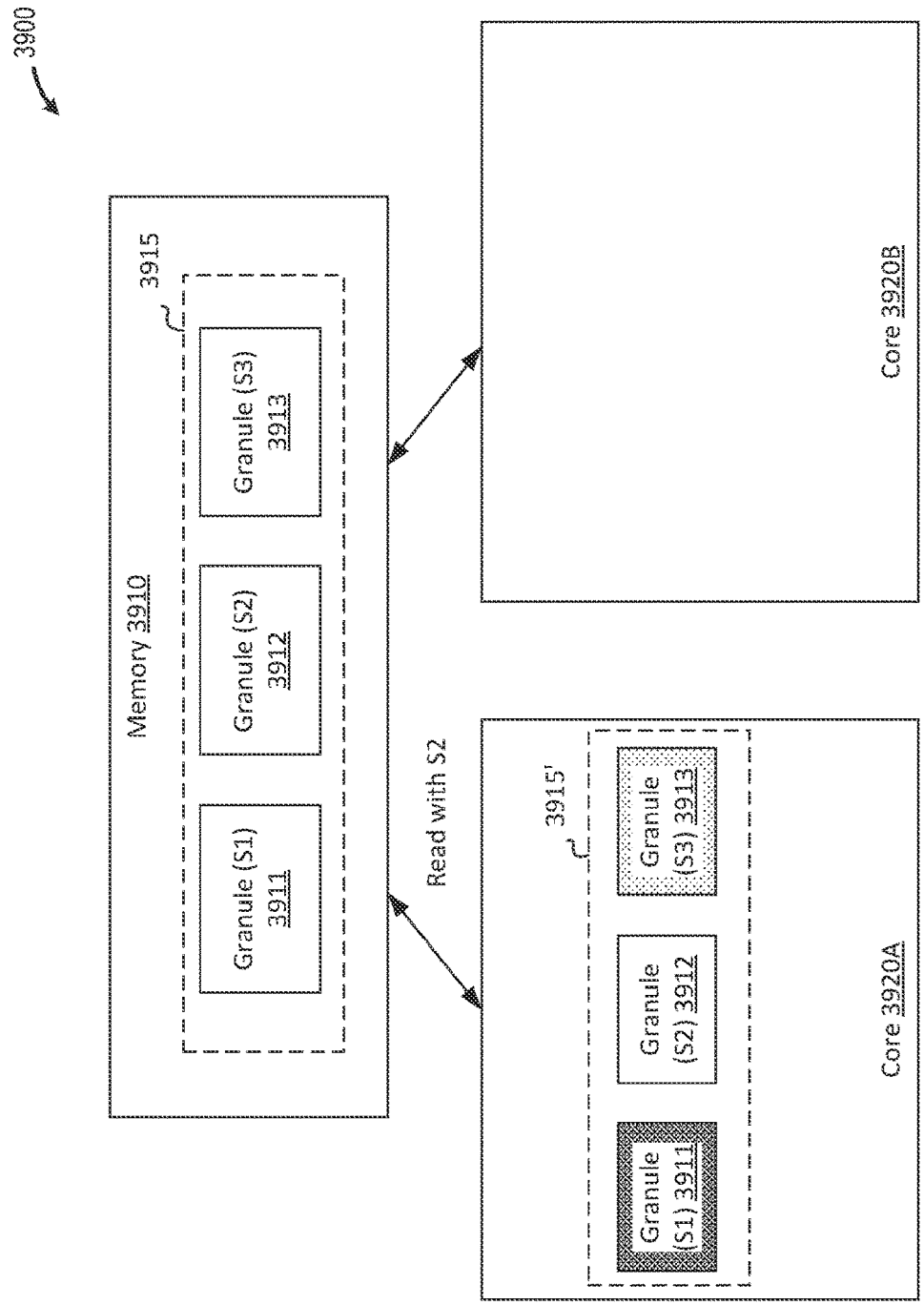

Referring to FIG. 39B, the cache line 3915 is accessed/read by a first function running on the core 3920A using the S2 size field in accordance with diffusion embodiments described herein (e.g., those described with respect to FIGS. 32 and 33). As a result, the core 3920A correctly diffuses the granule 3912, but not granules 3911, 3913 as they have different size fields. The result is shown in cache line 3915' inside the core 3920A (where the granules with hatching indicate improper diffusion). It will be understood that the granule 3912 of the cache line 3915' is no longer diffused, but still encrypted.

Figure 39C:
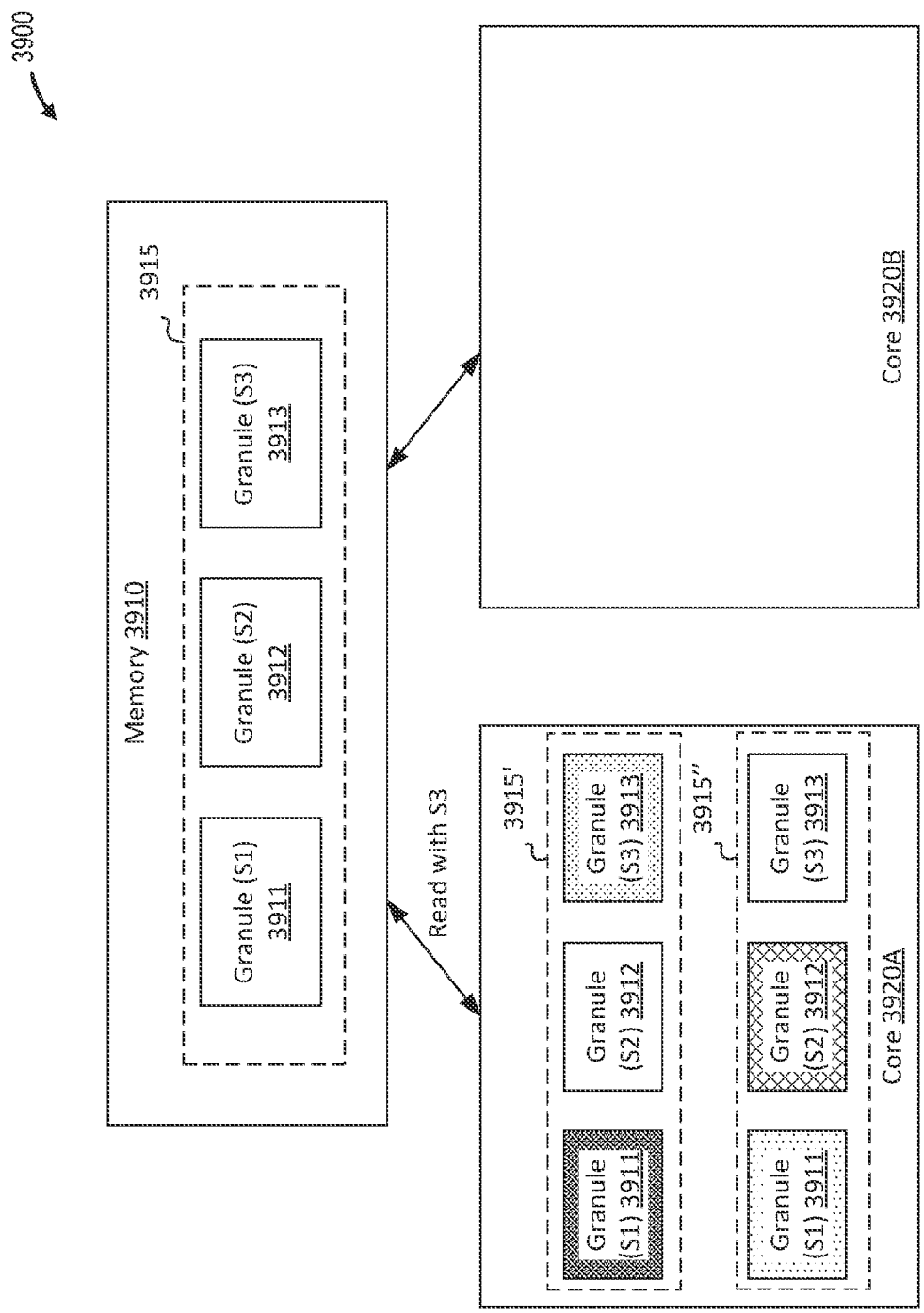

Referring to FIG. 39C, the cache line 3915 is accessed/read by a second function running the core 3920A using the S3 size field in accordance with diffusion embodiments described herein (e.g., those described with respect to FIGS. 32 and 33). As a result, the core 3920A correctly diffuses the granule 3913, but not granules 3911, 3912 as they have different size fields. The result is shown in cache line 3915" inside the core 3920A (where the granules with hatching indicate improper diffusion). It will be understood that the granule 3913 of the cache line 3915" is no longer diffused, but still encrypted.

Figure 39D:
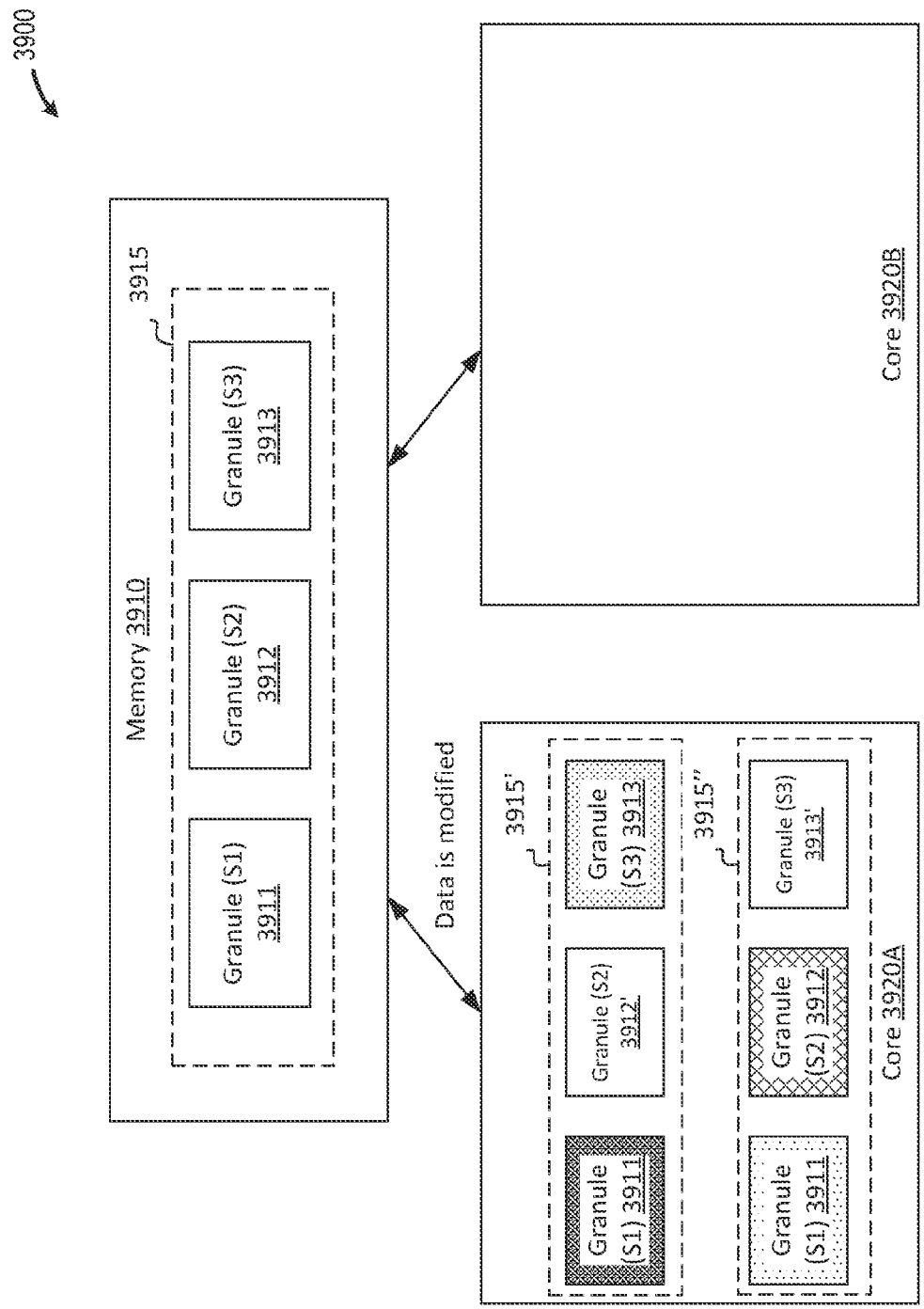

Referring to FIG. 39D, the properly diffused granules are decrypted by the core 3920A and modified by the respective functions accessing them, then re-encrypted prior to being stored in the DCU of the core 3920A. The modified granules are indicated by granules 3912' and 3913'.

Figure 39E:
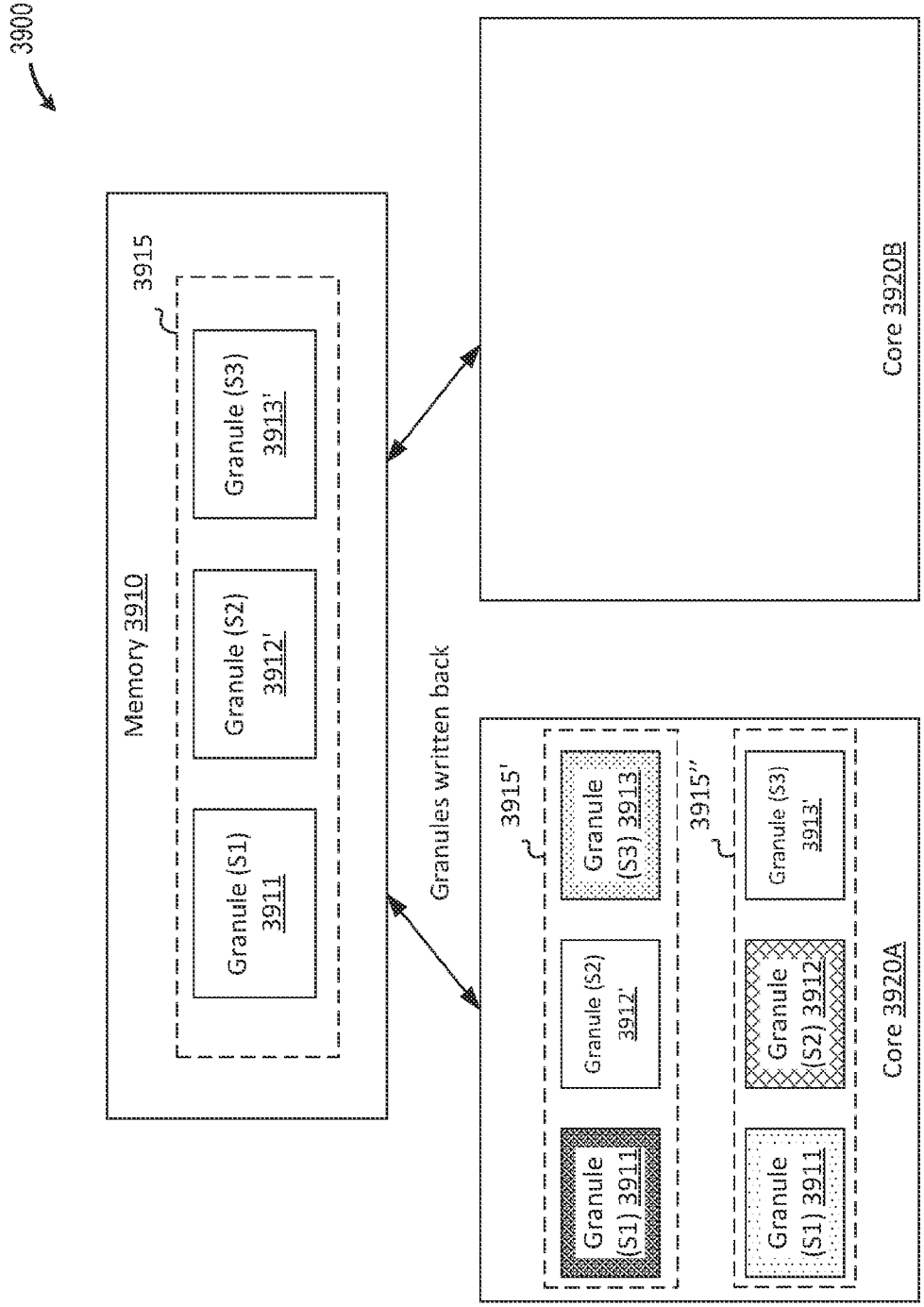

Referring to FIG. 39E, the modified granules 3912' and 3913' are written back to the memory 3910. The modified granules may be written back in such a way that only they are written back to the cache line 3915 in memory 3910. As an example, they may be selectively written back using metadata (e.g., the size field) as described above.

Figure 39F:
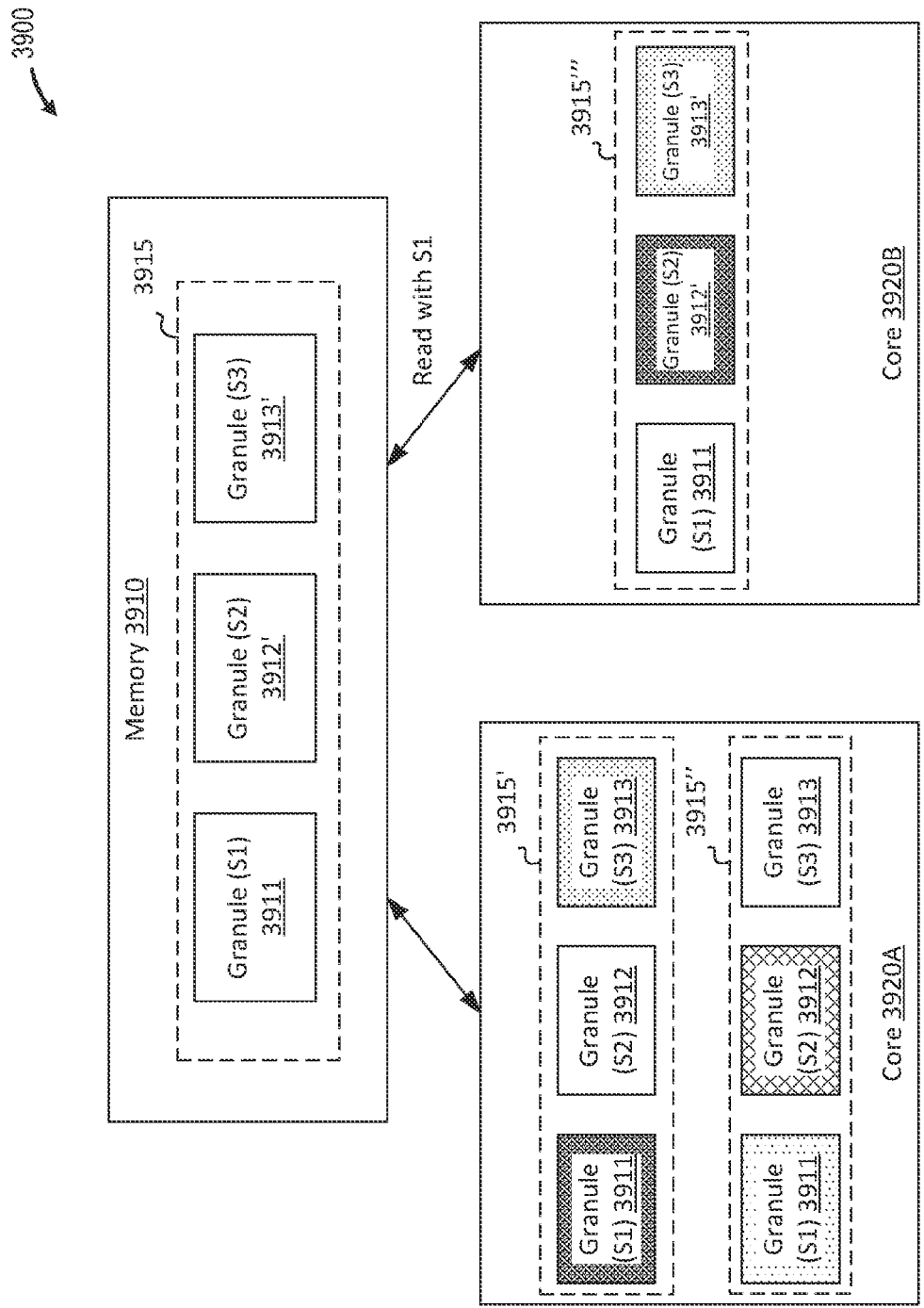

Referring to FIG. 39F, the cache line 3915 is accessed/read by a function running the core 3920B using the S1 size field in accordance with diffusion embodiments described herein (e.g., those described with respect to FIGS. 32 and 33). As a result, the core 3920B correctly diffuses the granule 3911, but not granules 3912, 3913 as they have different size fields. The result is shown in cache line 3915' inside the core 3920B (where the granules with hatching indicate improper diffusion). It will be understood that the granule 3911 of the cache line 3915''' is no longer diffused, but still encrypted.

Use After Free

In some instances, an intra-process adversary may get the exact same allocation that the victim just used and made free. To prevent such an adversary from exploiting this scenario, version field 3003 in the encoded pointer 3000 of FIG. 30 may be used. In particular, the CC seam layer may keep track of every allocation starting with an initial 4 bits version number and increase it in every UAF allocation. This small change in the version field converts the encrypted 32-bit field of the pointer 3000 to a completely different random number from its previous encrypted value. Now using this pointer, the adversary can access the same allocation that has been used before by the victim (who might have left some residual data in that location). However, as the encrypted part of the new pointer is completely different, the adversary's read will generate a completely different keystream which will be XORed with the victim's encrypted residual data and hence adversary cannot get any clue about its unencrypted value.

Inter-Process Adversary

In some cases, an inter-process adversary might also be able to get a pointer and corresponding allocation same as shown FIG. 31. Therefore, an inter-process adversary can observe data changes (bit-flips) in the victim's allocation. The similar diffusion mechanism discussed above for mitigating intra-process adversaries can potentially mitigate inter-process adversaries as well. For example, in some embodiments, to protect against inter-process adversaries, the diffusion may be tweaked by both the size field and a Process ID, where the process ID identifies a cryptographically isolated tenant and may be set by the CPU, the privileged software (VMM or OS) or both.

Physical Adversary

The counter mode of encryption in CC provides the protections against cold-boot and interposer in general to provide forward secrecy and write-once confidentiality. However, an interposer can observe the hamming-distances and bit-flips of data updates on the same location. The diffusion embodiments described with respect to FIGS. 32 and 33 can protect physical interposer to observe bit-flips as well.

Colluding Physical, VMM, OS Adversary

This type of adversary can perform software or hardware bypass reads and writes helped by colluding VMM or by colluding interposer. This type of colluding adversary can reveal potential bitflips of the victim's even with the diffusion mechanism described with respect to FIG. 32. For instance, assume either by physical attacks or by CC bypass read/write capability, the adversary can read some victim's ciphertext and write this ciphertext into his own allocation. After that the adversary switch to CC mode by help of colluding VMM/OS and read the ciphertext from his own allocation. Now, if the adversary's size field is the same as the victim's size field (e.g., with probability $\frac{1}{32}$ or higher), then a subsequent read operation will reverse the diffusion. And the adversary will obtain:

{Key stream of adv.} XOR {Key stream of victim} XOR {data of victim}. Repeating twice will return {Data 1 of victim} XOR {Data 2 of victim}, which will reveal the Hamming distance (bit flips) between Data 1 and Data 2. From cryptographic standpoint, this vulnerability exists since the counter mode encryption+diffusion is work like an XOR+Encrypt (XE) rather than a standard XOR Encrypt XOR (XEX) mode. However, this potential vulnerability may be mitigated with diffusion as described above with respect to FIG. 33.

Multitenancy Considerations

Diffusion engine implementations may also take into account the presence of multiple tenants, each associated with a different key. When encrypting and decrypting data inside the cache hierarchy there is a need to efficiently access per tenant keys.

In a first option, there is an explicit key store supported by the diffusion engine (e.g., 3440). There is also data path for loading keys into the key store. The diffusion engine accesses the key store and selects the most appropriate key based on the metadata bits which are present in the physical address associated with a read or write operation. In one embodiment these metadata bits indicate the ID of the tenant. Such ID may also be referred to as "PASSID". In a variant of this embodiment, the tenant ID is not obtained from the physical address, but instead communicated to the diffusion engine via a separate data path.

In a second option, the need to store or generate keys in the diffusion engine may be removed as compared with the first option above. According to this option, the key may be communicated to the diffusion engine (e.g., 3450) with every read or write operation.

A third option may generate keys on the fly. For instance, the tenant ID (e.g., PASSID) being part of the physical address, or communicated via dedicated wiring, may be used as a seed to a lightweight, on-the-fly key generation mechanism, such as a PRINCE or Simon encryption engine.

In any of these multitenancy embodiments, entries from units of the cache hierarchy may be flushed based on the value of a tenant ID included in a new "selective invalidation" message. This may involve novel sequencer logic that performs all the necessary write backs one-by-one associated with the cache lines, which become evicted, as well appropriate wiring to broadcast a selective invalidation message to all entries of a cache.

It is noted that the power/size field of a pointer is just one example of metadata that can be used to tweak diffusion (e.g., like a version number, there can be multiple per cache line). In other aspects of the present disclosure, a derived key may be used to process Key ID and/or shared library Key ID, and or various data key IDs. While these items are only expected be one per cache line, any or all of these items can be a derived key identifier that is passed through the cache as a tag to encryption circuitry to derive a corresponding key and then encrypt/decrypt the data therewith.

D. Linear In-Line Metadata (LIM), Metadata Stored in Out-of-Band Tables, and In-Page Metadata.

A cryptographically encoded pointer and/or cryptographic addressing as described above may, according to some embodiments, be used with embodiments described in this section, including LIM, metadata stored in out-of-band tables, and in-page metadata, that is, even if some or all of the metadata is stored in memory, although embodiments are not so limited.

Memory tagging technology provides memory safety mechanisms designed to prevent buffer overruns, overflows, and use after free exploits. Current technology uses a repeating memory tag for every data block within the memory space. For example, in systems using a 16 Byte memory block, a 1 Byte tag is associated with each memory block. Thus, a 16 GB memory allocation may require an additional 1 GB simply to store the tag data—resulting in Gigabytes of wasted memory and performance impacts due to multiple redundant memory accesses to retrieve the tag metadata.

In this section, "metadata" refers to at least one or more of: a tag value or version number (tag metadata), valid range metadata, context information (e.g. a memory allocation size (e.g., Bytes of allocated memory referenced by an indirect address), a type of the data or code (e.g., class of data or code defined by programming language), permissions (e.g., read, write, and execute permissions of the indirect address), a location of the data or code (e.g., address combined with the size of the data or code), an ownership of the data or code, a privilege level (e.g., user or supervisor), or a cryptographic context identifier (or crypto context ID) (e.g., randomized or deterministically unique value for each indirect address), to name a few examples. "Metadata" as used herein may also refer to a key identifier (key ID), a tweak, a counter, a memory access control (MAC), or error correction code (ECC). "Metadata" as used herein may also refer to a compartment ID and/or bounds information for an object.

In this section, "allocation" refers to an addressable portion of memory in which an object, such as data or code, is stored.

In this section, "bounds information" refers to information to determine a beginning and an end of an allocation based on a reference point. The reference point may include, for example, a midpoint, a beginning, an end of either a slot, a block, a page, or any other unit of memory.

In this section, "slot," refers a unit of memory in a cache line.

In this section, by "compartment," what is meant herein is a tenant distinguishable from other tenants by way of its compartment identifier (ID). For example, a tenant may, according to one embodiment, be cryptographically isolated from another tenant, although cryptographically isolated tenants provide merely an example and not intended to be limiting with respect to the definition of a "compartment." As used herein, the term "cryptographic isolation" is intended to mean isolation resulting from different areas of memory (different compartments or tenants) being encrypted with different keys and/or tweaks. Isolated memory compartments/tenants can be composed of data structures and/or code of virtual machines (VMs), applications, functions, or threads. In multi-tenant environments, cryptography may be used to enforce isolation between the tenants rather than page tables or extended page tables. compartments may be defined in the context of memory allocation with support for object-granular sharing to reduce memory waste and unnecessary data copies. Most existing solutions are page-granular, which granularity does not match the granularity of programming languages. Some solutions use fixed granularities smaller than a page, but such solutions still present a mismatch with object-granular sharing. Alternative approaches are needed for efficiently storing and locating object-granular metadata. Compartments are used in multi-tenant environments, where each tenant has access to its own private object or objects and where at least some tenants may have the ability to delegate access to their private objects by other tenants.

As used herein, a "tweak" may refer to, among other things, an extra input to a block cipher, in addition to the usual plaintext or ciphertext input and the key (e.g., secret key 116(1)). A tweak comprises one or more bits that represent a value.

A memory allocation security check system is provided herein. A system according to some embodiments may include memory controller circuitry; and processor circuitry coupled to the memory controller circuitry and to be coupled to a memory circuitry, the processor circuitry to: in response to a memory allocation request, perform a memory allocation operation including obtaining a memory allocation for an object in the memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; in response to a memory operation request corresponding to a program, access the first metadata using a pointer including data to identify a location of the first metadata in the memory circuitry, wherein the first metadata is hidden from the program; and in response to a determination by the memory controller circuitry of a match between the first metadata and second metadata, perform a memory operation corresponding to the memory operation request.

A non-transitory or transitory storage device or storage medium is provided. The storage medium includes machine-readable instructions that, when executed by a processor circuitry, cause the processor circuitry to perform operations including: in response to a memory allocation request, performing a memory allocation operation including obtaining a memory allocation for an object in a memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; in response to a memory operation request corresponding to a program, accessing the first metadata using a pointer including data to identify a location of the first metadata in the memory circuitry, wherein the first metadata is hidden from the program; and in response to a determination of a match between the first metadata and second metadata, performing a memory operation corresponding to the memory operation request.

A memory allocation security check method comprising: in response to a memory allocation request, performing a memory allocation operation including obtaining a memory allocation for an object in a memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; in response to a memory operation request corresponding to a program, accessing the first metadata using a pointer including data to identify a location of the first metadata in the memory circuitry, wherein the first metadata is hidden from the program; and in response to a determination of a match between the first metadata and second metadata, performing a memory operation corresponding to the memory operation request.

Some embodiments providing compartment IDs as part of object metadata, whether stored in-line or in a separate metadata table, provide especially useful solutions for example in the context of browsers and Function-as-a-Service (FaaS) workloads in datacenters.

Some systems and methods described herein provide systems, methods, and computer readable media containing instructions that store metadata associated with a memory allocation at a midpoint of a slot. According to one embodiment, the slot may also include the memory allocation (inline within a given cache line including the allocation to which the metadata pertains), along with at least one of bounds information or a compartment ID. According to a further embodiment, the allocation may be wholly or in part, that is, at least in part, in a different cache line from its relevant metadata.

Using a 16 GByte example, using traditional tag metadata would require 0.5 GByte of additional memory space to repeatedly store 4-bit tag metadata for each 16 Byte block included within the allocation. Some systems and methods disclosed herein beneficially reduce this memory requirement to one or more Bytes located at the midpoint memory address (or midpoint) within a slot, such as a cache slot, and corresponding to a memory allocation, for example a memory allocation within that same slot (for example, corresponding to 1 Byte of metadata in a 16 Byte slot included within the allocation). Such a mechanism could result for example in a billion-fold decrease in memory required to store the tag metadata.

The metadata may then be hidden from software (i.e. the program) by the system processor circuitry such as by one or more cores 474/484, providing a contiguous memory when incrementing the logical address or index across the extent of the memory allocation in the slot, with the processor skipping over the metadata and adjusting the linear/virtual address accordingly.

The midpoint of a memory allocation bounding box (corresponding to a given slot size in which an object is stored in an allocation) may, according to one embodiment, be determined by the memory controller circuitry (such as integrated memory controller logic (IMC) 472 of FIG. 4) using a best-fit power of two pointer encoding, or any other encoding where a midpoint of a bounding box may be designated for carrying metadata. The metadata may be encoded only once per memory allocation, located at the midpoint of the allocation's bounding box, and may be hidden by the processor circuitry such that the memory circuitry appears as a contiguous allocation to software using an encoded pointer. Some systems and methods disclosed herein use pointer encoding to determine the midpoint of a memory allocation's bounding box. The metadata associated with the entire memory allocation is stored about the determined midpoint location, and may be accessed by the pointer such that it is accessible to the processor, along with the allocation it pertains to. The C++ New operator or C malloc function (or similar) of the memory allocator library may take the metadata size into account and adjust (increase) the memory allocation accordingly to accommodate the metadata size and any additional metadata such as the allocation's true size. Because the metadata is stored at the midpoint of a slot (at a predictable reference location), the processor circuitry can hide the existence of the tag metadata by reliably skipping over the metadata and adding the size of the metadata to memory accesses linear/virtual addresses past the midpoint based on pointer encoding when accessing memory circuitry via the pointer. Meanwhile, the processor will be able to directly determine the location of the metadata inline along with the allocation based on the pointer encoding.

Some systems and methods disclosed herein benefit from the realization that a power of two encoding of the allocation size may provide a best fit bounding box (or slot) midpoint value that is always located with the memory allocation. Beneficially, multiple memory slots may overlap within a larger memory slot's power of two size, but each of the smaller memory slots will have different midpoint addresses and each of the smaller memory slot midpoint values will differ from the larger memory slot midpoint value.

The pointer may include a number of bits (e.g., 6-bits for a 64 bit pointer) to identify the power of two slot size, and, in one embodiment, a tag value for versioning to prevent use-after-free (UAF). The actual allocated memory bounds (e.g., offset and array size, or actual allocation size to the left (lower bounds or LB) and allocation size to the right (upper bounds or UB) of the bounding box midpoint) may be also be encoded as part of the midpoint metadata and checked by the processor circuitry to ensure a given memory access is performed only within the boundary addresses of the current memory allocation. These bounds may be sized according to a power of two (Po2) bounding box size (where Po2 incrementing of the slot sizes is used) identified by the pointer's size field value to optimize memory use, with smaller bounding boxes requiring fewer Bytes to encode the allocation's true bounds versus larger allocations requiring additional Bytes to encode the larger allocations' true bounds.

Any tag data in the metadata 4050 may be associated with a storage location (slot of the allocation being referenced by the pointer 4080.

Beneficially, some systems and methods disclosed herein reduce memory overhead for storing metadata, while providing performance optimizations. Unlike memory tagging technologies of the state of the art, where the processor circuitry may store one tag per each memory block (16B) comprising an allocation, some of the systems and methods disclosed herein provide a processor that can instead cache metadata, such as one including at least one of bounds and a compartment ID per allocation, making caching far more effective and reducing memory lookups, by fetching metadata from a predetermined reference location within a memory location such as cache, such as a slot, the reference location for example corresponding to the midpoint of the allocation's bounding box. Memory allocations (objects) may have the metadata at the same memory location (cache, cache line or slot) as the object, completely avoiding the extra memory lookups from a separate metadata tag table (aka. data corruption detection DCD) requires.

When allocating memory, according to one embodiment, malloc( )/new may simply account for the metadata at the midpoint of the bounding box, increasing the allocation size (e.g. by one Byte, or two Bytes, or more depending on the size of the bounding box and associated metadata size), and setting the metadata at the midpoint of the memory allocation's bounding box. The logic (such as malloc) may then return a pointer with the same metadata along with the size of the bounding box in the size field. When the processor is accessing the memory (such as a cache) with this encoded pointer format, the processor circuitry will look-up the metadata value from the midpoint of the allocation's bounding box and compare with the pointer metadata value, allowing memory access if there is a match, and triggering a fault or exception if there is no match. Malloc free( ) may then be used to reset the memory metadata, such as at least parts of the metadata. Similarly, the processor may use bounds information in the metadata verifying the memory access is within the correct allocation bounds, for example, is within X1 Bytes (or other unit of minimum allocation size) from the left of the bounding box midpoint (LB) and X2 Bytes (or other unit of minimum allocation size) from the right of the midpoint (UB) of the bounding box, where tag, X1 and X2 are separate fields of the midpoint metadata.

Figure 40:
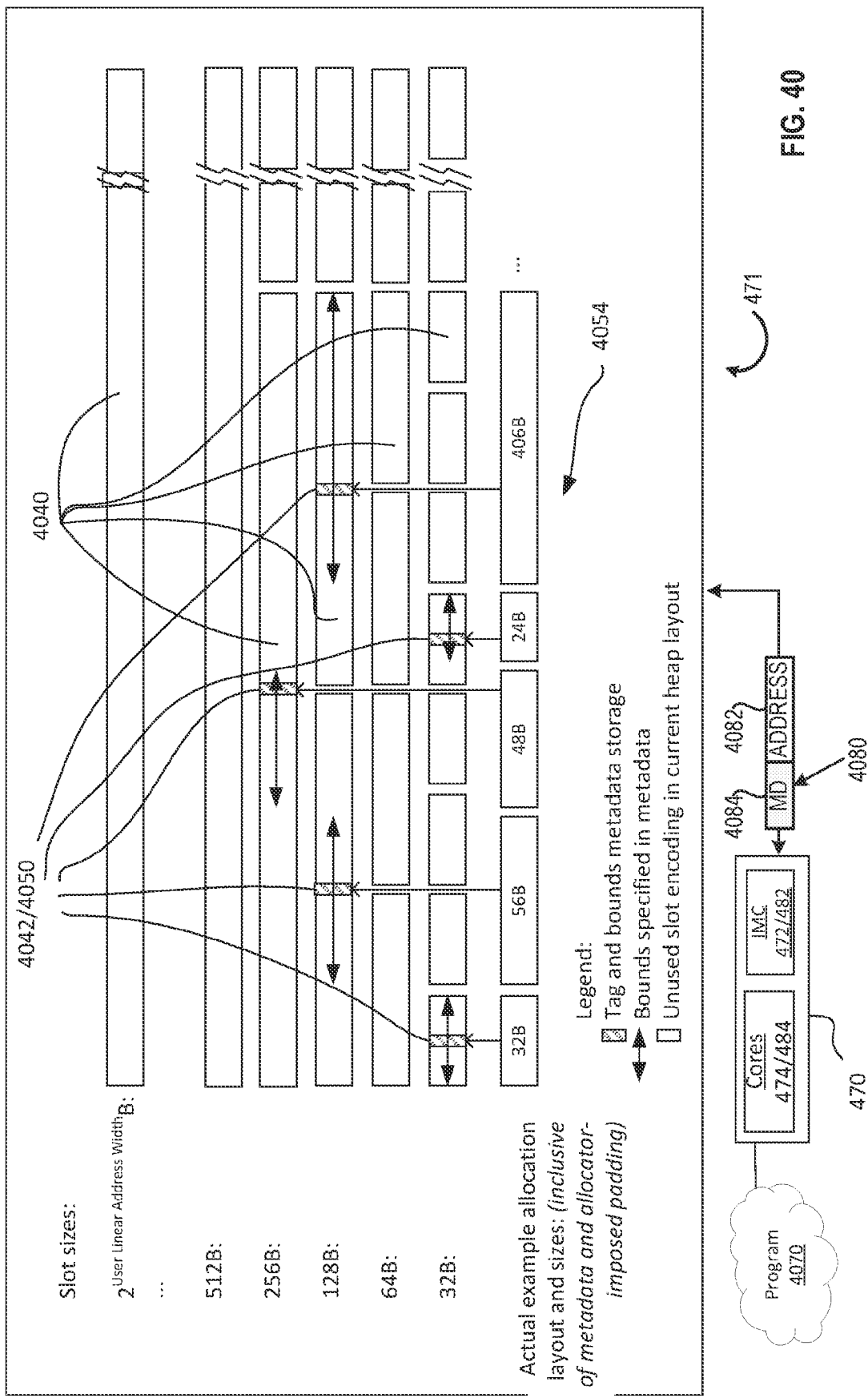
FIG. 40 is a schematic illustration of a memory allocation security check system according to an embodiment.

FIG. 40 is a schematic diagram of an illustrative memory circuitry/cache circuitry 471 (similar to cache 471 or 481 or to memory 432 or 434 of FIG. 4) to allow security checks on memory allocations along with processor circuitry (for example similar to cores 474 or 484 of FIG. 4), and memory controller circuitry 4020 (similar to IMC 472 or 482 of FIG. 4). Although embodiments are not so limited, in the shown embodiment of FIG. 40, the memory circuitry/cache circuitry 471 may be apportioned into one or more power of two (i.e., $2^0$ to $2^n$) slots 4040 in which the respective midpoint address 4042 includes respective, unique, metadata 4050 that is associated with the respective memory allocations 4054 within slots 4040, in accordance with at least one embodiment described herein.

In some embodiments, an instruction that causes the processor circuitry (such as cores 474/484 of FIG. 4) to perform a memory operation causes the memory controller circuitry (such as IMC 472/482 of FIG. 4) to access the memory circuitry/cache circuitry 471 using a pointer 4080 that includes at least data representative of the address 4082 for the memory operation and metadata 4084 associated with the respective memory allocation 4040 corresponding to memory address 4082. The metadata 4084 is compared to metadata 4050 stored at the midpoint address 4042 of the respective memory allocation 4040. If the pointer metadata 4084 matches the stored metadata 4050 within the memory allocation 4040, the operation at the designated memory address 4082 is permitted. If the pointer metadata 4084 fails to match the stored metadata 4050 within the memory allocation 4040, an exception is returned to the processor 470.

It is to be noted that when a comparison of metadata is described in this section, the comparison is not meant to be viewed in a restrictive manner, and is meant to encompass comparison of all or part of the metadata (such as tag data, compartment ID, etc.) in the pointer with metadata associated with the object for which an access control is to be implemented.

In the embodiments of the memory circuitry/cache circuitry 471 of FIG. 40, each object 4054 is fully assigned to a given slot (i.e. one object per slot and one slot per object), in this way ensuring that the metadata 4050 at the midpoint can be easily associated with the object to which it pertains. Embodiments are however not so limited, and include within their scope the provisional of metadata, compartment ID and bounds information at a cache line that includes none, some, or all of the object to which the metadata pertains. The objects 4054 are shown in FIG. 40 once at the bottom of the figure, and represented correspondingly by double pointed arrows within the respective slots 4040 themselves. Even though the objects 4054 may be in slots larger than the allocations themselves, the allocations may, according to one embodiment, not need padding in order to be placed within the larger slots. According to some embodiments, the object may be allocated to a slot that most tightly fits the object, given the set of available slots and objects. In the shown embodiment of FIG. 40, for example, the 32B object 4054 is allocated to a 32B slot 4040, the 56B object to a 128B slot 4040, the 48B object to a 256B slot, the 24B object to a 32B slot and the 96B object to a 128B slot. In the shown example of FIG. 40, because the 48B object would have crossed an alignment boundary within two slots, it is assigned to the larger 128B slot. Although the shown example of FIG. 40 shows the objects as spanning through the slots in a contiguous fashion (tightly packed), clearly, embodiments are not so limited, and include within their scope an allocation scheme of objects to respective, dedicated memory slots as long as a midpoint address of the slot is crossed by the object, where some slots may be free, especially for example in UAF scenario where a dangling pointer is involved. According to some embodiments, object sizes may be no smaller than half the width of a smallest slot in order for them to cross (i.e. to at least partially cover) the midpoint when assigned to a slot.

Based on the above allocation scheme, where each object is uniquely assigned to a dedicated slot, and crossed the slot midpoint, the metadata 4050 may be located at the midpoint address of the slot in order to allow the processor to find it quickly, without having to go to a separate table or memory location to determine the metadata. Current approaches sometimes put the metadata before each allocation, typically in a non-power-of-two scheme, and within each pointer, specify a distance of the pointer address from the beginning of the allocation. However, the pointer has a limited number of bits, and the need to specify the latter distance may overrun the extent of the pointer where the distance is larger than what the pointer can accommodate, that is, where an allocation is larger than one that the bits in the pointer can accommodate. The power-of-two (Po2) approach, used according to one embodiment, allows a unique mapping of each object to a Po2 slot, where the slot is used to provide the possibility to uniquely encode and encrypt each object within it. According to some embodiments, metadata 4050 may be encrypted as well.

To overcome the problem of too long of a distance/offset from the beginning of an allocation as noted above, instead, some embodiments merely specify, in the size field of the pointer, the size of the slot, such as the Po2 size of the slot as a size exponent in the size field of the pointer, that the object to be addressed fits into. The size will determine the specific address bits to be referred to by the processor in order to determine the slot being referred to. Having identified the specific slot, the processor can go directly to the midpoint address of the identified slot in order to read out the metadata, including at least one of bounds information or a compartment ID, and possibly other metadata, such as tag data. Embodiments are however not limited to Po2 schemes for the slots, and may include a scheme where the availability of slots of successively increasing sizes may be based on a power of an integer other than two, or based on any other scheme.

Bounds information stored as part of metadata 4050, where the object is known to always cross the midpoint, may be expressed as the LB and UB with the midpoint as the point of reference for the LB and UB, and can be used regardless of the size of the slot and in order to allow, among other things, a detection of buffer overflow. Advantageously, because the bounds information in the shown embodiment is stored in with the object in a slot (although embodiments are not so limited), it can be, at substantially the same time as the object itself, made available to the processor, in this manner making memory operations more efficient than those of the prior art. Bounds information, according to some embodiments, allow a determination of the location of the allocation based on known midpoint reference and without the need to take up a large number of bits in the pointer where the slot and/or the allocation itself are large, especially where the number of bits in the pointer may not be sufficient to support a distance of the pointer value from the beginning of the allocation. A Po2 scheme as shown by way of example in FIG. 40 provides a compact encoding scheme where, every time a value is added in the size exponent field of the pointer, the slot size being referenced is doubled, instead of a linear scaling as afforded by the provision of distance information from a pointer value to the beginning of a referred to object. Thus, a limited size field can, in a Po2 scheme can be used to designate much larger slot sizes and objects as schemes of the prior art.

Although the memory controller circuitry 472/482 is depicted in FIG. 40 as a separate box from the processor circuitry 470, in some embodiments, the processor circuitry 470/480 may include all or a portion of the memory controller circuitry 472/482.

In response to execution of an instruction causing a memory access operation, the processor circuitry 470 generates an encoded pointer 4080 that includes at least data representative of the memory address 4082 involved in the operation and data representative of the metadata 4084 associated with the memory allocation 4040 corresponding to the memory address 4082. The encoded pointer 4080 may include additional information, such as data representative of the size of the memory allocation 4040 and pointer arithmetic as described below in detail with regard to FIG. 41.

In some embodiments, the core 474/484 may metadata 4084 carried by the encoded pointer 4080 with metadata 4050 stored at the midpoint address 4042 of the memory allocation 4040. The core 474/484 may further perform bounds checks and/or a compartment ID check using the metadata 4050 stored at the memory location. If the metadata 4084 carried by the encoded pointer 4080 matches the metadata 4050 stored at the midpoint address 4042 of slot 4040, and further if bounds checks comparing the address 4082 against the bounds information, and/or a compartment ID check comparing the compartment ID stored in metadata 4043/4050 and contents of a current compartment ID register present a match, the core 474/484 completes the requested operation. If the metadata 4084 carried by the encoded pointer 4080 fails to match the metadata 4050 stored at the midpoint address 4042 of slot 4040, and/or if bounds checks on the address and/or a compartment ID check fails to return a match, the core returns an exception to the processor circuitry 470.

The memory circuitry/cache circuitry 471 may include any number and/or combination of electrical components, semiconductor devices, optical storage devices, quantum storage devices, molecular storage devices, atomic storage devices, and/or logic elements capable of storing information and/or data. All or a portion of the memory circuitry/cache circuitry 471 may include transitory memory circuitry, such as RAM, DRAM, SRAM, or similar. All or a portion of the memory circuitry/cache circuitry 471 may include non-transitory memory circuitry, such as: optical storage media; magnetic storage media; NAND memory; and similar. The memory circuitry/cache circuitry 471 may include one or more storage devices having any storage capacity. For example, the memory circuitry/cache circuitry 471 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 40, the IMC 472/482 apportions the memory circuitry/cache circuitry 471 into any power of two number of slots 4040. In some embodiments, the IMC 472/482 may apportion the memory circuitry/cache circuitry 471 into a single memory slot 4040 (i.e., a power of two=$2^m$, for a value of m that results in the entire system memory being covered). In other embodiments, the IMC 472/482 may apportion the memory circuitry/cache circuitry 471 into two memory slots 4040 (i.e., a power of two=$2^{m-1}$). In other embodiments, the IMC 472/482 may apportion the memory circuitry/cache circuitry 471 into four memory slots 4040 (i.e., a power of two=$2^{m-2}$). In other embodiments, the IMC 472/482 may apportion the memory circuitry/cache circuitry 471 into "n" memory allocations 4040 (i.e., a power of two=$2^k$ for a value k that results in dividing the memory space into "n" slots). Importantly, note that the midpoint address 4042 in each of the memory slots 4040 does not align with the midpoint address in other memory slots, thereby permitting the storage of metadata 4050 that is unique to the respective memory slot 4040s. In some embodiments, the metadata 4050 may include any number of bits. For example, the metadata 4050 may include 2 bits or more, 4-bits or more, 6-bits or more; 8-bits or more, 16-bits or more, or 32-bits or more.

The encoded pointer 4080 includes the memory address 4082 to perform a memory operation (fetch, store, etc.). The memory address 4082 may include any number of bits. For example the memory address 4082 may include: 8-bits or more; 16-bits or more, 32-bits or more; 48-bits or more; or 64-bits or more; 128-bits or more; 256-bits or more, 512-bits for more, up to 2 to the power of the linear address width for the current operating mode, e.g. the user linear address width-bits in terms of slot sizes being addressed. In embodiments, the metadata 4084 carried by the encoded pointer 4080 may include any number of bits. For example, the metadata 4084 may include 4-bits or more, 8-bits or more, 16-bits or more, or 32-bits or more. In embodiments, all or a portion of the address and/or tag data carried by the encoded pointer 4080 may be encrypted. In embodiments, the metadata 4050A-4050n may be loaded as a cache line (e.g., a 32-Byte block, 64-Byte block, or 128-Byte block, 256-Byte block or more, 512-Byte block, or a block size equal to a power of two-Bytes) into the processor cache circuitry 4012. In such embodiments, in performing memory operations on data stored in the processor cache circuitry 471/481, the IMC 472/482 or other logic, e.g. in processor circuitry 470, compares the metadata 4084 and other relevant information such as the address 4082 and the contents of the current compartment ID register with the metadata 4050 stored on the cache line containing the requested memory address.

For memory operations occurring at memory addresses before the midpoint address 4042 of the allocation 4040 (i.e., the "hidden" address containing the tag data in metadata 4050), upon successful verification of the metadata 4050 with the metadata 4084 associated with the memory allocation 4040, the pointer 4080 may simply perform the operation at the indicated memory address 4082. For memory operations occurring at memory addresses after the midpoint address 4042 of the allocation 4040, the encoded pointer 4080 may be offset based on the size of the metadata 4050 stored in the memory allocation 4040. Thus, the presence of the metadata 4050 is "hidden" by the processor circuitry from software having access to the metadata using the encoded pointer 4080.

Figure 41:
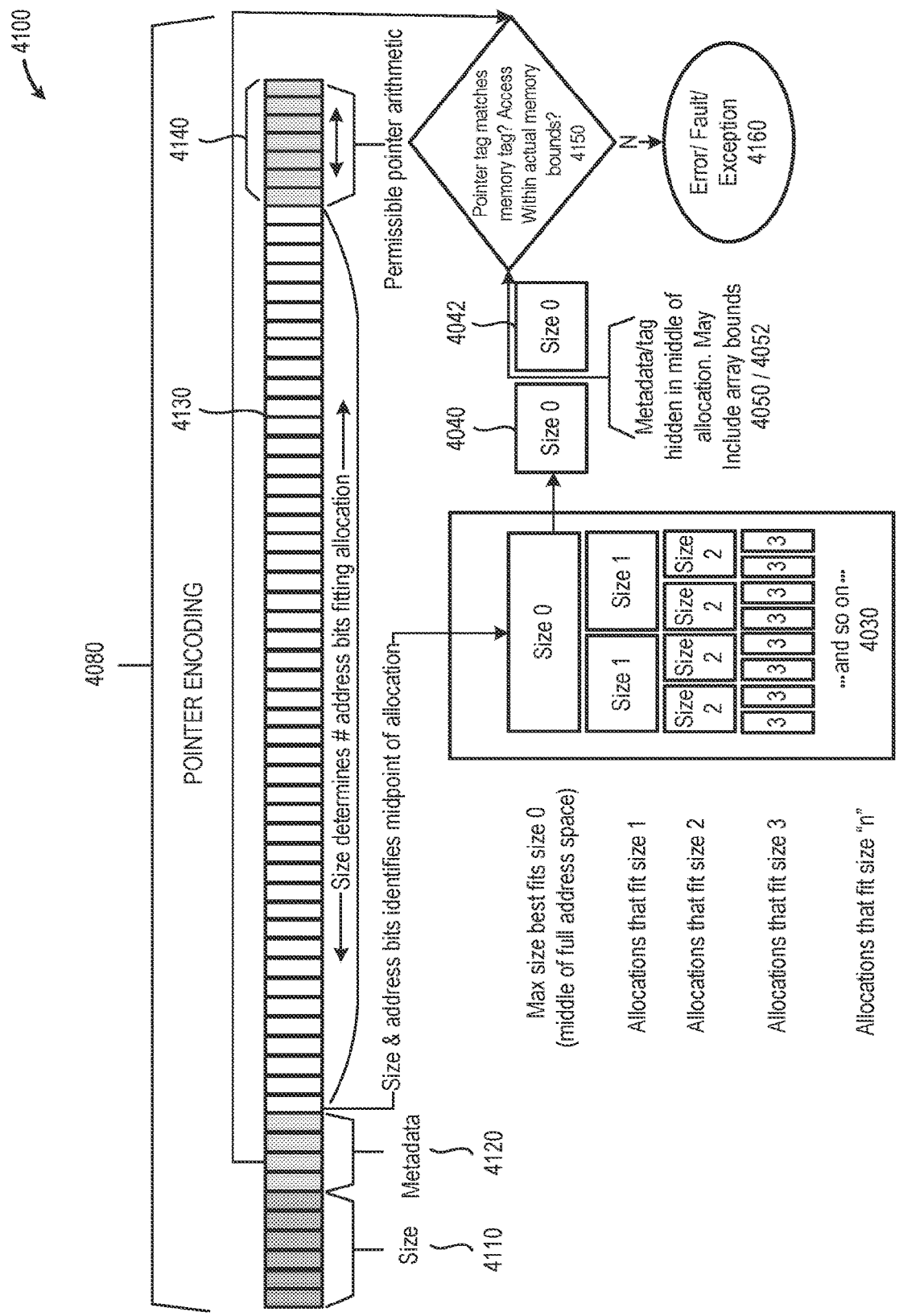
FIG. 41 is a schematic diagram of an illustrative encoded pointer architecture according to one embodiment.

FIG. 41 is a schematic diagram of an illustrative encoded pointer architecture 4100 in which the encoded pointer 4080 includes a multi-bit memory allocation size field 4110, a multi-bit optional metadata field 4120 (such as tag data field), a multi-bit address field 4130, and a multi-bit pointer arithmetic field 4140. As depicted in FIG. 41, the encoded pointer 4080 may include any size pointer, such as, for example, a 64-bit pointer, or a 128-bit pointer, or a pointer that is larger than 128-bits. The encoded pointer, in one embodiment, may include a x86 architecture pointer. The encoded pointer 4080 may include a greater (e.g., 128-bits), or lesser (e.g., 16-bits, 32-bits) number of bits. In embodiments, the number of bits used in the address field 4130 may be based on the size of the respective memory allocation 4040 as expressed in the size field 4110. For example, in general, a larger memory allocation ($2^0$) may require a lesser number of address bits than a smaller memory allocation ($2^1$ to $2^n$). The address field 4130 may include any number of bits, although, it is noted that, in the shown embodiment of FIG. 40, the size number in fact does not correspond to the Po2 slot size. For example, the address field 4130 may accommodate memory addresses having: 8-bits or more; 16-bits or more, 32-bits or more; 48-bits or more; 64-bits or more; 128-bits or more.

Referring still to FIG. 41, the size field 4110, in combination with the information in the address field 4130, will allow the processor to find the midpoint of a given slot. The specific address bits in the address field 4130 are determined by the size indicated in the size field. For a Po2 scheme, where the size field includes size exponent information, as the size exponent becomes larger (for larger slots), fewer address bits are needed to identify a particular slot (since with larger slots, there will be fewer slots to identify). In such a case, more of the bits at the end of the pointer, in the pointer arithmetic field 240, can be used to range within a given slot. The latter leads to a shrinking of the address field.

As noted previously, use of metadata field 4120 and of tag data therein is optional. Tag data in a pointer allows multiple versions of a pointer to be used pointing to the same slot, while still ensuring that the pointer version being used to access the slot is in fact the pointer with the right to access that slot. The use of tag data can be useful for mitigating UAF attacks for example. Where a dangling pointer is involved, but where tag data is used, changing tags with each version of the pointer would result in a mismatch with an allocation sought to be accessed by a dangling pointer, leading to errors and thus protecting the new allocation from unauthorized access by the dangling pointer.

Tag data in the pointer may be avoided, for example where other mechanisms are used to ensure the right of the pointer to access an object, such as where integrity checks are used. For example, integrity checks may provide a measure for use in checking the integrity of at least a portion of an object, such as data, after it is decrypted and/or decompressed. More specifically, a measure including an integrity value may first be associated with at least a portion of an object before the object is compressed and/or encrypted and stored in a slot. For example, an integrity value may include an integrity check value (ICV) (e.g., a hash), a message authentication code (MAC) (e.g., the same MAC produced when the same message, secret key, and initialization vector used), a message integrity code (MIC) (e.g., the same MIC produced if the same algorithm is used), a signature (e.g., produced using a private key of a key pair), hash message authentication code/HMAC (e.g., SHA3 HMAC), and so on, or combinations thereof. After a subsequent decryption and/or decompression of the object within a given slot, the same type of measure may be taken of the recreated object and compared to that type of measure that was originally taken of the original object to determine if the original object, as stored, has in any way been altered since being stored within the storage.

According to another embodiment, a value may be stored as part of data to indicate, when accessed, whether the memory location corresponding to the data is freed or allocated. The latter mechanism would not need additional information in the pointer, such as tag data that would need a comparison with the tag information in the metadata 4050.

In embodiments, the size data field 4110 may include any number of bits. For example, the size data may include: 2-bits or more; 4-bits or more; 6-bits or more; or 8-bits or more. The size data field 4110 provides an indication of the size of the memory allocation 4040. The metadata field 4120, when present (it is to be noted that a tag field is optional according to embodiments) may include any number of bits. For example, the size data field 4110 may include: 4-bits or more, 6-bits or more; 8-bits or more, 16-bits or more, or 32-bits or more. The encoded pointer 4060 also includes a permissible pointer arithmetic field 4140. The permissible pointer arithmetic field 4140 may include any number of bits. For example, the pointer arithmetic field 4140 may include: 4-bits or more, 6-bits or more; 8-bits or more, 16-bits or more, or 32-bits or more.

As depicted in FIG. 41, upon execution of an instruction that includes a memory operation, according to one embodiment, the processor circuitry 470 and/or the IMC 472/482 compares at 4150 the metadata 4084 included in the metadata field 4120, the address 4130, and/or the contents of the current compartment ID register with the metadata 4050 stored at the midpoint address 4042 of the memory allocation 4040. If the metadata 4084 included in the metadata field 4120 matches the metadata 4050 stored at the midpoint address 4042 of the memory allocation 4040, and the other metadata checks also succeed, then the processor circuitry 470 and/or the IMC 472/482 completes the requested memory operation in the memory circuitry/cache circuitry 471 at operation 270. According to some embodiments, the metadata 4050 may include at least one of bounds information and a compartment ID corresponding to a tenant with permission to access the object associated with the metadata. If the metadata 4084 included in the metadata field 4120 fails to match the metadata 4050 stored at the midpoint address 4042 of the memory allocation 4040, the IMC 472/482 reports an error, fault, or exception 4160 to the processor circuitry 470. In some embodiments, allocation bounds metadata may be included in metadata 4050. In such embodiments, the IMC 472/482 may also check whether the memory access is within the specified bounds. The bounds information may include coordinates of a memory allocation—e.g., offset and array size, or actual allocation size to the left and allocation size to the right of a bounding box midpoint.

Figure 42:
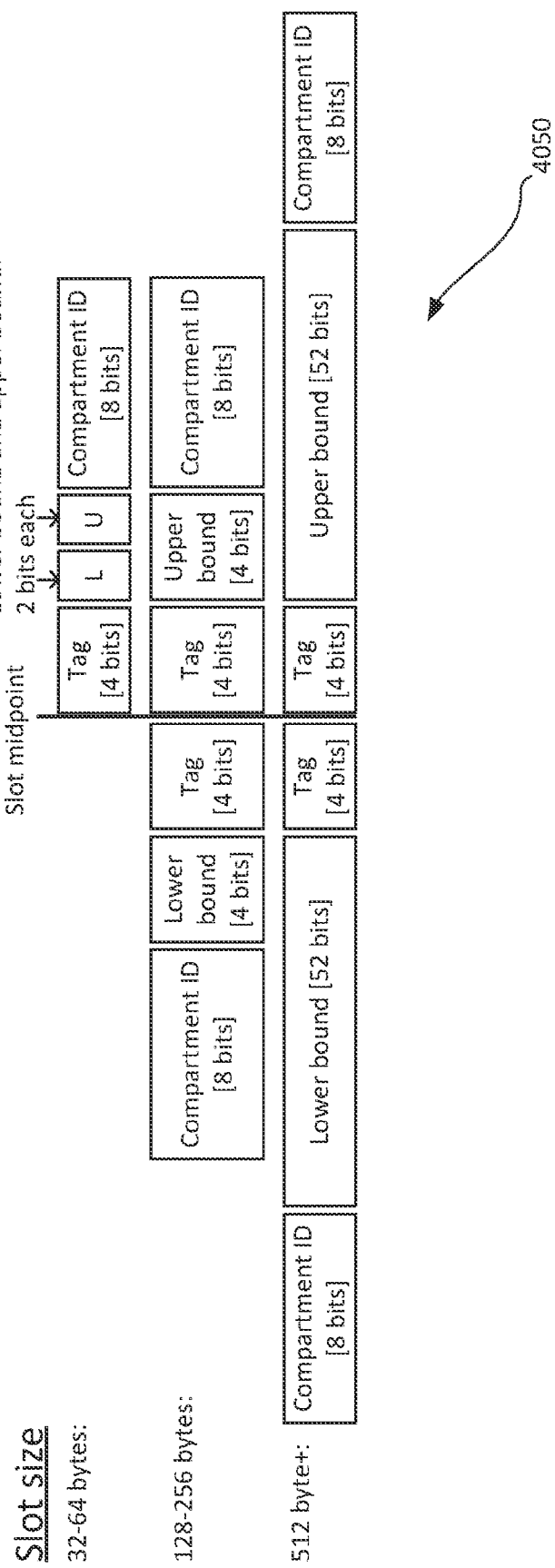
FIG. 42 is an expanded view of an embodiment of the metadata of FIG. 9 for different ranges of slot sizes.

Referring now to FIG. 42, the figure provides an expanded view of an embodiment of the metadata 4050 for different ranges of slot sizes. In the shown example, slot sizes of 32 to 64 Bytes include tag data, LB and UB on one side of and adjacent to the midpoint 4042, with 1 Byte allocated to LIM if no compartment ID is used, and 2 Bytes allocated to LIM where compartment ID is used. The LIM in this case includes a 4 bits of tag data, 2 bits each for the LB and UB, and possibly 4 bits for the compartment ID. In the shown example, slot sizes of 128 to 256 Bytes include tag data, LB and UB on both sides of and adjacent to the midpoint 4042, with 2 Bytes allocated to LIM if no compartment ID is used, and 4 Bytes allocated to LIM where a compartment ID is used. The 2 Byte LIM in this case includes 8-bits of tag data straddling the midpoint, and 4 bits each for the LB and UB, and a total of 16 bits for the compartment ID. In the shown example, slot sizes above 512 B include tag data, LB and UB on both sides of and adjacent to the midpoint 4042, with 10 Bytes allocated to LIM (with 8 bits of tag data straddling the midpoint, and 60 bits each for the LB and UB where no compartment ID is used, and 52 bits each for the LB and UB where the compartment ID is used, where the compartment ID is 1 Byte at each side of the midpoint where used), and a total of 16 bits for the compartment ID. The metadata may be set using ordinary memory accesses or specific instructions that accept input operands specifying the slot whose metadata should be updated and the values for the metadata. A compartment should not be permitted to update metadata for a different compartment, so the processor should first check that the previous value of the compartment ID in the stored metadata matches the value of the current compartment ID register prior to permitting an update of any of the stored metadata. Privileged software or a trusted portion of unprivileged software may be permitted to override the check for the previous value of the compartment ID.

In the LIM metadata embodiments of FIGS. 40-42, according to one aspect, the metadata may thus, as suggested in the storage format of FIG. 42, be stored such that at least some of the metadata (such as, in the shown case, the tag metadata and the compartment ID metadata) is duplicated about the slot midpoint. This duplicated format for metadata allows the pointer to access one side of a cache line or page boundary (referring to cases in which the midpoint coincides with a cache line or page boundary) to perform one or more checks on the metadata without the necessity to access the other side of the cache line or page boundary. The duplication thus allows the processor to avoid having to look up metadata in multiple cache lines or pages, especially for larger allocations. The metadata, including the tag data if it is there, but in any event including at least one of bounds information or a compartment ID, may, according to one embodiment, be encrypted. In one embodiment, only part of the metadata 4050 may be encrypted, such as only tag data when present, or only the bounds information, or other parts of the metadata.

The bounds information allows an integrity check (where an integrity value is used as explained above) or other access control mechanisms to be performed based on the actual extent of the allocation within a slot. The bounds information provided to the processor allows the processor to ensure that the offset within the pointer to specify a given location in the slot is within the bounds of the object that is assigned to the slot for which the access control is to be performed.

The bounds information is useful at least because other allocations may be overlapping the same memory range covering a number of slots. The bounds pointers corresponding to a slot are allowed to use only the specified range of memory designated in the bounds information. Bounds information is also related to the concept of access control mechanisms such as integrity checks. When integrity values are being calculated, the bounds information allow the processor to determine the extent of the objects within the memory for which the integrity values are being calculated.

According to one embodiment, there is one copy of the bounds information maintained for every allocation, as shown in FIG. 42. Current mechanisms pack bounds information into pointers, but some embodiments put the bounds information together with the allocation in memory slots. Storing bounds information in memory slots along with the allocation as part of the metadata advantageously obviates the need for expanded pointers and multiple copies of the bounds information where the bounds information is stored in the pointers themselves. The latter disadvantageously leads to expanded pointers, increasing the amount of memory necessary to store the pointers, increasing processing overhead and the need to expand register states. The pointer needs to only contain offsets regarding finding the objects and associated metadata, but would not need to include the metadata itself, noting that pointers including the metadata are typically called capabilities. The bounds information could, according to one embodiment, go through a cryptographic transformation (be encrypted) when stored in the slots.

Referring still to FIG. 42, according to an embodiment, compartment identification information (compartment ID) information may be added as part of the metadata to support zero copy data sharing across cryptographically isolated compartments.

Thus, in the embodiment of FIG. 42, isolation can be supported at arbitrary levels of granularity such as, for example, isolation between virtual machines, isolation between applications, isolation between functions, isolation between threads, or isolation between data structures (e.g., few Byte structures). Compartment IDs are useful in multi-tenant environments, where each tenant has access to its own private objects and where at least some tenants have the ability to delegate access to their private objects by other tenants. The processor may compare the compartment ID accessed in the metadata 4050 against a current compartment ID value in a dedicated register, such as one situated in the core 474b/484b, or via a general purpose register, although a dedicated register may be preferable according to some embodiments. The dedicated register may be analogous to a model specific register (MSR) changeable by the process/program itself optionally in addition to being changeable by the operating system (OS), as opposed to a general purpose register that is more readily accessible, such as from usermode. MSRs are normally only accessible from privileged software, such as the OS or VMM, although some embodiments contemplate having a MSR-type dedicated register(s) to store compartment IDs that are accessible by unprivileged software. According to some embodiments, the dedicated register may include one or more dedicated registers. Once the compartment ID accessed by the pointer is checked against a current compartment ID value in the dedicated register, if a match takes place, this allows the tenant using the pointer to access the object associated with the metadata including the given compartment ID. If there is no match, the tenant cannot access the object associated with the metadata. Compartment IDs may be shared between various tenants in order to allow sharing of objects between those tenants when accessing the objects within the memory slots. The use of compartment IDs allows multi-tenant usages, where the core can allow access to the same objects by mutually distrustful tenants in order for the objects to be exchanged between the tenants.

In some embodiments, where contention arises for the pointer bits allocated to the size field 4110, for example where 6 bits may not be able to be allocated to the size exponent, the processor may be configured to guess the value of missing size bits by first using the available size bits, and thereafter guessing values of remaining bits for the slot sizes by trying different values for the remaining bits and determining whether the guessed values result in a match with values in the metadata 4050. If a match takes place, then access to the objects corresponding to the metadata would be allowed. The mechanism involving guessing some of the size bits in order to gain pointer access to an object reduces security by increasing the probability that an attacker could forge the.

Figure 43:
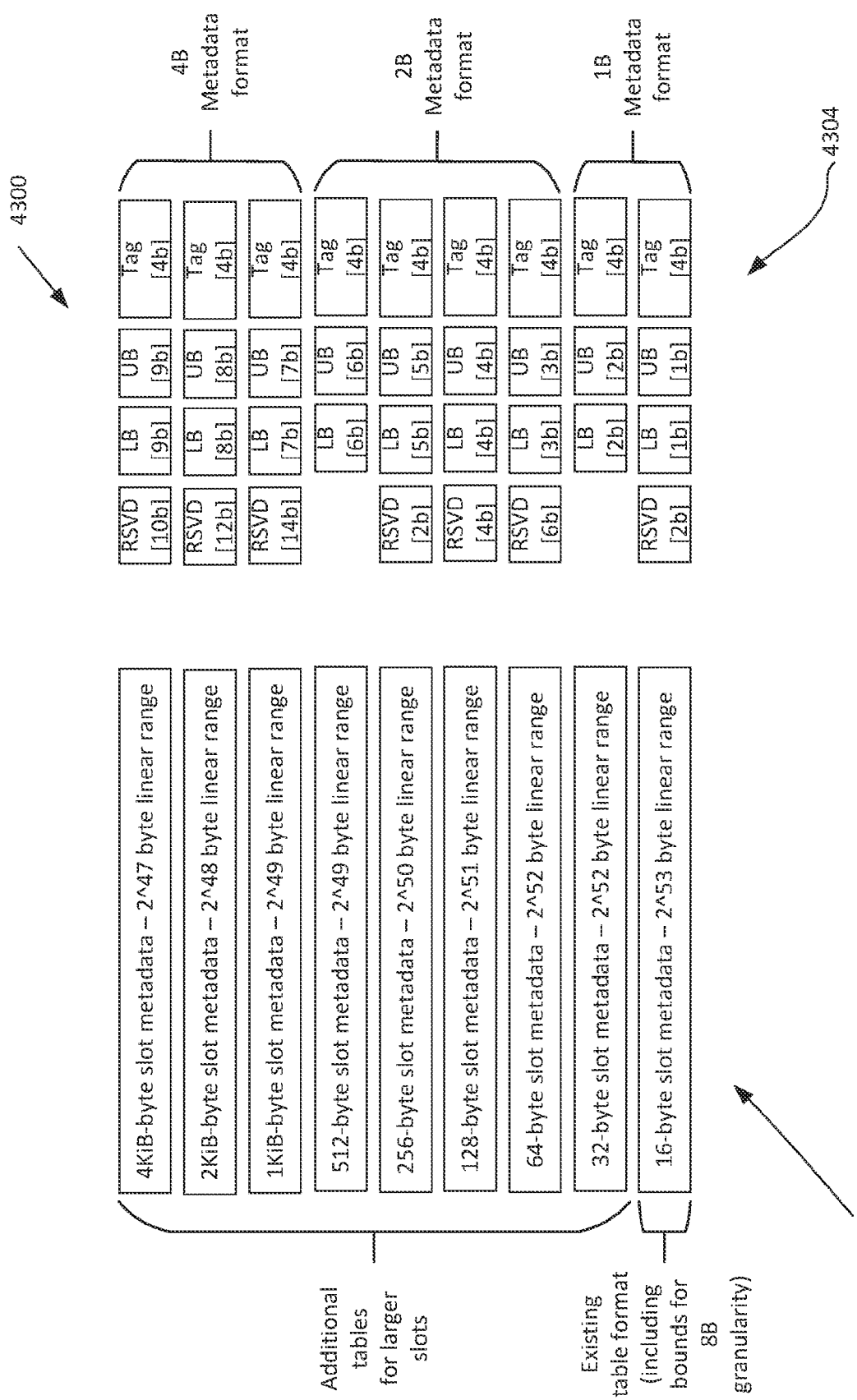
FIG. 43 is an illustration of metadata stored in tables separate from the linear memory layout of FIG. 41, according to some embodiments.

Reference is now made to FIG. 43, where, according to an embodiment, metadata corresponding to objects may be stored in tables separate from the linear memory layout (slots) shown in FIG. 42. In the shown metadata tables 4300 of FIG. 43, metadata for each object is stored not in-line with the object within a memory slot, but in a dedicated metadata table, with the table format 4302 corresponding to a granularity 4304 based on an associated granularity of the object to which the stored metadata pertains. The granularities 4304 represented in the embodiment of FIG. 43 include power of two granularities including 16 Bytes, 32 Bytes, 64 Bytes, 128 Bytes, 256 Bytes, 512 Bytes, 1 KiBytes, 2 KiBytes, and 4 KiBytes, although embodiments are not so limited, and include within their scope the provision of different sets of granularities irrespective of any particular order of granularity change. In the embodiment of FIG. 43, although the metadata is not stored in-line with the objects within cache memory slots, the pointer may still be used to refer to a location storing the metadata, instead of the pointer itself carrying the metadata, in this way avoiding the need to copy the metadata along with the pointer, similar to the advantageous embodiment of FIG. 42 described above.

As noted previously, currently, some mechanisms are provided to allow a pointer to identify where to access metadata (not including bounds information or compartment ID) within a metadata table of 16 Bytes granularity, including bounds of 8 Bytes of granularity. However, existing mechanisms would require the storing of metadata for every 16 Byte granule in a fixed size metadata table, leading to performance and memory use overhead when looking up the metadata pertaining to each granule. Existing approaches either require padding objects out to page granularity (e.g. 4K) resulting in a great deal of wasted memory due to padding, or they duplicate memory for small data granules (e.g. a duplicate for every 16B of data) resulting in a great deal of wasted memory due to duplicated metadata. This is especially acute when expanding the metadata to include a compartment ID (e.g. 16 bits of metadata).

In the shown embodiment of FIG. 43, a metadata table providing a fixed size granule is advantageously avoided by providing instead a number of metadata tables configured to store metadata in corresponding table formats according to respective memory slot sizes/granules, where each slot size that is used as a basis for a format of the metadata table corresponds to a memory slot size in which the allocation corresponding to the metadata is stored.

Referring still to FIG. 43, a commonality between the LIM option of FIG. 42 and the metadata table option of FIG. 43 is that, in the metadata table option, the number of bits corresponding to each slot size or granularity can increase or decrease with the granularity. According to some embodiments, the storage format of the metadata may not necessarily involve duplication of information about a midpoint location within memory, contrary to the embodiment for the storage format of some of the in-line metadata as shown by way of example in FIG. 42.

According to some embodiments, the pointer may indicate the granularity for a given object for which metadata is to be accessed in the metadata table, for instance by providing the same in its size field 4110, or by providing range information in its linear address space 4130, where all objects within given ranges would be known to correspond to a given granularity (FIG. 41). The ranges may be stored in a register, such as in a model specific register (MSR). In such a case, the processor may use the pointer address information to locate and determine a corresponding range stored in the MSR, and may then determine based on the determined range, for example by consulting a table, the size exponent corresponding to that range. Once the size exponent (slot size) is determined, a corresponding metadata table may be selected for the metadata based on its correlation with the determined slot size.

Regardless of how a metadata table is selected in the embodiment of FIG. 12, whether by virtue of a bit in the size filed, or by virtue of ranges identified in the linear address field of the pointer, the embodiment of FIG. 43 advantageously avoids the need for the processor, when reading objects within cache lines, to skip over inline metadata pertaining to those objects, and thus, addresses used to access the objects would not need to be adjusted accordingly, thus simplifying processor operations. Where the metadata is stored in-line with objects in cache slots, the processor may add the size of the metadata when generating a linear address for a program to access an object in a cache line in order to present the program from accessing the metadata directly, as the processor is the entity that is responsible for checking access rights based on the metadata. It is to be noted that the embodiment of FIG. 43 may be used in conjunction with that of FIG. 42, in that a processor may be configured to access metadata at least one of in-line or in a selected metadata table. Where a selectable metadata is used as set forth in the example of FIG. 43, the processor would have to go through two operations, accessing an object in-line, and accessing the metadata in a selected metadata table, instead of one operation where the metadata is stored in line. According to some embodiments, a processor may be configured to function using both modalities at the same time, accessing metadata in-line for some objects, while accessing metadata in selected metadata tables for other objects. The pointer format itself may be the same when using either the in-line metadata format or the metadata table format for storing the metadata, although the information encoded within the pointers may be different for each. In certain instances, where slot sizes and object sizes may be such that objects may overrun a page boundary, it may be advantageous to use the metadata table option as opposed to the in-line metadata option in order to avoid slowed performance. A concern in the latter scenario is that inserting metadata may cause an object that would otherwise fit on a page to no longer fit on a page.

The embodiment of FIG. 43 may lay out metadata in memory identically to the in-line metadata table, or it may use a layout that groups metadata for each slot size in a contiguous range of memory. Any type of metadata that could be stored using the in-line metadata table can alternatively be stored in the embodiment of FIG. 43, e.g. tag, bounds, compartment ID, key ID, tweak, counter, MAC, ECC, etc.

The in-line metadata option of FIGS. 40-42 may be advantageously accessed by the processor, along with the object to which the metadata pertains, in a single memory operation rather than two separate memory operation as would be the case with a metadata table, in this way yielding better performance. In addition, the in-line metadata approach makes the object and the corresponding metadata available to the processor substantially simultaneously, and thus mitigates any security issues that may arise from the object and the metadata arriving at the processor at different times, especially where the processor may be subject to speculation attacks (by virtue of not having all of the needed information in order to perform access control on the object before accessing the same), and therefore. Any metadata that was described above for in-line storage in relation to the embodiment of FIGS. 40-42 may be stored in a metadata table format as described with respect to the embodiment of FIG. 43. In addition, a metadata table according to embodiments may support any arbitrary size of metadata.

According to some embodiments, whether the embodiment pertaining to in-line metadata is used, or that pertaining to metadata tables, hidden in-line metadata may be used for an object, where the metadata pertaining to the object is repeated on every cache line. Hidden in-line metadata may be useful especially when an object is too large (spanning for example multiple pages) to be accommodated by a single cache line. In such cases, the processor may perform an access control on the object using local metadata, such as through a tag check or integrity check by way of example, and, if the local access control does not yield a match, the processor may then access the midpoint to find the bounds of the object. The above two-step operation may happen in rare cases where very large object (e.g. those exceeding one page of memory) are stored on cache lines.

Figure 44:
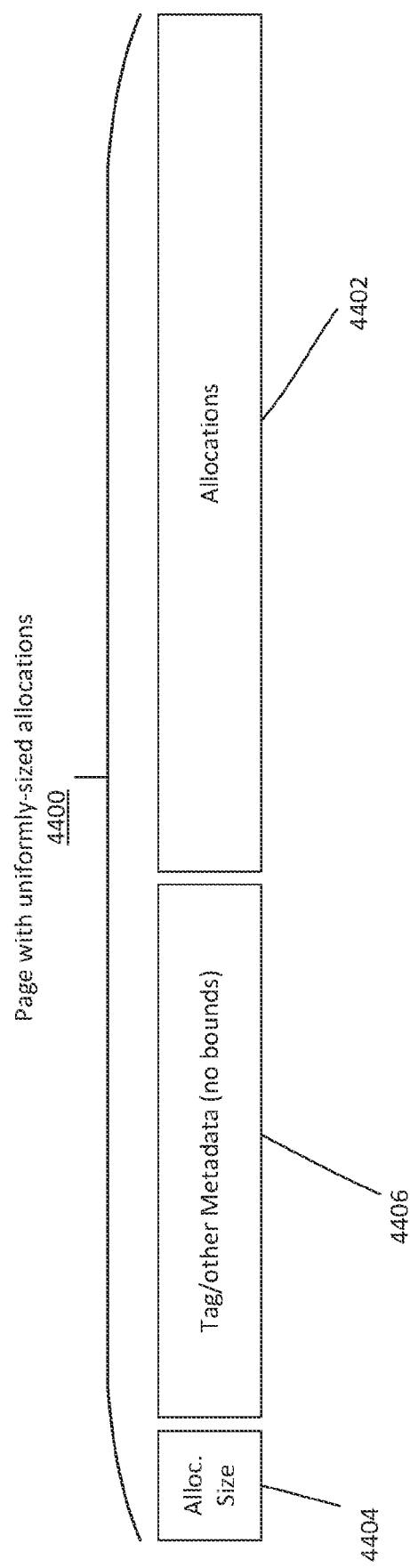
FIG. 44 is an illustration of a page storing allocations of a same size where the metadata is stored in the same page, according to an embodiment.

Reference is now made to FIG. 44, which shows an alternative embodiment for accessing metadata without storing the metadata in a pointer to the object being referenced. In the embodiment of FIG. 44, a memory allocator may pack allocations 4402 of a same size into corresponding pages, and avoid the overhead of storing bounds pertaining to the allocation by instead indicating, for each page 4400 to be accessed, the uniform allocation size 4404 at a beginning of the page, optionally also packing metadata 4406 including at least one of bounds information, compartment ID 4406 tightly with good locality at a beginning of the page. The embodiment of FIG. 44 provides a hybrid between the linear in-line metadata of FIGS. 40-42, and the metadata table of FIG. 43, by keeping metadata closer to the object to which it pertains, although not directly in-line in a cache line carrying the object. In the embodiment of FIG. 44, all metadata is then on a same page as the object to which it pertains. The embodiment of FIG. 44 avoids overheads associated with having metadata in a separate table, where the metadata is likely on a different page than the page storing the object, and where multiple page blocks may be needed to look up address translations for the object versus the corresponding metadata, potentially requiring multiple translation look-aside buffers (TLBs). The embodiment of FIG. 44 advantageously provides a mechanism where a single TLB entry may be needed for locating an object and its metadata, although the two may be ultimately stored on different cache lines. In order to achieve the format of FIG. 44, a memory allocator may take the size of the page, subtract a size of the metadata from the same, and divide the resulting value by the number of uniformly sized allocations that can fit within that page. According to the embodiment of FIG. 44, since the allocations within a page have a uniform size, bounds information is not needed in the metadata, and size information is not needed in a pointer to access the metadata and corresponding allocation. However, any type of metadata that could be stored using the in-line metadata table can alternatively be stored in the embodiment of FIG. 44, e.g. tag, bounds, compartment ID, key ID, tweak, counter, MAC, ECC, etc. An advantage of the embodiment of FIG. 44 is that it avoids the overhead of storing bounds by instead indicating a uniform allocation size at a beginning of a memory page, and further, where tags are used, by allowing a tight packing of the tags at a beginning of the page.

Figure 45:
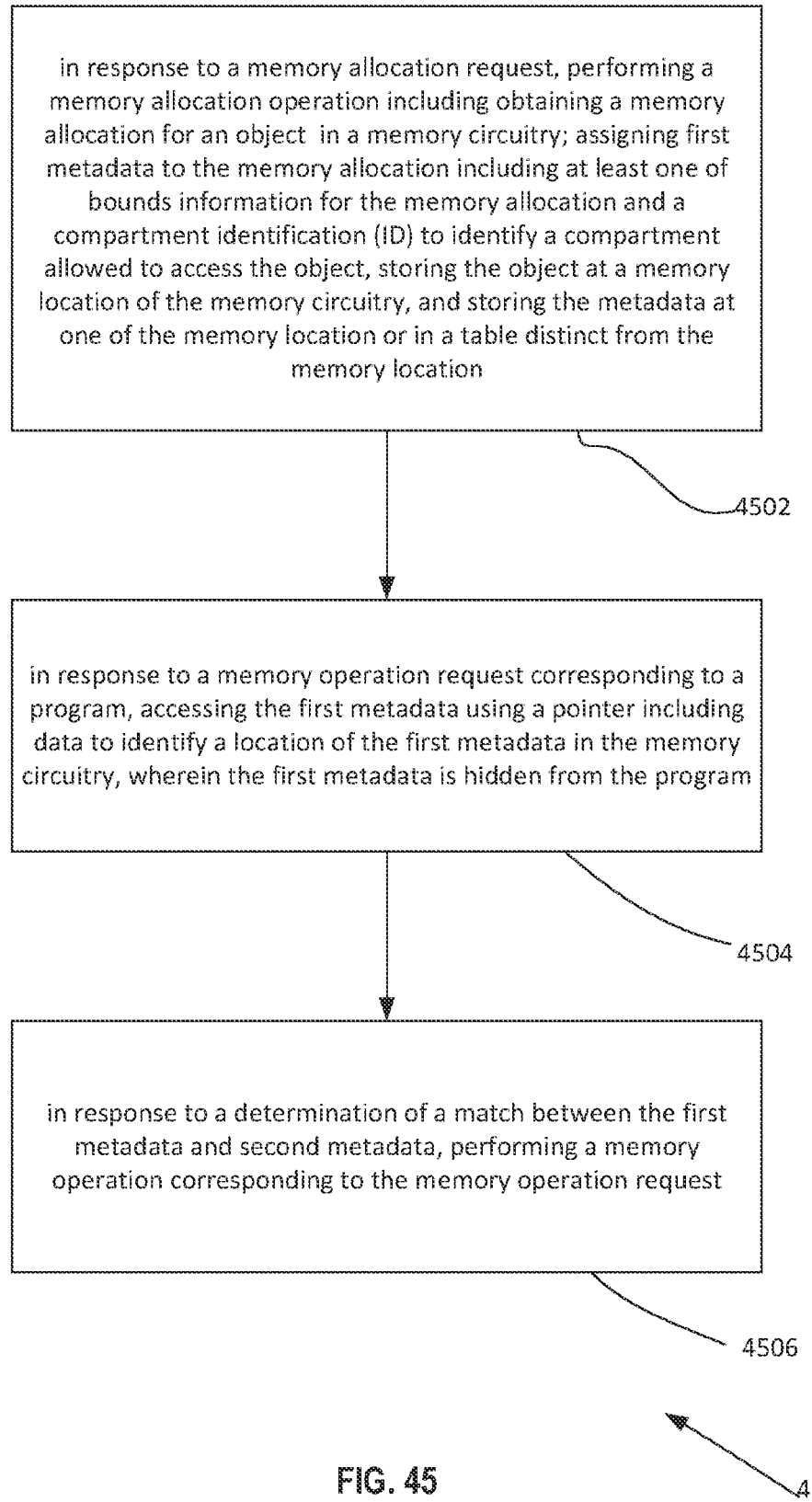
FIG. 45 is a flow diagram of a method according to an embodiment.

FIG. 45 is a flow diagram of a process 4500 according to an embodiment. At operation 4502, the process 4500 includes in response to a memory allocation request, performing a memory allocation operation including obtaining a memory allocation for an object in a memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; at operation 4504, the process 4500 includes in response to a memory operation request corresponding to a program, accessing the first metadata using a pointer including data to identify a location of the first metadata in the memory circuitry, wherein the first metadata is hidden from the program; and at operation 4506, the process 4500 includes in response to a determination of a match between the first metadata and second metadata, performing a memory operation corresponding to the memory operation request.

E. Cryptographic Computing Latency Reduction Using Crypto Cache

Embodiments in this section provide an optimization for cryptographic addressing.

As referred to in this section, a "cache" may refer to cache memory as understood by a person skilled in the art, or to any quickly accessible memory element within a memory hierarchy.

As referred to herein, although a content addressable memory (CAM) circuitry is referred to in the context of storing encrypted linear address-linear address pairs, embodiments are not limited to provision of a CAM circuitry to store the pair. Any memory circuitry that is adapted to store a lookup table of correlated information is thus within the purview of embodiments.

As referred to herein, a translation lookaside buffer (TLB) is a memory register or cache that is used to reduce the time taken to access a memory location. It is typically a part of the chip's memory-management unit (MMU). The TLB stores the recent translations of linear addresses to physical addresses, and can be called an address-translation cache. An example of a TLB is given in the memory unit 370 of FIG. 3, in the form of the data TLB unit 372.

The operands for all arithmetic and logic operations may be contained in registers. To operate on data in main memory, the data is first copied into registers. A load operation copies data from main memory into a register or load buffer, for example before it is copied to cache. A store operation copies data from a register or store buffer into main memory, for example from a cache. Load and store buffers are referred to in this section in the above context.

Figure 46:
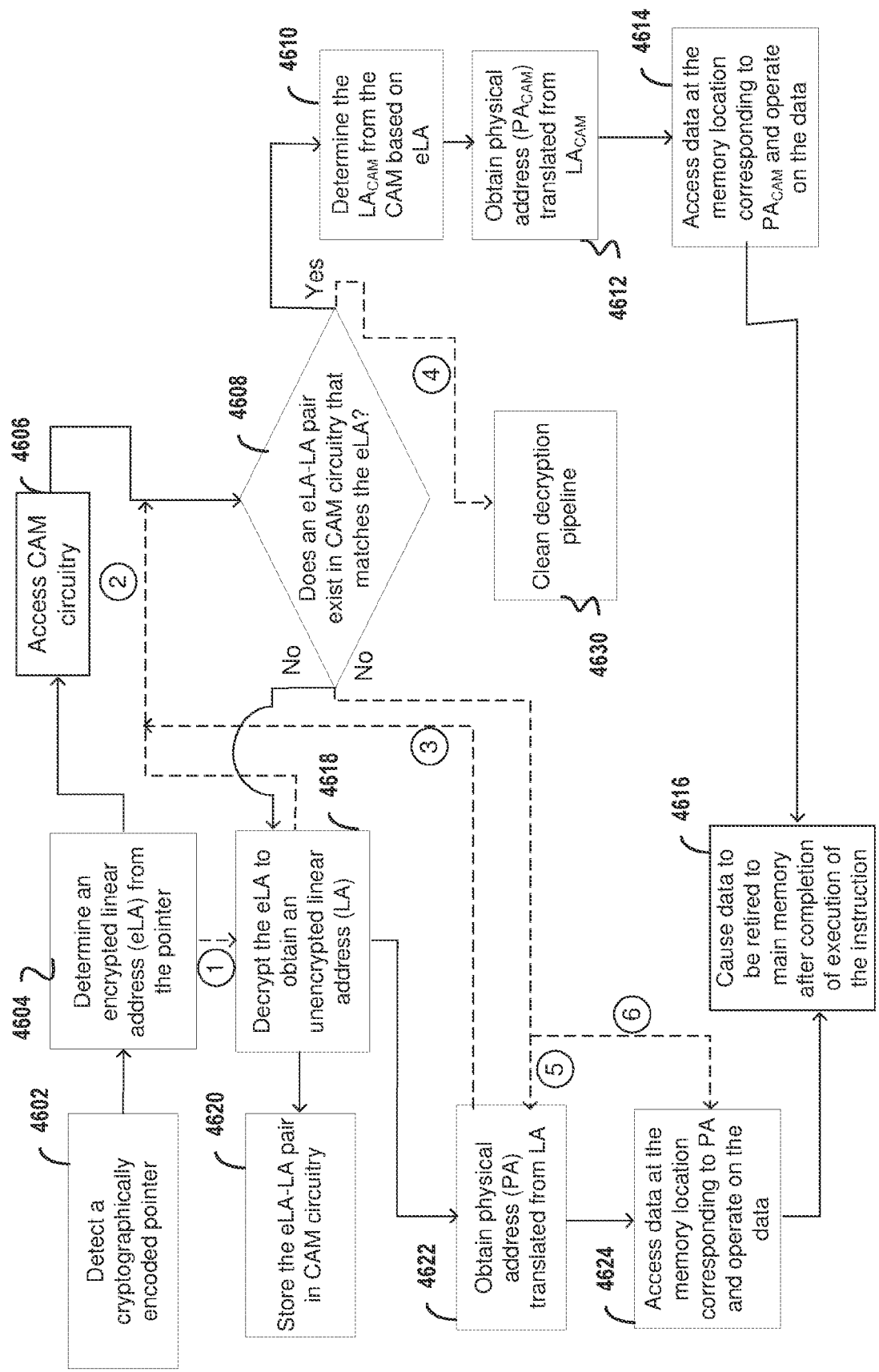
FIG. 46 is a flow diagram showing flow options to access memory content using a cryptographically encoded pointer without decrypting an encrypted address of the pointer, according to an embodiment.
Figure 47:
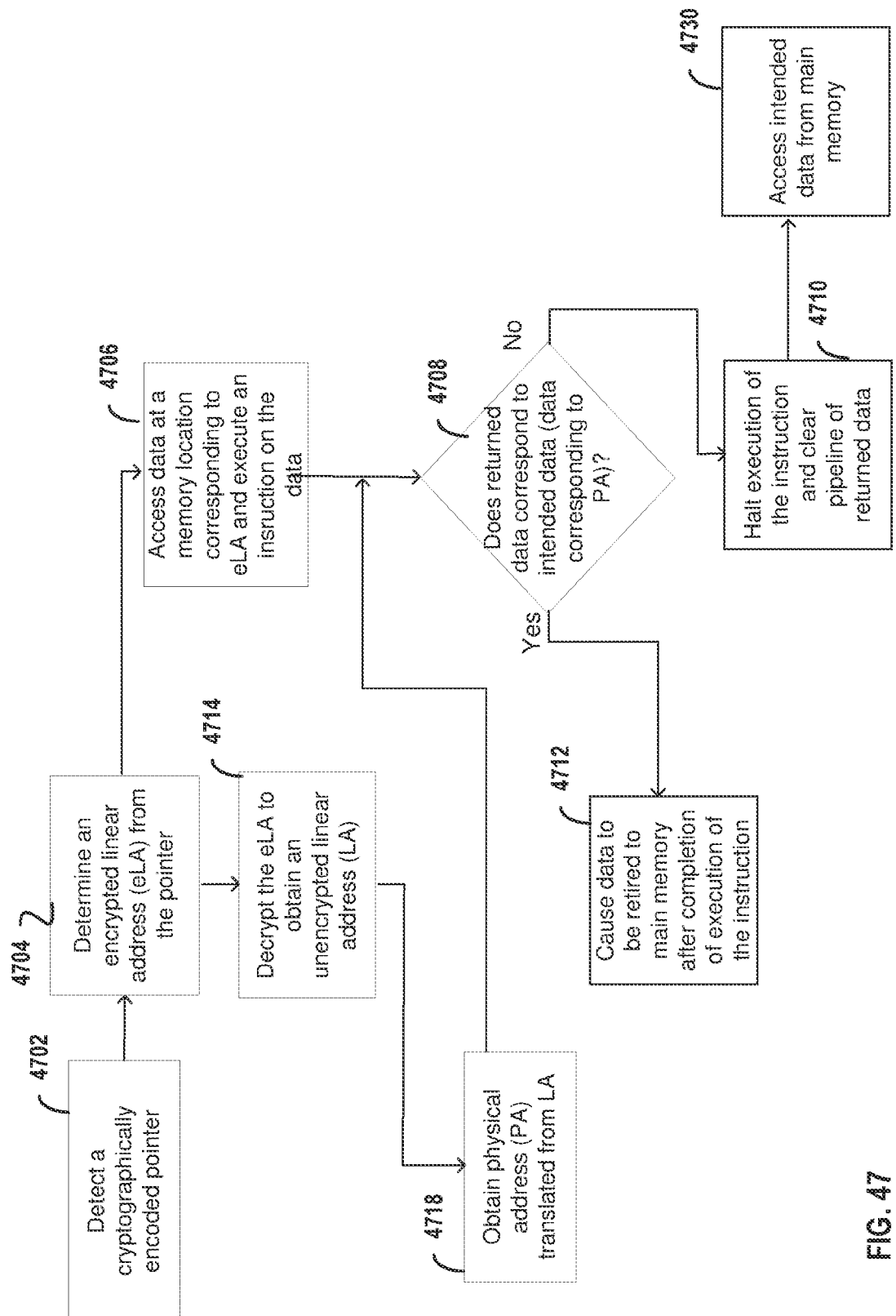
FIG. 47 is a flow diagram a flow to access memory content using a cryptographically encoded pointer without decrypting an encrypted address of the pointer, according to an embodiment.

FIGS. 46 and 47 provide illustrations of flows according to a first and second embodiment, respectively. Although FIGS. 46 and 47 depict the flow in terms of consecutive operations, embodiments include within their scope the performance of the operations in parallel with one another to the extent feasible.

Some embodiments provide a dedicated content addressable memory circuitry (CAM circuitry), such as a dedicated cache, to store previously decrypted pointers, such as in the form of ciphertext-plaintext pairs, in order to bypass decryption of a similar pointer in the near future. Some embodiments advantageously reduce the access latency in cryptographic computing environments. Some embodiments provide a microarchitectural feature in the form of dedicated hardware in order to store the previously decrypted pointers, this dedicated hardware being distinct from the processor caches, such as caches 471/481 of processors 470/480 of FIG. 4, and/or from instruction and data caches, such as instruction cache 682 and data cache 684 of processor 602 of FIG. 6. An address generation unit in the memory access unit, such as memory access unit 364 of FIG. 3, may implement CAM (or lookup table) for recently decoded pointers to shorten access latency to the same encoded pointers in the near future, that is, for future instructions that are to operate on data to be accessed in the processor's cache. Improvements as described in this section may, for example, be implemented in cryptographic addressing layer 110 of FIG. 1 and memory access unit 364 of FIG. 3.

A CAM circuitry according to some embodiments herein may, for example, be implemented similarly to the supplemental hardware (HW) memory 696 of FIG. 6. Although the instant description refers to a "dedicated" CAM circuitry, embodiments in this section may also encompass CAM circuitry that is distinct from the processor cache, that is able to store ciphertext-plaintext pairs corresponding to a pointer address, but that may in addition, be used to store other data, such as keys or tweaks.

Embodiments concern the use of cryptographically encoded pointers, for example such as those described above in the context of the Sections entitled "Cryptographic Addressing" and "Cryptographically Encoded Pointers in an Encrypted Base Address (EBA) Format" and the flow diagram of FIG. 8. Some embodiments may be implemented by hardware, such as by core 390 of FIG. 3B, or any of cores 474/484 of computing system 400 of FIG. 4 in the context of accessing memory content in caches 471/481 of processors 470/480. Some of the software units 810 and hardware 820 of FIG. 8 may be used to implement some embodiments.

Embodiments may be used in client or server CPUs or processors. Crypto caches are implemented in the CPU/processor, and specifically as part of the core, and the internal signals are not accessible from the outside of the processor. However, one could indirectly measure the impact of crypto caches on data read latency.

In some embodiments, decryption of an encoded linear address (eLA) to an unencrypted (raw) linear address (LA) may be bypassed before the core accesses data in its cache, and, and, in addition, the core may be able to start operating on the data (i.e. executing an instruction on the data) before, without, or simultaneously with the decryption. The core may be able to obtain ready access to cache data without waiting for the decryption of eLA to LA from the cryptographically encoded pointer by determining whether a ciphertext-plaintext pair corresponding to a prior decryption of the pointer eLA into LA (with the ciphertext corresponding to eLA, and the plaintext corresponding to the LA) exists in the CAM circuitry. The prior decryption may have happened when an eLA from a prior access request to the cache was decrypted by the core into LA, and stored in the CAM circuitry.

According to some embodiments, the core may look for an eLA-LA pair previously stored in the CAM circuitry and corresponding to the current eLA (that is, the eLA from the current pointer) either every time a cryptographically encoded pointer address is to be decoded into LA, or selectively, based on pointer parameters, such as the size field of the current pointer, as will be described further below.

If there exists an eLA-LA pair in the CAM circuitry where the eLA of the pair (hereinafter $eLA_{CAM}$) matches the current eLA, the core may assume that the LA from the eLA-LA pair (hereinafter $LA_{CAM}$) is the correct LA to be used, may then obtain the physical address (PA) from a translation of $LA_{CAM}$, which translation may be performed by a TLB for example and obtained by the core, and access the data in the processor data cache at the memory location corresponding to the PA thus obtained. The above operations may take place in lieu of a regular pipeline of eLA to LA decryption and LA to PA translation, or simultaneously with the same.

As used herein, a "match" between $eLA_{CAM}$ and the current eLA may mean that $eLA_{CAM}$ and the current eLA or either the same, or a similar, for example with a slightly different offset as compared with one another, but with their respective encrypted parts being the same.

An advantage of embodiments in this section is a performance improvement in cryptographic memory addressing by optimizing data access latency. Because the eLA to LA decryption may typically take multiple cycles, bypassing the same in order to be able to execute instructions on cache data quickly can bring significant advantages with respect to reducing the latency of memory accesses. The multiple cycles may be replaced by a single operation of performing a cryptographic cache table look up in the CAM circuitry in order to look for a eLA match and the corresponding eLA-LA pair stored therein.

According to some embodiments in this section, the CAM circuitry may be populated with eLA-LA pairs by way of the core storing in the CAM circuitry and after decrypting an eLA from a pointer in order to obtain the corresponding LA therefrom, the eLA-LA pair that resulted from the decryption. The core may store eLA-LA pairs after every decryption, or selectively based on pointer parameters, such as based on pointer size.

The CAM circuitry storage locations may be overwritten based on the CAM circuitry's space constraints and as a function of time. Once one or more eLA-LA pairs are stored in the CAM circuitry, the core may take advantage of the same when decoding a next cryptographically encoded pointer by first accessing the CAM circuitry to determine whether an $eLA_{CAM}$ match exists with the current eLA as described above.

The CAM circuitry is to exist within the security boundary of the processor or CPU, so that unencrypted addresses can be stored therein with a decreased possibility of a security breach. In this sense, the CAM circuitry storage of unencrypted LAs is akin to the TLB's storage of unencrypted PAs. According to some embodiments, therefore the CAM circuitry may be placed on the same physical chip as the core and cache, such as the data and instruction caches. According to some embodiments, the security boundary may be smaller than the extent of a physical chip, as long as the CAM circuitry, core and cache exist within the same security boundary, and especially if other circuitry on the chip is not communicatively connected to the cache unless it does so through ciphertext messages.

According to some embodiments, as noted above, the core may store all decrypted eLA-LA pairs in the CAM circuitry. According to some other embodiments, the core may select eLA-LA pairs for storage in the CAM circuitry, for example based on pointer parameters. If all decrypted eLA-LAs are stored, there would be more overriding of existing entries in the CAM circuitry to accommodate new entries as compared with a scenario where only some eLA-LA pairs are stored in the CAM circuitry.

Where there is a selection of eLA-LA pairs to store, the core may implement an algorithm to select the eLA-LA pairs to be migrated into the CAM circuitry. The algorithm may, for example, select the eLA-LA pairs that are associated with an unencrypted size field in the pointer that is larger than a threshold. Larger eLA sizes would typically correlate with a larger probability of future access requests with the same eLA, as it would correlate with a larger data object being pointed to by the pointer in memory, and hence a larger probability that the pointer will be reused. In general, the algorithm may select the eLA-LA pairs predictively, based on probability of future access requests by way of future instructions.

According to some embodiments, the CAM circuitry may store eLA-LA pairs for both stack and heap accesses. According to an alternative embodiment, there may be separate CAM circuitries for stack accesses and heap accesses, respectively.

A feature of embodiments in this section is that not only is the eLA and its decrypted LA stored in the CAM circuitry, but that their correlation is stored as well (hence mention of a "pair" being stored), in this way, the CAM circuitry having the functionality of a lookup table. According to some embodiments, the decryption process may happen contemporaneously with storage of an eLA-LA pair in the CAM circuitry. Storage of the eLA-LA pair may be temporary, in that, for example it may be stored for a given number of pointers/instructions, and overwritten thereafter.

After detecting a pointer, a core may thus access the CAM circuitry to determine a correlation between the eLA in the detected pointer, and $eLA_{CAM}$, which was stored in the pointer in the context of a previous pointer. Therefore, according to some embodiments, storage of the eLA-LA pair in the CAM circuitry is to outlive an instruction that led to its generation and storage. In this way, the next instruction can take advantage of the same in order to reduce access latency.

Referring now to FIG. 46, a flow diagram is shown of flow options according to some embodiments. It is noted at the outset that paths (1)-(6) in FIG. 46, shown in broken lines, are optional paths according to a variation of the shown embodiment, and will be explained in further detail later. In addition, the flows, decisions and actions in FIG. 46 are all subject to the options and variations discussed in this section with respect to each, and are not meant to be interpreted as limiting with respect to possible embodiments in this section.

According to an embodiment, at operation 4602, the core may detect a cryptographically encoded pointer. At operation 4604, the core may determine an eLA associated with the pointer. Thereafter, at 4606, the core may access a CAM circuitry that stores at least one eLA-LA pair from a previous pointer. At operation 4608, the core may determine whether the eLA-LA pair exists in the CAM circuitry where the eLA in the pair ($eLA_{CAM}$) matches the eLA associated with the pointer.

In the event of a match, the core may, at operation 4610, determine the LA in the pair ($LA_{CAM}$) that correlates with $eLA_{CAM}$, and, at 4612, obtain a PA associated with $LA_{CAM}$ ($PA_{CAM}$). The core may obtain $PA_{CAM}$ for example from a TLB associated with a cache maintained by the core. At operation 4614, the core may access data at the memory location corresponding to $PA_{CAM}$, and operate on the data, that is, execute an instruction on the data. At operation 4616, the core may cause the data accessed at 4614 to be retired to main memory, or to otherwise be discarded from the core's execution pipeline, after completion of execution of the instruction.

In the event of a non-match, the core may, at operation 4618 decrypt the eLA from the pointer, and either simultaneously with operation 4618 or thereafter, store the eLA-LA pair resulting from the decryption into the CAM circuitry. The core may, at operation 4622, obtain a PA associated the LA obtained from the decryption. The core may obtain the PA for example from a TLB associated with a cache maintained by the core. At operation 4624, the core may access data at the memory location corresponding to PA, and operate on the data, that is, execute an instruction on the data. At operation 4616, the core may cause the data accessed at 4624 to be retired to main memory, or to otherwise be discarded from the core's execution pipeline, after completion of execution of the instruction.

According to an optional embodiment of FIG. 46, operation 4606, accessing the CAM circuitry, and operation 4608, determining whether a match exists between the pointer eLA and $eLA_{CAM}$, may happen contemporaneously with one or more of operations 4618, decrypting the pointer eLA to obtain LA (along with operation 4620, storing the corresponding eLA-LA pair in the CAM circuitry), or operation 4622 obtaining PA translated from LA. This optional embodiment includes additional flow paths (1)-(6) in FIG. 46 shown in broken lines.

According to this optional embodiment, as the core is accessing the CAM circuitry in order to determine whether a eLA-$eLA_{CAM}$ match exists, the core may also, using flow path (1), decrypt, at 4618 the pointer eLA to obtain LA, store, at 4620, the thus obtained eLA-LA pair in CAM circuitry. The core may also obtain, at 4622, the PA from the LA obtained from decryption. The core may, at any time during operation 4618, the decryption operation, and/or operation 4622, the operation of obtaining the PA, by way of flow paths (2) and (3) respectively, determine at 4608 whether there exists an eLA-$eLA_{CAM}$ match.

If no match exists based on flow paths (1) and (2)/(3), the core may continue at paths (5)/(6), respectively, with obtaining the PA from LA at 4622 and accessing the data at the memory location of the PA, and operating on the data at 4624, and then retiring the data or removing the data from the core pipelines at 4616 at the conclusion of the execution of the instruction.

If a match exists, based on flow paths (1) and (2)/(3), the core may continue at path (4) to remove, from the decryption pipeline, at operation 4630 any data relating to operations 4618 and/or 4622, and continue with operations 4610 through 4616 as described in further detail above.

According to another, embodiment in this section, instead of and/or in addition to use of a CAM circuitry, the decryption of eLA to LA and/or the translation of LA to PA may be bypassed in another manner before cache data is returned to the core. According to this second embodiment, which does not depend on a CAM circuitry, the core may access the memory content within a cache directly using the pointer eLA, or the associated LA, and not using the PA. This second embodiment may save a TLB lookup operation by the TLB, and an associated operation to obtain the PA. According to this embodiment, the core can start directly accessing the load and store buffer data paths without waiting for a PA, and, where the eLA, as opposed to the LA, is used to directly access the cache, the core may further bypass waiting for a eLA to LA decryption as noted above before starting to execute an instruction on the returned data.

According to this second embodiment, the cache may be directly linearly addressable by an eLA or a LA, that is, the caches may be configured to be eLA and/or LA addressable (designed for an eLA/LA direct lookup). The core may obtain data from the cache immediately, prior to decryption and/or to LA to PA translation.

The description below of the second embodiment will refer to an eLA addressing of a cache, although embodiments encompass within their scope an eLA to LA decryption and use of the LA to directly address the cache.

According to this second embodiment, the cache itself may be used to obtain a translation of the eLA to the PA in parallel to the core accessing the cache data directly using the eLA. In this manner, the cache would be able to immediately return data to the core in order for the core to start executing an instruction on the returned data while, in parallel, the core would be, in parallel, going through regular eLA-LA decryption operation and the regular In such a scenario, the probability of obtaining the right or intended data (data corresponding to a PA that would have resulted from an eLA to LA decryption and subsequent LA to PA translation to obtain the intended PA) is relatively high (e.g. 95%-99%), and hence the core may speculate that the data returned based on the eLA is the intended data, and, in this way, memory access latency may be significantly reduced by way of an eLA addressable cache. However, in certain instances, there could be collisions, that is, there could be scenarios where the data accessed by the core using the eLA to access the cache may not be the intended data, and may hence not correspond to the intended PA. Hence, some embodiments provide a mechanism to not only access a cache using the eLA directly, but also to verify whether the accessed data is the intended data. Some embodiments may also verify that an Address Space Identifier (ASID) for the eLA associated with the cache line being accessed matches the ASID for the instruction requesting the access prior to proceeding with accessing the cache line.

The second embodiment is based in part on a premise that there might be multiple mappings of one eLA to different PAs, given that the cache is a shared resource. The multiple PAs may be used across processes that might map different processes to the same eLA, which may then result in a collision in an eLA addressable cache. The eLA data lookup in the cache may yield returned data for a given instruction, but the returned data may not correspond to the instruction corresponding to the currently detected pointer, but may correspond to another instruction altogether, and hence be the wrong data. Still, much of the time, the eLA that an application is currently using will very likely yield the intended data directly from the cache, and hence the optimization advantage referred to herein.

A verification mechanism according to this second embodiment may involve, in parallel with the core accessing the cache directly using the eLA, and operating on the returned data, the core additionally decrypting the eLA to LA, and obtaining a PA from a translation of the LA (for example by a TLB), and comparing the PA thus obtained with the PA corresponding to the returned data in order to ensure that the returned data from the eLA lookup corresponds to the intended data.

If a lookup of the PA obtained from a translation of the LA, and a PA corresponding to the returned data yields a non-match, the core may stop the speculation that the returned data is the intended data, and may discard the returned data from its execution pipelines.

A return of the PA from a TLB process, as well as a parallel eLA based cache access, allows the core to confirm that the data being operated on is the intended data, and can allow the core to proceed to higher instructions and confirm the data.

In the event of a non-match, the core may perform a "pipeline nuke" to revert all of its registers and all changes in its pipeline related to the returned data as if that data had never been returned. An eLA-addressable cache therefore provides the possibility of the core memory access operations proceeding on a speculative basis until a verification is made regarding whether the PA of the returned data corresponds to the PA of the intended data. According to this second embodiment, a pipeline nuking operation may be performed as long as the verification operation happens prior to the returned data being committee back to the main memory. As long as the returned data is within the processor pipeline, the core can always unwind or reverse the operation on the data in response to a non-match resulting from the verification operation.

After a pipeline nuke, once the core determines that the returned data is not the intended data, and after, by way of pipeline nuking, it restores its old registers as if did the returned data had never been returned, the core may issue an access request to main memory in order to access the intended data, since the cache returned the wrong data (a cache miss).

One feature of embodiments is that the core may store in its registers a value of eLA, as the eLA may need to be carried through to decrypt the data returned by the cache and referenced by the eLA, where the eLA was cryptographically bound to the data. The core would need to know the eLA content or value in order to properly decrypt and diffuse the dada that comes in from the main memory or a higher level cache in the hierarchy.

Referring now to FIG. 47, a flow diagram is shown of flow options according to some embodiments. The flows, decisions and actions in FIG. 47 are all subject to the options and variations discussed in this section with respect to each, and are not meant to be interpreted as limiting with respect to possible embodiments in this section.

According to an embodiment, at operation 4702, the core may detect a cryptographically encoded pointer. At operation 4704, the core may determine an eLA associated with the pointer. Thereafter, at 4706, the core may access data at a memory location corresponding to the eLA (and in this way obtain the "returned data"), and may operate on the returned data. At operation 4708, the core may determine whether the returned data corresponds to intended data (verification operation). The verification operation may entail a comparison between the PA obtained from a translation of the LA corresponding to the pointer eLA, and the PA corresponding to the returned data.

If there is a match, then, at operation 4712, the core may cause the returned data accessed at 4706 to be retired to main memory, or to otherwise be discarded from the core's execution pipeline, after completion of execution of the instruction.

In the event of a non-match, the core may, at operation 4710, nuke the pipeline(s), that is, the core may perform a "pipeline nuke" to revert all of its registers and all changes in its pipeline related to the returned data as if that data had never been returned, and halt execution of the instruction. Thereafter, at operation 4730, the core may issue an access request to the main memory to obtain the intended data from the memory.

Contemporaneously with operations 4706 and 4708, the core may, at operation 4714, decrypt the eLA from the pointer. The core may, at operation 4718, obtain a PA associated with the LA obtained from the decryption. The core may obtain the PA for example from a TLB associated with a cache maintained by the core. The core may move from operation 4718 to the flow of operation 4708, and 4710 or 4712 as explained above.

According to an alternative embodiment, the core may perform operations 4714 and 4718 only if there is no data at the cache corresponding to the pointer eLA, in which case the flow would move directly from operation 4706 to operation 4712 without a verification operation at 4708. In such a case, in a small percentage of cases, the core would be working on the wrong data without verification.

According to some embodiments, optimizations may be provided as set forth below.

In one option, the core may speculatively decode data read from its cache that matches a valid cryptographically encoded pointer format. If the data is decoded successfully, the core may cause the translation to be stored in its cache. According to one feature of the above, the registers may include a "valid cryptographic computing (CC) pointer" bit to indicate whether the current value is a valid CC pointer with a valid translation available in cache. The core may then propagate the "valid CC pointer" bit on pointer arithmetic within allowed bounds. According to a related feature, the register may include an index to directly point to the translation cache entry if the register value indicates a valid CC pointer. On memory access, the core may then advantageously use the decoded version from the crypto cache (combined with the associated offset from the register).

F. Policy and Security Metadata Aware Cache Coherency

Memory data units, also known as caches, are annotated. Technical problems arise in architectures where memories are organized in a hierarchical fashion, where the cache, such as, for example, L1 cache, represents the part of the memory hierarchy that is fastest to access. Some current computing architectures include separate computing cores and various associated caches, where a same cache may be accessible by separate cores. The memory hierarchy may include progressively larger and or more difficult to access parts, ending in the main memory. A memory hierarchy architecture is useful at least because of scalability and use.

A technical problem being addressed herein is how to ensure that changes happening in a dedicated cache associated with a core become known and propagate seamlessly to the other cores. A core may be changing memory content (i.e. data), while another core can be changing another version of the memory content in another cache line. In the end, if one core overrides the change made by the other core, there is no consistency or coherency between the cache lines, and a conflict arises as to memory content stored among those various caches. The latter may happen where some data/memory content change in one cache may not propagate seamlessly to other caches.

An aim of embodiments is to ensure consistency and coherency between independently made changes on the same data or memory content.

Current cache coherency protocols exist, the purpose of which is to ensure that all changes made on the data in caches happen in such a way that cores become aware of the changes in various caches, such that there can be a choice as to whether one core overrides the changes made by another core with respect to the same data. One of the best known such protocols is MESI, which stands for Modified (M), Exclusive (E), Shared (S) and Invalid (I). In the current version of MESI, Modified, Exclusive, Shared and Invalid have the following meanings:

1) Modified (M) refers to a cache line data that is present only in the current cache, and is dirty, that is, it has been modified from the value in main memory. The cache is required to write the dirty data back to main memory at some time in the future, before any other read of the (no longer valid) main memory state is permitted.
2) Exclusive (E) refers to a cache line which is present only in the current dedicated cache, and is clean, that is, it matches the main memory. It may be changed to the Shared state at any time in response to a read request, and, alternatively, it may be changed to the Modified state when being written to.
3) Shared (S) refers to a cache line that may be stored in other caches and is clean, that is, it matches the main memory (in Shared states, nobody has started modifying the memory content yet, and, if modification takes place by one core, all the other cores can be notified and with invalidate their content as dirty). The line may be discarded (changed to the Invalid state) at any time.
4) Invalid (I) indicates a cache line that is invalid, that is, unused.

One idea behind MESI is that it allow the enforcing of cache lines to be in only four states: Exclusive, Modified, Shared and Invalid. According to MESI, a communication may involve snooping, and in terms of hardware implementation, the cores may have snooping agents, which, in one option, may intercept read requests or write requests by other cores, determine if the other core is attempting to read memory content which the core maintaining the cache that is being accessed has modified, ensure that the memory content that has been modified propagates back to the main memory, and cause a response to be sent to stop the read request. The core that modified the cache memory content may write back the modified content into main memory, and the other core will issue another read request again to access the most up-to-date content.

A "write-back" as used in this section refers to a procedure by which a computing element, such as a core, updates in main memory only those memory contents where, in the update operation, the memory content which exists in the main memory is replaced by the memory content of the local copy of the core performing the write back. As part a write back process, optionally, if the security metadata is tied with additional encryption, the memory content that is being written back by a core maybe reverse diffused to the main memory, which means that it may be encrypted when written back. The security metadata may, for example, be used as a key selector or as a tweak. Selectors for specific keys may be used for further processing of the content (such as through diffusion), which selectors may be used in the form of a few bits in the physical address associated with a cache line to tell you how to diffuse certain content (such as certain bytes) within the cache A problem being addressed by embodiments concerns the use of security metadata in cache lines in the context of cache coherency. Cache lines may be annotated with security metadata. The security metadata may be a few bits, such as 4-5 bits. To tie the security metadata size with the overall framework of cryptographic computing, the number of bits for a security metadata may correlate with the size field of the memory allocation in the associated cache line within which diffusion is to be implemented. A set bit via certain bit vector may further indicate which granules are to be altered as part of diffusion.

Where cache lines become annotated with the security metadata, cache coherency poses special problems. For example, if a core starts reading or writing, it needs to into account not only the address of the memory content to be addressed, but also the security metadata associated with the content in a cache line in order to be able to access the content successfully. Some embodiments address a situation where an access request (i.e. a read request or a write request) is for memory content but where the read request includes security metadata (also known as crypto color, or key selector as noted above, or tweak value) that is different from the security metadata with which the cache line sought to be accessed is annotated. .

Some embodiments in this section pertain to different approaches that may be taken with respect to an access request (e.g. a read request or a write request) on memory content while using a security metadata that does not match the security metadata used to annotate the memory content within a cache line, a situation we refer to herein as a "conflict" or "mismatch," that may be detected by the core maintaining the cache for which the cache line is to be accessed. A "conflict" or "mismatch" as used herein are to be distinguished from a "violation," which refers to a "conflict" or "mismatch" resulting from a malicious attack, rather than for example from a buggy software, or from attempts by a prefetcher to access the data with the wrong security metadata.

Embodiments encompass cache coherency in the context of read and write accesses by cores that are local to a given device, and/or by cores that are remote using security metadata. A remote access refers to an access by a remote device, that is, a device that is distinct from the device housing the local core and its local cache, for example a device communicatively connected to the device housing the local core and its local cache by way of a cloud network, such as the one shown in FIG. 10.

A simpler embodiment is for the core maintaining the cache sought to be accessed (hereinafter, the "cache to be accessed") may treat the security metadata as part a physical address associated with the access request from a core attempting to access the cache (hereinafter the "accessing core"), and do nothing, that is, treat the read/write request similar to one including a physical address not matching that of the memory content sought to be accessed.

Alternatively, an embodiment pertaining to an aggressive approach may include a core, in response to detection of a conflict, for example after a read or write operation, causing an update to the main memory and invalidating the memory content sought to be accessed within the cache to be accessed.

An alternative approach according to another embodiment may involve the use of a snooping agent of a core. The snooping agent may detect another core attempting an access using a different security metadata than the one associated with a given memory content in a cache to be accessed of a core with the snooping agent, and may then interrupt the execution of the main program and invoke an exception with an exception handler, which will handle the conflict. In such a situation, a conflict may be treated as an integrity violation. According to some options, a core may raise an exception and/or the exception handler may handle the conflict differently depending on the number of exceptions invoked. By way of example, a core may invoke an exception handler in the event that the number of detected conflicts is equal to or larger than a given threshold.

According to some embodiments, as opposed to an entire cache line, but sets of granules of cache lines may be annotated with different security metadata with respect to one another. For example, core may annotate sets of 8 bytes, or sets of a given number of bits, or a given number of bits of a cache line in its cache to be accessed with a first security metadata, and another given number of bits with a second security metadata.

According to one embodiment, if another core attempts to access different sets of granules of the cache line annotated with the second security metadata, a core maintaining the cache line may determine that the other core operates with different security metadata for the memory content it seeks to access in the same cache line of the cache to be accessed, not react to the access of the cache line by the other core, and act as if the other core were accessing memory content from another cache line, that is, allow the access by the other core to the different sets of granules of the cache line as if it were an access to a different cache line with its own security policy. The core maintaining the cache to be accessed may determine that the other core operates with different security metadata to access data in the cache line of the cache to be accessed for example by virtue of a communication to a core regarding the different security metadata to be used by the other core. The latter communication may correspond to an update or revision to the MESI protocol. In such an instance, a core is configured to perform its own access in its own granule(s) in a cache line of a cache to be accessed using a first security metadata (first security policy), and to determine that another core is attempting to access one or more other granule(s) in the same cache line using a second security metadata (second security policy) different from the first security metadata, a core Cores that are adapted to annotate individual granules of a cache line with respective metadata allow changes to a same cache line to happen simultaneously and independently while granules with different security metadata and corresponding to different security domains are being accessed by different cores. The latter functionality provides tremendous performance benefits among different cores.

A purpose of the threshold policy described herein in the context of embodiments within this section is to detect innocent accesses. The number of mismatches happening in the event of a threat or malware/attack is typically higher as compared with innocent accesses that lead to mismatches, as the attacker would be trying to guess the right security metadata for certain regions of memory within a given amount of time at a higher frequency. The latter relates to the notion of a window associated with memory accesses and the number of attempted memory accesses within that time window. Heuristics would allow a distinction between violations caused by buggy software and those caused by an attacker who may be persistent. Where a temporal number of violations against the threshold is exceeded, according to a more tolerant policy, the core may interrupt the access and cause an exception to be raised.

If an access request is from an attacker, or from a core implementing buggy software, using the aggressive policy of invalidating copy of the memory content, the determination of a conflict may be an indication that there is some bug in the software. In such an instance, the core attempting the access will invalidate its local copy and reissue a read request to read again, to the main memory, and get the correct copy with the correct security metadata. If the subsequent read request from the main memory again results in a conflict, there may be a persistent bug in the code, in which case the number of accesses may exceed a given (preset, predetermined) threshold and result in an exception, which process may help catch bugs in the code.

A more tolerant policy is to continue working with one's local copy of the memory content, even though another core may be accessing the memory content with different security metadata. In this version of a tolerant policy, conflicts, as opposed to bugs, may be tracked against a given threshold, with the assumptions that there are no bugs in the software/code. A core may continue to work with the memory content in its local copy including its local security metadata, while allowing another core to attempt accesses to the memory content with different security metadata and resolve its own conflicts. The latter approach suggests confidence in the core with respect to its local copy and code used (security metadata).

The various policies to be used may be stored in a policy register, such as a special purpose register, a Model Specific Register (MSR), for example one for each core, for example in the form of a bit vector, and accessed by the various cores to set their policies and to be configured accordingly. In the alternative, the policies may be implemented at the cores at boot time.

The aggressive policy, as noted above, means that every time a core attempts to read or write with a different value of security metadata (detection of a conflict), the core can immediately back off and essentially invalidate the memory content it was attempting to access. According to a tolerant policy, the core believes that it has the correct code/correct security metadata, and that, should another core attempt to read the same memory content with different security metadata, it will read garbage, and will handle its own coherency conflicts, which means that multiple copies of the same memory content, with different security metadata, will exist in different caches.

According to some embodiments, in an aggressive policy, the concepts of exclusive, modified and shared will have the same meaning as in the current MESI protocol, as noted above, but, in a tolerant policy, the concepts of the exclusive, modified and shared will have different meanings as noted below:

1) Exclusive:
  a) according to the current version of MESI: only one core as a local copy and this one has not been modified;
  b) according to some embodiments in this section:
    i) if the aggressive policy holds, exclusive means that only one core has a copy and this one has not been modified;
    ii) if more tolerant policies hold, exclusive means that only one core has a copy annotated with the same security metadata and this copy has not been modified.
2) Modified (based on the value in main memory):
  a) according to the current version of MESI: only one core as a local copy and this one has been modified;

b) according to some embodiments in this section:
   i) if the aggressive policy holds, modified means that only one core has a copy and this one has been modified;
   ii) if more tolerant policies hold, modified means that only one core has copy annotated with the same security metadata and this copy has been modified; there may be other copies, however, annotated with different metadata.
3) Shared:
   a) according to the current version of MESI: more than one cores have a local copy and this copy is the same in each core;
   b) according to some embodiments in this section:
      i) if the aggressive policy holds, then shared means that several cores have the same copy, annotated with the same security metadata, and not other copies annotated with other security metadata exist in local core caches;
      ii) if more tolerant policies hold, shared means that several cores have the same copy, annotated with the same security metadata, but other copies annotated with other security metadata exist in local core caches.

Going back to encoding, the policy may be in the form of a bit vector encoding, which may be stored in a register, such as a MSR for each core. According to a first embodiment of the bit vector:

1) A first bit may indicate whether the security metadata aware coherency operates on granules of cache lines or entire cache lines. For example, granules may be too complex to implement, or a particular skew, may have switched the granules off, in which case, the first bit would be set to zero. If set to show that the security metadata is to operate on granules, the policy bit vector may be accompanied by another bit vector showing which granules are to be accessed.
2) A second bit may dictate whether to invalidate or not, in case a security metadata mismatch is detected when accessing the same granules of a cache line. The second bit determines whether the policy is aggressive or tolerant. A read request associated with a security metadata and corresponding granules may be broadcasted, and a core may determine, through its snooping agent, that the access is to the same granules with different security metadata, regardless of whether the security metadata is shared or modified. The second bit will therefore determine whether the core will, in such a case, invalidate its local copy annotated with the local security metadata and write back the memory content (e.g. bit set to 1), or, in the alternative, it may write back the memory content because of the read, but not invalidate and keep this copy and keep it at excusive (e.g. bit set to 0).
3) A third bit may dictate whether to invalidate or not, in case a security metadata mismatch is detected when accessing different granules of a cache line. The third bit may be set to 1 only if the first bit is set to one, but the second bit may be set to 1 or zero.
4) A fourth bit may indicate whether each cache coherency agent maintains state information of past mismatches.
5) A fifth bit may dictate whether to invoke an exception handler in case of mismatches. Bit 4 may therefore provide a software solution to a conflict or a mismatch detection. If bit 4 is set to 1, for example, every time a conflict is detected, an exception handler may be invoked, which may in this manner be caused to take further steps with respect to the mismatch.
6) A sixth bit may indicate the policy for invoking the exception handler. This may be done immediately once a mismatch is detected or when the state maintained by the cache coherency agent including one or more counters with certain specific values.

The bit vector, for example at bits 4, 5 and 6 in the example embodiment above, may set the possibility for the core cache coherency agent of affecting the execution of the main software by invoking an exception handler to interrupt the operation of the same.

Although an example of a bit vector is provided in the description above, embodiments are not so limited, and include within their scope the provision of a bit vector of any number of bits to indicate any of the policies noted above or described herein.

According to an embodiment, the counter (that determines whether a threshold of conflict detections has been reached within a time window) may be part of the policy register (such as the MSR).

Embodiments in this section, such as those described in relation to the cache coherency protocols and policies described herein, are very well suited for distributed memory systems, such as those associated with any of the computing nodes of FIG. 10.

Embodiments may be deployed among cores in a single system, such as a SoC, such as the computing system 400 of FIG. 4 including multiple cores and caches (the cores may be CPU, GPU, xPU or any other cores). Embodiments may further be deployed in a distributed memory system where the memory distributed among different edge computing nodes, such as nodes 1002, 1012, 1022 and 1032 of FIG. 10. In the event of a distributed memory deployment, a policy register may exist a controller node, and may store cache coherency policies for one or more cores (in this case a computing core such as cores 474/484 of FIG. 4) of one or more nodes within an edge computing network, such as the network of FIG. 10. The controller node may be adapted to transmit cache coherency policies stored in its policy register, such as those described herein, to computing cores of other nodes within the edge computing network. The controller node may further include a counter to keep track of a history of conflicts for each computing core of nodes coupled to it, and make decisions regarding how to allocate memory based on a history of conflicts associated with each computing core. Alternatively or in conjunction with a controller node, in a distributed memory system, such as one associated with the edge computing network of FIG. 10, there may exist a policy register within each distinct node for each computing core of that node.

According to some embodiments, cache coherency policies may dictate the behavior of a core upon the detection of a conflict. Examples of these policies are addressed below and in the context of FIGS. 48-52. In FIGS. 48-52, E-hit and E-miss refer respectively to a match of a physical address in either a read request or a write request with respect to the physical address of the memory content of the local cache of a core. FIGS. 48-52 present flows based on whether an access is a read access or a write access, whether we have a E-hit or a E-miss on our local cache, and further whether we have a security metadata match or mismatch with respect to the data in our local cache (that is, we have a mismatch between the security metadata of the memory content in our local cache and the security metadata associated with our access operation).

Figure 48:
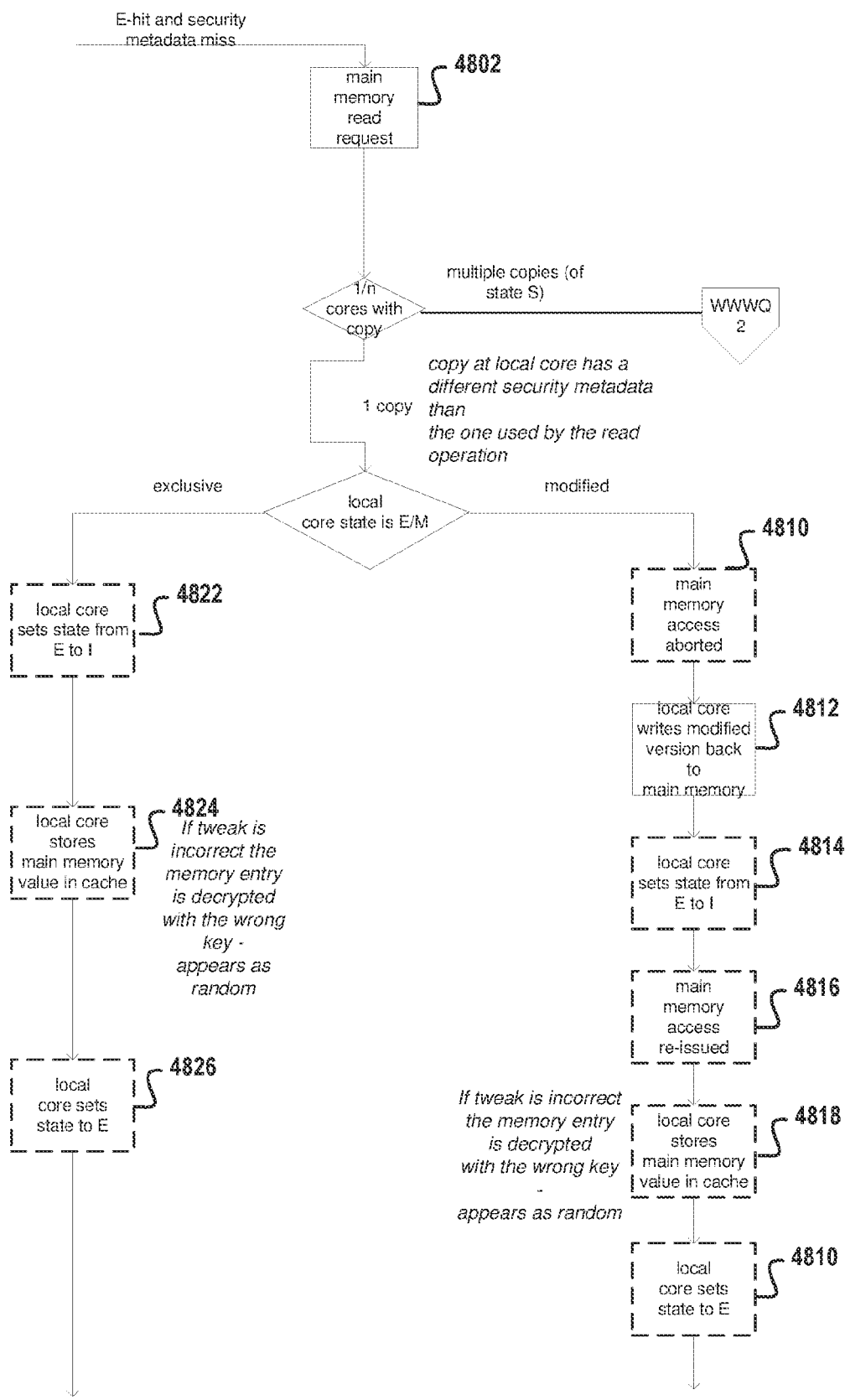
FIG. 48 is a flow chart of a cache coherency flow for a read request by a core with respect to a memory content in a cache line in the case of a security metadata miss, and where there is a single copy of the memory content to be accessed in the local cache of the core attempting the access, according to some embodiments.

FIG. 48 pertains to a read request in the case of a E-hit and security metadata miss, and where there is a single copy of the memory content to be accessed in the local cache of the core attempting the access. If a core is attempting a read, there is thereafter a determination that the content to be read is in that core's local cache (E-hit), and a further determination as to whether the security metadata associated with the read request is a hit or a miss. In the case of a security metadata miss (FIG. 48), the core may issue a main memory read request at 4802.

Figure 49:
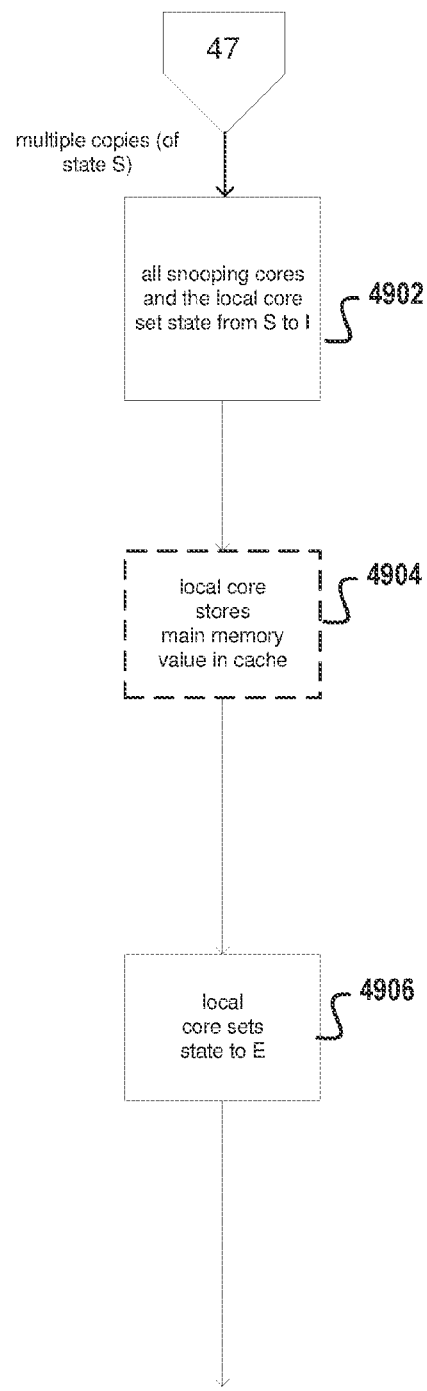
FIG. 49 is a flow chart of a cache coherency flow for a read request by a core with respect to a memory content in a cache line, in the case of a security metadata miss, and where there are multiple copies of the memory content to be accessed with state S in various cores, according to some embodiments.

Thereafter, in the event of multiple copies of the memory content of state Shared (S) present at multiple cores, the flow will move to that shown in FIG. 49.

In the event of a single copy of the memory content at the local cache of the core (hereinafter, "copy"), the flow moves to a determination as to whether that copy is of state Exclusive (E) or Modified (M). If the copy is of state E, then the local core invalidates its copy at 4822 and sets the state to Invalid (I), stores the main memory value in its cache at 4824, and sets the state of the new store to E at 4826. If the copy is of state modified, the main memory access is aborted at the local core at 4810, the local core writes the modified version back to main memory at 4812, sets the state of the copy from E to I at 4814, reissues a main memory access at 4816, stores the main memory value of the content in its local cache at 4818 (in this case, if the security metadata is incorrect, the memory entry from main memory would be decrypted with the wrong key, and the memory content would then appear as random), and finally sets its state to E.

Referring still to FIG. 48, according to some embodiments, at each of the branches starting with operation 4822 or 4810, the local core issuing the read request may implement different policies from those shown (hence the broken lines surrounding the blocks corresponding to those operations). As shown in FIG. 48, the core issuing the read request may implement any of the below policies, in addition to, in conjunction with and/or instead of the relevant operations of the branch starting at operation (hence the broken lines used for the branch of operations) 4822 or 4810:
1) invalidate the local copy and proceed according to the flow of FIG. 48, for example if it is accessing the same granules in the cache line with a different security metadata value;
2) (not shown) ignore the mismatch if accessing different granules with a different security metadata value; and/or
3) (not shown) check to determine if the number of currently detected mismatches exceeds a threshold and raise an exception if the threshold is exceeded, for example when accessing the same granules in the cache line with different security metadata (SM), the exception to invoke an exception handler to interrupt the software.

Ignoring the mismatch in the context of embodiments in this section means not invalidating one's own memory content. Ignoring may include, in some options, using a counter to keep track of the mismatch within a specific time window, and for example, invoking an exception handler to take further action based on the mismatch. This latter option of keeping a counter may apply in the case where the same granules within a cache line are sought to be accessed by a core but with different security metadata from that of the snooping core(s), in which case there could be a violation if the counter number exceeds a predetermined threshold for example.

In each case of ignoring or invalidating according to embodiments in this section, the core in question may write back the memory content in its local cache back to the main memory.

Changing the state of a memory content in some embodiments in this section may be followed by transmitting a signal to other cores indicating the new state for the memory content.

FIG. 49 pertains to a read request in the case of a E-hit and security metadata miss, and where there are multiple copies of the memory content to be accessed with state S in various cores. FIG. 49 is a continuation of a branch of the flow of FIG. 48 after issuance of a main memory read request by the core and, based on the same, a determination that there exist, at various cores, a number of copies of the memory content sought to be read at a state S or Shared (same copy with same security metadata). In this case, a cache coherency protocol may be used to cause a broadcast of the read request to the cores, either directly or through intermediaries, such as the main memory, to allow snooping cores or cache coherency agents of snooping cores to determine that the read request was issued with respect to the memory content and the associated security metadata.

In FIG. 49, all snooping cores and the local core may set the state of the memory content from S to I at 4902, and the local core may store the main memory value of the memory content in its local cache at 4904, and thereafter set its state to E at 4906.

Referring still to FIG. 49, according to some embodiments, at operation 4904, the snooping cores may implement different policies from those shown (hence the broken lines surrounding the blocks corresponding to operations 4902 and 4904). Thus, as shown in FIG. 49, the snooping cores may implement any of the below policies in addition to, in conjunction with and/or instead of the relevant operations of the branch starting at operation (hence the broken lines used for the branch of operations) 4902:
1) invalidate the local copy (Q202), for example if the local core is accessing the same granules in the cache line with a different security metadata value;
2) ignore the mismatch if the local core is accessing the same granules but policy dictates so;
3) ignore the mismatch if accessing different granules in the same cache line; and/or
4) check to determine if the number of currently detected mismatches exceeds a threshold and raise an exception if the threshold is exceeded, for example (1), (2) or (3) above holds, the exception to invoke an exception handler to interrupt the software.

Figure 50:
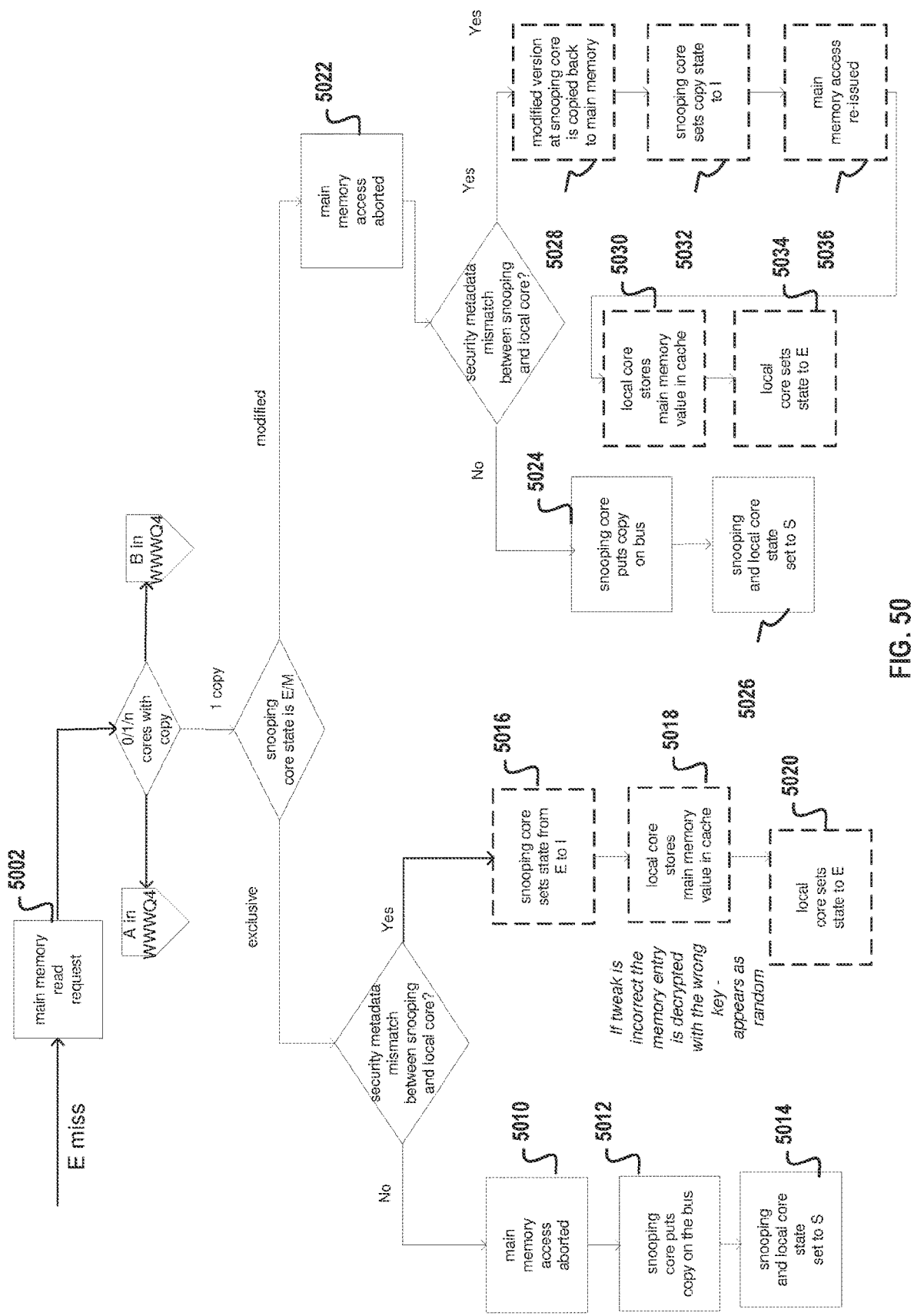
FIG. 50 is a flow chart of a cache coherency flow for a read request by a core with respect to a memory content in a cache line, where there is a single copy of the memory content to be accessed in the local cache of the core attempting the access, where the single core is at state E or M with respect to the memory content, according to some embodiments.

FIG. 50 pertains to an embodiment in the case of a read request with an E-miss (the physical address used as part of the read request does not lead to the memory content sought to be read), and where there is a single copy of the memory content to be accessed in the local cache of the core attempting the access, where the single core is at state E or M with respect to the memory content. Instances where no copies of the memory content and multiple copies of the memory content exist are addressed at A and B in FIG. 51, the description of which is to follow.

If a core is attempting a read, there is thereafter a determination that the content to be read is not in that core's local cache (E-miss). In the case of an E-miss, the core may issue a main memory read request at 5002 in order to broadcast a read request and allow snooping agents of other cores to know of the existence of the read request. Thereafter, in the event of zero copy present at any core, or multiple copies of the memory content of state Shared (S) present at multiple cores, the flow will move to that shown in FIG. 51.

In the event of a single copy of the memory content at the local cache of the core, the flow moves to a determination as to whether that copy is of state Exclusive (E) or Modified (M). If the copy is of state E, then there is a determination as to whether there exists a security metadata mismatch or conflict between the snooping core(s) and the local core attempting the read.

In the event of no mismatch, the local core aborts its main memory access at 5010, the snooping core puts its copy of the memory content on the bus (or otherwise shares it with the local core) at 5012, and the snooping and local core set their state to S at 5014.

In the event of a mismatch, according to an aggressive embodiment, the snooping core sets its state from E to I, invalidating its copy at 5016 (in which case no write back to main memory would be needed). The local core at 5018 stores the main memory copy in its cache at 5018, and sets the state of the new store to E at 5020.

If the copy is of state M, the main memory access may be aborted at the local core at 5022. Then, there is a determination as to whether there exists a security metadata mismatch or conflict between the snooping core(s) and the local core attempting the read.

In the event of no mismatch, the snooping core puts its copy of the memory content on the bus (or otherwise shares it with the local core) at 5024, and the snooping and local core set their state to S at 5026.

In the event of a mismatch, the modified version of the memory content including its security metadata is copied back to the main memory at 5028, the snooping core sets its copy state to I at 5032, the local core reissues its main memory access at 5036, stores the main memory value of the memory content and its associated metadata in its cache at 5030, and sets its state to E at 5034.

Referring still to FIG. 50, according to some embodiments, at each of the branches starting with operations 5016 or 5028, the snooping core may implement different policies from those shown (hence the broken lines surrounding the blocks corresponding to those operations).

As shown in FIG. 50, the snooping core may implement any of the below policies in addition to, in conjunction with and/or instead of the relevant operations of the branch starting at operation (hence the broken lines used for the branch of operations) 5016:

1) invalidate its local copy if accessing, with a different security metadata value, the same granules as the core issuing the initial read request in the cache line (Q316); in this case, policy 2) may be used together with policy 4) below;
2) ignore the mismatch if accessing the same granules but policy dictates so (in which case 5018 and 5020 may not happen, the local core may store the memory content of the snooping core in its local cache and set its state to S); in this case, policy 1) may be used together with policy 4) below;
3) ignore the mismatch if accessing different granules with a different security metadata value (in which case 5018 and 5020 may not happen, the local core may store the memory content of the snooping core in its local cache and set its state to S); and/or
4) check to determine if the number of currently detected mismatches exceeds a threshold and raise an exception if 1) or 2) above hold (in which case 5018 and 5020 may not happen, and an exception handler may determine next steps).

In the case of policies 2) and 3), the snooping core may not respond to the local core. In the case of policy 2) above, the snooping core may ignore the mismatch if the local core is attempting to access the same granules as the snooping core. In any of policies 2), 3) and 4), the snooping core may continue to work on its local copy, while, because of the state I, the local core may perceive the snooping core cache as have zero copy, and attempt to obtain the memory content sought to be read from the main memory (Q318) itself. This latter operation may result in the local core reading garbage from the main memory, if it is reading it with a metadata mismatch, which conflict may raise further exceptions, which may be dealt with by the operating system (OS) or another handler. In the case of policy 3), the snooping core may respond to the local core by placing a copy on the bus.

As shown in FIG. 50, the snooping core may implement any of the below policies in addition to, in conjunction with and/or instead of the relevant operations of the branch starting at operation (hence the broken lines used for the branch of operations) 5028:

1) write back its copy to main memory, then invalidate that local copy if the read access by the local core is for the same granules in the cache line with a different security metadata value;
2) write back its copy to main memory, then ignore the mismatch if the read access by the local core is for the same granules but policy dictates so;
3) not write back its copy to main memory, and ignore the mismatch if the read access by the local core is for different granules with a different security metadata value; and/or
4) check to determine whether the number of currently detected mismatches exceeds a threshold and raise an exception if 1) or 2) above hold.

In policies 2) through 4) above, the snooping core may continue to keep its memory content sought to be accessed at state M, knowing that a different security metadata is being used by the local core to try to read the same.

Policy 2) may apply to a group of cores that are to access the same granules but with different security metadata than that of the local core. In this case, they may ignore the mismatch under the assumption that the snooping core's security metadata is the valid one.

Figure 51:
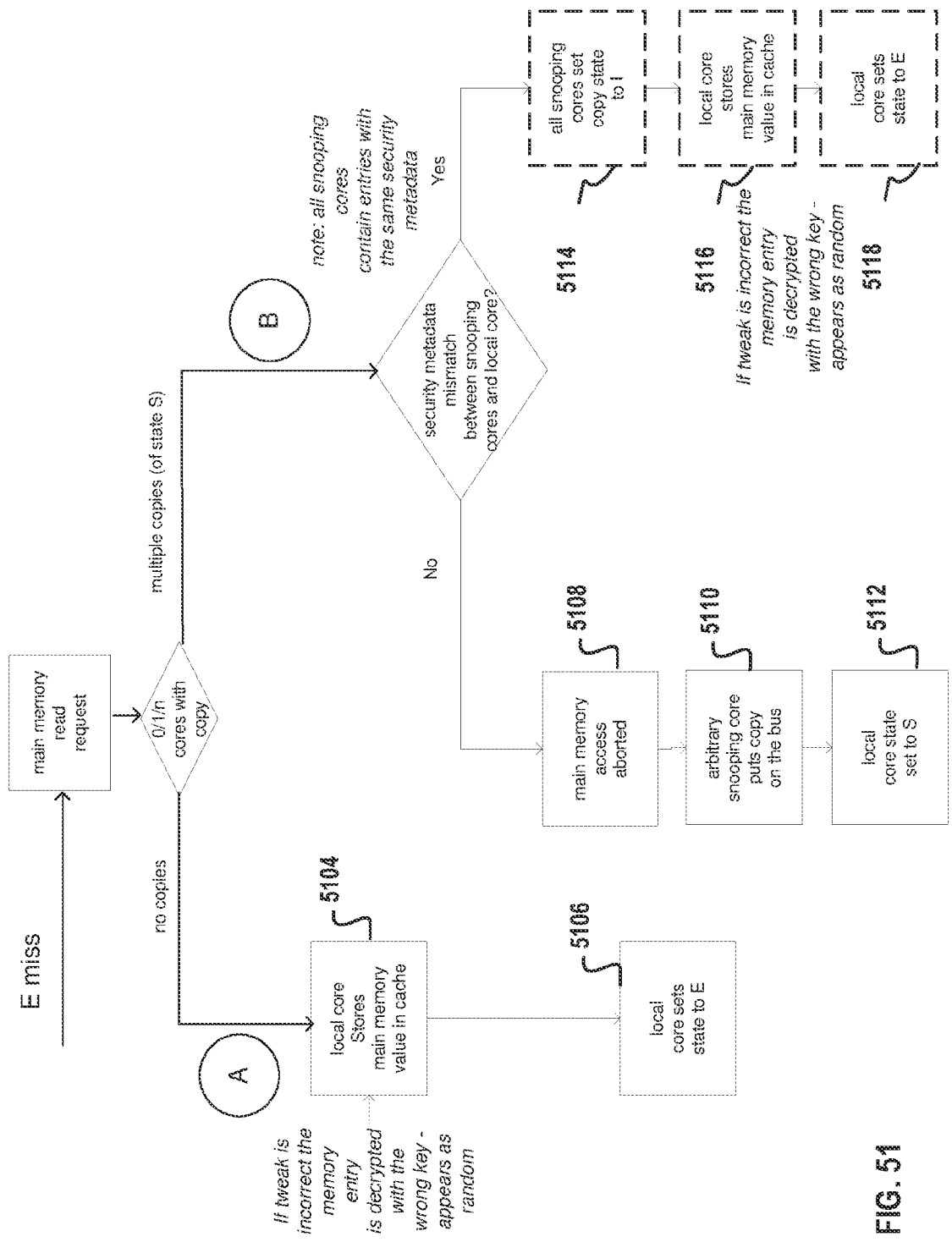
FIG. 51 is a flow chart of a cache coherency flow for a read request where there are multiple copies of the memory content to be accessed in the local cache of the core attempting the access, where the snooping cores are in a state Shared (S) with respect to the memory content (branch B), or where no copy of the memory content exists (branch A), according to some embodiments.

FIG. 51 pertains to an embodiment in the case of a read request with an E-miss (the physical address used as part of the read request does not lead to the memory content sought to be read), and where there are multiple copies of the memory content to be accessed in the local cache of the core attempting the access, where the snooping cores are in a state S with respect to the memory content (branch B), or where no copy of the memory content exists (branch A). FIG. 51 is a continuation of FIG. 50 as shown in the off-page references to A and B therein.

If a local core is attempting a read, there is thereafter a determination that the content to be read is not in that core's local cache (E-miss). In the case of an E-miss, the core may issue a main memory read request at 5002 in order to broadcast a read request and allow snooping agents of other cores to know of the existence of the read request. Thereafter, in the event of zero copy present at any core, the flow will move to branch A, and multiple copies of the memory content of state Shared (S) present at multiple cores, the flow will move to branch B.

In the event of no copy of the memory content anywhere at the snooping cores, at branch A, the flow moves to the local core storing the main memory copy in its cache at 5104, and setting the state of the new store to E at 5106.

In the event of multiple copies of the memory content at the snooping cores at state S, we move to branch B of the flow, and determine whether there is a security metadata mismatch between the snooping cores and the local core.

This is the case where several snooping cores own a copy, and the copies are associated with the same security metadata, hence the state S.

In the event of no mismatch, the local core aborts its main memory access at 5108, an arbitrary snooping core puts its copy of the memory content on the bus (or otherwise shares it with the local core) at 5110, and the local core sets its state to S at 5112.

In the event of a mismatch, according to an aggressive embodiment, the snooping cores set their state from S to I, invalidating their copies at 5114 (in which case no write back to main memory would be needed). The local core at 5116 stores the main memory copy in its cache, and sets the state of the new store to E at 5118.

Referring still to FIG. 51, according to some embodiments, at each of the branches starting with operations 5114, the snooping core may implement different policies from those shown (hence the broken lines surrounding the blocks corresponding to those operations).

As shown in FIG. 51, the snooping cores may implement any of the below policies in addition to, in conjunction with and/or instead of the relevant operations of the branch starting at operation (hence the broken lines used for the branch of operations) 5114:
1) invalidate the local copy if accessing the same granules in the cache line with a different security metadata;
2) ignore the mismatch if accessing the same granules but policy dictates so;
3) ignore the mismatch if accessing different granules with a different security metadata;
4) check to determine if the number of currently detected mismatches exceeds a threshold and raise an exception if 1) or 2) holds FIG. 52 pertains to an embodiment in the case of a write request with an E-hit on the left branch, or an E-miss (the physical address used as part of the read request does not lead to the memory content sought to be read) on the right branch.

Figure 52:
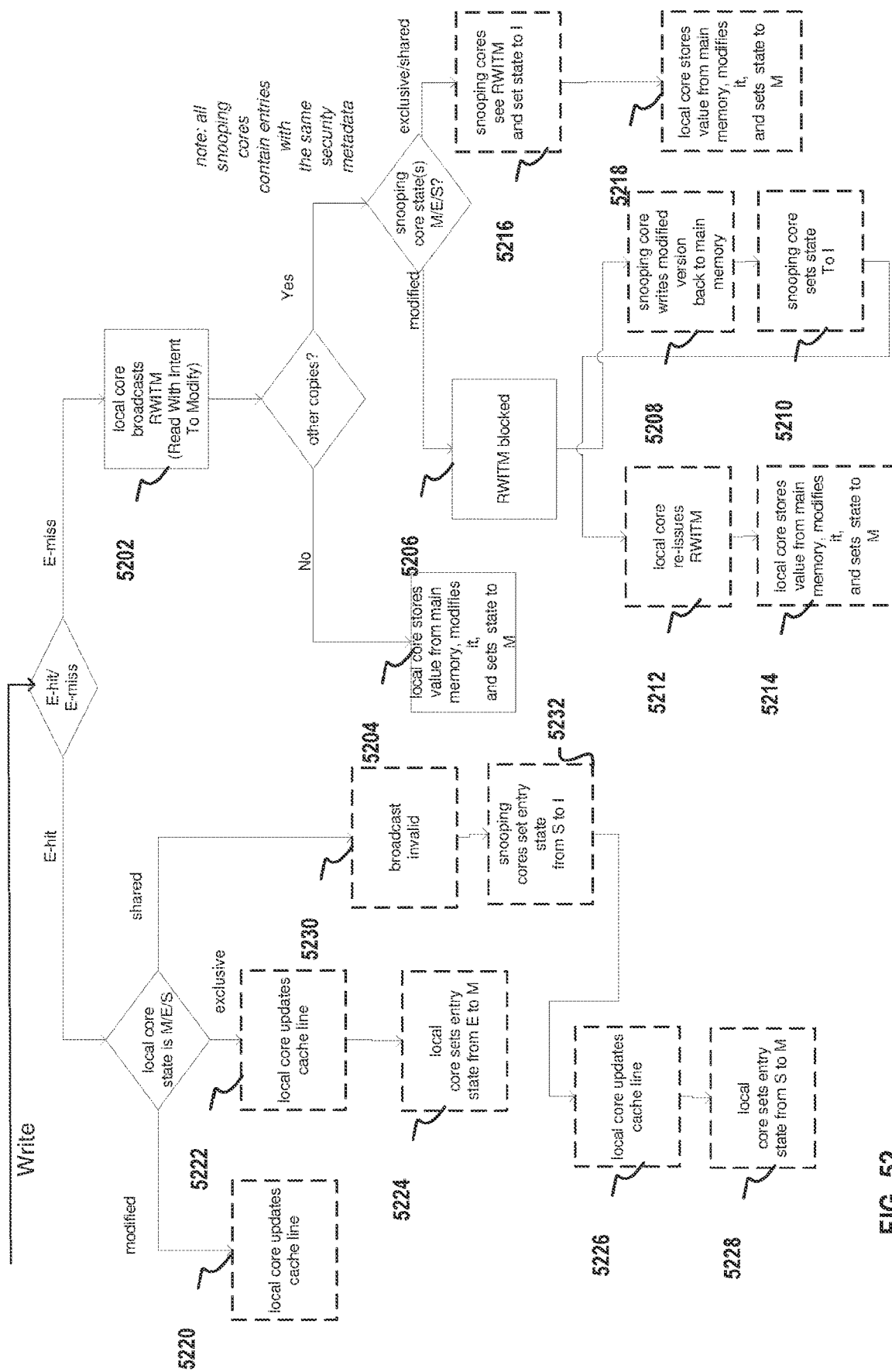
FIG. 52 is a flow chart of a cache coherency flow for a write request according to some embodiments.

In FIG. 52, a local core attempts to start writing into some memory content which exists in its local cache, and is in a state of either M, E or S. If it is in a M state, this means that the local core already started writing on this memory content and it is different from the main memory content in terms of its security metadata. If it is in an E state, this means that it was previously read, but was never written on. If it is in a S state, this means the local core read it, but several other cores read it and the cores all have exactly the same copy (same memory content and same security metadata for that content).

In the event of an E-hit, there is a determination as to whether the local core state is M, E or S. The flow of FIG. 52 further assumes that there is a security metadata mismatch between the write request and the memory content copy, if it exists, on the cache that is to be written to. The mismatch may be cause by a use-after-free bug, or a malicious attack, by way of example only.

If the local core is in an M state, the local core updates its cache line at 5220 by writing the memory content sought to be written with its associated security metadata, and the state remains M.

If the local core is in a E state, the local core updates its cache line at 5222 by writing the memory content sought to be written with its associated security metadata, and changing the state from E to M at 5224.

If the local core is in a S state, according to an aggressive approach, the local core broadcasts a transmission to set the state of the memory content from S to I at 5230, and the snooping cores set the entry state of their memory content from S to I at 5232. Then, at 5226, the local core updates its cache line at 5226 by writing the memory content sought to be written with its associated security metadata, and by setting its entry state from S to M.

In the event of an E-miss (the local core does not have a copy of the memory content it wants to modify, and possibly, one or more other cores do), the local core at 5202 broadcasts a Read with Intent to Modify (RWITM) message to other cores, and there is thereafter a determination as to whether there are copies of the memory content sought to be read and modified.

If no copies exist, the local core at 5204 stores the value from the main memory into its cache, modifies it with its own security metadata, and sets its state to M.

If copies do exist, there is a determination as to whether the snooping core states are M, E or S.

If the state is M, the RWITM is blocked at 5206, and the snooping cores at 5208 write the modified version of the memory content back to main memory, and at 5210 set the state to I. Thereafter, at 5212, the local core reissues another RWITM message, and at 5214, the local core stores the memory content and associated security metadata from main memory in its cache, modifies it, and sets its state to M.

If the state is E or S, the snooping cores, in response to RWITM, set their state to I in an aggressive approach at 5216, and at 5218, the local core stores the memory content and associated security metadata from main memory in its cache, modifies it, and sets its state to M.

Referring still to FIG. 52, according to some embodiments, at each of the branches starting with operations 5114, the snooping core may implement different policies from those shown (hence the broken lines surrounding the blocks corresponding to those operations).

As shown in FIG. 52, the local core may implement any of the below policies in addition to, in conjunction with and/or instead of the relevant operations of the branch starting at operation (hence the broken lines used for the branch of operations) 5220 or 5222, where the local core is the sole owner of that copy:
1) increase a mismatch counter if accessing the same granules in the cache line with a different security metadata value;
2) ignore the mismatch if accessing different granules with a different tv value;
3) check if the number of currently detected mismatches exceeds a threshold and raise an exception if (1) holds.

As shown in FIG. 52, the local core may implement any of the below policies in addition to, in conjunction with and/or instead of the relevant operations of the branch starting at operation (hence the broken lines used for the branch of operations) 5230 (where several cores own the copy, all in the shared state):
1) increase a mismatch counter if accessing the same granules in the cache line with a different security metadata value;
2) ignore the mismatch if accessing different granules with a different security metadata value;
3) check if the number of currently detected mismatches exceeds a threshold and raise an exception if (1) holds.

The snooping cores may implement any of the below policies in addition to, in conjunction with and/or instead of the relevant operations of the branch starting at operation (hence the broken lines used for the branch of operations) 5230:
1) invalidate their local copy if accessing the same granules in the cache line with a different tv value;

2) ignore the invalid broadcast and the mismatch if accessing the same granules but policy dictates so, in which case the snooping cores may write back their granules to the main memory or it may not;

3) ignore the invalid broadcast and the mismatch if accessing different granules with a different tv value;

4) check to determine if the number of currently detected mismatches exceeds a threshold and raise an exception if 1) or 2) holds.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

EXAMPLES

The following examples pertain to embodiments in accordance with this specification. The system, apparatus, method, and machine readable storage medium embodiments can include one or a combination of the following examples:

Example AA1 provides a processor comprising: first circuitry to: encrypt a first code image using a first code key; load the encrypted first code image into a memory area allocated in memory for the first code image by an operating system running on the processor; and send to the operating system a substitute key that corresponds to the first code key, where the first code key is concealed from the operating system; and an instruction cache including control circuitry; and second circuitry coupled to the instruction cache, the second circuitry to: receive the substitute key from the operating system; in response to a first request from the operating system to execute the first code image to instantiate a first process, perform a first cryptographic function using a hardware key to generate the first code key from the substitute key; and program the control circuitry of the instruction cache with the first code key to enable the first code image to be decrypted using the first code key.

Example AA2 comprises the subject matter of Example AA1, and the substitute key is an encrypted version of the first code key.

Example AA3 comprises the subject matter of Example AA2, and the first circuitry is further to: prior to encrypting the first code image with the first code key, generate the first code key from a root key; and perform a second cryptographic function on the first code key, using the hardware key, to generate the substitute key, where the second cryptographic function includes an encryption algorithm.

Example AA4 comprises the subject matter of Example AA1, and the substitute key is a unique key identifier.

Example AA5 comprises the subject matter of Examples AA4, and the first circuitry is further to: prior to encrypting the first code image with the first code key, generate the unique key identifier; perform the first cryptographic function on the unique key identifier, using the hardware key, to obtain the first code key; and perform a second cryptographic function on the first code key, using the hardware key, to generate the substitute key, where the second cryptographic function includes an decryption algorithm.

Example AA6 comprises the subject matter of any one of Examples AA1-AA5, and the first circuitry is further to: prior to encrypting the first code image, inject an attestation key into the first code image; and send the attestation key to a user authorized to access the first code image.

Example AA7 comprises the subject matter of any one of Examples AA1-AA6, and the first circuitry is further to: prior to encrypting the first code image, inject a plurality of no-operation instructions into the first code image at a given block granularity, where the second circuitry is further to: prior to executing a decrypted instruction of the first code image, determine whether the first code image has been modified based on the decrypted instruction.

Example AA8 comprises the subject matter of any one of Examples AA1-AA7, and the second circuitry is further to: prior to executing the first code image, determine whether the first code key is valid, where determining that the first code key is valid includes determining that the first code key was established for the first process.

Example AA9 comprises the subject matter of any one of Examples AA1-AA8, and the first circuitry is further to: establish a data key to be used for encrypting and decrypting data to be associated with the first process.

Example AA10 comprises the subject matter of any one of Examples AA1-AA9, and the second circuitry is further to: encrypt the first code image based, in part on a tweak, the tweak including at least a portion of a linear address corresponding to the memory area where the first code image is stored.

Example AA11 comprises the subject matter of Example AA10, and the tweak further includes execute permission metadata that indicates whether the first code image has permission to execute.

Example AA12 comprises the subject matter of any one of Examples AA1-AA11, and the hardware key is stored in fuses of the processor, stored in read-only memory (ROM) coupled to the processor, or generated by a physically unclonable function coupled to the processor.

Example AA13 comprises the subject matter of any one of Examples AA1-AA12, and the hardware key is inaccessible to the operating system running on the processor.

Example AA14 comprises the subject matter of any one of Examples AA1-AA13, and the first code image is encrypted in response to receiving an initial request from the operating system to load the first code image into the memory area.

Example AA15 comprises the subject matter of any one of Examples AA1-AA14, and the processor further includes: a data cache including data cache control circuitry, where the second circuitry is to: program the data cache control circuitry with a first data key associated with the first process, where first data stored in the data cache for the first process is to be decrypted using the first data key programmed in the data cache control circuitry.

Example AA16 comprises the subject matter of Example AA15, and the first data is to be decrypted based, in part, on a tweak including at least a portion of a linear address of the first data.

Example AA17 comprises the subject matter of any one of Examples AA15-AA16, and the second circuitry is to: receive a second substitute key from the operating system; in response to a second request from the first process to execute a library image to instantiate a library process, perform the first cryptographic function using the hardware key to generate a library key from the second substitute key; and program the control circuitry for the instruction cache with the library key to enable the library image to be decrypted using the library key.

Example AA18 comprises the subject matter of Example AA17, and second data stored in the data cache for the library process is to be decrypted using the first data key programmed in the data cache control circuitry.

Example AA19 comprises the subject matter of any one of Examples AA17-AA18, and the second circuitry is further to: receive a third substitute key from the operating system; in response to a third request from the operating system to execute a second code image to instantiate a second process to run concurrently with the first process, perform the first cryptographic function using the hardware key to generate a second code key from the third substitute key; and program the control circuitry of the instruction cache with the second code key to enable the second code image to be decrypted using the second code key.

Example AA20 comprises the subject matter of Example AA19, and the second circuitry is further to: in response to a fourth request from the second process to execute the library image, program the control circuitry for the instruction cache with the library key to enable the library image to be decrypted using the library key.

Example AM1 provides method comprising: encrypting a first code image using a first code key; loading the encrypted first code image into a memory area allocated in memory for the first code image by an operating system running on a processor coupled to the memory; sending to the operating system a substitute key that corresponds to the first code key, wherein the first code key is concealed from the operating system; receiving, at the processor, the substitute key from the operating system; in response to a first request from the operating system to execute the first code image to instantiate a first process, performing a first cryptographic function using a hardware key to generate the first code key from the substitute key; and programming control circuitry of an instruction cache in the processor with the first code key to enable decryption of the first code image using the first code key.

Example AM2 comprises the subject matter of Example AM1, and the substitute key is an encrypted version of the first code key.

Example AM3 comprises the subject matter of Example AM2, and the method further includes: prior to encrypting the first code image with the first code key, generating the first code key from a root key; and performing a second cryptographic function on the first code key, using the hardware key, to generate the substitute key, wherein the second cryptographic function includes an encryption algorithm.

Example AM4 comprises the subject matter of Example AM1, and the substitute key is a unique key identifier.

Example AM5 comprises the subject matter of Examples AM4, and the method further includes prior to encrypting the first code image with the first code key, generating the unique key identifier; performing the first cryptographic function on the unique key identifier, using the hardware key, to obtain the first code key; and performing a second cryptographic function on the first code key, using the hardware key, to generate the substitute key, wherein the second cryptographic function includes an decryption algorithm.

Example AM6 comprises the subject matter of any one of Examples AM1-AM5, and the method further includes: prior to encrypting the first code image, injecting an attestation key into the first code image; and sending the attestation key to a user authorized to access the first code image.

Example AM7 comprises the subject matter of any one of Examples AM1-AM6, and the method further includes: prior to encrypting the first code image, injecting a plurality of no-operation instructions into the first code image at a given block granularity, wherein the second circuitry is further to: prior to executing a decrypted instruction of the first code image, determining whether the first code image has been modified based on the decrypted instruction.

Example AM8 comprises the subject matter of any one of Examples AM1-AM7, and the method further includes: prior to executing the first code image, determining whether the first code key is valid, wherein determining that the first code key is valid includes determining that the first code key was established for the first process.

Example AM9 comprises the subject matter of any one of Examples AM1-AM8, and the method further includes: establishing a data key for encrypting and decrypting data associated with the first process.

Example AM10 comprises the subject matter of any one of Examples AM1-AM9, and the method further includes: encrypting the first code image based, in part on a tweak, the tweak including at least a portion of a linear address corresponding to the memory area where the first code image is stored.

Example AM11 comprises the subject matter of Example AM10, and the tweak further includes execute permission metadata that indicates whether the first code image has permission to execute.

Example AM12 comprises the subject matter of any one of Examples AM1-AM11, and the hardware key is stored in fuses of the processor, stored in read-only memory (ROM) coupled to the processor, or generated by a physically unclonable function coupled to the processor.

Example AM13 comprises the subject matter of any one of Examples AM1-AM12, and the hardware key is inaccessible to the operating system running on the processor.

Example AM14 comprises the subject matter of any one of Examples AM1-AM13, and the first code image is encrypted in response to receiving an initial request from the operating system to load the first code image into the memory area.

Example AM15 comprises the subject matter of any one of Examples AM1-AM14, and the method further includes: programming data cache control circuitry coupled to a data cache with a first data key associated with the first process, wherein first data stored in the data cache for the first process is decrypted using the first data key programmed in the data cache control circuitry.

Example AM16 comprises the subject matter of Example AM15, and the first data is decrypted based, in part, on a tweak including at least a portion of a linear address of the first data.

Example AM17 comprises the subject matter of any one of Examples AM15-AM16, and the method further includes: receiving a second substitute key from the operating system; in response to a second request from the first process to execute a library image to instantiate a library process, performing the first cryptographic function using the hardware key to generate a library key from the second substitute key; and programming the control circuitry for the instruction cache with the library key to enable decryption of the library image using the library key.

Example AM18 comprises the subject matter of Example AM17, and second data stored in the data cache for the library process is decrypted using the first data key programmed in the data cache control circuitry.

Example AM19 comprises the subject matter of any one of Examples AM17-AM18, and the method further includes: receiving a third substitute key from the operating system; in response to a third request from the operating system to execute a second code image to instantiate a second process to run concurrently with the first process, performing the first cryptographic function using the hardware key to generate a second code key from the third substitute key; and programming the control circuitry of the instruction cache with the second code key to enable decryption of the second code image using the second code key.

Example AM20 comprises the subject matter of Example AM19, and the method further includes: in response to a fourth request from the second process to execute the library image, programming the control circuitry for the instruction cache with the library key to enable decryption of the library image using the library key.

Example BP1 relates to a processor that includes: a memory hierarchy storing encrypted data; a core; and circuitry to obtain plaintext data from the encrypted data by: accessing the encrypted data based on an encoded pointer; decrypting the encrypted data using a counter mode block cipher; and performing a diffusion operation on an output of the decryption, wherein the diffusion operation fully mixes the bits of the output of the decryption and a tweak value; wherein the core is to execute an instruction using the plaintext data.

Example BP2 includes the subject matter of Example BP1, wherein the tweak value is based on a field in the encoded pointer.

Example BP3 includes the subject matter of Example BP2, wherein the field in the encoded pointer is a size field indicating a memory allocation size for the encrypted data.

Example BP4 includes the subject matter of any one of Examples BP1-BP3, wherein the diffusion operation comprises a block cipher.

Example BP5 includes the subject matter of Example BP4, wherein the block cipher is one of a PRINCE cipher or a K-cipher.

Example BP6 includes the subject matter of Example BP4, wherein the diffusion operation further comprises performing an XOR operation on an output of the block cipher and a second tweak value.

Example BP7 includes the subject matter of any one of Examples BP1-BP6, wherein decrypting the encrypted data the counter mode block cipher comprises performing an XOR operation on the encrypted data and a keystream.

Example BP8 includes the subject matter of Example BP7, wherein the keystream is generated based on the encoded pointer and a key.

Example BP9 includes the subject matter of Example BP8, wherein the key is based on a field of the encoded pointer.

Example BP10 includes the subject matter of any one of Examples BP1-BP9, wherein the encrypted data is stored in one of a Level-1 (L1) cache, a Level-2 (cache), and a Level-3 (L3 cache).

Example BP11 includes the subject matter of any one of Examples BP1-BP10, wherein the encoded pointer comprises a size field indicating a memory allocation size for the encrypted data, a set of encrypted bits, and a set of unencrypted bits.

Example BP12 includes the subject matter of Example BP11, wherein the circuitry is to access the encrypted data by: decoding the encoded pointer to obtain the memory address of the encrypted data, wherein decoding comprises: decrypting the encrypted bits of the encoded pointer based on the size field and the unencrypted bits; and obtaining the memory address from the decrypted bits and the unencrypted bits; and using the memory address to access the encrypted data in the memory hierarchy.

Example BP13 includes the subject matter of any one of Examples BP1-BP12, wherein executing the instruction comprises generating modified data based on the plaintext data, and the circuitry is further to: perform the diffusion operation on the modified data; encrypt an output of the diffusion operation using the counter mode block cipher; and store an output of the encryption into the memory hierarchy.

Example BP14 includes the subject matter of Example BP13, wherein the circuitry is to selectively store a subset of a cache line to the memory hierarchy based on a bit vector indicating granules of the cache line that have been modified.

Example BM1 relates to a method comprising: accessing, by a processor core based on an encoded pointer, encrypted data stored in a memory hierarchy; decrypting the encrypted data using a counter mode block cipher; performing a diffusion operation on an output of the decryption, wherein the diffusion operation fully mixes the bits of the output of the decryption and a tweak value; and executing, by the processor core, an instruction using an output of the diffusion operation.

Example BM2 includes the subject matter of Example BM1, wherein the tweak value is based on a field in the encoded pointer.

Example BM2 includes the subject matter of Example BM2, wherein the field in the encoded pointer is a size field indicating a memory allocation size for the encrypted data.

Example BM4 includes the subject matter of any one of Examples BM1-BM3, wherein the diffusion operation comprises a block cipher.

Example BM5 includes the subject matter of Example BM4, wherein the block cipher is one of a PRINCE cipher or a K-cipher.

Example BM6 includes the subject matter of Example BM4, wherein the diffusion operation further comprises performing an XOR operation on an output of the block cipher and a second tweak value.

Example BM7 includes the subject matter of any one of Examples BM1-BM6, wherein decrypting the encrypted data the counter mode block cipher comprises performing an XOR operation on the encrypted data and a keystream.

Example BM8 includes the subject matter of Example BM7, wherein the keystream is generated based on the encoded pointer and a key.

Example BM9 includes the subject matter of Example BM8, wherein the key is based on a field of the encoded pointer.

Example BM10 includes the subject matter of any one of Examples BM1-B9, wherein the encrypted data is accessed from a Level-1 (L1) cache, a Level-2 (cache), or a Level-3 (L3 cache).

Example BM11 includes the subject matter of any one of Examples BM1-BM10, wherein the encoded pointer comprises a size field indicating a memory allocation size for the encrypted data, a set of encrypted bits, and a set of unencrypted bits.

Example BM12 includes the subject matter of Example BM11, wherein accessing the encrypted data comprises: decoding the encoded pointer to obtain the memory address of the encrypted data, wherein decoding comprises: decrypting the encrypted bits of the encoded pointer based on the size field and the unencrypted bits; and obtaining the memory address from the decrypted bits and the unencrypted bits; and using the memory address to access the encrypted data in the memory hierarchy.

Example BM13 includes the subject matter of any one of Examples BM1-BM12, wherein executing the instruction comprises generating modified data based on the output of the diffusion operation, and the method further comprises: performing the diffusion operation on the modified data; encrypting an output of the diffusion operation using the counter mode block cipher; and storing an output of the encryption into the memory hierarchy.

Example BM14 includes the subject matter of Example BM13, wherein storing the output of the encryption comprises selecting storing a subset of a cache line to the memory hierarchy based on a bit vector indicating granules of the cache line that have been modified.

Example CA1 provides an apparatus, a system, a processor, a machine readable medium, a method, and/or hardware-, firmware-, and/or software-based logic, where the Example of A1 includes a memory allocation security check system, comprising: memory controller circuitry; and processor circuitry coupled to the memory controller circuitry and to be coupled to a memory circuitry, the processor circuitry to: in response to a memory allocation request, perform a memory allocation operation including obtaining a memory allocation for an object in the memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; in response to a memory operation request corresponding to a program, access the first metadata using a pointer including data to identify a location of the first metadata in the memory circuitry, wherein the first metadata is hidden from the program; and in response to a determination by the memory controller circuitry of a match between the first metadata and second metadata, perform a memory operation corresponding to the memory operation request.

Example CA2 includes the subject matter of Example CA1, and optionally, wherein the second metadata is at least one of in a metadata field of the pointer or stored at a memory location other than the pointer.

Example CA3 includes the subject matter of Example CA1, and optionally, wherein: the memory circuitry corresponds to cache circuitry; the memory location includes a slot within a cache line of the memory circuitry; the processor circuitry is to store the object within the slot and to store the first metadata at a midpoint address of the slot; and the data to identify a location of the first metadata in the memory location includes data to identify a location of the midpoint address.

Example CA4 includes the subject matter of Example CA3, and optionally, wherein the processor circuitry, in response to the memory operation request, is to generate the pointer, and to adjust an incrementation of a physical or virtual address across the memory allocation while the program is accessing the object to hide the first metadata from the program.

Example CA5 includes the subject matter of Example CA1, and optionally, wherein the first metadata further includes tag data.

Example CA6 includes the subject matter of Example CA3, and optionally, wherein the bounds information includes upper bounds information on an extent of the memory allocation on one side of the midpoint address corresponding to higher bits of the memory location, and lower bounds information on an extent of the memory allocation on another side of the midpoint address corresponding to lower bits of the memory location, and wherein the memory controller circuitry is to determine bounds of the memory allocation based on the upper bounds information and the lower bounds information.

Example CA7 includes the subject matter of Example CA1, and optionally, wherein the memory controller circuitry is to allocate the memory circuitry as one or more power-of-two memory allocations, the memory allocation corresponding to one of the one or more power-of-two memory allocations.

Example CA8 includes the subject matter of Example CA1, and optionally, wherein the memory controller circuitry is to determine whether a match exists between the compartment ID and a current compartment ID corresponding to the pointer, the current compartment ID stored in a dedicated compartment ID register.

Example CA9 includes the subject matter of Example CA3, and optionally, wherein storing the object within the slot includes storing one object per slot.

Example CA10 includes the subject matter of Example CA1, and optionally, wherein the memory controller circuitry is to encrypt all or part of the first metadata prior to a storing of the first metadata.

Example CA11 includes the subject matter of Example CA3, and optionally, wherein the data to find the location includes data in a size field of the pointer including information on a size of the slot, and data in an address field of the pointer.

Example CA12 includes the subject matter of Example CA1, and optionally, wherein the memory controller circuitry is to perform an integrity value check on the object prior to performing the memory operation corresponding to the memory operation request.

Example CA13 includes the subject matter of Example CA3, and optionally, wherein the memory circuitry includes a plurality of dedicated metadata tables distinct from a cache line and adapted to store the first metadata in a format in a selectable one of the plurality of dedicated metadata tables based on a size of the slot.

Example CA14 includes the subject matter of Example CA1, and optionally, wherein the memory circuitry includes an out-of-band table including pages, the memory location corresponds to a page of the out-of-band table, the page to store only memory allocations of a same size, storing the object at a memory location of the memory circuitry, and storing the metadata at one of the memory location or in a table distinct from the memory location includes storing the object and the metadata in the page.

Example CA15 includes the subject matter of Example CA1, and optionally, wherein at least some of the metadata is duplicated about a midpoint address of the memory location.

Example CA16 includes the subject matter of Example CA1, and optionally, the memory controller circuitry to further generate an exception responsive to a determination that the second metadata does not match the first metadata.

Example CA17 includes the subject matter of Example CA1 wand optionally, herein the first metadata at least one of: a tag, a cryptographic key, a key identifier, a tweak value, a counter value, an aggregate cryptographic Media Access Control (MAC) value, and an Error Correction Code (ECC).

Example CM1 includes a memory allocation security check method comprising: in response to a memory allocation request, performing a memory allocation operation including obtaining a memory allocation for an object in a memory circuitry, assigning first metadata to the memory allocation including at least one of bounds information for the memory allocation and a compartment identification (ID) to identify a compartment allowed to access the object, storing the object at a memory location of the memory circuitry, and storing the metadata at one of the memory location or in a table distinct from the memory location; in response to a memory operation request corresponding to a program, accessing the first metadata using a pointer including data to identify a location of the first metadata in the memory circuitry, wherein the first metadata is hidden from the program; and in response to a determination of a match between the first metadata and second metadata, performing a memory operation corresponding to the memory operation request.

Example CM2 includes the subject matter of Example CM1, and optionally, wherein the second metadata is at least one of in a metadata field of the pointer or stored at a memory location other than the pointer.

Example CM3 includes the subject matter of Example CM1, and optionally, wherein: the memory circuitry corresponds to cache circuitry; the memory location includes a slot within a cache line of the memory circuitry; the method further includes storing the object within the slot and storing the first metadata at a midpoint address of the slot; and the data to identify a location of the first metadata in the memory location includes data to identify a location of the midpoint address.

Example CM4 includes the subject matter of Example CM3, and optionally, further including, in response to the memory operation request, generating the pointer, and adjusting an incrementation of a physical or virtual address across the memory allocation while the program is accessing the object to hide the first metadata from the program.

Example CM5 includes the subject matter of Example CM1, and optionally, wherein the first metadata further includes tag data.

Example CM6 includes the subject matter of Example CM3, and optionally, wherein the bounds information includes upper bounds information on an extent of the memory allocation on one side of the midpoint address corresponding to higher bits of the memory location, and lower bounds information on an extent of the memory allocation on another side of the midpoint address corresponding to lower bits of the memory location, the method further including determining bounds of the memory allocation based on the upper bounds information and the lower bounds information.

Example CM7 includes the subject matter of Example CM1, and optionally, further including allocating the memory circuitry as one or more power-of-two memory allocations, the memory allocation corresponding to one of the one or more power-of-two memory allocations.

Example CM8 includes the subject matter of Example CM1, and optionally, further including determining whether a match exists between the compartment ID and a current compartment ID corresponding to the pointer, the current compartment ID stored in a dedicated compartment ID register.

Example CM9 includes the subject matter of Example CM3, and optionally, wherein storing the object within the slot includes storing one object per slot.

Example CM10 includes the subject matter of Example CM1, and optionally, further including encrypting all or part of the first metadata prior to a storing of the first metadata.

Example CM11 includes the subject matter of Example CM3, and optionally, wherein the data to find the location includes data in a size field of the pointer including information on a size of the slot, and data in an address field of the pointer.

Example CM12 includes the subject matter of Example CM1, and optionally, further including performing an integrity value check on the object prior to performing the memory operation corresponding to the memory operation request.

Example CM13 includes the subject matter of Example CM3, and optionally, wherein the memory circuitry includes a plurality of dedicated metadata tables distinct from a cache line and adapted to store the first metadata in a format in a selectable one of the plurality of dedicated metadata tables based on a size of the slot.

Example CM14 includes the subject matter of Example CM1, and optionally, wherein the memory circuitry includes an out-of-band table including pages, the memory location corresponds to a page of the out-of-band table, the page to store only memory allocations of a same size, storing the object at a memory location of the memory circuitry, and storing the metadata at one of the memory location or in a table distinct from the memory location includes storing the object and the metadata in the page.

Example CM15 includes the subject matter of Example CM1, and optionally, wherein at least some of the first metadata is duplicated about a midpoint address of the memory location.

Example CM16 includes the subject matter of Example CM1, and optionally, further including generating an exception responsive to a determination that the second metadata does not match the first metadata.

Example CM17 includes the subject matter of Example CM1 wand optionally, herein the first metadata at least one of: a tag, a cryptographic key, a key identifier, a tweak value, a counter value, an aggregate cryptographic Media Access Control (MAC) value, and an Error Correction Code (ECC).

Example DA1 includes an apparatus of a computing system, the apparatus including a memory element; a core coupled to the memory element, the core to detect a cryptographically encoded pointer; use an encrypted address from the pointer to access memory content within the memory element without decrypting the encrypted address; and execute an instruction on the memory content.

Example DA2 includes the subject matter of Example DA1, wherein the memory content corresponds to returned memory content, the core further to decrypt the encrypted address to obtain an unencrypted address therefrom while executing the instruction; determine whether there is a match between the returned memory content and an intended memory content associated with the instruction; and in response to a determination that a match does not exist, halt execution of the instruction.

Example DA3 includes the subject matter of Example DA2, the core to further, after decrypting, obtain a physical address corresponding to a translation of the unencrypted address, wherein determining whether there is a match includes comparing the physical address with the physical address of the returned memory content.

Example DA4 includes the subject matter of any one of Examples DA2-DA3, wherein, in response to a determination that a match exists, cause the returned memory content to be retired to main memory after determining whether there is a match an after completion of execution of the instruction.

Example DA5 includes the subject matter of Example DA1, wherein the encrypted address is a pointer encrypted address; and using the encrypted address without decrypting includes accessing information in a Content Addressable Memory (CAM) circuitry separate from the memory element, the information including a CAM encrypted address-CAM unencrypted address pair, the CAM unencrypted address corresponding to an unencrypted version of the CAM encrypted address; determining whether a match exists between the CAM encrypted address and the pointer encrypted address; and in response to a determination that the match exists, using the CAM unencrypted address to access the memory content.

Example DA6 includes the subject matter of Example DA5, wherein using the CAM unencrypted address to access the memory content includes obtaining a CAM physical address corresponding to a translation of the CAM unencrypted address; and accessing the memory content using the CAM physical address.

Example DA7 includes the subject matter of Example DA5, the core to further, in response to a determination that the match does not exist decrypt the pointer encrypted address to obtain a pointer unencrypted address therefrom; and use the pointer unencrypted address to access the memory content.

Example DA8 includes the subject matter of Example DA7, wherein using the pointer unencrypted address to access the memory content includes obtaining a pointer physical address corresponding to a translation of the pointer unencrypted address; and accessing the memory content using the pointer physical address.

Example DA9 includes the subject matter of Example DA5 wherein the core is further to while at least one of accessing information in the CAM circuitry or determining whether a match exists between the CAM encrypted address and the pointer encrypted address, decrypt the pointer encrypted address to obtain a pointer unencrypted address therefrom; and in response to a determination that a match does not exist between the CAM encrypted address and the pointer encrypted address, use the pointer unencrypted address to access the memory content.

Example DA10 includes the subject matter of Example DA5, wherein the cryptographically encoded pointer is a second cryptographically encoded pointer, and the encrypted address is a second encrypted address, the core to further, prior to detecting the second cryptographically encoded pointer detect a first cryptographically encoded pointer including a first encrypted address; decrypt the first encrypted address to obtain a first unencrypted address therefrom; and store the first encrypted address and the first unencrypted address in the CAM circuitry, the first encrypted address and the first unencrypted address corresponding to the CAM encrypted address-CAM unencrypted address pair.

Example DM1 includes a method to be performed at an apparatus of a computing system, the method including detecting a cryptographically encoded pointer; using an encrypted address from the pointer to access memory content within a memory element of the apparatus without decrypting the encrypted address; and executing an instruction on the memory content.

Example DM2 includes the subject matter of Example DM1, wherein the memory content corresponds to returned memory content, the method further including decrypting the encrypted address to obtain an unencrypted address therefrom while executing the instruction; determining whether there is a match between the returned memory content and an intended memory content associated with the instruction; and in response to a determination that a match does not exist, halting execution of the instruction.

Example DM3 includes the subject matter of Example DM2, the method further including, after decrypting, obtaining a physical address corresponding to a translation of the unencrypted address, wherein determining whether there is a match includes comparing the physical address with the physical address of the returned memory content.

Example DM4 includes the subject matter of any one of Examples DM2-DM3, further including, in response to a determination that a match exists, causing the returned memory content to be retired to main memory after determining whether there is a match an after completion of execution of the instruction.

Example DM5 includes the subject matter of Example DM1, wherein the encrypted address is a pointer encrypted address; and using the encrypted address without decrypting includes accessing information in a Content Addressable Memory (CAM) circuitry separate from the memory element, the information including a CAM encrypted address-CAM unencrypted address pair, the CAM unencrypted address corresponding to an unencrypted version of the CAM encrypted address; determining whether a match exists between the CAM encrypted address and the pointer encrypted address; and in response to a determination that the match exists, using the CAM unencrypted address to access the memory content.

Example DM6 includes the subject matter of Example DM5, wherein using the CAM unencrypted address to access the memory content includes obtaining a CAM physical address corresponding to a translation of the CAM unencrypted address; and accessing the memory content using the CAM physical address.

Example DM7 includes the subject matter of Example DM5, the method further including, in response to a determination that the match does not exist decrypting the pointer encrypted address to obtain a pointer unencrypted address therefrom; and using the pointer unencrypted address to access the memory content.

Example DM8 includes the subject matter of Example DM7, wherein using the pointer unencrypted address to access the memory content includes obtaining a pointer physical address corresponding to a translation of the pointer unencrypted address; and accessing the memory content using the pointer physical address.

Example DM9 includes the subject matter of Example DM5 further including while at least one of accessing information in the CAM circuitry or determining whether a match exists between the CAM encrypted address and the pointer encrypted address, decrypting the pointer encrypted address to obtain a pointer unencrypted address therefrom; and in response to a determination that a match does not exist between the CAM encrypted address and the pointer encrypted address, using the pointer unencrypted address to access the memory content.

Example DM10 includes the subject matter of Example DM5, wherein the cryptographically encoded pointer is a second cryptographically encoded pointer, and the encrypted address is a second encrypted address, the method further including, prior to detecting the second cryptographically encoded pointer detecting a first cryptographically encoded pointer including a first encrypted address; decrypting the first encrypted address to obtain a first unencrypted address therefrom; and storing the first encrypted address and the first unencrypted address in the CAM circuitry, the first encrypted address and the first unencrypted address corresponding to the CAM encrypted address-CAM unencrypted address pair.

Example DAA1 includes an apparatus of a computing system, the apparatus including a memory element; a Content Addressable Memory (CAM) circuitry; and a core coupled to the memory element and to the CAM circuitry, the core to detect a cryptographically encoded pointer including an encrypted address; decrypt the encrypted address to obtain an unencrypted address therefrom; and store the encrypted address and the unencrypted address as a correlated pair in the CAM circuitry.

Example DAA2 includes the subject matter of Example DAA1, wherein the cryptographically encoded pointer is a first cryptographically encoded pointer, the encrypted address is a first encrypted address, and the unencrypted address is a first unencrypted address, the core to further, after storing the correlated pair detect a second cryptographically encoded pointer including a second encrypted address; access the correlated pair in the CAM; determine whether a match exists between the second encrypted address and the first encrypted address from the correlated pair; and in response to a determination that the match exists, use the first unencrypted address to access the memory content; and execute an instruction on the memory content.

Example DAA3 includes the subject matter of Example DAA2, wherein using the first unencrypted address to access the memory content includes obtaining a first physical address corresponding to a translation of the first unencrypted address; and accessing the memory content using the first physical address.

DAA4. The apparatus of any one of claims DAA2-DAA3, the core to further, in response to a determination that the match does not exist decrypt the second encrypted address to obtain a second unencrypted address therefrom; and use the second unencrypted address to access the memory content.

Example DAA5 includes the subject matter of Example DAA4, wherein using the second unencrypted address to access the memory content includes obtaining a second physical address corresponding to a translation of the second unencrypted address; and accessing the memory content using the second physical address.

Example DAA6 includes the subject matter of Example DAA2 wherein the core is further to while at least one of accessing the correlated pair or determining whether a match exists between the first encrypted address and the second encrypted address, decrypt the second encrypted address to obtain a second unencrypted address therefrom; and in response to a determination that a match does not exist between the first encrypted address and the second encrypted address, use the second unencrypted address to access the memory content.

Example DMM1 includes a method to be performed at an apparatus of a computing system, the method including detect a cryptographically encoded pointer including an encrypted address; decrypting the encrypted address to obtain an unencrypted address therefrom; and storing the encrypted address and the unencrypted address as a correlated pair in a content addressable memory (CAM) circuitry of the apparatus.

Example DMM2 includes the subject matter of Example DMM1, wherein the cryptographically encoded pointer is a first cryptographically encoded pointer, the encrypted address is a first encrypted address, and the unencrypted address is a first unencrypted address, the method further including, after storing the correlated pair detecting a second cryptographically encoded pointer including a second encrypted address; accessing the correlated pair in the CAM; determining whether a match exists between the second encrypted address and the first encrypted address from the correlated pair; and in response to a determination that the match exists, using the first unencrypted address to access the memory content; and executing an instruction on the memory content.

Example DMM3 includes the subject matter of Example DMM2, wherein using the first unencrypted address to access the memory content includes obtaining a first physical address corresponding to a translation of the first unencrypted address; and accessing the memory content using the first physical address.

Example DMM4 includes the subject matter of any one of Examples DMM2-DMM3, the method further including, in response to a determination that the match does not exist decrypting the second encrypted address to obtain a second unencrypted address therefrom; and using the second unencrypted address to access the memory content.

Example DMM5 includes the subject matter of Example DMM4, wherein using the second unencrypted address to access the memory content includes obtaining a second physical address corresponding to a translation of the second unencrypted address; and accessing the memory content using the second physical address.

Example DMM6 includes the subject matter of Example DMM2 wherein the method further includes while at least one of accessing the correlated pair or determining whether a match exists between the first encrypted address and the second encrypted address, decrypting the second encrypted address to obtain a second unencrypted address therefrom; and in response to a determination that a match does not exist between the first encrypted address and the second encrypted address, using the second unencrypted address to access the memory content.

Example EA1 includes an apparatus of a computing system including: a cache; and a core coupled to the local cache, the core to: detect a conflict between first security metadata corresponding to an access request, and second security metadata corresponding to memory content in a cache line of the cache; and in response to detecting the conflict, at least one of invalidate the memory content in the cache line, or ignore the conflict by not invalidating the memory content in the cache line to permit the access request to access the memory content in the cache line.

Example EA2 includes the subject matter of Example EA1, the core to, in response to detecting the conflict: determine whether the access request is to a same granule of the cache line being accessed by the core or to a different granule of the cache line being accessed by the core; in response to a determination that the access request is to the same granule: ignore the conflict by not invalidating the memory content in the cache line; and at least one of write back the memory content in its cache to the main memory or maintain a counter to determine whether a number of detected conflicts exceeds a threshold; and in response to a determination that the access request is to a different granule, ignore the conflict by not invalidating the memory content in the cache line.

Example EA3 includes the subject matter of any one of Examples EA1-EA2, wherein the cache supports granules annotated with different security metadata as compared with one another, and a simultaneous access and alteration of the granules by multiple other cores Example EA4 includes the subject matter of any one of Examples EA1-EA2, the core to maintain a counter to determine whether a number of detected conflicts exceeds a threshold, and, in response to a determination that the number of detected conflicts exceeds the threshold, invoking an exception handler to interrupt an operation of software on the core Example EA5 includes the subject matter of any one of Examples EA1-EA4, wherein the access request is a read request from the core, and wherein a physical address of the memory content in the cache line corresponds to a physical address associated with the access request, the core to, in response to detecting the conflict: invalidate the memory content in the cache line; and store a main memory version the memory content in the cache line Example EA6 includes the subject matter of any one of Examples EA1-EA4, wherein the access request is a read request from another core, and wherein a physical address of the memory content in the cache line corresponds to a physical address associated with the access request, the core to, in response to detecting the conflict: invalidate the memory content in the cache line; and store a main memory version the memory content in the cache line Example EA7 includes the subject matter of any one of Examples EA1-EA4, wherein the access request is a read request from another core, and wherein a physical address of the memory content in the cache line does not corresponds to a physical address associated with the access request, the core to, in response to detecting the conflict: invalidate the memory content in the cache line; and store a main memory version the memory content in the cache line Example EA8 includes the subject matter of Example EA7, wherein, where the memory content in the cache line is modified as compared with a main memory version of the memory content, the core, in response to detecting the conflict, to: write back the memory content in its cache to the main memory; reissue a main memory access after invalidating the memory content in the cache line; and store a main memory version of the memory content in the cache line Example EA9 includes the subject matter of any one of Examples EA1-EA4, wherein the access request is a write request from the core, and wherein a physical address of the memory content in the cache line corresponds to a physical address associated with the access request, the core to, in response to detecting the conflict: broadcast an invalidate message to other cores of the computing system to cause the other cores to invalidate their respective memory contents;

invalidate the memory content in the cache line; and update its cache with updated memory content based on the write request Example EA10 includes the subject matter of any one of Examples EA1-EA4, wherein the access request is a write request from another core, a physical address of the memory content in the cache line does not corresponds to a physical address associated with the access request, and the memory content in the cache line is either exclusive to the cache line, or shared with said another core, the core to: detect a Read With Intent to Modify (RWITM) broadcast message from said another core; and in response to detecting the RWITM, invalidate the memory content in the cache line Example EA11 includes the subject matter of any one of Examples EA1-EA4, wherein the access request is a write request from another core, a physical address of the memory content in the cache line does not corresponds to a physical address associated with the access request, and the memory content in the cache line is modified as compared with a main memory version of the memory content, the core to: detect a Read With Intent to Modify (RWITM) broadcast message from said another core; block the RWITM message; write back the memory content into main memory; and invalidate the memory content in the cache line Example EA12 includes the subject matter of any one of Examples EA1-EA11, the core including a policy register to store a cache coherency policy bit vector, the bit vector including at least one of: a bit to indicate whether the cache line is to support access requests to granules associated with respective distinct security metadata on a granule by granule basis, or whether the cache line is to support access requests to an entire cache line associated with its security metadata; a bit to indicate whether or not to invalidate the memory content in the cache line in response to a detection of a conflict when an access request is to a same granule of the cache line being accessed by the core; a bit to indicate whether or not to invalidate the memory content in the cache line in response to detection of a conflict when the access request is to a different granule of the cache line being accessed by the core; a bit to indicate whether to maintain information on a number of past mismatches within a time window; a bit to indicate whether to invoke an exception handler in response to detection of a conflict; or a bit to indicate a policy for invoking the exception handler, including whether to invoke the exception handler immediately after detection of a conflict, or when a threshold number of mismatches has been detected as maintained by a counter; wherein the core is to further decode the bit vector to be configured with a cache coherency policy set by the bit vector Example EA13 includes the subject matter of any one of Examples EA1-EA12, wherein said another core is of the computing system, or of another computing system to be communicatively coupled to the computing system through a wireless or wired network.

Example EM1 includes a method to be performed at a processor of a computing system, the method including: detecting a conflict between first security metadata corresponding to an access request to a core of the processor, and second security metadata corresponding to memory content in a cache line of a cache of the processor, the cache coupled to the core; and in response to detecting the conflict, at least one of invalidating the memory content in the cache line, or ignoring the conflict by not invalidating the memory content in the cache line to permit the access request to access the memory content in the cache line.

Example EM2 includes the subject matter of Example EM1, further including, in response to detecting the conflict: determining whether the access request is to a same granule of the cache line being accessed by the core or to a different granule of the cache line being accessed by the core; in response to a determination that the access request is to the same granule: ignoring the conflict by not invalidating the memory content in the cache line; and at least one of writing back the memory content in its cache to the main memory or maintaining a counter to determine whether a number of detected conflicts exceeds a threshold; and in response to a determination that the access request is to a different granule, ignoring the conflict by not invalidating the memory content in the cache line.

Example EM3 includes the subject matter of any one of Examples EM1-EM2, wherein the cache supports granules annotated with different security metadata as compared with one another, and a simultaneous access and alteration of the granules by multiple other cores.

Example EM4 includes the subject matter of any one of Examples EM1-EM2, further including maintaining a counter to determine whether a number of detected conflicts exceeds a threshold, and, in response to a determination that the number of detected conflicts exceeds the threshold, invoking an exception handler to interrupt an operation of software on the core.

Example EM5 includes the subject matter of any one of Examples EM1-EM4, wherein the access request is a read request from the core, and wherein a physical address of the memory content in the cache line corresponds to a physical address associated with the access request, the method further including, in response to detecting the conflict: invalidating the memory content in the cache line; and storing a main memory version the memory content in the cache line.

Example EM6 includes the subject matter of any one of Examples EM1-EM4, wherein the access request is a read request from another core, and wherein a physical address of the memory content in the cache line corresponds to a physical address associated with the access request, the method further including, in response to detecting the conflict: invalidating the memory content in the cache line; and storing a main memory version the memory content in the cache line.

Example EM7 includes the subject matter of any one of Examples EM1-EM4, wherein the access request is a read request from another core, and wherein a physical address of the memory content in the cache line does not corresponds to a physical address associated with the access request, the method further including, in response to detecting the conflict: invalidating the memory content in the cache line; and storing a main memory version the memory content in the cache line.

Example EM8 includes the subject matter of Example EM7, wherein, where the memory content in the cache line is modified as compared with a main memory version of the memory content, the method further including, in response to detecting the conflict: writing back the memory content in its cache to the main memory; reissuing a main memory access after invalidating the memory content in the cache line; and storing a main memory version of the memory content in the cache line.

Example EM9 includes the subject matter of any one of Examples EM1-EM4, wherein the access request is a write request from the core, and wherein a physical address of the memory content in the cache line corresponds to a physical address associated with the access request, the method further including, in response to detecting the conflict: broadcasting an invalidate message to other cores of the computing system to cause the other cores to invalidate their respective memory contents; invalidating the memory content in the cache line; and updating its cache with updated memory content based on the write request.

Example EM10 includes the subject matter of any one of Examples EM1-EM4, wherein the access request is a write request from another core, a physical address of the memory content in the cache line does not corresponds to a physical address associated with the access request, and the memory content in the cache line is either exclusive to the cache line, or shared with said another core, the method further including: detecting a Read With Intent to Modify (RWITM) broadcast message from said another core; and in response to detecting the RWITM, invalidating the memory content in the cache line.

Example EM11 includes the subject matter of any one of Examples EM1-EM4, wherein the access request is a write request from another core, a physical address of the memory content in the cache line does not corresponds to a physical address associated with the access request, and the memory content in the cache line is modified as compared with a main memory version of the memory content, the method further including: detecting a Read With Intent to Modify (RWITM) broadcast message from said another core; blocking the RWITM message; writing back the memory content into main memory; and invalidating the memory content in the cache line.

Example EM12 includes the subject matter of any one of Examples EM1-EM11, further including storing a cache coherency policy bit vector, the bit vector including at least one of: a bit to indicate whether the cache line is to support access requests to granules associated with respective distinct security metadata on a granule by granule basis, or whether the cache line is to support access requests to an entire cache line associated with its security metadata; a bit to indicate whether or not to invalidate the memory content in the cache line in response to a detection of a conflict when an access request is to a same granule of the cache line being accessed by the core; a bit to indicate whether or not to invalidate the memory content in the cache line in response to detection of a conflict when the access request is to a different granule of the cache line being accessed by the core; a bit to indicate whether to maintain information on a number of past mismatches within a time window; a bit to indicate whether to invoke an exception handler in response to detection of a conflict; or a bit to indicate a policy for invoking the exception handler, including whether to invoke the exception handler immediately after detection of a conflict, or when a threshold number of mismatches has been detected as maintained by a counter; wherein the method further includes decoding the bit vector to be configured with a cache coherency policy set by the bit vector.

Example EM13 includes the subject matter of any one of Examples EM1-EM13, wherein said another core is of the computing system, or of another computing system to be communicatively coupled to the computing system through a wireless or wired network.

Example FA1 provides apparatus comprising: a processor including first circuitry to execute a security engine to: create an interrupt descriptor in a memory for a first process; generate a substitute interrupt key corresponding to a first interrupt key to be used for communication between the first process and a second process; communicate the substitute interrupt key to the first process and to the second process; and provide an encrypted memory address of the interrupt descriptor to the second process, wherein the first circuitry is further to: receive, from the second process, a first interrupt request to interrupt the first process; decrypt the encrypted memory address of the interrupt descriptor indicated by the first interrupt request using the first interrupt key; and update the interrupt descriptor with the first interrupt request.

Example FA2 comprises the subject matter of Example FA1, and the first circuitry is to further execute the security engine to: store the substitute interrupt key in the interrupt descriptor.

Example FA3 comprises the subject matter of any one of Examples FA1-FA2, and the first circuitry is to further execute the security engine to: create an entry for a user interrupt target table of the second process, wherein the entry includes the substitute interrupt key; and update the user interrupt target table with the entry.

Example FA4 comprises the subject matter of Example FA3, and the first circuitry is to further execute the security engine to: prior to updating the user interrupt target table, encrypt the entry with the first interrupt key.

Example FA5 comprises the subject matter of Examples FA4, and to decrypt the encrypted memory address of the interrupt descriptor in the first interrupt request is to include: receiving an index to the encrypted entry in the user interrupt target table; retrieve the encrypted entry from the user interrupt target table based on the index; and decrypt the encrypted entry using the first interrupt key.

Example FA6 comprises the subject matter of any one of Examples FA3-FA5, and the entry includes an interrupt identifier for the second process to include in the first interrupt request to interrupt the first process.

Example FA7 comprises the subject matter of any one of Examples FA3-FA6, and the entry is to further include an indication of a memory location for the interrupt descriptor.

Example FA8 comprises the subject matter of any one of Examples FA1-FA7, and the first circuitry is to further execute the security engine to: cause the first interrupt key to be generated; and encrypt the first interrupt key with a hardware key to generate the substitute interrupt key.

Example FA9 comprises the subject matter of any one of Examples FA1-FA8, and the first circuitry is to further execute the security engine to: cause a unique key identifier to be generated as the substitute interrupt key; and encrypt the substitute interrupt key using a hardware key to generate the first interrupt key.

Example FA10 comprises the subject matter of any one of Examples FA1-FA9, and the first circuitry is to further execute the security engine to: create a second interrupt descriptor in the memory for the first process; generate a second substitute interrupt key corresponding to a second interrupt key to be used for communication between the first process and a hardware device; communicate the second substitute interrupt key to the first process and to the second process; and provide an encrypted memory address of the second interrupt descriptor to the hardware device, and wherein the first circuitry is further to: receive, from the hardware device, a second interrupt request to interrupt the first process; decrypt the encrypted memory address of the second interrupt descriptor indicated by the second interrupt request using the second interrupt key; and update the second interrupt descriptor with the second interrupt request.

Example FA11 comprises the subject matter any one of Examples FA1-FA10, and further comprises the features of any one of Examples AA1-AA10 (as far as those method steps are not redundant with method steps of Examples FA1-FA10).

Example FM1 provides method comprising: creating an interrupt descriptor in a memory for a first process; generating a substitute interrupt key corresponding to a first interrupt key to be use for communicating between the first process and second process; communicating the substitute interrupt key to the first process and to the second process; providing an encrypted memory address of the interrupt descriptor to the second process; receiving, from the second process, a first interrupt request to interrupt the first process; decrypting the encrypted memory address of the interrupt descriptor in the first interrupt request using the first interrupt key; and updating the interrupt descriptor with the first interrupt request.

Example FM2 comprises the subject matter of Example FM1, and the store the substitute interrupt key in the interrupt descriptor.

Example FM3 comprises the subject matter of any one of Examples FM1-FM2, and the method further includes: creating an entry for a user interrupt target table of the second process, wherein the entry includes the substitute interrupt key; and updating the user interrupt target table with the entry.

Example FM4 comprises the subject matter of Example FM3, and the method further includes: prior to updating the user interrupt target table, encrypting the entry with the first interrupt key.

Example FM5 comprises the subject matter of Examples FM4, and the decrypting the encrypted memory address of the interrupt descriptor in the first interrupt request includes: receiving an index to the encrypted entry in the user interrupt target table; retrieving the encrypted entry from the user interrupt target table based on the index; and decrypting the encrypted entry using the first interrupt key.

Example FM6 comprises the subject matter of any one of Examples FM3-FM5, and the entry includes an interrupt identifier for the second process to include in the first interrupt request to interrupt the first process.

Example FM7 comprises the subject matter of any one of Examples FM3-FM6, and the entry further includes an indication of a memory location for the interrupt descriptor.

Example FM8 comprises the subject matter of any one of Examples FM1-FM7, and the method further includes: causing the first interrupt key to be generated; and encrypting the first interrupt key with a hardware key to generate the substitute interrupt key.

Example FM9 comprises the subject matter of any one of Examples FM1-FM8, and the method further includes: causing a unique key identifier to be generated as the substitute interrupt key; and encrypting the substitute interrupt key using a hardware key to generate the first interrupt key.

Example FM10 comprises the subject matter of any one of Examples FM1-FM9, and the method further includes: creating a second interrupt descriptor in the memory for the first process; generating a second substitute interrupt key corresponding to a second interrupt key to be used for communicating between the first process and a hardware device; communicating the second substitute interrupt key to the first process and to the second process; and providing an encrypted memory address of the second interrupt descriptor to the hardware device; receiving, from the hardware device, a second interrupt request to interrupt the first process; decrypting the encrypted memory address of the second interrupt descriptor in the second interrupt request using the second interrupt key; and updating the second interrupt descriptor with the second interrupt request.

Example FM11 comprises the subject matter any one of Examples FM1-FM10, and further comprises the steps of the method of any one of Examples AM1-AM10 (as far as those method steps are not redundant with method steps of Examples FM1-FM10).

Computer-Related-Method, Means-plus-Function, and General multiple dependent Examples:

Example G1 includes an apparatus comprising means to perform one or more elements of a method of any one of Examples AM1-AM20, BM1-BM14, CM1-CM17, DM1-DM10, DMM1-DMM6, EM1-EM13 and FM1-FM10.

Example G2 includes one or more non-transitory computer-readable media comprising instructions to cause an electronic device, upon execution of the instructions by one or more processors of the electronic device, to perform one or more elements of a method of any one of Examples AM1-AM20, BM1-BM14, CM1-CM17, DM1-DM10, DMM1-DMM6, EM1-EM13 and FM1-FM10.

Example G3 includes machine-readable storage including machine-readable instructions which, when executed, implement the method of any one of Examples AM1-AM20, BM1-BM14, CM1-CM17, DM1-DM10, DMM1-DMM6, EM1-EM13 and FM1-FM10.

Example G4 includes an apparatus comprising: one or more processors and one or more computer-readable media comprising instructions that, when executed by the one or more processors, cause the one or more processors to perform the method of any one of Examples AM1-AM20, BM1-BM14, CM1-CM17, DM1-DM10, DMM1-DMM6, EM1-EM13 and FM1-FM10.

Example G5 includes a system including the processor of any one of claims AA1-AA20, BA1-BA14, and FA1-FA10, and further including a main memory coupled to the processor.

Example G6 includes a system including the apparatus of any one of claims CA1-CA17, DA1-DA10, DAA1-DAA6, and EA1-EA13, further including a main memory coupled to the apparatus Example G7 includes the system of any one of Examples G5 and G6, further including an input/output subsystem.

Example G8 includes the apparatus of any one of Examples AA1-AA20, and further comprising the features of any one of claims BA1-BA4, CA1-CA17, DA1-DA10, DAA1-DAA6, EA1-EA13 and FA1-FA10 (as far as those features are not redundant with features of Examples AA1-AA20).

Example G9 includes the method of any one of Examples AM1-AM20, and further comprising the features of any one of claims BM1-BM14, CM1-CM17, DM1-DM10, DMM1-DMM6, EM1-EM13, and FM1-FM10 (as far as those features are not redundant with features of Examples AA1-AA20).

Example G10 includes an apparatus comprising logic, modules, or circuitry to perform one or more elements of a method described in or related to any of Examples AM1-AM20, BM1-BM14, CM1-CM17, DM1-DM10, DMM1-DMM6, EM1-EM13 and FM1-FM10, and KM1-KM7, or any other method or process described herein.

Example G11 includes a method, technique, or process as described in or related to any of Examples AM1-AM20, BM1-BM14, CM1-CM17, DM1-DM10, DMM1-DMM6, EM1-EM13 and FM1-FM10, or portions or parts thereof.

Example G12 includes an apparatus comprising: one or more processors and one or more computer-readable media comprising instructions that, when executed by the one or more processors, cause the one or more processors to perform the method, techniques, or process as described in or related to any of Examples AM1-AM20, BM1-BM14, CM1-CM17, DM1-DM10, DMM1-DMM6, EM1-EM13 and FM1-FM10, or portions thereof.

Example G13 includes a signal as described in or related to any of the examples herein, or portions or parts thereof.

Example G14 includes a datagram, packet, frame, segment, protocol data unit (PDU), or message as described in or related to any of the examples herein, or portions or parts thereof, or otherwise described in the present disclosure.

Example G15 includes a signal encoded with data as described in or related to any of the examples herein, or portions or parts thereof, or otherwise described in the present disclosure.

Example G16 includes a signal encoded with a datagram, packet, frame, segment, protocol data unit (PDU), or message as described in or related to any of the examples herein, or portions or parts thereof, or otherwise described in the present disclosure.

Example G17 includes an electromagnetic signal carrying computer-readable instructions, wherein execution of the computer-readable instructions by one or more processors is to cause the one or more processors to perform the method, techniques, or process as described in or related to any of Examples AM1-AM20, BM1-BM14, CM1-CM17, DM1-DM10, DMM1-DMM6, EM1-EM13 and FM1-FM10, or portions thereof.

Example G18 includes a computer program comprising instructions, wherein execution of the program by a processing element is to cause the processing element to carry out the method, techniques, or process as described in or related to any of Examples AM1-AM20, BM1-BM14, CM1-CM17, DM1-DM10, DMM1-DMM6, EM1-EM13 and FM1-FM10, or portions thereof.

What is claimed is:

1. A processor comprising:
    first circuitry to:
        encrypt a first code image using a first code key to generate an encrypted first code image;
        load the encrypted first code image into a memory area allocated in memory for the first code image by an operating system running on the processor; and
        send to the operating system a substitute key that corresponds to the first code key, wherein the first code key is concealed from the operating system; and
    an instruction cache including control circuitry; and
    second circuitry coupled to the instruction cache, the second circuitry to:
        receive the substitute key from the operating system;
        in response to a first request from the operating system to execute the first code image to instantiate a first process, perform a first cryptographic function using a hardware key to generate the first code key from the substitute key; and
        program the control circuitry of the instruction cache with the first code key to enable the first code image to be decrypted using the first code key.

2. The processor of claim 1, wherein the substitute key is an encrypted version of the first code key.

3. The processor of claim 2, wherein the first circuitry is further to:
    prior to encrypting the first code image with the first code key, generate the first code key from a root key; and
    perform a second cryptographic function on the first code key, using the hardware key, to generate the substitute key, wherein the second cryptographic function includes an encryption algorithm.

4. The processor of claim 1, wherein the substitute key is a unique key identifier.

5. The processor of claim 4, wherein the first circuitry is further to:
    prior to encrypting the first code image with the first code key, generate the unique key identifier;
    perform the first cryptographic function on the unique key identifier, using the hardware key, to obtain the first code key; and
    perform a second cryptographic function on the first code key, using the hardware key, to generate the substitute key, wherein the second cryptographic function includes an decryption algorithm.

6. The processor of claim 1, wherein the first circuitry is further to:
    prior to encrypting the first code image, inject an attestation key into the first code image; and
    send the attestation key to a user.

7. The processor of claim 1, wherein the first circuitry is further to:
    prior to encrypting the first code image, inject a plurality of no-operation instructions into the first code image at a given block granularity, wherein the second circuitry is further to:
prior to executing a decrypted instruction of the first code image, determine whether the first code image has been modified based on the decrypted instruction.

8. The processor of claim 1, wherein the second circuitry is further to:
    prior to executing the first code image, determine whether the first code key is valid, wherein determining that the first code key is valid includes determining that the first code key was established for the first process.

9. The processor of claim 1, wherein the first circuitry is further to:
    establish a data key to be used for encrypting and decrypting data to be associated with the first process.

10. The processor of claim 1, wherein the second circuitry is further to:
    encrypt the first code image based, in part on a tweak, the tweak including at least a portion of a linear address corresponding to the memory area where the first code image is stored.

11. A method comprising:
    encrypting a first code image using a first code key to generate an encrypted first code image;
    loading the encrypted first code image into a memory area allocated in memory for the first code image by an operating system running on a processor coupled to the memory;
    sending to the operating system a substitute key that corresponds to the first code key, wherein the first code key is concealed from the operating system;
    receiving, at the processor, the substitute key from the operating system;
    in response to a first request from the operating system to execute the first code image to instantiate a first process, performing a first cryptographic function using a hardware key to generate the first code key from the substitute key; and
    programing control circuitry of an instruction cache in the processor with the first code key to enable decryption of the first code image using the first code key.

12. The method of claim 11, further comprising:
encrypting the first code image based, in part on a tweak, the tweak including at least a portion of a linear address corresponding to the memory area where the first code image is stored.

13. The method of claim 12, wherein the tweak further includes execute permission metadata that indicates whether the first code image has permission to execute.

14. The method of claim 11, wherein the hardware key is stored in fuses of the processor, stored in read-only memory (ROM) coupled to the processor, or generated by a physically unclonable function coupled to the processor.

15. The method of claim 11, wherein the hardware key is inaccessible to the operating system running on the processor.

16. A non-transitory storage medium including machine-readable instructions that, when executed by a processor circuitry, cause the processor circuitry to perform operations including:
encrypting a first code image using a first code key to generate an encrypted first code image;
loading the encrypted first code image into a memory area allocated in memory for the first code image by an operating system running on a processor coupled to the memory;
sending to the operating system a substitute key that corresponds to the first code key, wherein the first code key is concealed from the operating system;
receiving, at the processor, the substitute key from the operating system;
in response to a first request from the operating system to execute the first code image to instantiate a first process, performing a first cryptographic function using a hardware key to generate the first code key from the substitute key; and
programing control circuitry of an instruction cache in the processor with the first code key to enable decryption of the first code image using the first code key.

17. The storage medium of claim 16, wherein the first code image is encrypted in response to receiving an initial request from the operating system to load the first code image into the memory area.

18. The storage medium of claim 16, further comprising:
programming data cache control circuitry coupled to a data cache with a first data key associated with the first process, wherein first data stored in the data cache for the first process is decrypted using the first data key programmed in the data cache control circuitry.

19. The storage medium of claim 18, wherein the first data is decrypted based, in part, on a tweak including at least a portion of a linear address of the first data.

20. The storage medium of claim 18, further comprising to:
receiving a second substitute key from the operating system;
in response to a second request from the first process to execute a library image to instantiate a library process, performing the first cryptographic function using the hardware key to generate a library key from the second substitute key; and
programming the control circuitry for the instruction cache with the library key to enable decryption of the library image using the library key.

21. The storage medium of claim 20, wherein second data stored in the data cache for the library process is decrypted using the first data key programmed in the data cache control circuitry.

22. The storage medium of claim 20, further comprising:
receiving a third substitute key from the operating system;
in response to a third request from the operating system to execute a second code image to instantiate a second process to run concurrently with the first process, performing the first cryptographic function using the hardware key to generate a second code key from the third substitute key; and
programming the control circuitry of the instruction cache with the second code key to enable decryption of the second code image using the second code key.

23. The storage medium of claim 22, further comprising:
in response to a fourth request from the second process to execute the library image, programming the control circuitry for the instruction cache with the library key to enable decryption of the library image using the library key.

24. An apparatus comprising:
means for encrypting a first code image using a first code key to generate an encrypted first code image;
means for loading the encrypted first code image into a memory area allocated in memory for the first code image by an operating system running on a processor coupled to the memory;
means for sending to the operating system a substitute key that corresponds to the first code key, wherein the first code key is concealed from the operating system;
means for receiving, at the processor, the substitute key from the operating system;
means for, in response to a first request from the operating system to execute the first code image to instantiate a first process, performing a first cryptographic function using a hardware key to generate the first code key from the substitute key; and
means for programing control circuitry of an instruction cache in the processor with the first code key to enable decryption of the first code image using the first code key.

25. The apparatus of claim 24, further comprising:
means for encrypting the first code image based, in part on a tweak, the tweak including at least a portion of a linear address corresponding to the memory area where the first code image is stored.

* * * * *